(12) United States Patent
Gordon et al.

(10) Patent No.: US 11,431,834 B1
(45) Date of Patent: *Aug. 30, 2022

(54) SCREEN INTERFACE FOR A MOBILE DEVICE APPARATUS

(71) Applicant: Majen Tech, LLC, Longview, TX (US)

(72) Inventors: George Andrew Gordon, Frisco, TX (US); Joseph A Cerrato, Longview, TX (US); Ronald A Johnston, Longview, TX (US); Kevin J Zilka, Los Gatos, CA (US)

(73) Assignee: Majen Tech, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,614

(22) Filed: Jul. 20, 2018

Related U.S. Application Data

(63) Continuation of application No. 15/924,272, filed on Mar. 18, 2018, now Pat. No. 10,051,103, which is a
(Continued)

(51) Int. Cl.
*H04M 1/72412* (2021.01)
*G06Q 20/32* (2012.01)
(Continued)

(52) U.S. Cl.
CPC .... *H04M 1/72412* (2021.01); *G06F 3/04883* (2013.01); *G06F 21/32* (2013.01); *G06F 21/36* (2013.01); *G06Q 20/3227* (2013.01)

(58) Field of Classification Search
CPC .. H04M 1/7253; G06F 3/04883; G06F 21/32; G06F 21/36; G06Q 20/3227
See application file for complete search history.

(56) References Cited

U.S. PATENT DOCUMENTS

| 5,797,031 A | 8/1998 | Shapiro et al. |
| 5,924,042 A | 7/1999 | Sakamoto et al. |

(Continued)

FOREIGN PATENT DOCUMENTS

| AU | 2014278594 A1 | 12/2015 |
| DK | 201670559 B | 7/2016 |

(Continued)

OTHER PUBLICATIONS

Broida, Rick, "iPhone tip: Select multiple photos to share or to delete", clnet, Aug. 16, 2010.*
(Continued)

*Primary Examiner* — Shefali D Goradia
(74) *Attorney, Agent, or Firm* — Patrick E. Caldwell, Esq.; The Caldwell Firm, LLC

(57) ABSTRACT

An electronic device is provided comprising: a user interface component configured to output stimuli and receive inputs; a connection component configured to transmit communications to other devices, one or more processors coupled to the user interface component and the connection component; and a computer-readable storage medium containing instructions, that, when executed by the one or more processors, cause the one or more processors to perform actions including: securely storing, at the electronic device, payment information associated with a payment account; detecting a proximate POS terminal; in response to detecting the proximate POS terminal, determining that a mechanical input authorizing a payment transaction has not been locally received at the electronic device within a time period; in response to the determination, presenting a stimulus indicating that the mechanical input has not been locally received; detecting, subsequent to the stimulus presentation, via the user interface component, a mechanical input was locally received at the electronic device; in response to
(Continued)

detecting that the mechanical input has been locally received at the device, enabling the payment information to be accessed; and transmitting, from the electronic device, a communication including the payment information to the POS terminal.

58 Claims, 34 Drawing Sheets

Related U.S. Application Data continuation of application No. 15/789,867, filed on Oct. 20, 2017, now Pat. No. 10,057,400, which is a continuation-in-part of application No. 14/050,332, filed on Oct. 9, 2013, now abandoned.

(60) Provisional application No. 61/751,212, filed on Jan. 10, 2013.

(51) Int. Cl.
  *G06F 3/04883* (2022.01)
  *G06F 21/32* (2013.01)
  *G06F 21/36* (2013.01)

(56) References Cited

U.S. PATENT DOCUMENTS

| | | | |
|---|---|---|---|
| 6,282,612 B1 | 8/2001 | Sakajiri et al. | |
| 6,703,918 B1 | 3/2004 | Kita | |
| 6,868,074 B1 | 3/2005 | Hanson | |
| 6,974,078 B1 | 12/2005 | Simon | |
| 6,985,078 B2 | 1/2006 | Suzuki et al. | |
| 7,254,786 B2 | 8/2007 | Henriquez | |
| 7,641,111 B2 | 1/2010 | Adams et al. | |
| 7,900,833 B2 | 3/2011 | Silverbrook et al. | |
| 7,946,477 B1 | 5/2011 | Ramachandran et al. | |
| 8,023,895 B2 | 9/2011 | Smith | |
| 8,065,235 B2 | 11/2011 | Narayanaswami et al. | |
| 8,113,438 B1 | 2/2012 | Leason et al. | |
| 8,126,806 B1 | 2/2012 | DiMartino et al. | |
| 8,196,131 B1 | 6/2012 | Behren et al. | |
| 8,223,024 B1 | 7/2012 | Petrou | |
| 8,291,349 B1 | 10/2012 | Park et al. | |
| 8,335,932 B2 | 12/2012 | Behren et al. | |
| 8,346,672 B1 | 1/2013 | Weiner et al. | |
| 8,370,431 B1 | 2/2013 | Wang et al. | |
| 8,380,177 B2 | 2/2013 | Laracey | |
| 8,417,225 B2 | 4/2013 | Mock et al. | |
| 8,577,803 B2 * | 11/2013 | Chatterjee | G06Q 20/386 705/41 |
| 8,649,770 B1 | 2/2014 | Cope et al. | |
| 8,666,895 B2 | 3/2014 | Grigg et al. | |
| 9,129,273 B2 | 9/2015 | Baldwin et al. | |
| 9,299,072 B2 | 3/2016 | Khan et al. | |
| 9,400,977 B2 | 7/2016 | Brown et al. | |
| 9,483,758 B2 * | 11/2016 | Rhee | G06Q 20/3674 |
| 9,519,901 B1 * | 12/2016 | Dorogusker | G06Q 20/401 |
| 9,529,490 B2 | 12/2016 | Li | |
| 9,830,589 B2 * | 11/2017 | Xing | G06Q 20/3829 |
| 9,864,984 B2 | 1/2018 | Khan et al. | |
| 10,120,541 B2 | 11/2018 | Shaw et al. | |
| 10,223,682 B2 | 3/2019 | Brown et al. | |
| 10,379,830 B2 * | 8/2019 | Prasad | G06F 11/3438 |
| 10,489,769 B2 | 11/2019 | Brown et al. | |
| 10,551,876 B2 | 2/2020 | Sepulveda et al. | |
| 10,635,134 B2 | 4/2020 | Sepulveda et al. | |
| 10,642,416 B2 | 5/2020 | Sepulveda et al. | |
| 10,699,262 B2 | 6/2020 | Brown et al. | |
| 10,754,603 B2 | 8/2020 | Bernstein et al. | |
| 10,861,090 B2 | 12/2020 | Haggerty et al. | |
| 2002/0169673 A1* | 11/2002 | Prorock | G06Q 20/20 705/16 |
| 2003/0001722 A1 | 1/2003 | Smith | |
| 2003/0028481 A1 | 2/2003 | Flitcroft et al. | |
| 2003/0108009 A1 | 6/2003 | Petersen | |
| 2004/0054629 A1 | 3/2004 | Jong et al. | |
| 2004/0225613 A1 | 11/2004 | Narayanaswami et al. | |
| 2005/0074125 A1 | 4/2005 | Chavanne et al. | |
| 2005/0221798 A1 | 10/2005 | Sengupta et al. | |
| 2006/0131390 A1 | 6/2006 | Kim | |
| 2006/0135142 A1 | 6/2006 | Repka | |
| 2006/0189382 A1 | 8/2006 | Muir et al. | |
| 2006/0224989 A1 | 10/2006 | Pettiross et al. | |
| 2006/0288233 A1 | 12/2006 | Kozlay | |
| 2007/0035513 A1 | 2/2007 | Sherrard et al. | |
| 2007/0050618 A1 | 3/2007 | Roux et al. | |
| 2007/0152035 A1 | 7/2007 | Adams et al. | |
| 2007/0157094 A1 | 7/2007 | Lemay et al. | |
| 2007/0162350 A1 | 7/2007 | Friedman | |
| 2007/0206743 A1 | 9/2007 | Chang | |
| 2008/0011833 A1 | 1/2008 | Saarisalo | |
| 2008/0045806 A1 | 2/2008 | Keppler | |
| 2008/0165210 A1 | 7/2008 | Platzer et al. | |
| 2008/0235144 A1 | 9/2008 | Phillips | |
| 2009/0007014 A1 | 1/2009 | Coomer et al. | |
| 2009/0159678 A1 | 6/2009 | Day et al. | |
| 2009/0182630 A1* | 7/2009 | Otto | G06Q 20/20 705/14.1 |
| 2009/0212902 A1 | 8/2009 | Haddock | |
| 2009/0300649 A1 | 12/2009 | Gopal et al. | |
| 2010/0023449 A1 | 1/2010 | Skowronek et al. | |
| 2011/0040980 A1* | 2/2011 | Kerr | G06F 21/6245 713/189 |
| 2011/0117898 A1 | 5/2011 | Pereira et al. | |
| 2011/0163969 A1 | 7/2011 | Anzures et al. | |
| 2011/0165896 A1 | 7/2011 | Stromberg et al. | |
| 2011/0202834 A1 | 8/2011 | Mandryk et al. | |
| 2011/0214158 A1 | 9/2011 | Pasquero et al. | |
| 2011/0239304 A1 | 9/2011 | Saarisalo | |
| 2011/0264586 A1* | 10/2011 | Boone | G06Q 20/3276 705/67 |
| 2012/0011572 A1 | 1/2012 | Chew et al. | |
| 2012/0015629 A1 | 1/2012 | Olsen et al. | |
| 2012/0017084 A1 | 1/2012 | Hutton | |
| 2012/0024947 A1 | 2/2012 | Naelon | |
| 2012/0030043 A1 | 2/2012 | Ross et al. | |
| 2012/0030566 A1* | 2/2012 | Victor | G06F 3/04883 715/702 |
| 2012/0041767 A1 | 2/2012 | Hoffman et al. | |
| 2012/0095852 A1 | 4/2012 | Bauer et al. | |
| 2012/0143706 A1 | 6/2012 | Crake et al. | |
| 2012/0206335 A1 | 8/2012 | Osterhout et al. | |
| 2012/0221421 A1 | 8/2012 | Hammad | |
| 2012/0240041 A1 | 9/2012 | Lim et al. | |
| 2012/0241524 A1 | 9/2012 | Blot et al. | |
| 2012/0244805 A1 | 9/2012 | Haikonen et al. | |
| 2012/0254290 A1 | 10/2012 | Naaman | |
| 2012/0266220 A1 | 10/2012 | Brudnicki et al. | |
| 2012/0300932 A1 | 11/2012 | Cambridge et al. | |
| 2012/0310743 A1* | 12/2012 | Johri | G06Q 20/352 705/14.58 |
| 2013/0036382 A1 | 2/2013 | Yuan et al. | |
| 2013/0047123 A1 | 2/2013 | May et al. | |
| 2013/0060618 A1 | 3/2013 | Barton et al. | |
| 2013/0069985 A1 | 3/2013 | Wong et al. | |
| 2013/0073448 A1 | 3/2013 | Wall et al. | |
| 2013/0073449 A1 | 3/2013 | Voynow et al. | |
| 2013/0111599 A1 | 5/2013 | Gargiulo | |
| 2013/0117365 A1 | 5/2013 | Padmanabhan et al. | |
| 2013/0125020 A1 | 5/2013 | Lee et al. | |
| 2013/0151140 A1 | 6/2013 | Suh | |
| 2013/0151400 A1 | 6/2013 | Makhotin et al. | |
| 2013/0173477 A1 | 7/2013 | Cairns | |
| 2013/0189953 A1* | 7/2013 | Mathews | H04W 12/06 455/411 |
| 2013/0212470 A1 | 8/2013 | Karunamuni et al. | |
| 2013/0219342 A1 | 8/2013 | Nosou et al. | |
| 2013/0268331 A1 | 10/2013 | Bitz et al. | |
| 2013/0275883 A1 | 10/2013 | Bharshankar et al. | |
| 2013/0332297 A1 | 12/2013 | Forutanpour et al. | |
| 2013/0332353 A1 | 12/2013 | Aidasani et al. | |
| 2014/0030980 A1 | 1/2014 | D'Ambrosio | |

(56) References Cited

U.S. PATENT DOCUMENTS

| | | |
|---|---|---|
| 2014/0058937 A1 | 2/2014 | Watson |
| 2014/0108260 A1 | 4/2014 | Poole et al. |
| 2014/0129438 A1 | 5/2014 | Desai et al. |
| 2014/0162598 A1* | 6/2014 | Villa-Real ............... H04M 1/66 455/411 |
| 2014/0244494 A1 | 8/2014 | Davis et al. |
| 2014/0244495 A1 | 8/2014 | Davis et al. |
| 2014/0325614 A1 | 10/2014 | Rhelimi |
| 2014/0344153 A1 | 11/2014 | Raj et al. |
| 2014/0362056 A1 | 12/2014 | Zambetti et al. |
| 2014/0365882 A1 | 12/2014 | Lemay |
| 2014/0365912 A1 | 12/2014 | Shaw et al. |
| 2014/0365919 A1 | 12/2014 | Shaw et al. |
| 2014/0365953 A1 | 12/2014 | Zambetti et al. |
| 2015/0058191 A1 | 2/2015 | Khan et al. |
| 2015/0186871 A1 | 7/2015 | Laracey |
| 2015/0213542 A1 | 7/2015 | Wallaja |
| 2015/0227925 A1 | 8/2015 | Filler |
| 2015/0271091 A1 | 9/2015 | Maruyama |
| 2015/0348007 A1 | 12/2015 | Khan et al. |
| 2015/0348009 A1 | 12/2015 | Brown et al. |
| 2015/0348025 A1 | 12/2015 | Brown et al. |
| 2015/0356602 A1 | 12/2015 | Moore et al. |
| 2016/0037345 A1 | 2/2016 | Margadoudakis |
| 2016/0203467 A1 | 7/2016 | Khan et al. |
| 2016/0300211 A1 | 10/2016 | Brown et al. |
| 2016/0379205 A1 | 12/2016 | Margadoudakis |
| 2017/0010771 A1 | 1/2017 | Bernstein et al. |
| 2017/0010846 A1 | 1/2017 | Bernstein et al. |
| 2017/0010847 A1 | 1/2017 | Bernstein et al. |
| 2017/0286938 A1 | 10/2017 | Brown et al. |
| 2019/0073102 A1 | 3/2019 | Shaw et al. |
| 2019/0220134 A1 | 7/2019 | Sepulveda et al. |
| 2020/0042970 A1 | 2/2020 | Brown et al. |
| 2020/0249720 A1 | 8/2020 | Sepulveda et al. |
| 2021/0095852 A1 | 4/2021 | Jones et al. |

FOREIGN PATENT DOCUMENTS

| | | |
|---|---|---|
| DK | 201770561 A1 | 2/2018 |
| DK | 201670555 B | 10/2018 |
| EP | 2388744 A2 | 11/2011 |
| EP | 2956825 A2 | 4/2016 |
| EP | 3097472 A1 | 11/2016 |
| EP | 3149679 A1 | 4/2017 |
| EP | 3130999 A1 | 1/2019 |
| EP | 3465408 B1 | 8/2020 |
| EP | 3699746 A1 | 8/2020 |
| GB | 2237486 A | 5/1991 |
| GB | 2277183 A | 10/1994 |
| GB | 2407189 A | 4/2005 |
| NL | 2012929 A | 12/2014 |
| WO | 2008147457 A1 | 12/2008 |
| WO | 2009003941 A1 | 1/2009 |
| WO | 2009039419 A1 | 3/2009 |
| WO | 2010111002 A1 | 9/2010 |
| WO | 2010128442 A3 | 4/2011 |
| WO | 2011100623 A3 | 11/2011 |
| WO | 2013039528 A1 | 3/2013 |
| WO | 2014143843 A1 | 9/2014 |
| WO | 2014143916 A2 | 9/2014 |
| WO | 2014122451 A3 | 10/2014 |
| WO | 2014200730 A1 | 12/2014 |
| WO | 2014200676 A3 | 4/2015 |
| WO | 2015183412 A1 | 12/2015 |
| WO | 2018022313 A1 | 2/2018 |

OTHER PUBLICATIONS

Cipriani, Jason, "How to select multiple photos at once in iOS 9", clnet, Jul. 22, 2015.*

OSXDaily, "How to Select Multiple Photos Quickly on iPhone and iPad with a Drag & Select Gesture", Feb. 8, 2018.*
Paul Horowitz, "How to Delete Multiple Photos Directly on iPhone," OSXDaily, Aug. 3, 2012.*
Paul Horowitz, "How to Bulk Remove Many Photos on iPhone Quickly with a Date Trick,", OSXDaily, Jul. 17, 2014.*
Labrou, Yannis, et al. "Wireless wallet." The First Annual International Conference on Mobile and Ubiquitous Systems: Networking and Services, 2004. MOBIQUITOUS 2004.. IEEE, 2004.*
"Bell ID Secure Element in the Cloud," (product data sheet), Bell ID, [online], 2014, retrieved on Dec. 21, 2014], retrieved from the internet.
Bell ID, Bell ID: Secure Element in the Cloud, YouTube, video file, available online at https://www.youtube.com/watch?v=t5KuxXgW7Qs, Nov. 6, 2013.
Epstein, Video: Forget Smartphones and NFC, 'Coin' is the Future of Payments, BGR, available online at http://bgr.com/2013/11/14/coin-preorders-announcement-payment-solution/, Nov. 14, 2013.
Epstein, Zach, "Video: Forget smartphones and NFC, 'Coin' is the future of payments," Yahoo News, [online], Nov. 14, 2013, Apr. 13, 2012, [retrieved on Nov. 20, 2014], retrieved from the internet.
U.S. Pat. No. 10,489,769.
U.S. Pat. No. 9,400,977.
Rakesh, "WiFi Direct is Better Than Bluetooth for Sharing Files Between Android Devices," http://www.droidviews.com/wifi-direct-is-better-than-bluetooth-for-exchanging-files-between-android-devices, Mar. 7, 2013, 12 pages.
Wallen, "Five Useful Tips for Your Samsung Galaxy S III," TechRepublic, http:www.techrepublic.com/blog.smartphones/five-useful-tips-for-your-Samsung-Galaxy-S-III, Nov. 1, 2012, 12 pages.
Wikipedia, "iOS 5," https://en.wikipedia.org/wiki/IOS 5#:~:text=iOS%205%20is%20the%20fifth,6%20on%20September%2019%2C%202012.
Advisory Action, dated Sep. 28, 2021, in U.S. Appl. No. 17/180,662.
Broida, Rick, "iPhone Tip: Select multiple photos to share or to delete", cjnet, Aug. 16, 2010.
Cipriani, Jason, "Howto select multiple photos at once in iOS 9", cjnet, Jul. 22, 2015.
Final Rejection, dated Sep. 1, 2021 for U.S. Appl. No. 17/180,662.
Final Rejection, dated Sep. 1, 2021, in U.S. Appl. No. 17/180,662.
Final Rejection, dated Nov. 19, 2021, in U.S. Appl. No. 17/180,662.
Horowitz, Paul, "How to Delete Multiple Photos Directly on iPhone", OSXDaily, Jul. 17, 2014.
Horowitz, Paul, "How to Bulk Remove Many Photos on iPhone Quickly with a Date Trick", OSXDaily, Jul. 17, 2014.
Non-Final Rejection, dated Aug. 9, 2021 for U.S. Appl. No. 16/990,990.
Non-Final Rejection, dated Aug. 18, 2021 for U.S. Appl. No. 16/041,614.
Non-Final Rejection, dated May 4, 2021, in U.S. Appl. No. 17/180,662.
Notice of Appeal, dated Sep. 16, 2021, in U.S. Appl. No. 17/180,662.
Office Action dated Mar. 31, 2021 for U.S. Appl. No. 16/041,614.
Office Action dated May 12, 2021 for U.S. Appl. No. 16/041,611.
Office Action dated Jun. 1, 2021 for U.S. Appl. No. 16/041,614.
Office Action dated Jun. 10, 2020 for U.S. Appl. No. 16/041,611.
Office Action dated Jun. 10, 2020 for U.S. Appl. No. 16/041,614.
Office Action dated Oct. 3, 2019 for U.S. Appl. No. 16/041,611.
Office Action dated Oct. 3, 2019 for U.S. Appl. No. 16/041,614.
Office Action dated 2020/01/03 for U.S. Appl. No. 16/357,161.
Office Action, dated Aug. 3, 2021 for U.S. Appl. No. 16/357,161.
Pre-Brief Appeal Conference Decision, dated Nov. 4, 2021, in U.S. Appl. No. 17/180,662.
Notice of Allowance dated Apr. 13, 2022 for U.S. Appl. No. 16/357,161.
Office Action dated Nov. 19, 2021 for U.S. Appl. No. 17/180,662.
Office Action dated Dec. 8, 2021 for U.S. Appl. No. 16/041,611.

* cited by examiner

SCREEN INTERFACE FOR A MOBILE DEVICE APPARATUS

RELATED APPLICATIONS

The present application is a continuation of U.S. patent application Ser. No. 15/924,272 filed on Mar. 18, 2018 which, in turn, is a continuation of U.S. patent application Ser. No. 15/789,867 filed on Oct. 20, 2017 which, in turn, is a continuation-in-part of U.S. patent application Ser. No. 14/050,332 filed on Oct. 9, 2013 (published as US 2018-0032997 A1) which, in turn, claims priority to U.S. Patent Application No. 61/751,212 filed Jan. 10, 2013, which are all incorporated herein by reference in their entirety for all purposes.

FIELD OF THE INVENTION AND BACKGROUND

The present invention relates to mobile devices, and more particularly to mobile device screen interfaces.

SUMMARY

A system, method, and computer program product are provided to: display, utilizing the touchscreen, a grid of a plurality of photos; receive, utilizing the touchscreen, an indication of a touch input for selection of a first photo of a subset of the plurality of photos in the grid; in response to the receipt of the indication of the touch input for selection of the first photo of the subset of the plurality of photos in the grid, cause selection of the first photo of the subset of the plurality of photos in the grid, utilizing the one or more processors; in response to the receipt of the indication of the touch input for selection of the first photo of the subset of the plurality of photos in the grid, change at least one visual aspect of the first photo of the subset of the plurality of photos in the grid, for visually indicating the selection of the first photo of the subset of the plurality of photos in the grid; in response to the receipt of the indication of the touch input for selection of the first photo of the subset of the plurality of photos in the grid, add a check mark icon to the first photo of the subset of the plurality of photos in the grid, for visually indicating the selection of the first photo of the subset of the plurality of photos in the grid; receive, utilizing the touchscreen, an indication of a continuation of the touch input for selection of a second photo of the subset of the plurality of photos in the grid; in response to the receipt of the indication of the continuation of the touch input for selection of the second photo of the subset of the plurality of photos in the grid, cause selection of the second photo of the subset of the plurality of photos in the grid, utilizing the one or more processors; in response to the receipt of the indication of the continuation of the touch input for selection of the second photo of the subset of the plurality of photos in the grid, change at least one visual aspect of the second photo of the subset of the plurality of photos in the grid, for visually indicating the selection of the second photo of the subset of the plurality of photos in the grid; in response to the receipt of the indication of the continuation of the touch input for selection of the second photo of the subset of the plurality of photos in the grid, add a check mark icon to the second photo of the subset of the plurality of photos in the grid, for visually indicating the selection of the second photo of the subset of the plurality of photos in the grid; and operate on the subset of the plurality of photos.

An electronic device is provided comprising: a user interface component configured to output stimuli and receive inputs; a connection component configured to transmit communications to other devices, one or more processors coupled to the user interface component and the connection component; and a computer-readable storage medium containing instructions, that, when executed by the one or more processors, cause the one or more processors to perform actions including: securely storing, at the electronic device, payment information associated with a payment account; detecting a proximate POS terminal; in response to detecting the proximate POS terminal, determining that a mechanical input authorizing a payment transaction has not been locally received at the electronic device within a time period; in response to the determination, presenting a stimulus indicating that the mechanical input has not been locally received; detecting, subsequent to the stimulus presentation, via the user interface component, a mechanical input was locally received at the electronic device; in response to detecting that the mechanical input has been locally received at the device, enabling the payment information to be accessed; and transmitting, from the electronic device, a communication including the payment information to the POS terminal.

DETAILED DESCRIPTION

Figure 1:
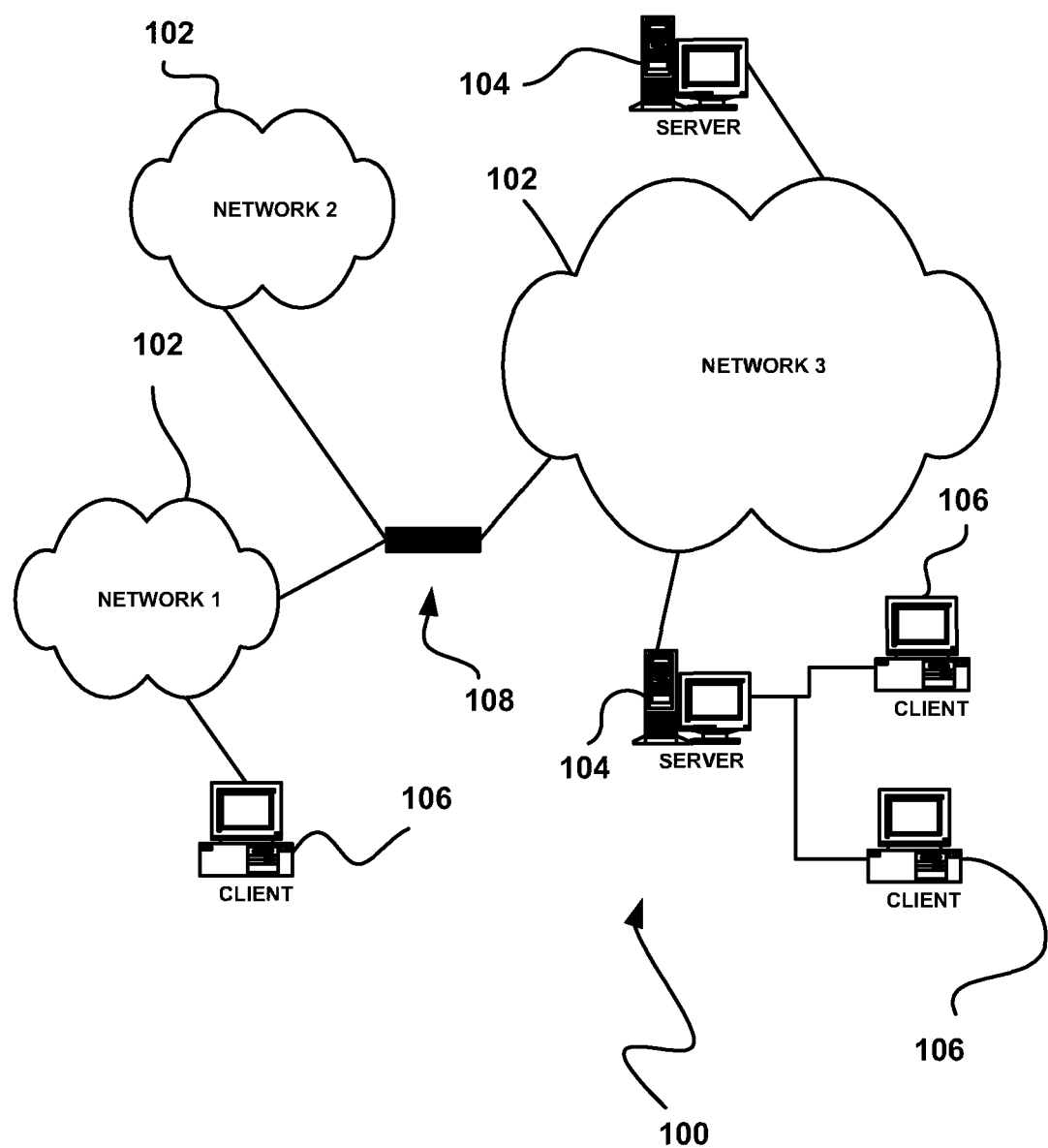
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g., printer, etc.), any component of a computer, and/or any other type of logic. In order to facilitate communication among the networks 102, at least one gateway 108 is optionally coupled therebetween.

Figure 2:
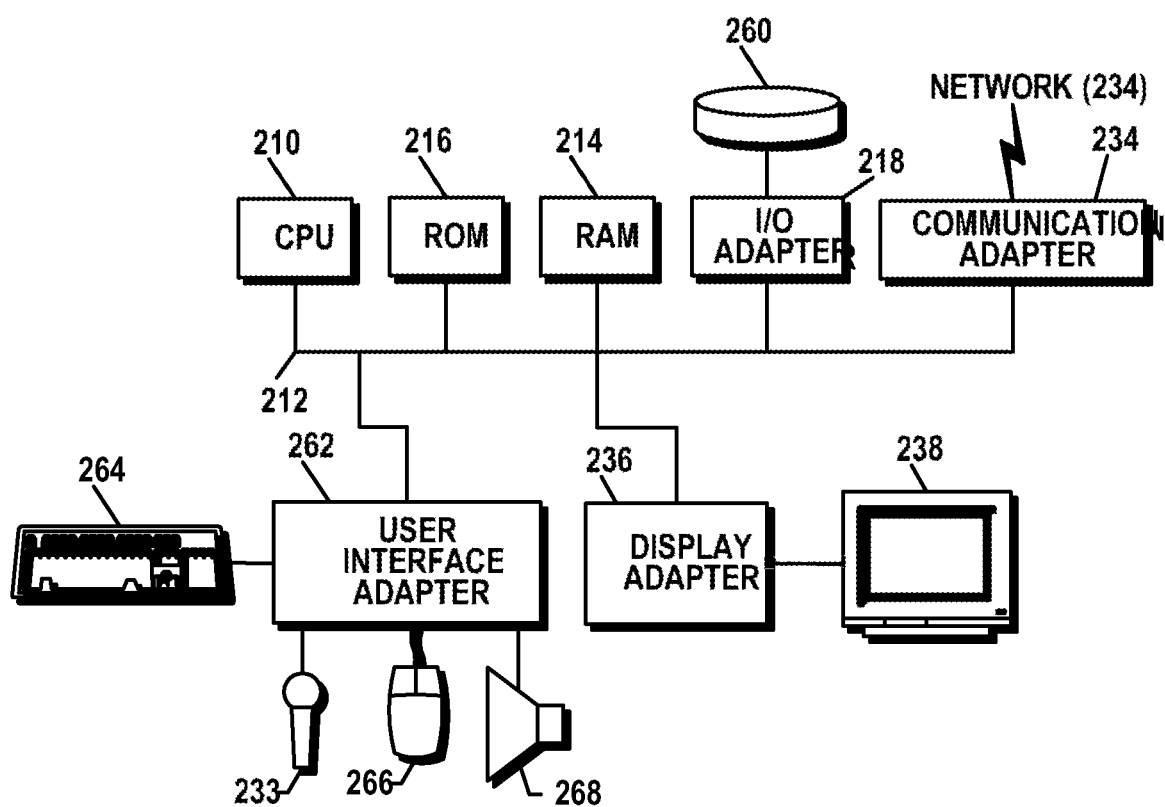
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
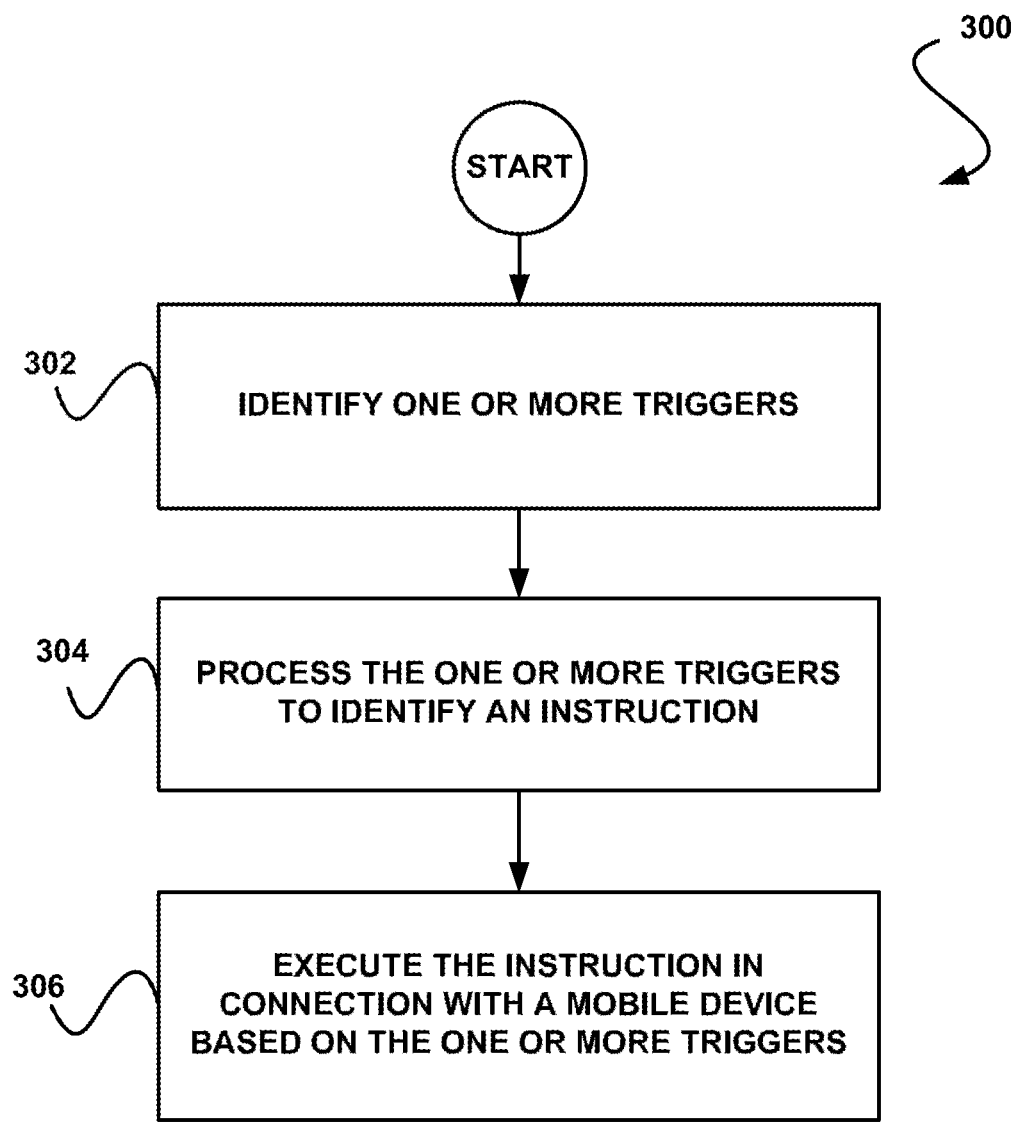
FIG. 3 shows a method for executing an instruction in connection with a mobile device, in accordance with one embodiment.

FIG. 3 shows a method 300 for executing an instruction in connection with a mobile device, in accordance with one embodiment. As an option, the method 300 may be implemented in the context of the architecture and environment of the previous Figures and/or any subsequent Figure(s). Of course, however, the method 300 may be carried out in any desired environment.

As shown, one or more triggers are identified. See operation 302. Additionally, the one or more triggers are processed to identify an instruction. See operation 304. Further, the instruction is executed in connection with a mobile device based on the one or more triggers. See operation 306.

In the context of the present description, a trigger may include anything which may be associated with the mobile device and which may cause the mobile device to respond and/or take action in some manner. For example, in various embodiments, a trigger may include time, date, location, a phone conversation, notes, other devices near the user's mobile device (e.g., a device associated with a trusted entity, etc.), weather, a map (e.g., as an application on the mobile device, etc.), a rss feed, calendar, carrier information (e.g., signal strength, etc.), social media (e.g., comments, postings, uploads, etc.), stocks, an action (e.g., by a user, by an application, by a trusted entity, etc.), a plurality of actions (e.g., by the user, by an application, by a trusted entity, etc.), messaging platform (e.g., email, voicemail, SMS, etc.), camera, browsing history (e.g., of the user, of another entity, etc.), purchase history (e.g., of the user, of another entity, etc.), network (e.g., WiFi, NFC, Bluetooth, connectivity, etc.), speed (e.g., speed of the user, speed of a vehicle, etc.), a request (e.g., from another device, from a cloud based app, from another entity, etc.), an application (e.g., installed on the device, associated with an installed application, associated with an app management system, etc.), and/or any other feature which may cause the mobile device to respond and/or take action in some manner. In another embodiment, a trigger may include a macro, a script, and/or any other preconfigured set of one or more inputs.

An instruction may include one or more triggers and one or more response actions. A response action may include any action taken by the mobile device in response to one or more triggers. For example, in various embodiments, a response action may include posting and/or sending a message (e.g., via social network, via email, via SMS, etc.), displaying and/or suppressing a notification (e.g., text notification, audible notification, etc.), uploading and/or downloading a data file (e.g., photo, document, etc.), activating and/or deactivating a service (e.g., Bluetooth, WiFi, GPS, NFC, device volume, device screen brightness, etc.), creating a data file (e.g., email, document, photo, SMS, posting, etc.), modifying and/or deleting a data file (e.g., email, document, photo, SMS, posting, etc.), importing and/or exporting a data entry (e.g., contact, etc.), executing and/or quitting a mobile device app (e.g., Facebook app, Yelp app, Flickr app, etc.), send and/or receive a message (e.g., SMS, email, chat, etc.), accept and/or reject a connection (e.g., Facebook friend, Linked-in contact, CRM database management service, etc.), initiate and/or reject payment (e.g., ticket purchase, online service purchase, purchase verification email, etc.), completing a phone call, navigating to a destination, updating a user list (e.g., todo list, etc.), updating a count (e.g., kitchen item inventory, etc.), purchasing and/or ordering an item (e.g., grocery item, car oil etc.), scheduling an appointment (e.g., with a client, with a doctor, etc.), and/or taking any action in response to a trigger. In another embodiment, a response action may include a macro, a script, and/or any other preconfigured set of one or more actions.

Additionally, the response action may include an advertisement, a suggestion, incentive, useful information, a utilitarian function, and/or any type of an output. Useful information and/or utilitarian function may include, but are not limited to passes (e.g., boarding or travel passes, etc.), tickets (e.g., movie or event tickets, etc.), commerce-related programs/cards (e.g., loyalty program/cards, etc.), etc. In the context of the present description, an advertisement may include anything (e.g., media, deal, coupon, suggestion, helpful information/utility, etc.) that has at least a potential of incentivizing or persuading or increasing the chances that one or more persons will purchase a product or service.

Further, in one embodiment, the response action may occur based on availability of the user (e.g., active use of the device, no appointments listed, etc.). For example, in one embodiment, the response action may conditionally occur based on a facial recognition in connection with a user of the mobile device. In one embodiment, if it is determined that the user is viewing the mobile device, utilizing facial recognition, the action may occur utilizing the mobile device. In another embodiment, the action may occur based on movements by the user and/or device (e.g., as determined by accelerometers, gyroscopes, device sensors, etc.). For example, in one embodiment, the movement of the device may indicate the user is walking and has sat down (e.g., in a vehicle, etc.), whereupon the device Bluetooth system may be activated and Pandora may automatically begin to stream from the phone to a vehicle audio system. Of course, any response action may occur in response to any trigger.

Additionally, the application on the mobile device may include any type of online or locally stored application. In various embodiments, the application may include a social network application, a dating service application, an on-line retailer application, a browser application, a gaming application, a media application, an application associated with a product, an application associated with a location, an application associated with a store (e.g., an online store, a brick and mortar store, etc.), an application associated with a service, an application associated with discounts and/or coupon services, an application associated with a company, any application that performs, causes, or facilitates the aforementioned action(s), and/or any other type of application including, but not limited to those disclosed herein.

In the context of the present description, the mobile device may include any type of mobile device, including a cellular phone, a tablet computer, a handheld computer, a media device, a mobile device associated with a vehicle, a PDA, an e-reader, and/or any other type of mobile device.

In one embodiment, the trigger may include receiving a communication (e.g., advertisement, message, etc.) and the response action may include displaying an advisement. In one embodiment, the advertisement may be displayed in a non-intrusive manner. For example, in one embodiment, the action (e.g., advertisement, etc.) may be manifested utilizing a lock screen, or any other type of additional screen (e.g., swipe down screen, etc.), of the mobile device. In another embodiment, the action (e.g., advertisement, etc.) may be manifested during an unlocking of a lock screen of the mobile device. In still other embodiments, the action (e.g., advertisement, etc.) may be manifested in a manner that is integrated in any regular usage of the mobile device. Of course, any such manifestation of the aforementioned action may be presented in any manner that reduces an intrusiveness of a presentation thereof.

In another embodiment, the trigger may include receiving input from the user, including navigating to a gallery of photos, selecting photos to be shared, and selecting a recipient. The response action to such triggers may be to send the photos (e.g., email, SMS, etc.) to the recipient, to upload the photos (or a compressed folder of photos, etc.) to an account (e.g., social networking site, etc.) associated with the recipient, to modify (e.g., compress, apply filters, etc.) the photos before sending them to the recipient, and/or to take any other action relating to the selection of the photos and of a recipient. The instruction recorded therefore may include both the triggers (e.g., input from the user, etc.) and the response action or one or more actions.

Further still, in one embodiment, the trigger may include receiving a weather update (e.g., via RSS feed, via email, via weather application, via push update, etc.). A response action may include displaying a notification, causing a map application to update a route to account for weather conditions, causing a calendar appointment to calculate the time at which the user must leave to arrive at one or more appointments on time, sending an email notification to participants of an event regarding the weather update, and/or taking any other action in response to the weather update. The instruction recorded therefore may include both an update received (e.g., regarding weather, etc.) and one or more response actions (e.g., display notification, interact with other applications, etc.).

In the context of the present description, executing the instruction may include implementing the one or more triggers and the one or more response actions in any manner. For example, in various embodiments, executing the instruction may include applying a macro, causing one or more applications to interact, applying a script, applying a string of commands, and/or applying one or more triggers and one or more response actions. In one embodiment, the instruction may be executed automatically (e.g., as a result of one or more triggers, etc.) or manually. Additionally, in another embodiment, the instruction may be executed by a voice command, by a remote configuration (e.g., command from a remote device, etc.), and/or by any other manner.

As an example, in one embodiment, the instruction may include pressing a button on a homescreen (or anywhere located on the device, etc.), causing a string of commands to be implemented including determining all emails received from the last week from CONTACT_X, forwarding the batch of emails onto CONTACT_Y, archiving the emails to a predefined location (e.g., dropbox folder, etc.), and emailing a list of received emails to CONTACT_Z. In another embodiment, the instruction may be executed by giving a predefined voice command (e.g., "execute weekly email cleanup," etc.). Of course, any command and/or string of commands (e.g., relating to one or more triggers and one or more actions, etc.) may be implemented by an instruction (e.g., via a shortcut, a button, a voice command, an app, etc.). As such, the instruction may be manually executed.

In a separate embodiment, the instruction may be executed automatically. For example, in one embodiment, the mobile device may indicate (e.g., via sensors, etc.) that the user has entered a restaurant. In response, the instruction may cause a response action to be automatically initiated including updating a status on social networking site (e.g., Facebook, Foursquare, etc.), sending a message (e.g., email, SMS, etc.) to participants of the event that the user has arrived, and/or taking any other action or actions as initiated by the instruction.

In another embodiment, the instruction may automatically execute (e.g., on a weekly basis, time trigger, etc.) a string of commands to be implemented including determining all emails received from the last week from CONTACT_X, forwarding the batch of emails onto CONTACT_Y, archiving the emails to a predefined location (e.g., dropbox folder, etc.), and emailing a list of received emails to CONTACT_Z. Of course, any command and/or string of commands (e.g., relating to one or more triggers and one or more actions, etc.) may be implemented in a similar. As such, the instruction may be automatically executed.

More illustrative information will now be set forth regarding various optional architectures and features with which the foregoing techniques discussed in the context of any of the present or previous figure(s) may or may not be implemented, per the desires of the user. For instance, various optional examples and/or options associated with the one or more triggers of operation 302, the instruction of operation 304, the executing of the instruction of operation 306, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 4:
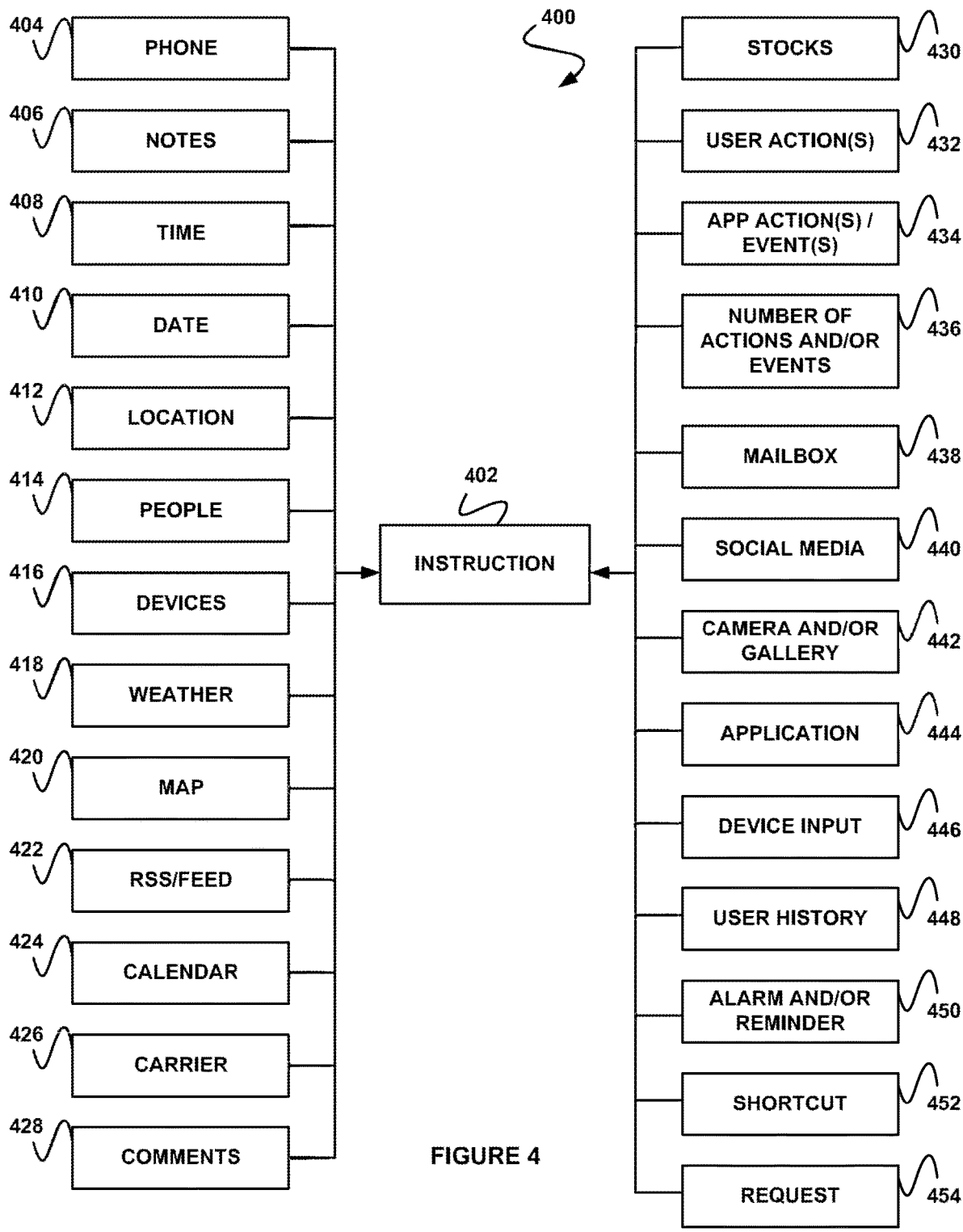
FIG. 4 shows a system for triggering an instruction in connection with a mobile device, in accordance with another embodiment.

FIG. 4 shows a system 400 for prompting an action by a platform in connection with a mobile device, in accordance with another embodiment. As an option, the system 400 may be implemented in the context of the architecture and environment of the previous Figures and/or any subsequent Figure(s). Of course, however, the system 400 may be implemented in the context of any desired environment. It should also be noted that the aforementioned definitions may apply during the present description.

As shown, one or more triggers 404-454 may cause an instruction 402 in connection with a mobile device to be executed. In one embodiment, a trigger may include a phone 404. In various embodiments, a phone call may trigger an action, including automatic speech-to-text dictation, the display of a notes application screen (e.g., to jot down some notes, etc.), rejection of the phone call, priority tagging (e.g., application of a different ringer, elevation of ringtone, etc.) of the phone call, the sending (e.g., via SMS, email, etc.) of a pre-scripted message response (e.g., "Inside of a noisy hall. I'll call you back after my event," "Running a bit late—will be there in a few minutes," etc.), and/or any other action. Of course, any pre-scripted message response may be sent, and in another embodiment, a list of pre-scripted messages may be presented to the user for selection, and if no selection is made, the top message response (e.g., determined by user usage, determined by relevancy, etc.) may be sent.

In other embodiments, the action taken in response to the phone call may be dependent on the user identity, a user tag, and/or any other information associated with the caller. For example, in one embodiment, the caller may be a manager or boss of the user, in which case the phone call may be prioritized (e.g., ringer volume increased, etc.). In another embodiment, the caller may have a tag of "client" and if the user does not answer the call, a message may be automatically sent (e.g., via SMS, via email, etc.) to the caller thanking him/her for the call and indicating that the user will respond to the call as soon as is possible. Of course, any message and/or action may be taken in response to the phone call.

In one embodiment, a trigger may include notes 406 such as text entered, a recorded audio, a speech-to-text function, and/or any other input associated with a note. In some embodiments, the notes may be associated with an app (e.g., Evernote, a notes app, phone, etc.), with an event (e.g., calendar item, etc.), with a contact (e.g., contact manager, etc.), and/or any other with any other feature (or app) of the mobile device. In another embodiment, the notes may include context awareness features such as the ability to determine who the note relates to (e.g., note may include the text "Call Bill," etc.), what the note relates to (e.g., time, place, and/or other information associated with the text or audio of a note, etc.), and/or the ability to track the note (e.g., note sent from user to contact, and from the contact to another contact and so forth, etc.).

In various embodiments, a notes may trigger an action, including initiating a phone call (e.g., based on a contact listed in a note, etc.), sending a message (e.g., email, SMS, etc.), setting a reminder (e.g., calendar reminder, etc.), creating an event detail (e.g., calendar item, etc.), uploading information to an online server (e.g., social networking site, blog, etc.), and/or taking any other action in response to a note. In one embodiment, the note may be spoken as a voice command (e.g., "NOTE: remind me to clean the bathroom," etc.) and may be set to remind the user based off of a proximity timer (e.g., if the user exceeds the proximity, it may activate the reminder, etc.), a time based timer (e.g., 12 pm the next day, etc.), a calendar based availability timer (e.g., device may recognize the user has free time the following day at 2 μm and may remind the user at that time due to the availability, etc.), and/or taken any other action relating to the voiced note.

In one embodiment, a trigger may include a time 408. For example, in various embodiments, a time may include the amount of time at a location, a time of day (e.g., morning, afternoon, night, etc.), an exact time (e.g., 6:43 pm, etc.), availability (e.g., free time in a schedule, etc.), and/or any other association to time. For example, in one embodiment, the mobile device may belong a young child, and at 9 pm, if the child is not at home, the current location of the child (e.g., based on GPS signal, etc.) may be pushed to other subscribing devices (e.g., mobile device associated with a parent, etc.). Of course, any action may be triggered in response to a time trigger.

In another embodiment, a trigger may include a date 410. For example, in various embodiments, a date may include a date range (e.g., an event lasting three days, vacation dates, etc.), a reoccurring day and/or range of the week and/or month and/or year (e.g., every Monday of the month, third Sunday of every month, quarterly and/or annual basis, etc.), a specific date (e.g., May 20, 2012, etc.), and/or any other association to a date. As an example, in one embodiment, the user of the mobile device may have an event scheduled for a specific date. In response to the event scheduled, the upcoming date may trigger one or more actions, including sending out a general reminder to participants, providing a weather forecast for the event, presenting any necessary detours to navigate to the event (e.g., based on scheduled construction issues, etc.), requesting participants to update a status (e.g., will attending, will not attend, etc.), and/or taking any other action in response to the event scheduled. In another embodiment, a preview (e.g., of an email, of a message, of a reminder, etc.) associated with a date may be automatically sent to a user of the mobile device for approval before being sent to a participant and/or another recipient contact.

Still yet, in another embodiment, a trigger may include a location 412. In various embodiments, a location may include a current location of the mobile device, a preconfigured address (e.g., address associated with "home," "work," and/or any preset location, etc.), a destination, and/or any other address. In various embodiments, the location may trigger a number of one or more actions, including updating a social networking site (e.g., Facebook, Foursquare, etc.), sending a message (e.g., email, SMS, etc.) to a contact, updating a management system (e.g., truck route progress, etc.), displaying a website associated with the location, displaying an app associated with the location (e.g., an app from the store, etc.), and/or taking any other action in response to the location.

In one embodiment, a trigger may include people 414. For example, in various embodiments, people may include individuals within a close geographic proximity (e.g., less than 10 feet, etc.) to the user, pre-selected contacts (e.g., favorite contacts, contacts with a tag, etc.), unknown individuals, and/or any person that may interact in some manner with the user's mobile device. For example, in various embodiments, people may trigger one or more actions, including a request to share information (e.g., meet new contacts, share business card, share data file such as a photo, etc.), to update a status on a social networking site (e.g., Facebook, etc.), to create a shared data file (e.g., shared whiteboard, etc.), to control another mobile device, and/or any other action in response to people.

As an example, in one embodiment, a user of a mobile device may be in close proximity to a group of friends. The mobile device may recognize (e.g., via device recognition, GPS location, etc.) the presence of the other friends and automatically update a status on a social networking site that the user is now with such friends. Any photos that are taken during the event may be instantly pushed and shared to other devices associated with the friends. Additionally, permission may be automatically granted to such friends to control at least some aspect (e.g., ability to push information, ability to control camera, etc.) associated with the user's mobile device. Of course, when the friends are beyond a threshold geographic proximity to the user, all automatic and applied settings may be terminated (e.g., sharing settings are severed, permissions are revoked, social networking updates of the group are halted, etc.).

In another embodiment, a trigger may include devices 416. For example, in various embodiments, devices may include any device located within a close geographically proximity (e.g., within 20 feet, etc.) of the mobile device of the user, any device already associated with the user's mobile device (e.g., known device associated with a trusted entity, etc.), any device not yet associated with the user's mobile device (e.g., new devices not before paired and/or connected, etc.), and/or any other device which may interact with the user's mobile device in some manner. Of course, devices may include other mobile devices, televisions, tablets, cash registers, and/or any other electronic device which may send and receive an electronic signal (e.g., to enable communication, etc.). In various embodiments, devices may trigger one or more actions, including a payment display page (e.g., electronic transfer, credit card charge, etc.), a display to share with and/or receive from another device (e.g., device associated with a trusted entity, etc.) data and/or information, stream data (e.g., photos, music, slideshow, videos, etc.) and/or other information (e.g., text feeds, etc.), display advertisements (e.g., relevant coupons and/or discounts, etc.), cause the user's mobile device display to function in another manner (e.g., secondary display to a master device, function as a mouse, keyboard, or another preselected function, etc.), and/or any other action taken in response to another device.

As an example, in one embodiment, the user's mobile device may detect that a cash register device is within a predetermined geographic proximity (e.g., within 10 feet, etc.). In response to the detection, the mobile device may display a payment display page with an option to pay. After the items have been scanned by the cash register, the items and total price may be displayed on the user's mobile device. The user may select to pay for the items using a stored payment account (e.g., credit card account, banking routing number and account, etc.). After the payment, the payment display page may automatically update a personal finance application with the pending transaction, as well as display to the user current budget balances. In another embodiment, current budget balances may be displayed to the user before processing the payment so that the user may verify that the purchase is within a predetermined expense budget.

In a further embodiment, the user's mobile device may detect other devices (e.g., relating to a brick and mortar store, etc.). Such other devices may seek to push coupons and/or ads, and/or invite the user to download and/or use an app associated with the store. In response, the mobile device may automatically filter and/or reject content pushed from other devices. For example, the user may indicate that all app requests are to be rejected except for entertainment related shops, and all content including coupons and/or ads are to be rejected unless it relates to a discount of at least 75%. If a coupon is at least 75% off, the coupon may be pushed and displayed to the user. Additionally, the user may have also configured the mobile device so that when such coupons and/or ads are displayed on the device, they are also automatically uploaded (e.g., to a blog, social networking site, etc.) and shared with other friends associated with the user.

In one embodiment, a trigger may include weather 418, including weather associated with the current location of the user, and/or weather associated with another location set by the user. The weather may trigger one or more actions, including displaying a notification (e.g., "weather is cool at 60 degree," etc.), sending a message (e.g., SMS, email, etc.) to a contact (or participants of an event, etc.), rerouting a navigation route, displaying a recommendation (e.g., "take a coat," safety recommendations, weather advisory warnings, etc.), and/or taking any action in response to the weather.

In another embodiment, a trigger may include a map 420. In one embodiment, the map may be a separate and distinct app. In another embodiment, the map may be included and be embedded within another app and/or feature associated with the mobile device (e.g., pushed interactive image from another device, device map platform, etc.). In various embodiments, the map may trigger one or more actions, including navigating to a location, finding a location (e.g., address, store, sites, etc.), displaying trusted entities (e.g., friends, etc.) near the user, estimating one or more times of arrival, displaying one or more overlays (e.g., bike view, real time traffic, pedestrian view, points of interest [POI], etc.), and/or any other action associated with the map app.

As an example, every time the user gets into a car, the user starts a map app to display real-time traffic updates. In response, the user activates a navigation feature to apply the quickest route home. In one embodiment, rather than go through the same process repeatedly, the user may automate the process so that as soon as the user enters the car (e.g., based off of sensors, etc.), the map application automatically displays real-time traffic feeds, selects the quickest route home, and then begins the navigation feature to apply the quickest route home. In another embodiment, the user may select a button the homescreen of the mobile device which would then start a navigation feature to apply the quickest route (from real time traffic updates) home. In a further embodiment, the user may give a verbal command (e.g., "navigate home," etc.) to navigation feature to apply the quickest route (from real time traffic updates) home. Of course, any method may be used to save and execute the string of commands.

In another embodiment, on a daily basis, the user may open a map app to view possible locations to eat lunch. Additionally, the user may view other friends on the map who intend to eat lunch with the user. After selecting a location, the user sends a message out to all friends giving the location. Once at the location, the user sends a message out to all friends notifying them that the user has arrived. In one embodiment, rather than apply these same steps repeatedly (e.g., daily, etc.), the user may automate the process so that every morning, the map app gives a recommendation (e.g., based on Yelp ratings, etc.) of a lunch location, and after the user approves, the mobile device automatically sends a message to all friends. When the user arrives at the intended location, the mobile device may automatically send a message out to all friends that the user has arrived, as well as automatically display a map with a real time update of the location of each friend. Of course, permissions to view the location of a friend may be controlled by the friend (e.g., temporary permission, full permission, etc.). Additionally, in other embodiments, the string of commands may be saved to a button shortcut, and/or be used by a verbal command (e.g., send my friends a lunch update, view my friends, etc.), and/or executed in any manner.

In another embodiment, a trigger may include an RSS/Feed 422. In various embodiments, the RSS and/or Feed may be associated with an app (e.g., gaming app, food app, news app, etc.), may be an app (e.g., RSS management app, feed management app, etc.), may be associated with an online site (e.g., site which pushes updates to a mobile device, blog entries, news headlines, etc.), and/or may be associated with an RSS reader, feed reader, aggregator (e.g., web based, desktop-based, mobile device based, etc.), and/or any other app and/or RSS tool. The RSS/Feed may trigger one or more actions, including causing the mobile device to sound an audible and/or visible (e.g., flashing light, display feed on home screen, display feed on locked screen, etc.) notification, send a message (e.g., SMS, email, etc.), post a message (e.g., onto a blog, onto a social networking site, etc.), give a recommendation (e.g., best feed deal out of the past ten feeds, etc.), forward on the feed (e.g., to a contact, etc.), provide a summary (e.g., of the article referenced by the feed, etc.), provide a text-to-speech function (e.g., for immediate playback in a vehicle, etc.), and/or any other action taken in response to receiving an RSS and/or feed.

In some embodiments, the action may require approval by the user before being completed. For example, in various embodiments, receiving a RSS feed update may initiate the creation of a blog posting. The blog posting may be prepared (e.g., with text, graphics, photos, etc.) with a preview sent to the user (e.g., via mobile device app, via email, etc.). If the user approves of the preview (e.g., by selecting an "approve" button, etc.), the posting may be uploaded to a bog. Of course, any preview and/or approval process may be associated with an RSS and/or feed item.

In another embodiment, the user may belong to a technology group focusing on semi-conductors. Whenever the user receives a RSS and/or feed relating to a competitor's use of doping (e.g., addition of impurities in semiconductor material, etc.), the user immediately forwards on the update to all in the technology group. The user may automate the process so that whenever a RSS and/or feed is received which relates to semiconductors and which relates doping, the RSS and/or feed is immediately forwarded on to preselected members of the user's technology group. The string of commands (making up the automated process, etc.) may be saved within an app (e.g., RSS management app, etc.), by the mobile device (e.g., native utility on the device, etc.), by an online platform (e.g., online RSS feed subscription management site, etc.), and/or saved in any manner. Additionally, in other embodiments, the string of commands may be saved to a button shortcut, and/or be used by a verbal command, and/or executed in any manner.

In one embodiment, a trigger may include a calendar 424. In various embodiments, an action may be taken in response to a scheduled event (e.g., appointment, etc.), unscheduled time (e.g., free time, etc.), a metadata tag (e.g., appointment is tagged as relating to work, a priority tag associated with the event, etc.), an event creation source (e.g., created by another user on a shared calendar, etc.), an event duration (e.g., one hour, two days, etc.), and/or any other feature associated with a calendar. The calendar may trigger one or more actions, including rescheduling an event, notifying participants of an event of a conflict (e.g., new conflict, existing conflict, etc.), notifying participants of an event of newly added participants, finding and/or presenting related content (e.g., airline ticket, car rental, hotel rental, points of interest, etc.), displaying and/or playing a notification (e.g., audible, text, alarm, etc.), sharing an event (e.g., with a contact, with a participant, etc.), creating a shared resource to be used at the event (e.g., shared word processing document, shared photo platform, etc.), and/or taking any other action in response to a calendar.

As an example, in one embodiment, a user may set up an event relating to a business travel trip. After scheduling the time for the event, the user may search for airplane tickets, hotels in the vicinity, maps to get to the destination, and/or other items relating to the business travel trip. After making all such reservations and/or gathering the material, the user may send an overview of the event (e.g., location, hotels, car rental, etc.) to a business manager, as well as to a business accountant so that the user can be reimbursed for the trip. Such a series of one or more actions may be automated. For example, after creating an event (e.g., including time, dates, location, metadata tag indicating business trip, etc.), the calendar may fetch related items (e.g., airplane tickets, recommended hotels, rental car, etc.) and present a package to the user. After selecting an appropriate package, the calendar may communicate with each item to finalize the reservation. After receiving confirmation of each reservation (e.g., via email, etc.), the calendar app may generate an overview of the entire event (e.g., each confirmed reservation, location specifics, price for each item and total price, etc.). Such an overview may be sent to the user (e.g., preview pane, preview screen, via email, etc.) to obtain the user's approval. Once the user approves of the overview, it may be automatically sent to the user's manager and the business accountant. In this manner, the number of steps (and time) required of the user may be greatly reduced. Of course, any action may be taken in response to a calendar. Additionally, in other embodiments, the string of commands (e.g., one or more actions relating to the calendar event, etc.) may be saved to a button shortcut, and/or be used by a verbal command, and/or executed in any manner.

In another embodiment, a trigger may include a carrier. For example, in various embodiments, a carrier may include a network data signal, a network telephone signal, a roaming signal, and/or any other type of signal and/or feature associated with a carrier. In some embodiments, the carrier may be used to trigger one or more actions, including an ability to stop, cancel, and/or limit a feature and/or service (e.g., SMS, data, voice, specialized ringtones, etc.), send a message (e.g., SMS, email, etc.), enable emergency services and/or features (e.g., 911 calls only, etc.), and/or any other action relating to a carrier.

As an example, in one embodiment, the user of a mobile device may automate a process so that when the user is near exiting a carrier's data signal (e.g., based off of carrier coverage maps, etc.), the user's mobile device may automatically send out a message (e.g., SMS, email, etc.) to one or more contacts (e.g., preselected contacts, filtered contacts based on metadata tag, etc.) to inform them that the user will be losing coverage and will not be able to respond to messages (e.g., email, SMS, voice, etc.) immediately. Of course, the automatic one or more actions may relate to anything and/or be configured in any manner by the user. Additionally, in other embodiments, the string of commands (e.g., one or more actions relating to a network carrier signal, etc.) may be saved to a button shortcut, and/or be used by a verbal command, and/or executed in any manner.

In one embodiment, a trigger may include comments. For example, in various embodiments, comments may be associated with an online forum (e.g., blog, social networking site, video sharing site, photo sharing site, etc.), received via a messaging platform (e.g., email, SMS, chat, etc.), may include text, audio, photos, videos, and/or any other data file (e.g., document, spreadsheet, etc.), and/or may be received in any manner. In various embodiments, the comment may be analyzed to determine a context (e.g., based off of text, sender location, destination location, calendar item, purchase history, email history, browsing history, etc.), may be associated with a metadata tag (e.g., comment relates to vacation, Hawaii, family, and year 2012 tags, etc.), may be associated with a string of comments and/or conversation (e.g., chat, etc.), and/or may be associated with any item associated with the comments.

In one embodiment, the context of the comments may be used to trigger an action. For example, in various embodiments, the context may include any circumstances associated with a comment, and/or location information (e.g., GPS location information, a physical address, an IP address, shopping center, movie theatre, stadium, etc.), network information (e.g., information associated with the network currently being utilized or currently being accessed, etc.), information relating to applications being utilized (e.g., games, maps, camera, retailer, social networking, etc.), current activities (e.g., shopping, walking, eating, reading, driving, etc.), browsing activity, environment (e.g., environmental audio, weather, temperature, etc.), payment activities (e.g., just purchased coffee, groceries, clothes, etc.), comment history, social networking site history, actual text of comment, attachment associated with a comment, data item (e.g., photo, video, etc.) associated with a comment, and/or any other type of information which may relate in some manner to context and/or comments.

In one embodiment, the context may be determined based, at least on part, on information provided by one or more sensors, applications, inputs, software associated with the mobile device, an advertisement/content management platform, an operating system associated with the mobile device, and/or any context source. In another embodiment, the context may be determined based, at least in part, on current and/or past activities of the user (e.g., as determined by hardware/software associated with the mobile device, etc.). In another embodiment, the context may be determined by current and/or past activities of the mobile device. In another embodiment, the context may be determined based on a location of the user and/or the mobile device.

The context may include any circumstances that form one or more settings for an instruction (e.g., an input, display settings, location settings, content display, advertisement display, etc.). For example, in various embodiments, information for determining the context may include location information (e.g., GPS location information, a physical address, an IP address, shopping center, movie theatre, stadium, etc.), network information (e.g., information associated with the network currently being utilized or currently being accessed, etc.), applications being utilized (e.g., games, maps, camera, retailer, social networking, etc.), current activities (e.g., shopping, walking, eating, reading, driving, etc.), browsing activity, environment (e.g., environmental audio, weather, temperature, etc.), payment activities (e.g., just purchased coffee, groceries, clothes, etc.), and/or any other type of information associated with a context.

In some embodiments, based on the context of a comment, an action may be triggered, including setting an alarm and/or reminder (e.g., including setting a geofence border and/or trigger, etc.), creating and/or modifying a calendar event, providing a response to a comment (e.g., using pre-scripted responses, etc.), maintaining statistics (e.g., positive comments v. negative comments, etc.), posting a message (e.g., blog, social networking site, etc.), and/or taking any further action based off of the context of a comment. In other embodiments, a comment, regardless of the context, may be used to trigger an action, including giving a notification (e.g., 5 new comments, etc.), maintaining statistics (e.g., relating to comments generated, etc.), aggregating the comments to be presented to the user (e.g., displayed on a comments screen, overlay, menu, in an email, etc.), and/or taking any action in response to a comment.

As an example, in one embodiment, a user may post a blog posting which is published on more than one blog site. In response, comments relating to a blog posting may be posted on more than one site. The user's mobile device may take all such comments, aggregate them into one collection in a central comments repository (e.g., comments app, etc.). Additionally, in response to issues raised in the comments, the user may respond to such comments. Often, the issues raised may be very similar. Rather than respond to each comment individually, the user may automate responding to all pertinent comments (e.g., via a comments app on mobile device, etc.). The mobile device may identify a common issue in more than one comment (e.g., based on the text of the comments, etc.) and present the one or more issues to the user of the mobile device. The user may write one or more comment responses (e.g., based on the one or more issues identified, etc.). The mobile device may automatically select more one or more comment to which the response may pertain, request approval of the selected applicable comments from the user, and then the mobile device (e.g., comments app, etc.) may automatically post the response to the appropriate site. In this manner, an action may be taken in response to a context of a comment. Of course, in another embodiment, the user may write a comment response and then select a button to apply a string of preconfigured one or more actions, including formatting the response in a different manner (e.g., depending on the intended recipient and/or destination, etc.), modifying the text (e.g., insert name of original comment author, etc.), and/or taking any further action relating to the context of the comment.

In another embodiment, a comment may be received by the user from a trusted entity (e.g., friend, trusted business, etc.). The comment may include a confirmation of a ticket and/or an event. In response to the comment, the mobile device may automatically extract relevant information from the comment (e.g., date, location, time, participants, etc.), and based on the context (e.g., including the extracted relevant information, etc.) of the comment, create a calendar event, create a notification reminder (e.g., reminder set to one day before the event, reminder set using predetermined settings, etc.), post a social media posting (e.g., Facebook, etc.) indicating you will be attending an event, send an invite to other contacts (e.g., friends, etc.), import and/or download information (e.g., maps, etc.) relating to the event (e.g., information assembled within an event page, on a calendar item, etc.), and/or any other action taken in response to the context of the comment.

In a separate embodiment, an action may be triggered by a tag associated with a comment. For example, in one embodiment, a comment may be received and a tag may be associated with the comment indicating "work," "tech group," and "Boston location." Based on the tag associated with the comment, the user's mobile device may automatically take an action by forwarding (e.g., via email, chat, SMS, etc.) the comment (or a link thereto) to one or more contacts (e.g., or predefined groups, etc.). Of course, in other embodiments, an action may be triggered in response to any element associated with a comment. Additionally, rather than apply one or more commands (e.g., one or more actions, etc.) automatically, the commands may be manually executed via a shortcut button, a voice command, and/or any other way.

In a separate embodiment, a set of threshold triggers may be required in order for one or more actions to be taken. For example, in one embodiment, a string of commands may relate to formatting a comment, including taking the written response, modifying it by inserting the name of the author of the original comment, applying site-specific formatting requirements (e.g., size, length, etc.), and/or uploading the response to each particular site. In order for such one or more actions to be executed, the manually executed button may have a set of threshold triggers including requiring a comment to have been received, the comment to contain an author name, and/or any other information and/or triggers which may relate to the comment. Of course, any triggers may be required in order to apply and/or execute a string of commands (e.g., one or more actions, etc.).

In one embodiment, a trigger may include stocks 430. For example, in various embodiments, stocks may include closing time prices, percent change of individual stocks and/or of a portfolio, top stock sales, supply and/or demand changes, new stocks released, companies recently have gone public, and/or any other information which may relate in some manner to stocks. In some embodiments, stocks may be used to trigger one or more actions, including aggregating stock changes (e.g., stocks daily report, etc.), presenting recommendations (e.g., sell/buy stocks, etc.), notifying one or more contacts (e.g., stock client, etc.), and/or taking any other action in response to the stocks. As an example, in one embodiment, a user of a mobile device may be notified of recent top stocks. In response, the user may often forward such top stocks to investors associated with the user, and based on the response, may take an action (e.g., buy/sell stock shares, etc.). The user may automate such a string of commands and/or process, including receiving notification of top stocks, sending (e.g., via email, SMS, chat, etc.) such notifications to one or more predetermined recipients (e.g., investing clients, etc.), and based on the response of the one or more recipients (e.g., sell, buy, no action, etc.), automatically complete a transaction based on the input from the one or more recipient. In one embodiment, the string of commands may be automatically implemented once a top stock notification is received. In another embodiment, the string of commands may be invoked and/or executed by the user (e.g., select which top stock notifications to send, etc.). Additionally, the string of commands may be executed via shortcut button, a voice command, and/or any other method.

In another embodiment, a trigger may include one or more user one or more actions 432. For example, in various embodiments, the one or more user one or more actions may include starting an application, interacting in some manner with an application (e.g., within app action, etc.), navigating a menu (e.g., app menu, OS menu, etc.), sending a message and/or invite (e.g., via email, SMS, chat, etc.), setting a reminder and/or alarm, creating an event (e.g., calendar, etc.), activating/deactivating and/or modifying a device setting and/or feature (e.g., volume, WiFi, Bluetooth, NFC, GPS, accelerometer, screen brightness, etc.), posting a message and/or status (e.g., social networking site, etc.), checking-in to a location (e.g., Foursquare check-in, actual reservation check-in, etc.), connecting to another device (e.g., secondary device, display, etc.), navigating to one or more websites, updating an app (e.g., financial app updated per transaction, etc.), receiving a voice command, receiving a swipe command (e.g., swipe action correlates to a command, etc.), and/or interacting in some manner (e.g., via an action, etc.) with the mobile device.

In some embodiments, one or more user actions may be used to trigger one or more actions, including starting an application, interacting in some manner with an application (e.g., within app action, etc.), navigating a menu (e.g., app menu, OS menu, etc.), sending a message and/or invite (e.g., via email, SMS, chat, etc.), setting a reminder and/or alarm, creating an event (e.g., calendar, etc.), activating/deactivating and/or modifying a device setting and/or feature (e.g., volume, WiFi, Bluetooth, NFC, GPS, accelerometer, screen brightness, etc.), posting a message and/or status (e.g., social networking site, etc.), checking-in to a location (e.g., Foursquare check-in, actual reservation check-in, etc.), connecting to another device (e.g., secondary device, display, etc.), navigating to one or more websites, updating an app (e.g., financial app updated per transaction, etc.), receiving a voice command, receiving a swipe command (e.g., swipe action correlates to a command, etc.), and/or interacting in some manner (e.g., via an action, etc.) with the mobile device. Of course, any action may be taken in response to a user action. Additionally, a string of commands (e.g., one or more actions, etc.) may be invoked and/or executed by a shortcut button, a voice command, and/or by any other method.

As an example, in one embodiment, a user may make a reservation (e.g., via Kayak.com app, etc.) for an upcoming travel. In response to the user action, the mobile device may create a calendar item (e.g., based on the date, time, and location of the reservation, etc.), notify predetermined contacts of the reservation (e.g., close friends, etc.), and give a page of recommendations (e.g., expected weather, maps of the area, etc.). Of course, any item and/or action may be taken in response to the user making a reservation.

In another embodiment, a trigger may include one or more app actions and/or events 434. For example, in various embodiments, one or more app actions and/or events may include creating an event (e.g., calendar item, etc.), recording an item (e.g., recording a game score onto an online score database, recording an audio clip, recording a video clip, etc.), downloading and/or uploading a data file (e.g., document, photo, video, audio, GPS location, Geotag, etc.), controlling in some manner a system feature (e.g., volume, screen brightness, WiFi, Bluetooth, GPS, camera, etc.), displaying one or more advertisement elements (e.g., ads, ad platform, etc.), displaying one or more notifications (e.g., reminders, alarms, updates, etc.), interacting with one or more apps (e.g., request info from another app, cause another app to take an action, etc.), updating an app (e.g., updating a database associated with the app, etc.), syncing (e.g., with an online database, with another device, etc.), controlling in some manner another device (e.g., display, trusted device, etc.), looking up information (e.g., barcode, etc.) via an online database system, tracking progress (e.g., education app, etc.), authenticating (e.g., a user, a device etc.), recording a trip (e.g., GPS path/track, breadcrumb trail, etc.), sending a product (e.g., postcard, etc.), buying/selling a product (e.g., via Amazon.com, etc.), buying/reserving a ticket (e.g., via Kayak.com, etc.), displaying and/or using a digital card (e.g., card in digital wallet, etc.), interacting with a media file (e.g., play video, play music, listen to radio, etc.), create a new contact entry (e.g., new contact, etc.), print a data file, apply a toddler and/or kid's mode, receiving an input (e.g., from a user, etc.), and/or any other action and/or event which may relate to an app. Of course, any action and/or event may be used to trigger an action.

In some embodiments, one or more app actions and/or events may trigger one or more actions, including creating an event (e.g., calendar item, etc.), recording an item (e.g., recording a game score onto an online score database, recording an audio clip, recording a video clip, etc.), downloading and/or uploading a data file (e.g., document, photo, video, audio, GPS location, Geotag, etc.), controlling in some manner a system feature (e.g., volume, screen brightness, WiFi, Bluetooth, GPS, camera, etc.), displaying one or more advertisement elements (e.g., ads, ad platform, etc.), displaying one or more notifications (e.g., reminders, alarms, updates, etc.), interacting with one or more apps (e.g., request info from another app, cause another app to take an action, etc.), updating an app (e.g., updating a database associated with the app, etc.), syncing (e.g., with an online database, with another device, etc.), controlling in some manner another device (e.g., display, trusted device, etc.), looking up information (e.g., barcode, etc.) via an online database system, tracking progress (e.g., education app, etc.), authenticating (e.g., a user, a device etc.), recording a trip (e.g., GPS path/track, breadcrumb trail, etc.), sending a product (e.g., postcard, etc.), buying/selling a product (e.g., via Amazon.com, etc.), buying/reserving a ticket (e.g., via Kayak.com, etc.), displaying and/or using a digital card (e.g., card in digital wallet, etc.), interacting with a media file (e.g., play video, play music, listen to radio, etc.), create a new contact entry (e.g., new contact, etc.), print a data file, apply a toddler and/or kid's mode, and/or any other action and/or event which may relate to an app. Of course, any action and/or event may be used to trigger an action.

As an example, in one embodiment, an app may record a GPS path of a user. In response to the recording, the app may upload the GPS tracks to an online system (e.g., online database, social networking site, etc.), update a status (e.g., "I'm hiking at _____" on Facebook, Geocached object found status update, etc.), display relevant advertisements (e.g., based on location, based on hiking activity, etc.), and/or take any other action in response to recording a GPS path of a user. Of course, any app action and/or event may trigger any action. Additionally, the string of commands (e.g., one or more actions, etc.) may be initiated and/or executed via a shortcut button, a voice command, and/or by any other method.

In another embodiment, a trigger may include one or more actions and/or events 436. For example, in various embodiments, one or more actions and/or events may include one or more actions and/or events (e.g., a number of steps in a string of actions and/or events, etc.) taken by a user, one or more actions and/or events (e.g., a number of steps in a string of actions and/or events, etc.) taken by an app, and/or any other action relating to the number of actions and/or events. In some embodiments, a number of actions and/or events (e.g., a number of steps in a string of actions and/or events, etc.) may trigger one or more actions, including prompting the user (of the mobile device, etc.) to save a string of actions, prompting the user (of the mobile device, etc.) to send a string of actions to a contact (e.g., friend, etc.), canceling/modifying a system resource (e.g., executing the one or more actions, and/or taking any other action relating to a number of actions and/or events.

As an example, in one embodiment, a user may take several steps relating to a photo album, including selecting a camera and/or gallery application, selecting an appropriate photo album (e.g., new photos, etc.), selecting one or more photos, selecting to share the one or more photos, selecting and/or inputting addresses (e.g., email address, etc.) of one or more photo recipients, inputting a message to be sent with the photos, and sending the message to the one or more photo recipients. After inputting such actions, the number of steps (actions) taken may cause a prompt to be displayed prompting the user to save the string of actions. In various embodiments, the user may set up the string of actions to be executed automatically every time four new photos (or any number) have been taken, to be executed whenever the user selects a shortcut button, to be executed in response to an input by the user (e.g., voice command, use of camera, etc.), to be executed in response to a timer (e.g., once a month, etc.), and/or to be executed in response to any trigger. Of course, any number of actions and/or events may be used to trigger an action.

In one embodiment, a trigger may include a mailbox 438. For example, in various embodiments, a mailbox may include a voice message, an email message, a SMS message, a chat message, scanned documents, social updates, RSS/Feed updates, a digital mailbox (e.g., digital mail service, digital archival, etc.), and/or any other item which may relate in some manner to a mailbox. In some embodiments, a mailbox may trigger one or more actions, including sending a message response (e.g., pre-scripted responses, etc.), posting a message (e.g., to an online platform, to a social networking site, etc.), archiving a message, deleting a message, applying a filter (e.g., move to a folder, auto-tag, star, mark as spam, etc.) to a message, forwarding a message, and/or interacting with a mailbox in any manner.

As an example, in one embodiment, a user may receive a message relating to technology. The user may then tag the email with a "technology" tag, move it to a technology folder, and forward it onto a friend interested in technology. In one embodiment, the user may automate the process whereby when an email is received, a filter is applied to it including tagging it with a "technology" tag, and moving it to a designated technology folder. Additionally, the message may be automatically forwarded onto a predetermined friend interested in technology. In another embodiment, a preview email may be sent to the user (e.g., with respect to the automatic forwarding of the email, etc.) for approval before being sent. Of course, any action may be taken relating to the email message received. Additionally, the string of commands (e.g., actions, etc.) may be saved to a shortcut button (e.g., manually initiated by the user, etc.), may be activated by a voice command, and/or may be controlled and/or initiated in any manner.

In another embodiment, a trigger may include social media 440. In various embodiments, social media may include receiving a posting (e.g., Facebook post, wall post, etc.), receiving an update (e.g., Twitter update, news update, blog update, etc.), receiving an email and/or instant messaging and/or chat (e.g., via social media site platform, etc.), interacting in some manner with a social media platform (e.g., magazines, Internet forums, weblogs, social blogs, microblogging, wikis, social networks, social site, dating forum, photo sharing site, vlog, music sharing site, etc.), interacting in some manner with a social media data file (e.g., podcasts, photographs and/or pictures, videos, document, etc.), submitting and/or receiving a rating (e.g., "like," etc.), receiving and/or creating a social bookmark and/or tag, setting a level of trustworthiness (e.g., associated with a contact and/or friend, etc.), and/or interacting in any way with a platform and/or a site which facilitates interaction and dialogue.

In some embodiments, social media may trigger one or more actions, including uploading and/or reposting to a posting, uploading and/or sending an update (e.g., Twitter update, news update, blog update, etc.), sending an email and/or instant messaging and/or chat (e.g., via social media site platform, etc.), interacting in some manner with a social media platform (e.g., magazines, Internet forums, weblogs, social blogs, microblogging, wilds, social networks, social site, dating forum, photo sharing site, vlog, music sharing site, etc.), interacting in some manner with a social media data file (e.g., podcasts, photographs and/or pictures, videos, document, etc.), submitting and/or receiving a rating (e.g., "like," etc.), receiving and/or creating a social bookmark and/or tag, setting a level of trustworthiness (e.g., associated with a contact and/or friend, etc.), and/or taking any action in response to a social media trigger.

For example, in one embodiment, a user may receive a social media update (e.g., relating to a video blog the user follows, etc.). In response to the social media update, the user may share the update by posting it on other social media sites (e.g., Facebook, Youtube, Twitter, etc.), sending the update to specific contacts (e.g., friends, etc.), rate the update (e.g., "like it," etc.), and archiving it to a social database. Rather than apply many individual actions, the user may save all such one or more actions to a string of command. In various embodiments, the string of command may occur automatically based on the receipt of the blog update (or by any other trigger to automatically initiate the string of command), or may occur manually based on a shortcut button, a voice command, or any other input given by the user to initiate the string of commands.

In another embodiment, a trigger may include a camera and/or gallery 442. In various embodiments, a camera and/or gallery may include a live camera view, one or more photos (e.g., already taken photos, etc.), a webcam, a camera attached to the mobile device, a camera associated with another device (e.g., secondary device, etc.), an online gallery (e.g., photo sharing site, etc.), a voice activated camera feature, a camera filter (e.g., b&w, heavy saturation, etc.), a camera setting (e.g., exposure, aperture, etc.), and/or any feature associated with a camera and/or gallery.

In some embodiments, a camera and/or gallery may trigger one or more actions, including sharing a photo and/or an album (e.g., via photo sharing platform, via email, etc.), activating and/or deactivating a camera, activating and/or deactivating a camera option (e.g., time-lapse, webcam, collage, burst mode, panoramic, etc.), attaching a geotag (e.g., add GPS location to the photo, etc.) and/or other metadata tags, modifying and/or editing a photo (e.g., crop, resize, rasterize, etc.), altering camera types (e.g., video camera, still camera, digital camera, etc.), uploading captured images (e.g., to an online database, to a photo sharing site, etc.), applying a filter (e.g., b&w, heavy saturation, etc.), creating a photo collage (e.g., vignette of more than one photo, collection of more than one photo, etc.), and/or taking any other action in response to a camera and/or gallery. In various embodiments, the one or more actions taken in response to the camera and/or gallery may be executed automatically (e.g., in response to a trigger, etc.), in response to an action by a user (e.g., voice command, pressing a shortcut button, etc.), and/or in response to any other trigger.

As an example, in one embodiment, after a user takes a photo, the user may upload the photo to a photo sharing site (e.g., Filch, etc.), a social media site (e.g., Facebook, etc.), and an online database site (e.g., Dropbox.com, etc.). The user may save such one or more actions to an instruction to be executed manually (e.g., button, shortcut, etc.) and/or automatically (e.g., when a photo is taken it triggers a series of other commands, etc.). Of course, a string of commands (e.g., actions, etc.) may be initiated in any manner (e.g., gesture, movement, action, etc.).

In another embodiment, a trigger may include an application 444. In various embodiments, an application may include any type of online or locally stored application, including a social network application, a dating service application, an on-line retailer application, a browser application, a gaming application, a media application, an application associated with a product, an application associated with a location, an application associated with a store (e.g., an online store, a brick and mortar store, etc.), an application associated with a service, an application associated with discounts and/or coupon services, an application associated with a company, any application that performs, causes, or facilitates the aforementioned action(s), and/or any other type of application including, but not limited to those disclosed herein.

In some embodiments, an application may trigger one or more actions, including recording an application action (e.g., internet usage, use of system resources, use of data and/or information associated with another application, etc.), modifying and/or activating and/or deactivating a system setting (e.g., WiFi, Bluetooth, NFC, volume, screen brightness, etc.), interacting with another app (e.g., associated or not associated with the initial application, etc.), uploading information (e.g., data file, metadata, stats, etc.), syncing information (e.g., data file, metadata, stats, etc.), and/or taking any action in response to the application. As an example, in one embodiment, after an application is opened, the user may dim the screen of the device to conserve power usage, retrieve recent social media postings from other apps (e.g., applications associated Facebook, Twitter, Foursquare, and/or Youtube, etc.), upload the user's current status (e.g., GPS location, hanging out with other contacts, etc.), and start a music app to listen to music. Rather than execute each action individually, the user may save such actions as a string of commands (e.g., actions, etc.) and which may be executed automatically (e.g., as soon as the app is opened, etc.), and/or manually (e.g., voice command, selecting a shortcut button, etc.). Of course, the string of commands may be executed and/or selected in any manner.

In another embodiment, a trigger may include device input 446. For example, in various embodiments, the device input may include receiving input from one or more sensors (e.g., accelerometer, gyroscope, camera, light, proximity, temperature, magnetometer, microphone, etc.), receiving input from one or more location based sensors (e.g., GPS, carrier triangulation, digital compass, barometer, altimeter, etc.), and/or any other sensor and/or device which may provide input to a mobile device. In some embodiments, the device input may trigger one or more actions, including starting and/or ending an application associated with the mobile device, recording a path (e.g., GPS tracks, etc.), activating and/or unlocking and/or restricting a service (e.g., premium features, app usage, etc.), activating and/or deactivate a mode (e.g., airplane mode, car mode, walking mode, office mode, etc.), activating and/or modifying and/or deactivating a device setting (e.g., volume, screen brightness, etc.), and/or taking any other action in response to the device input.

As an example, in one embodiment, every time a user gets into the user's car, the user activates the Bluetooth to communicate with the car's audio system, starts Pandora music application, and activates a car hand's free mode. In various embodiments, the user may save such actions to an instruction and execute the instruction automatically (e.g., when the user enters the user's car as determined by sensors, etc.), manually (e.g., giving a voice command, pressing a shortcut button, etc.), and/or in any other manner. In another embodiment, the sensors may sense that the user is in a plane (e.g., high altitude, traveling at a fast speed, etc.), and in response, deactivate the carrier network, activate a WiFi signal (e.g., for inflight WiFi service, etc.), decrease the brightness of the screen, and sign into the WiFi using Gogo login credentials. In one embodiment, such actions may be implemented automatically (e.g., after detecting the user is in a plane, etc.), after receiving approval from a user (e.g., "It has been detected you are in a plane. Would you like to enable Airplane Mode?," etc.), manually (e.g., voice command, button shortcut, etc.), and/or by any other manner.

In one embodiment, a trigger may include user history 448. In various embodiments, user history may include browsing history, purchase history, app usage history, battery usage history, location history, workout history (e.g., exercise regime, etc.), work history (e.g., time-in, time-out, etc.), and/or any other history which may be associated with the user. In some embodiments, user history may trigger one or more actions, including restricting use of a carrier network (e.g., data plan, etc.), providing targeted advertisements and/or relevant content (e.g., ads, recommended apps, relevant content based on context, etc.), starting and/or ending an app (e.g., maps app, exercise app, purchase app [e.g., Amazon, etc.], etc.), activating and/or modifying and/or deactivating a device setting (e.g., volume, screen brightness, etc.) and/or service (e.g., WiFi, Bluetooth, NFC, etc.), and/or taking any other action in response to user history.

In various embodiments, the user history may be aggregated periodically (e.g., once per month, placed in an archival directory, etc.) and/or aggregated continuously (e.g., real time archival of history, etc.). In other embodiments, the user history may be reviewed by the user or another user (e.g., manager, etc.) periodically (e.g., monthly report, etc.), manually (e.g., as requested by the user and/or another user, etc.), automatically (e.g., after each browsing session, as part of the shut-down and/or log off process of the device, etc.), and/or in any other manner.

As an example, in one embodiment, the user may frequently go to a site (e.g., Amazon, etc.), select a product, do a price-check (e.g., via Google, etc.) to see if the price is good, consider buying the product used versus new (e.g., consider shipping charges, consider reduced price of product, consider reputation of third party seller, etc.), and after making the final decision, buying the product and having the product shipped to the user. In various embodiments, such actions may be saved to an instruction and implemented automatically (e.g., product text inputted in search field of Amazon.com, etc.), manually (e.g., voice command, shortcut button, etc.), and/or in any other manner. In another embodiment, in response to the actions of the user (e.g., selecting a product, price-checking, etc.), the mobile device may display relevant content automatically (e.g., on locked-screen, on pull down screen, etc.), after receiving an approval from the user (e.g., "You recently searched for X. Would you like to receive relevant related content?," etc.), manually (e.g., voice command, shortcut button, etc.), and/or in any other manner.

In various embodiments, a trigger may include an alarm and/or reminder 450, including playing an audio (e.g., music clip, etc.), showing a visual (e.g., flashing light, etc.), making a movement (e.g., vibrate the user's mobile device, etc.), communicating with another device (e.g., turn on television, turn on lights, etc.), and/or any other item which may be associated with an alarm and/or reminder. In some embodiments, an alarm and/or reminder may trigger one or more actions, including controlling in some manner the user's mobile device (e.g., increase/decrease volume and/or screen brightness, refresh content on locked screen, etc.), controlling in some manner an application associated with the mobile device (e.g., start and/or display a news app, a game puzzle app, etc.), controlling in some manner another device (e.g., another mobile device, television, secondary display, lights, smart appliance, etc.), and/or taking any other action in response to an alarm and/or reminder.

As an example, in one embodiment, the user may have a wake-up alarm that goes off at 6 am every morning. After the alarm has gone off, the user may turn on a light, turn on the television to get the latest news, check any email received on the user's mobile device, and check road traffic conditions. Rather than perform each action separately, the user may save such actions to an instruction and execute the instruction automatically (e.g., when the alarm goes off, etc.), manually (e.g., voice command, shortcut button, etc.), and/or in any other manner. In another embodiment, the mobile device may recognize the one or more actions performed by the user, and in response, prompt the user to save the instructions (e.g., as a string of commands, etc.).

In another embodiment, a trigger may include a shortcut 452, including a voice command, a displayed button (e.g., on a homescreen, on a menu, etc.), a gesture (e.g., swipe, a predetermined motion, etc.), a physical button (e.g., on the mobile device, etc.) or combination of two or more physical buttons, and/or any other function or item which may execute a string of one or more commands. In some embodiments, a shortcut may trigger one or more actions, including executing a saved set of commands and/or actions, controlling in some manner the mobile device, controlling in some manner one or more applications associated with the mobile device, and/or taking action in response to the shortcut. Each of the foregoing descriptions relating to FIG. 4 may each be associated with a shortcut. Of course, a shortcut may be applied to any further embodiment not disclosed herein.

In another embodiment, a trigger may include a request 454. In various embodiments, a request may include receiving a request from a network (e.g., WiFi, cellular carrier data network, cellular carrier voice network, etc.), a request from another device (e.g., secondary device, another mobile device, smart appliance, secondary display, etc.), a request from one or more applications (e.g., request for information, request for permission, request to control in at least some manner the mobile device or another device associated with the user, etc.), a request from one or more contacts (e.g., social media site contact, trusted contact, etc.), a request from a location (e.g., brick and mortar store, etc.), and/or from any other location and/or item which may provide a request.

In some embodiments, a request may trigger one or more actions, including granting and/or denying and/or modifying one or more permissions, downloading and/or installing an app, displaying content (e.g., ad, photo, video, text, interactive graphic, ticket, security credentials, etc.), starting an application, performing a function (e.g., complete a sale and/or transaction, etc.), verifying the identity of the user (e.g., via photo id, wireless handshake protocols, etc.), and/or taking any other action in response to the request.

As an example, when a user is at an airport, many requests may be made, including a request to transfer electronic luggage verification tabs (e.g., as a result of checking in baggage, etc.) to the user's mobile device from the personnel's computer, a request to display a boarding pass ticket, a request to display some form of identification, and a request to push updated gate change information to the device. Rather than accept and/or interact with each of the requests separately and individually, the user may choose to create an instruction (e.g., commands to accept multiple requests, etc.). In various embodiments, the instruction may be permanently saved (e.g., to a local cache, to an online database of instructions, etc.), may be temporarily saved (e.g., valid for only a set period of time, valid for only while the user is at a set location, valid for only requests made from airport personnel, etc.). After executing the saved instruction, any request made while the user is at the airport may be accepted and/or cause another function (e.g., string of commands, actions, etc.) to be performed.

In a separate embodiment, when a user is at a movie theater, the user may seek to buy a ticket using the user's mobile device. A request may be made from a device associated with the ticket teller to the user's mobile device to complete the transaction. After completing the transaction, a request may be made at the door for the user to display the ticket purchased. Additionally, while at the movie theater, a friend of the user may send a request to share a photo taken, and/or interact with the user in some manner. In various embodiments, rather than interact separately and individually with each request, the user may automate the process so that any request made while the user is located at the movie theater may be granted, and/or any request made by movie theater personnel may be granted, and/or any request made by friends located also at the movie theater may be granted. Of course, the user may control the instruction in any manner.

In various embodiments, the user may fully control the instruction, including the duration (e.g., length of time, etc.), the scope (e.g., location, friends, proximity, etc.), the permissions (e.g., ability for trusted personnel to read and/or write and/or edit information, ability for friends to read and/or send information, etc.), and/or any other item which may be associated with controlling in some manner the instruction. In some embodiments, the instruction may be saved to a local cache (e.g., on the user's mobile device, etc.), to an online server and/or database, to a cache associated with another device (e.g., secondary device, attached storage, etc.), and/or to any item, system, and/or environment where an instruction may be saved. In other embodiments, after an instruction has been created, a user may modify an instruction, including adding and/or removing triggers and/or actions.

In another embodiment, one or more instructions may be collected and/or organized in an instruction database, including a hierarchal database structure, a relational database, and/or any other type of organized database system. In various embodiments, the one or more instructions may be displayed in a drop-down menu format (e.g., list box, etc.), a hierarchal format, organized into groups and/or page elements, and/or structured in any manner.

In various embodiments, the one or more instructions may be further controlled, including modifying a time of applicability (e.g., when I hang out with my friends, only when I am alone, etc.), associating it with a schedule (e.g., 6-9 am daily, month of September, at 10 am today for my appointment, always, etc.), associating it with a context (e.g., location, time, participants, etc.), and/or taking any other action to control at least in part the one or more instructions. Of course, in other embodiments, the instructions may be further controlled by applying one or more additional triggers (e.g., time of applicability trigger, schedule trigger, context trigger, etc.).

In one embodiment, the one or more instructions may be recorded and/or created and/or modified on the user's mobile device. In another embodiment, the one or more instructions may be sent by another user and/or device. For example, in one embodiment, the user may have created an instruction which takes photos taken in the last week, compiles them into a photo newsletter, and emails it out to everyone designated in contacts as a favorite. The user may send (e.g., via email, via a link, via bumping the two devices, via Bluetooth, via physical cord, etc.) the instruction to another contact, and/or receive an instruction from another entity in a similar manner.

In a further embodiment, one or more instructions may be selected and/or downloaded from a service, server, and/or online database. For example, in one embodiment, a collection of instructions may be found on an online service. The user may navigate to the online service (e.g., via a website address, etc.) and may select one or more instructions organized by category, by function, by apps used, and/or organized in any manner. In various embodiments, the instructions may be sent to the user's mobile device, including downloading (e.g., from a website, etc.), pushing (e.g., from online service, etc.), synching (e.g., instructions management app on mobile device, etc.), and/or receiving the instruction in some manner on the user's mobile device.

Figure 5:
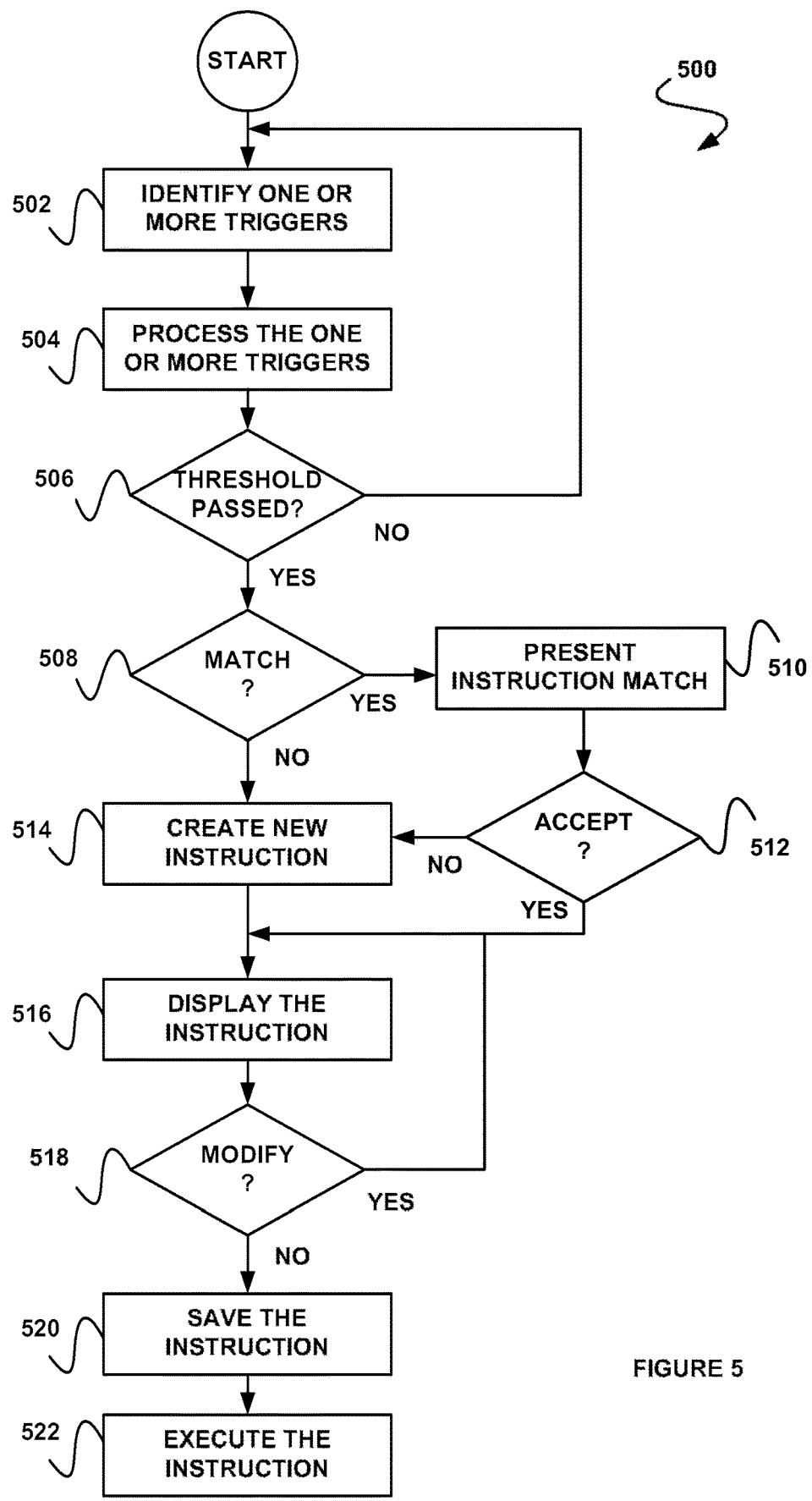
FIG. 5 shows a method for saving one or more instructions with a mobile device, in accordance with another embodiment.

FIG. 5 shows a method 500 for saving one or more instructions with a mobile device, in accordance with another embodiment. As an option, the method 500 may be implemented in the context of the architecture and environment of the previous Figures and/or any subsequent Figure(s). Of course, however, the method 500 may be implemented in the context of any desired environment. It should also be noted that the aforementioned definitions may apply during the present description.

As shown, one or more triggers are identified. See operation 502. In various embodiments, the one or more triggers may be identified using an input (e.g., screen surface input, microphone, multi-touch sensor, proximity sensor, vision-based commands and/or guidance, etc.), a sensor associated with the user's mobile device (e.g., GPS, accelerometer, NFC, gyroscope, temperature, magnetometer, barometer, altimeter, etc.), and/or by any other method. In one embodiment, the one or more triggers may be identified through a continuous (e.g., continuous motion and/or input, continuous menu selection, etc.) and/or near continuous (e.g., touching sequence includes a pause, wait for app to respond, wait for page load, etc.) process and/or motion. In a separate embodiment, the one or more triggers may be identified through a non-continuous process and/or motion. For example, in one embodiment, the trigger may include a context awareness (e.g., location, etc.), an action by the user (e.g., start social networking app, etc.), and a new photo to have been taken, each of which may be identified separately and in a non-continuous manner, before an instruction is triggered to upload a new photo with geotag metadata to a social networking site.

In one embodiment, the triggers may be inputted and/or collected at any time (e.g., whenever the user is using the mobile device, etc.). In other embodiments, the triggers may be inputted and/or collected based on an input and/or recording designation. For example, in one embodiment, the user may open an instruction app and select a "record now" option to record one or more triggers and/or actions. In other embodiments, the user may give a voice command "record now" to record one or more triggers and/or actions. Of course, the one or more triggers and/or actions may be recorded in any manner, and in response to any action and/or input.

Additionally, the one or more triggers may be processed. See operation 504. For example, in various embodiments, the one or more triggers may be processed using a processor on the user's mobile device, using a carrier network (e.g., trigger actions and/or metadata identified by the carrier, etc.), using an online service (e.g., trigger actions and/or metadata identified by an online service, etc.), and/or using any other type of network and/or service whereby the one or more triggers may be processed.

As shown, it is determined whether a threshold has been passed. See determination 506. In one embodiment, a threshold may include requiring a minimum amount of actions and/or triggers (e.g., at least four input actions from the user, etc.). In another embodiment, a threshold may relate to creating and/or recording new instructions. For example, in one embodiment, a trigger may include one action of the user opening up an application. In response to the trigger, a saved instruction may include taking one or more actions, including setting power usage profiles (e.g., conserve battery, etc.), setting a volume level (e.g., mute, etc.), and/or taking any other action. In contrast, in another embodiment, a user may give an input of at least four actions (e.g., open gallery, select one or more photos, select to share photos, select recipients, etc.), and based off of the four actions, a threshold may be passed (e.g., minimum three actions, etc.) whereupon the user's mobile device may prompt the user to save the actions to an instruction, look up an instruction based on the actions, and/or take any other action in response to the set of input actions.

If it is determined that a threshold has been passed, it is determined whether the one or more triggers match an existing instruction. See determination 508. For example, in various embodiments, the triggers may be compared to saved instructions on the user's mobile device (e.g., associated with instructions app, saved in local cache, etc.), on an online server system (e.g., online database, online service, online server, etc.), on another device (e.g., within a near geographic proximity to the user, from a trusted source, etc.), and/or on any platform, device, and/or system.

As shown, if a match is found, an instruction match is presented. See operation 510. For example, in various embodiments, an instruction match may be presented by a separate GUI (graphical user interface), a screen overlay, a pop-up box, may be visual, textual, and/or audible, and/or be presented in any manner. In one embodiment, an exact match of triggers may be displayed with a list of accompanying actions taken in response to the one or more triggers. In another embodiment, a match of instructions including at least the one or more triggers used may be displayed. For example, in one embodiment, the user may have recorded one or more triggers, including enabling the GPS, starting a map application, and displaying a map overlay of friends nearby. In response to such triggers, a match (or list of matches) may be displayed to the user including instructions which include the detected triggers as well as other triggers, such as selecting friends designated as favorite, and selecting friends that are within a proximity of 4 miles. The instruction may include one or more actions, including inviting friends (e.g., via each contact's preferred method of contact [email, SMS, chat], etc.), and posting an update on Facebook (e.g., regarding a status update, etc.). Of course, the foregoing example is only one embodiment of a match. A match may be composed of any triggers and/or actions.

In one embodiment, a user may control how a match (or list of matches) is displayed, including applying filters and/or restrictions (e.g., display only exact trigger matches, display top five most popular trigger matches, etc.), controlling the manner of the display (e.g., fill entire screen, notification in notification bar, text and/or audible notification, etc.), automating at least one aspect of the match (e.g., post update of instruction to a site, etc.), and/or taking any other action to control at least an aspect of a match (or list of matches).

As shown, it is determined whether a user accepts the presented instruction match. See determination 512. In various embodiments, the instruction match may be accepted by selecting a button (e.g., physical button, screen button, etc.), giving a voice command (e.g., "accept," etc.), exceeding a time threshold (e.g., 10 seconds, etc.), applying an automatic function (e.g., automatic acceptance based on whether exact trigger match is determined, automatic acceptance based on ratings of the match by one or more friends, etc.), giving a gesture (e.g., swipe motion, etc.) and/or movement (e.g., shake device, etc.), and/or giving any other input to indicate acceptance of the presented instruction.

If it the user does not accept the instruction match, or if the one or more triggers do not match an instruction, a create new instruction page is displayed. See operation 514. In one embodiment, the create new instruction page may be associated with the mobile device (e.g., associated with an installed app, etc.). In another embodiment, the create new instruction page may be a website, a portal to an online website, and/or associated with an online service. In one embodiment, tools may be presented to the user to create a new instruction. For example, in various embodiments, tools may include pre-inputted triggers and/or actions, an ability to input a custom (e.g., not before inputted, etc.) trigger and/or action, and/or any other tool which may facilitate creating a new instruction. In one embodiment, recommended triggers and/or actions may be presented to the user.

For example, in one embodiment, a user may input one or more triggers, including starting a gallery application, selecting photos, and applying a filter to all photos (e.g., b&w, saturation level, brightness, etc.). Based on such triggers, an instruction match may not be found (or a found instruction match may be rejected), whereupon a create new instruction page may be presented to the user, which may include the detected triggers, recommended additional one or more triggers, potential one or more actions, recommended instructions (e.g., a set of one or more recommended triggers and/or actions), and/or any other element which may facilitate the creation of a new instruction. The recommended one or more triggers and/or the one or more actions may include a recommendation to select one or more contacts as recipients of the selected photos, upload the selected photos to a social networking site (e.g., Facebook, etc.), back up the photos to a digital archive (e.g., Dropbox.com, etc.), send a multimedia message (e.g., text with image, etc.) to one or more recipients, and/or taking any further action. Alternatively, a recommended instruction may be presented based on the inputted triggers, with an additional trigger of selecting to share the photos, and based off of the combined set of triggers, taking action including sharing the photos with family (e.g., via email, etc.), uploading the photos to a personal blog, and archiving them on an online data storage site. Of course, in one embodiment, the user of the mobile device may combine one or more triggers and/or actions as desired, and/or may select any recommended instruction.

In a further embodiment, the create new instruction page may include the ability to drag and drop the one or more triggers and actions, to interact with one or more widgets (e.g., trigger widget, action widget, etc.), an ability to run and/or see a preview of the instruction, to select and/or deselect elements (e.g., triggers, actions, etc.) from a list, to select and/or deselect one or more hyperlinks (e.g., relating to a trigger, action, etc.), and/or further interact with the create new instruction page in any manner.

As shown, after creating a new instruction (or accepting a presented instruction match), the instruction may be displayed. See operation 516. In various embodiments, the instruction may be displayed on a GUI, a separate page and/or pane, by text (e.g., textual description of the one or more triggers and actions, etc.), by graphic (e.g., graphic of the one or more triggers and actions, etc.), in a flowchart format (e.g., input order of triggers leading to execution order of actions, etc.), and/or in any other manner. In some embodiments, the instruction may be displayed with interactive elements (e.g., ability to modify and/or change the one or more triggers and/or actions, etc.) and/or may be displayed in a static manner (e.g., no input permitted).

It is determined whether to modify the instruction. See determination 518. For example, in various embodiments, the user may specify the run times (e.g., only at night, only when I take photos, etc.), format (e.g., color, position, etc.), notifications (e.g., text, audible, frequency, ringtone, etc.), additional rules (e.g., do not run if I am driving, do not run if another instruction is being run, etc.), and/or any further information and/or features which may relate in some manner to the instruction. In various embodiments, input on whether to modify the instruction (e.g., yes, no, etc.) may be received by a touch sensor, a voice command, a physical button (e.g., on the device, etc.), and/or in any other manner.

As shown, if it determined to not modify the instruction, the instruction may be saved. See operation 520. In one embodiment, the instruction may be permanently saved, including saving it to a local cache (e.g., associated with the user's mobile device, associated with an app, etc.), to an online database (e.g., online instruction database, online data backup, online instruction service, online server, etc.), to another device (e.g., associated with a trusted contact of the user, etc.), and/or to any other storage medium. In other embodiments, the saving of the instruction may be associated with an app (e.g., product specific app, instruction app, etc.), a native utility on the device (e.g., native app, native OS Platform, etc.), and/or any other feature on a mobile device. In another embodiment, the instruction may be saved to a shortcut (e.g., graphic and/or icon, text hyperlink, touch button, device button, etc.), to a gesture, and/or to any other element associated with the mobile device which may execute the instruction.

In one embodiment, the user may opt to classify all triggers as actions and save such actions to a shortcut (e.g., button, gesture, voice command, etc.). In another embodiment, the user may opt to retain one or more triggers (e.g., input from the user, etc.) which may then cause one or more actions to be executed.

Further, the instruction may be executed. See operation 522. In one embodiment, after creating and/or saving the instruction, the mobile device may prompt the user whether it is desired to execute and/or run the instruction immediately. In other embodiments, the instruction may be executed in response to a shortcut (e.g., a button, a gesture, a voice command, etc.), and/or in response to the saved one or more triggers.

As an example, in one embodiment, a user may give a voice command (e.g., "run photo instruction #1," etc.), tap and/or press a button (e.g., on a screen associated with the mobile device, physical button on mobile device, etc.), give a preconfigured motion and/or gesture (e.g., a swipe, etc.), and/or select any other item which has been preconfigured to execute one or more instructions. In such an embodiment, the preconfigured item, or combination of items (e.g., voice command, button, motion, etc.) may be saved as the sole trigger associated with the instruction. In a separate embodiment, an instruction (e.g., associated with a shortcut, etc.) may be set to be executed on a set basis (e.g., run every other Friday, every night, etc.). Of course, in other embodiments, an instruction may be set to any other automatic configuration and/or setting.

Additionally, in another embodiment, a user may give one or more triggers to execute the instruction. For example, the user may create a calendar event, including inputting an event time, time, and location. The user may then choose to share the event with a group of contacts (e.g., work clients, etc.). Based off of such inputs, an instruction prompt may be displayed on the screen (e.g., "Would you like to run Share Work Event Instruction," etc.). If the user chooses to accept the prompt, an instruction may be run including fetching a map based off of the location, creating an e-invite, sending the e-invite to preselected recipients, monitoring responses from the recipients (e.g., accept, do not accept, etc.), and compiling a feedback response (e.g., to be presented to the user in the form of an email, etc.). Of course, the foregoing example is only one example of a set of triggers executing an instruction and subsequent actions associated with the instruction. Any combination of one or more triggers and/or one or more actions may be saved to an instruction.

In another embodiment, an instruction may be received from another device. For example, in one embodiment, a user may push an instruction from a first mobile device to a second mobile device associated with a second user. The second user may configure the mobile device settings to permit pushing instructions, syncing instructions, and/or sharing instructions in any manner. Further, in one embodiment, the instructions pushed from a trusted source may be automatically saved and/or executed on the first mobile device. For example, in one embodiment, the user may have already indicated that a contact was a trusted source, and based on the trustworthiness of the source, the contact may push an instruction (e.g., relating to a clientele management process, etc.) from the contact's mobile device to the user's mobile device. In one embodiment, the pushed instruction may require user input before proceeding (e.g., acceptance to receive instruction, acceptance to execute pushed instruction, etc.). In another embodiment, the pushed instruction may execute automatically after being pushed to the user's mobile device.

Figure 6:
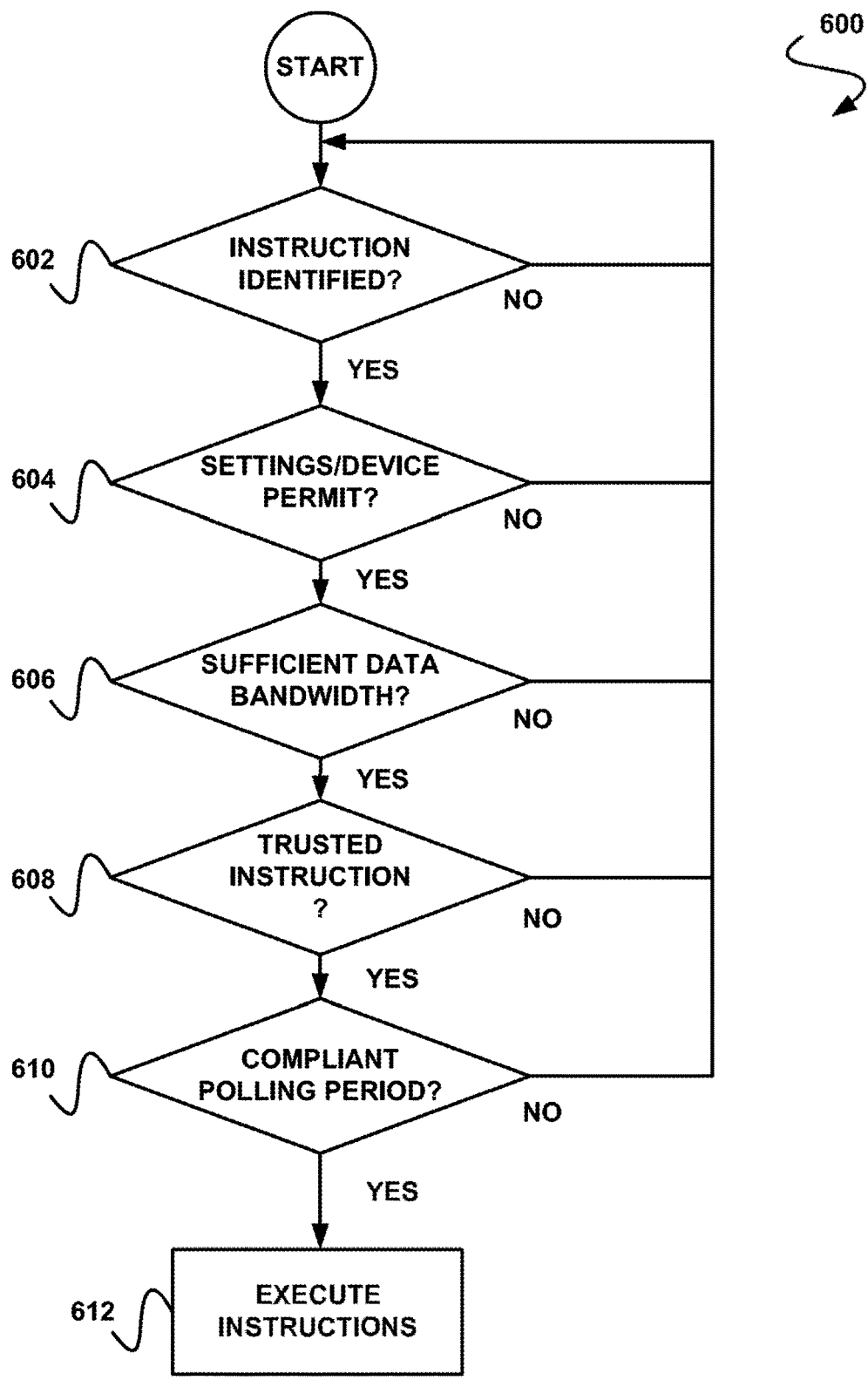
FIG. 6 shows a method for executing one or more instructions with a mobile device, in accordance with another embodiment.

FIG. 6 shows a method 600 for executing one or more instructions with a mobile device, in accordance with another embodiment. As an option, the method 600 may be implemented in the context of the architecture and environment of the previous Figures and/or any subsequent Figure(s). Of course, however, the method 600 may be implemented in the context of any desired environment. It should also be noted that the aforementioned definitions may apply during the present description.

As shown, it is determined whether an instruction is identified. See determination 602. In various embodiments, an instruction (e.g., combination of one or more triggers and one or more actions, etc.) may be identified by one or more triggers (e.g., predetermined one or more input from the user, a shortcut, etc.), an instruction match on the user's mobile device (e.g., saved instruction, app recognizes instruction, etc.), an instruction match on an online site (e.g., online instruction database, online instruction service, etc.), an instruction match on another device associated with the user (e.g., trusted device in close proximity to the user, etc.), and/or by any other method.

If it is determined that an instruction is identified, it is determined whether the settings and/or device permit executing the instruction. See determination 604. For example, in various embodiments, the settings and/or device may include settings relating to time, location, and/or people involved (e.g., do not run "Fred Instruction" if Fred is near, etc.), a battery status (e.g., do not run if less than 20% battery, etc.), a storage amount (e.g., do not run if less than 2 gb storage space, etc.), a data amount (e.g., restrict use of uploading photos while on carrier network, do not transfer data files over 200 mb, etc.), a permission (e.g., to execute instructions from trusted contacts, etc.), verifying an instruction source (e.g., instruction downloaded from an online source, instruction received from another device, etc.), a data transfer rate (e.g., only transfer using WiFi, only transfer if rate is greater than 1 mb/sec, etc.) and/or configuring any other setting associated with one or more instructions.

If it is determined that the settings and/or device permit executing the instruction, it is determined whether there is sufficient data bandwidth. See determination 606. For example, in various embodiments, sufficient data bandwidth may include a data transfer rate (e.g., minimum of 2 mb/sec, etc.), a sufficient amount of available data usage (e.g., based on data plan associated with the mobile device, etc.), a preferred network type (e.g., no data transfer while roaming, etc.), and/or any further item associated with data bandwidth.

If it is determined that there is sufficient data bandwidth, it is determined whether the instruction is trusted. See determination 608. For example, in various embodiments, determining whether the instruction is trusted may include verifying an instruction source (e.g., device, contact, etc.) and/or an instruction author (e.g., creator of the instruction, etc.), receiving instruction credentials (e.g., name and/or password, etc.), engaging in a security handshake (e.g., cryptographic protocol compliance, etc.), ensuring that the instruction is virus free (e.g., no viruses, worms, and/or malicious content, etc.) and/or any other item which may establish whether the instruction is to be trusted.

In another embodiment, an instruction may be verified using an instruction trustworthy app (e.g., virus scan app, Norton, etc.) associated with the instruction (or the device, or the app responsible for the instruction, etc.). In one embodiment, notwithstanding the lack of trust associated with an instruction, a user may still choose to execute and run an instruction by labeling an instruction as being trustworthy (e.g., "The source of this instruction is not trustworthy. Would you like to override the current settings and execute the instruction?," etc.). In another embodiment, in order to override a lack of trust associated with an instruction, a user may need to input a device administrator password and/or further authenticate in some manner to prevent any malicious activity. In such an embodiment, overriding a lack of trust may thereby reclassify the instruction as being a trusted instruction.

If it is determined that the instruction is trusted, it is determined whether the instruction is compliant with a polling period. See determination 610. For example, in various embodiments, a polling period may include periodically syncing (e.g., every 15 minutes, etc.) new and/or modified instructions (e.g., with an online database, etc.), periodically running (e.g., every 15 minutes, etc.) one or more instructions (e.g., a shortcut to an instruction including one or more triggers [shortcut button] and one or more actions, etc.), waiting for one or more triggers to complete (e.g., a trigger may be receipt of a new email and/or news article, etc.), and/or any other element which may relate to complying with a polling period. As an example, in one embodiment, the user may indicate that an instruction may relate to gathering the latest RSS feeds, filtering such RSS feeds by only including updates relating to cellular phone technology, and compiling such feeds into a report. The user may also indicate (e.g., as metadata associated with the instruction, as a polling period setting, etc.) that the instruction is to be run once a day at 6 pm. Of course, the polling period may relate to any time period and/or frequency.

As shown, if it is determined that the instruction is compliant with a polling period, the instructions may be executed. See operation 612. Of course, determinations 602-610 may occur simultaneously, in any order, and/or in any other manner.

Figure 7:
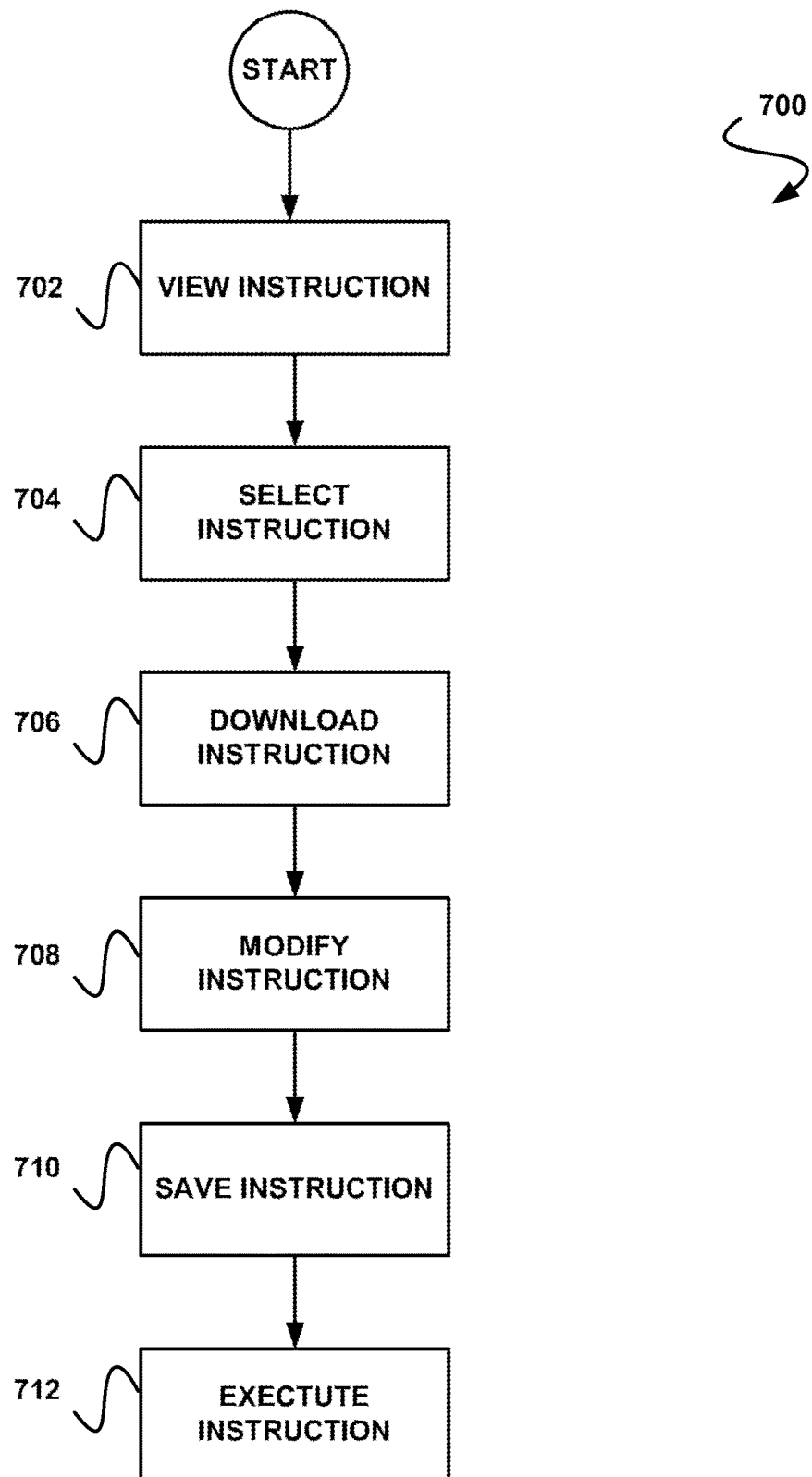
FIG. 7 shows a method for executing one or more instructions with a mobile device, in accordance with another embodiment.

FIG. 7 shows a method 700 for executing one or more instructions with a mobile device, in accordance with another embodiment. As an option, the method 700 may be implemented in the context of the architecture and environment of the previous Figures and/or any subsequent Figure(s). Of course, however, the method 700 may be implemented in the context of any desired environment. It should also be noted that the aforementioned definitions may apply during the present description.

As shown, an instruction may be viewed. See operation 702. In various embodiments, an instruction may be viewed on the user's mobile device, including viewing one or more instructions on an app (e.g., instruction store app, etc.), through an online portal (e.g., website, web portal, etc.), and/or through any portal and/or app which provides access (e.g., ability to view and/or download, etc.) to one or more instructions. In one embodiment, the user may view instructions associated with the user (e.g., previously downloaded, created instructions, active instructions, etc.). In another embodiment, the user may view new instructions (e.g., instructions not previously downloaded, etc.).

In various embodiments, an instruction store may include categorizations of instructions (e.g., productivity, social networking, calendar management, photo management, etc.). Of course, the instructions may be organized in any manner. In one embodiment, new instructions may be associated with the OS of the user's mobile device, including presenting new instructions as possible OS alterations and/or customizations (e.g., modify manner in which the phone responds based on different one or more triggers, etc.). In another embodiment, new instructions may be associated with a specific app (e.g., Facebook app, Dropbox app, Yelp app, etc.), with a genre of apps (e.g., business productivity apps, client management apps, social networking apps, etc.) which may be managed by a central instruction service (e.g., app platform, OS Native Utility, etc.), and/or with any app and/or item which may execute the one or more instructions.

In a separate embodiment, an instruction may be received via a messaging platform (e.g., SMS, email, chat, etc.). The user may select to save and/or associate the instruction with an installed app (e.g., managed by a specific app, managed by an OS Native Utility, etc.), with an app which may need to be downloaded and/or installed, with the messaging platform app (e.g., instruction is executed from directly within the messaging platform [e.g., email app, SMS app, chat app, etc.], etc.). Of course, new instructions may be viewed on any platform, associated with any app, and/or displayed in any manner.

In a further embodiment, an instruction may be viewed at the request of the user. For example, in various embodiments, the instruction may take an action to view one or more instructions, including browsing an online portal (e.g., instruction site, instruction database, etc.), navigating a specific app (e.g., app associated with a specific business and/or product and/or brick and mortar store, etc.), navigating an instruction store (e.g., instruction management app, etc.), receiving a text and/or chat and/or message (e.g., email, posting response, etc.), and/or taking any other action wherein the user requests to view one or more instructions.

As shown, an instruction may be selected. See operation 704. In some embodiments, the selection may include selecting one or more instructions (multiple instructions), combining more than one instruction together into an instruction packet (e.g., of more than one instruction, etc.), mixing and matching desired instructions, and/or taking any other action to select the one or more instructions in some manner.

In one embodiment, the instructions may be selected using the user's mobile device. In other embodiments, the one or more instructions may be selected using another device (e.g., device associated with another entity, a second mobile device, a computer, etc.), a device associated with a physical store (e.g., brick and mortar store, etc.), a device associated with an automobile (e.g., infotainment system console, etc.), and/or any other device which may permit selection of one or more instructions.

As shown, the one or more instructions may be downloaded. See operation 706. In one embodiment, the one or more selected instructions may be requested from the user's mobile device and downloaded to the user's mobile device. In other embodiments, the one or more selected instructions may be requested from another device and downloaded to the user's mobile device. In such an embodiment, the user may set trustworthy and/or permission settings associated with contacts, devices, and/or other entities (e.g., brick and mortar store, etc.).

As an example, in one embodiment, an employee of a corporation may be issued a mobile device, which may belong to and be controlled by the company. When instructions (e.g., client management, employee resources, etc.) need to be updated and/or downloaded to each employee's phone, a central app management section (or any person and/or group) may update and/or create an instruction and push (e.g., send to each employee's device to be executed, etc.) such an instruction to each employee's device. Of course, the employee's device may be controlled in any manner (e.g., send any type of instruction to the device, etc.).

Additionally, in other embodiments, the user's mobile device may display a notification of new one or more instructions, including displaying a status of one or more instructions (e.g., "HR Dept installed 2 new automatic executing instructions on your device: Instruction A (client management); Instruction B (employee resource)," etc.), a compliance agreement notification (e.g., "Please select 'accept' if you agree to the terms of the new one or more instructions," etc.), an employee input (e.g., "The downloaded Instruction from HR relates to sales. Would you like to install and/or execute (i.e., make it active) this instruction?," etc.), and/or any other notification relating to the one or more instructions.

In various embodiments, the user of the mobile device may set and/or control the level of permissions associated with pushing and/or installing one or more instructions on the user's mobile device. For example, in one embodiment, the user may be the sole entity permitted to install and/or execute instructions on the mobile device. In other embodiments, the user may grant permission to a group (e.g., "family" designation in metadata of contact, etc.), a specific entity (e.g., Bob, BestBuy stores, etc.), a location (e.g., instructions pushed from X location, instructions may be pushed while I am present at X location, etc.), a device (e.g., trusted device, established connections with one or more devices, etc.), and/or to any other entity and/or criteria which may relate in some manner to permissions.

In some embodiments, the permission may be complete and/or may be partial. For example, in various embodiments, partial permission may include an ability for another entity to send an instruction to a user's mobile device (e.g., execution may be dependent on the user accepting and/or giving some other approval of the instruction, etc.), to recommend (e.g., Bob recommends "Instruction A." Would you like to check it out?," etc.), to send a link to (e.g., within an email, etc.), to push a notification to the user's device (e.g., "Hi. I've been trying out this Instruction. It works great. Let me know if you like it.," etc.), to push an Instruction to the user's device (e.g., install, download, begin to execute, etc.), and/or to partially interact with the user's mobile device in some manner.

As shown, one or more instructions may be modified. See operation 708. In various embodiments, modifying the one or more instructions may include adding and/or deleting a specific trigger and/or action (e.g., as included in the downloaded instruction, etc.), adding and/or deleting a custom trigger and/or action (e.g., an item created by user, etc.), adding metadata to the instruction (e.g., name, creator, date modified, title, etc.), associating the instruction with one or more settings (e.g., time of applicability, permission level required in order to run, data network restriction, polling period, battery status requirement, etc.), and/or taking any further action to modify one or more instructions.

In one embodiment, a time threshold may be applied to modifying the one or more instructions. For example, in one embodiment, if the user does not modify the downloaded instruction within a set time period (e.g., 30 min, etc.), the instruction may be automatically saved and/or implemented (e.g., ready for execution, etc.). In another embodiment, the user may configure device settings such that when an instruction is downloaded, it is automatically saved and implemented (e.g., ready for execution, etc.). Of course, the user may modify the manner in which any automatic settings are applied to an instruction. For example, in some embodiments, the automatic settings may relate to applying a set of predetermined settings (e.g., including permissions, etc.) and/or metadata, interacting with the downloaded instruction to determine if it is safe to use (e.g., virus free, malicious software free, etc.), and/or applying any item (or items) which may be automated.

In another embodiment, modification to an instruction may be made at any time (e.g., after download, after install, after save, after executing, etc.). As an example, in one embodiment, the user may select an instruction and apply (e.g., after it has already been saved and executed, etc.) settings including making modifications to the saved instruction (e.g., actions, triggers, metadata, device settings, etc.). As such, settings and/or modifications relating to an instruction may be made at any period after downloading the instruction.

As shown, an instruction may be saved. See operation 710. In one embodiment, the instruction may be permanently saved, including saving it to a local cache (e.g., associated with the user's mobile device, associated with an app, etc.), to an online database (e.g., online instruction database, online data backup, online instruction service, online server, etc.), to another device (e.g., associated with a trusted contact of the user, etc.), and/or to any other storage medium. In other embodiments, the saving of the instruction may be associated with an app (e.g., product specific app, instruction app, etc.), a native utility on the device (e.g., native app, native OS Platform, etc.), and/or any other feature on a mobile device. In another embodiment, the instruction may be saved to a shortcut (e.g., graphic and/or icon, text hyperlink, touch button, device button, etc.), to a gesture, and/or to any other element associated with the mobile device which may execute the instruction.

In one embodiment, the user may opt to classify all triggers as actions and save such actions to a shortcut (e.g., button, gesture, voice command, etc.). In another embodiment, the user may opt to retain one or more triggers (e.g., input from the user, etc.) which may then cause one or more actions to be executed.

Further, the instruction may be executed. See operation 712. In one embodiment, after creating and/or saving the instruction, the mobile device may prompt the user whether it is desired to execute and/or run the instruction immediately. In other embodiments, the instruction may be executed in response to a shortcut (e.g., a button, a gesture, a voice command, etc.), and/or in response to the saved one or more triggers.

As an example, in one embodiment, a user may give a voice command (e.g., "run photo instruction #1," etc.), tap and/or press a button (e.g., on a screen associated with the mobile device, physical button on mobile device, etc.), give a preconfigured motion and/or gesture (e.g., a swipe, etc.), and/or select any other item which has been preconfigured to execute one or more instructions. In such an embodiment, the preconfigured item, or combination of items (e.g., voice command, button, motion, etc.) may be saved as the sole trigger associated with the instruction. In a separate embodiment, an instruction (e.g., associated with a shortcut, etc.) may be set to be executed on a set basis (e.g., run every other Friday, every night, etc.). Of course, in other embodiments, an instruction may be set to any other automatic configuration and/or setting.

Additionally, in another embodiment, a user may give one or more triggers to execute the instruction. For example, the user may create a calendar event, including inputting an event time, time, and location. The user may then choose to share the event with a group of contacts (e.g., work clients, etc.). Based off of such inputs, an instruction prompt may be displayed on the screen (e.g., "Would you like to run Share Work Event Instruction," etc.). If the user chooses to accept the prompt, an instruction may be run including fetching a map based off of the location, creating an e-invite, sending the e-invite to preselected recipients, monitoring responses from the recipients (e.g., accept, do not accept, etc.), and compiling a feedback response (e.g., to be presented to the user in the form of an email, etc.). Of course, the foregoing example is only one example of a set of triggers executing an instruction and subsequent actions associated with the instruction. Any combination of one or more triggers and/or one or more actions may be saved to an instruction.

Figure 8:
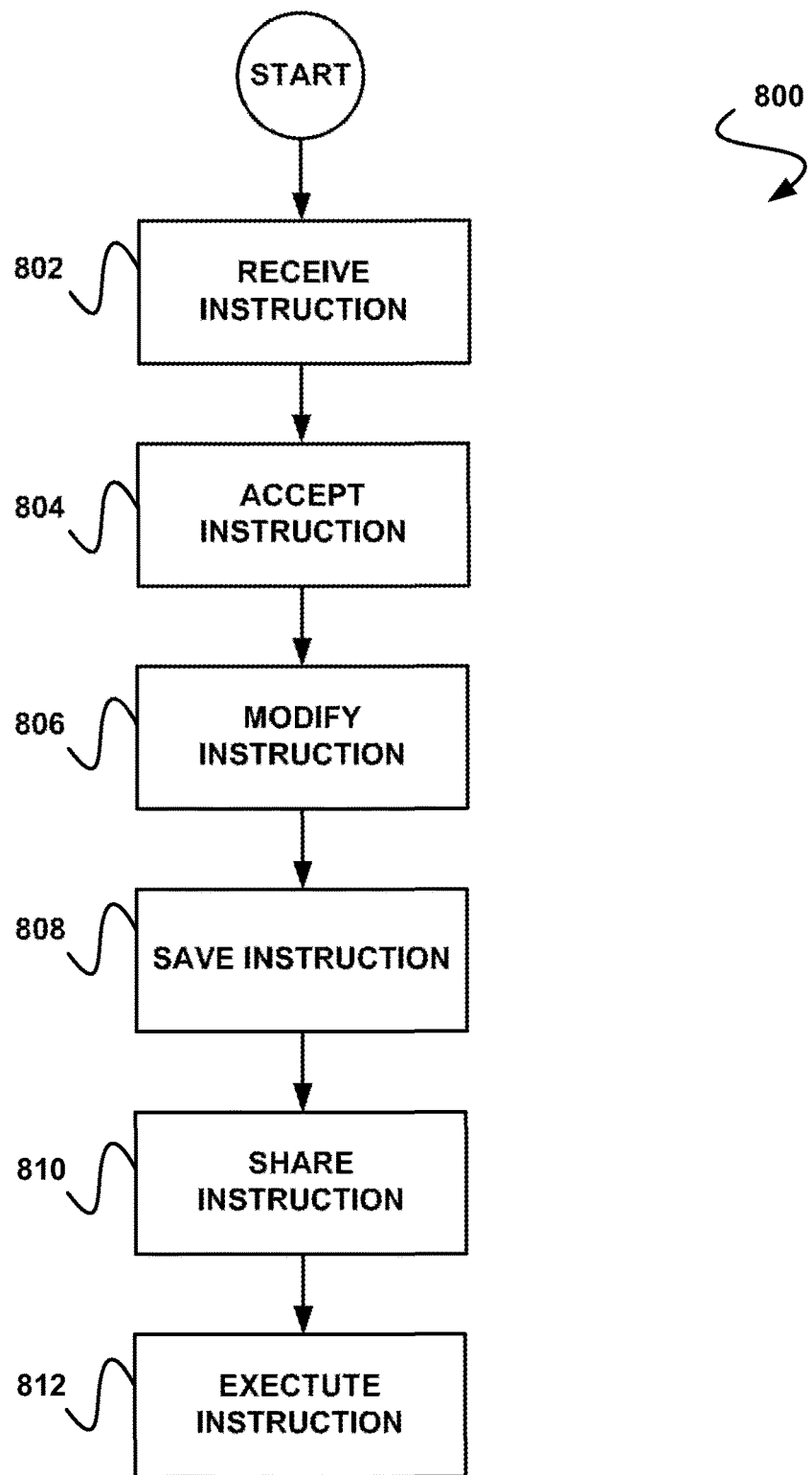
FIG. 8 shows a method for executing one or more instructions with a mobile device, in accordance with another embodiment.

FIG. 8 shows a method 800 for executing one or more instructions with a mobile device, in accordance with another embodiment. As an option, the method 800 may be implemented in the context of the architecture and environment of the previous Figures and/or any subsequent Figure(s). Of course, however, the method 800 may be implemented in the context of any desired environment. It should also be noted that the aforementioned definitions may apply during the present description.

As shown, an instruction may be received. See operation 802. In various embodiments, the instruction may be received from another device (e.g., secondary device, device associated with a trusted contact, device associated with a trusted entity such as a brick and mortar store, etc.), a messaging platform (e.g., email, SMS, chat, social networking messaging platform, etc.), an installed app (e.g., specific app installed on the mobile device, etc.), a network (e.g., WiFi, Bluetooth, etc.), a carrier (e.g., data carrier, mobile phone carrier, etc.), an online portal (e.g., website, web portal, etc.), an instruction store (e.g., instruction database, instruction repository, etc.), an OS platform (e.g., sync updates to device, etc.), a host system (e.g., a system to which the mobile device is physically connected, etc.), and/or from any system from which an instruction may be sent.

In another embodiment, an instruction may be received at the request of another entity (e.g., other than the user of the mobile device, etc.). For example, in various embodiments, the instruction may be received via a notification (e.g., from a contact, from a trusted entity, from a trusted device, etc.) prompting the user to take an action (e.g., view an instruction, download an instruction, etc.), via a message (e.g., email, chat, SMS, etc.), via a link (e.g., HTML link, download location site, etc.), via an attachment (e.g., to a message, etc.), and/or via any communication and/or data sent to the user's mobile device.

In one embodiment, a user may configure settings to enable notification and/or installation of instructions from trusted entities and/or sources. For example, the user may select filters to be applied to incoming notifications (e.g., relating to one or more instructions), including the type (e.g., clientele instructions, productivity instructions, etc.), the complexity (e.g., only permit at most 10 combined triggers and/or actions, etc.), the content (e.g., relating only to cell phone technology, etc.), a keyword (e.g., "AT&T," etc.), and/or any other filter which may relate in some manner to a notification. In some embodiments, the filters may be applied by an OS Native Utility (e.g., system app, system feature, etc.), an installed app (e.g., app associated with Yelp.com, Dropbox.com, Facebook.com, etc.), and/or by any system and/or feature associated with the user's mobile device. In other embodiments, the user may select to reject all notifications relating to instructions.

In another embodiment, one or more instructions may be received based off of a context associated with the user, including location information (e.g., GPS location information, a physical address, an IP address, shopping center, movie theatre, stadium, etc.), network information (e.g., information associated with the network currently being utilized or currently being accessed, etc.), applications being utilized (e.g., games, maps, camera, retailer, social networking, etc.), current activities (e.g., shopping, walking, eating, reading, driving, etc.), browsing activity (e.g., history, etc.), purchase activity (e.g., history, etc.), environment (e.g., environmental audio, weather, temperature, etc.), payment activities (e.g., just purchased coffee, groceries, clothes, etc.), and/or any other type of information.

As an example, in one embodiment, a user may have researched online how to get to an airport. Additionally, the user may have received an email confirming a flight purchase as well as a hotel reservation. Based on the context of such information, the user may be presented with a notification (e.g., on the device, via messaging platform, etc.) for an instruction (e.g., "Travel Instruction," etc.) which may including triggers such as receipt of a travel purchase and an event creation in a calendar app, as well as actions including aggregating travel information into one location (e.g., an event page, etc.), fetching and downloading relevant trip information (e.g., maps, public transportation information, etc.), posting a status update on a social networking site, and fetching emergency information (e.g., emergency numbers, headquarter contact info, etc.) for each of the reservations. As such, an instruction may be received at the request of another entity and/or as the result of contextual input.

In a separate embodiment, a user may be located at a restaurant for a lunch appointment, text the lunch appointment participant that the user has arrived, post a status update on a social networking site, and browse the internet searching for reviews of the lunch location and recommended food to eat. Based on the context of such information, the user may be presented with a notification (e.g., on the device, via messaging platform, etc.) of a relevant instruction (e.g., "Lunch Location Instruction," etc.), which may include triggers such as time (e.g., near lunchtime, etc.), location (e.g., near a restaurant, etc.), a calendar time (e.g., lunch appointment, etc.), as well as actions including texting the one or more participants that you have arrived, providing a real-time update of where other participants are located (e.g., based on permissions as set by the user and the one or more participants, etc.), and fetching and displaying relevant reviews of the location's menu and/or offerings. As such, an instruction may be received at the request of another entity and/or as the result of contextual input.

Additionally, in a further embodiment, the received notification of a relevant instruction may be relevant to one or more inputted triggers (e.g., opening an application, browsing for a keyword, calling a contact, etc.) and/or may be the result of a contextual understanding (e.g., location, time, contacts near, past browsing history, etc.). As such, a notification relating to one or more instructions may be given based on trigger inputs and/or contextual information and/or a request from an entity. Further, in another embodiment, more than one instruction may be given in a notification, including a list of possible relevant instructions (e.g., enable the user to choose from among highly relevant instructions, etc.).

As shown, one or more instructions may be accepted. See operation 804. In various embodiments, the instruction match may be accepted by selecting a button (e.g., physical button, screen button, etc.), giving a voice command (e.g., "accept," etc.), exceeding a time threshold (e.g., 10 seconds, etc.), applying an automatic function (e.g., automatic acceptance based on whether notification source is trusted, automatic acceptance based on ratings of the match by one or more friends, etc.), giving a gesture (e.g., swipe motion, etc.) and/or movement (e.g., shake device, etc.), and/or giving any other input to indicate acceptance of the presented instruction.

In some embodiments, the user may opt to forgo an acceptance step if the instruction passes a trustworthy threshold, including verifying the source of the instruction, the level of popularity of the instruction, the degree of friendship to the source (e.g., distant friend, close friend, etc.), and/or through applying any other test to the instruction associated with a notification.

As shown, one or more instructions may be modified. See operation 806. In various embodiments, modifying the one or more instructions may include adding and/or deleting a specific trigger and/or action (e.g., as included in the downloaded instruction, etc.), adding and/or deleting a custom trigger and/or action (e.g., an item created by user, etc.), adding metadata to the instruction (e.g., name, creator, date modified, title, etc.), associating the instruction with one or more settings (e.g., time of applicability, permission level required in order to run, data network restriction, polling period, battery status requirement, etc.), and/or taking any further action to modify one or more instructions.

In one embodiment, a time threshold may be applied to modifying the one or more instructions. For example, in one embodiment, if the user does not modify the downloaded instruction within a set time period (e.g., 30 min, etc.), the instruction may be automatically saved and/or implemented (e.g., ready for execution, etc.). In another embodiment, the user may configure device settings such that when an instruction is downloaded, it is automatically saved and implemented (e.g., ready for execution, etc.). Of course, the user may modify the manner in which any automatic settings are applied to an instruction. For example, in some embodiments, the automatic settings may relate to applying a set of predetermined settings (e.g., including permissions, etc.) and/or metadata, interacting with the downloaded instruction to determine if it is safe to use (e.g., virus free, malicious software free, etc.), and/or applying any item (or items) which may be automated.

In another embodiment, modification to an instruction may be made at any time (e.g., after download, after install, after save, after executing, etc.). As an example, in one embodiment, the user may select an instruction and apply (e.g., after it has already been saved and executed, etc.) settings including making modifications to the saved instruction (e.g., actions, triggers, metadata, device settings, etc.). As such, settings and/or modifications relating to an instruction may be made at any period after downloading the instruction.

As shown, an instruction may be saved. See operation 808. In one embodiment, the instruction may be permanently saved, including saving it to a local cache (e.g., associated with the user's mobile device, associated with an app, etc.), to an online database (e.g., online instruction database, online data backup, online instruction service, online server, etc.), to another device (e.g., associated with a trusted contact of the user, etc.), and/or to any other storage medium. In other embodiments, the saving of the instruction may be associated with an app (e.g., product specific app, instruction app, etc.), a native utility on the device (e.g., native app, native OS Platform, etc.), and/or any other feature on a mobile device. In another embodiment, the instruction may be saved to a shortcut (e.g., graphic and/or icon, text hyperlink, touch button, device button, etc.), to a gesture, and/or to any other element associated with the mobile device which may execute the instruction.

In one embodiment, the user may opt to classify all triggers as actions and save such actions to a shortcut (e.g., button, gesture, voice command, etc.). In another embodiment, the user may opt to retain one or more triggers (e.g., input from the user, etc.) which may then cause one or more actions to be executed.

As shown, an instruction may be shared. See operation 810. In various embodiments, the instruction may be shared by uploading the instruction to an online database (e.g., instruction store, instruction repository, instruction sharing site, etc.), sending the instruction to a recipient (e.g., contact, entity, via email, via chat, etc.), posting the instruction to a sharing platform (e.g., social networking platform, etc.), sending a link (or any representation of the instruction) to a recipient, beaming the instruction (e.g., via NFC, via Bluetooth, via close proximity data transfer, etc.) to another entity, and/or taking any other action to share the instruction.

As an example, in one embodiment, the user may wish to receive to share an instruction with a friend who is in close proximity to the user. The user may bring the user's mobile device within a close proximity (e.g., within 2 inches, etc.) of another device to transfer the instruction from one device to another (e.g., via NFC, via WiFi direct, etc.). In another embodiment, a user may be engaging in a conversation with a friend via a chat application. Using such an application, the user may share an instruction by sending a package (e.g., of the instruction with metadata and settings, etc.) to the friend. Of course, the instruction may be transferred in any manner.

Further, the instruction may be executed. See operation 812. In one embodiment, after creating and/or saving the instruction, the mobile device may prompt the user whether it is desired to execute and/or run the instruction immediately. In other embodiments, the instruction may be executed in response to a shortcut (e.g., a button, a gesture, a voice command, etc.), and/or in response to the saved one or more triggers.

As an example, in one embodiment, a user may give a voice command (e.g., "run photo instruction #1," etc.), tap and/or press a button (e.g., on a screen associated with the mobile device, physical button on mobile device, etc.), give a preconfigured motion and/or gesture (e.g., a swipe, etc.), and/or select any other item which has been preconfigured to execute one or more instructions. In such an embodiment, the preconfigured item, or combination of items (e.g., voice command, button, motion, set of commands, etc.) may be saved as the sole trigger associated with the instruction. In a separate embodiment, an instruction (e.g., associated with a shortcut, etc.) may be set to be executed on a set basis (e.g., run every other Friday, every night, etc.). Of course, in other embodiments, an instruction may be set to any other automatic configuration and/or setting.

Additionally, in another embodiment, a user may give one or more triggers to execute the instruction. For example, the user may create a calendar event, including inputting an event time, time, and location. The user may then choose to share the event with a group of contacts (e.g., work clients, etc.). Based off of such inputs, an already saved instruction may be displayed on the screen (e.g., "Would you like to run Share Work Event Instruction," etc.). If the user chooses to accept the prompt, an instruction may be run including fetching a map based off of the location, creating an e-invite, sending the e-invite to preselected recipients, monitoring responses from the recipients (e.g., accept, do not accept, etc.), and compiling a feedback response (e.g., to be presented to the user in the form of an email, etc.). Of course, the foregoing example is only one example of a set of triggers executing an instruction and subsequent actions associated with the instruction. Any combination of one or more triggers and/or one or more actions may be saved to an instruction.

Figure 9:
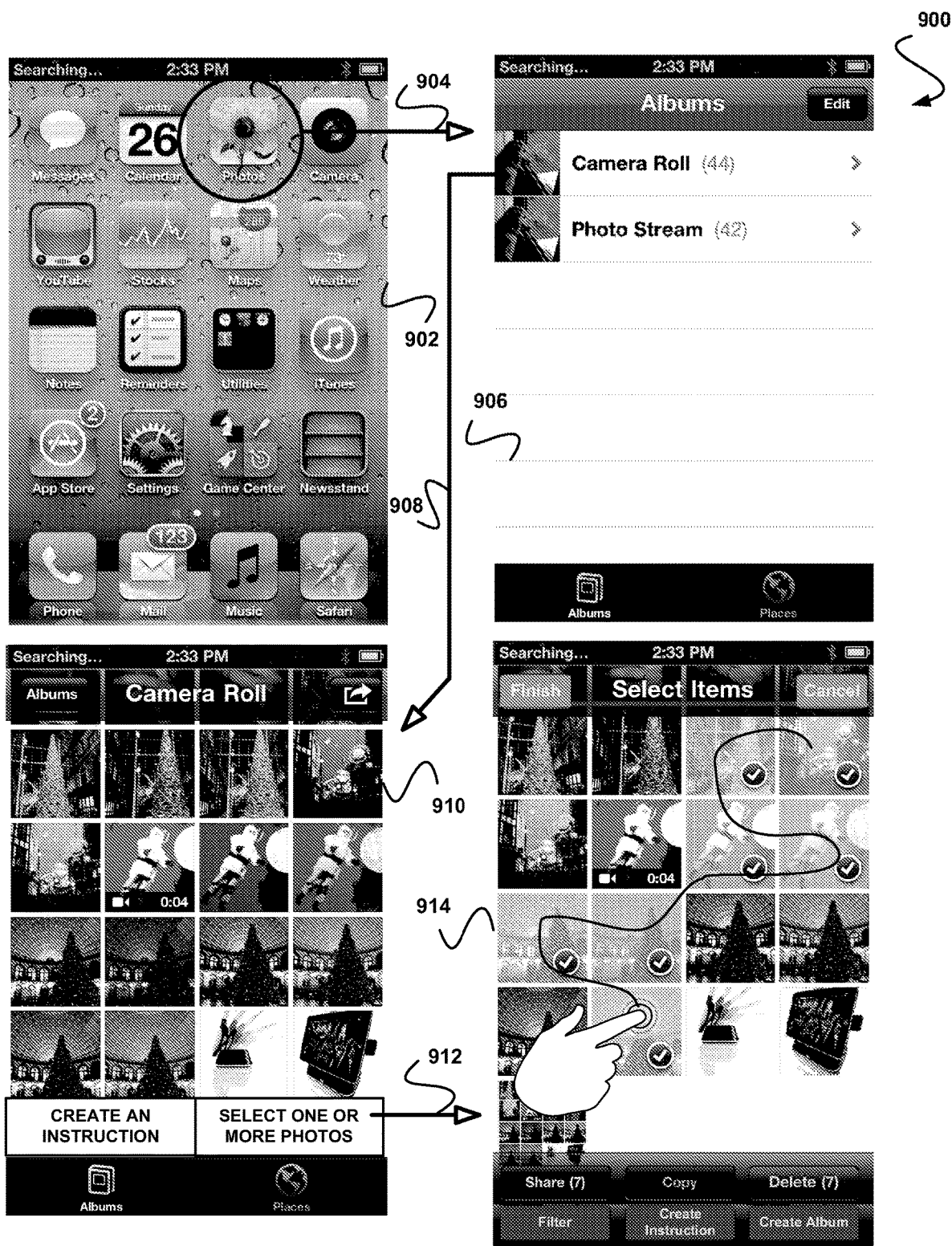
FIG. 9 shows a mobile device interface for receiving one or more triggers, in accordance with another embodiment.

FIG. 9 shows a mobile device interface 900 for receiving one or more triggers, in accordance with another embodiment. As an option, the mobile device interface 900 may be implemented in the context of the architecture and environment of the previous Figures and/or any subsequent Figure(s). Of course, however, the mobile device interface 900 may be implemented in the context of any desired environment. It should also be noted that the aforementioned definitions may apply during the present description.

As shown, a mobile device interface display 902 may be displayed. In various embodiments, a mobile device interface display may include a homescreen, a locked screen, a screen saver, a pull down display, a secondary display (e.g., external, secondary device, etc.), and/or any other type of display which may be associated with the mobile device. Additionally, an application may be selected 904. In one embodiment, the application may include a photo management app, a camera, a calendar, a map, a weather app, a notes app, a reminders app, a settings app, a phone app, a mail app, a music app, a browser app, and/or any app which may be capable of being selected.

In one embodiment, if a photos app is selected, a display of one or more albums 906 may be presented to the user. In one embodiment, the displayed albums may include albums synced with an online server (e.g., picasa albums, facebook albums, flickr albums, etc.), stock albums (e.g., provided by the operating system, an application, an online server, etc.), context-sensitive albums (e.g., automatic organization of photos based off of metadata such as year, location, etc.), and/or any type of album organization. Of course, in other embodiments, the user may define one or more albums and may manually add photos to the created one or more albums, and/or create a rule to add photos to the created one or more albums.

In various embodiments, the albums may be arranged according to one or more selected criteria (e.g., rules, alphabetical, location, date, etc.). In some embodiments, the display of one or more albums may include one or more tabs (e.g., alphabetical, location, date, people, etc.), a drop down menu, a hierarchal menu display, and/or any other item whereby the albums may be filtered and/or arranged.

As shown, an album may be selected 908, and a display 910 showing the photos associated with the album may be displayed. In various embodiments, an album may be selected by touching an icon (e.g., an album icon, etc.) on a screen and/or display, giving a voice command (e.g., "open camera roll," etc.), moving the mobile device in some manner (e.g., two forward movements selects the icon, a movement right or left selects a different icon, etc.), receiving an input from another device (e.g., secondary mobile device, keyboard, mouse, etc.), and/or receiving any other type of input wherein an album may be selected.

In one embodiment, the display showing the photos associated with the album may include one or more options. In various embodiments, the one or more options may include an ability to create an instruction, to select one or more photos, to categorize and/or arrange the photos in some manner, to share one or more photos and/or albums, and/or to interact with the photos and/or album in some manner.

As shown, the option to select one or more photos may be selected 912, and a display 914 showing the one or more selected photos may be displayed. In various embodiments, one or more photos may be selected, including individually selecting (e.g., by touching, giving voice command, using secondary device, etc.) each photo, selecting photos based on the trace path of the input (e.g., finger, stylus, etc.), selecting a metadata criteria (e.g., data, location, people included, etc.), selecting a recommendation from a contact (e.g., photos selected by a contact associated with a shared online album, etc.), selecting a recommendation from the mobile device (e.g., based on relevancy and/or context, from the app, from the operating system, etc.), selecting a popularity vote (e.g., associated with an online and/or shared album, etc.), and/or selecting any other item which may be associated with selecting one or more photos. In one embodiment, the trace path may be continuous (e.g., continuous input motion, one input path, etc.), or non-continuous (e.g., multiple input paths, broken input path, etc.).

Additionally, the trace path may be located on one page (e.g., one display screen) and/or on more than one page (e.g., multiple screens, tabbed screens, scrollable screen, etc.). In one embodiment, various methods may be utilized to select and/or navigate the one or more displays associated with the mobile device, including using a predetermined input to scroll (e.g., two fingers sliding up, etc.), a predetermined input to select (e.g., one finger slide and/or selection, etc.), a predetermined input to switch to an additional tab and/or additional album (e.g., two finger slide to the side, etc.), and/or using any other predetermined input to navigate the one or more displays associated with the mobile device and/or select the one or more photos.

In one or more embodiments, options may be shown which are associated with the selected one or more photos, including an ability to share (e.g., email, upload to online server and/or service, upload to blog, upload to social networking site, etc.), copy, delete, filter (e.g., use selected photos to select other like photos, etc.), edit (e.g., batch edit of photos, etc.), create one or more albums (e.g., of the selected photo(s), etc.), combine (e.g., create montage, etc.), create one or more photo books (e.g., through online server and/or service, through another app associated with the mobile device, etc.), to interact with any other app (e.g., associated with the mobile device, etc.) and/or take any other action which may relate to the one or more selected photos. Of course, after selecting one or more photos, the selected one or more photos may be deselected using a predetermined input (e.g., select the same photo twice, etc.).

Figure 10:
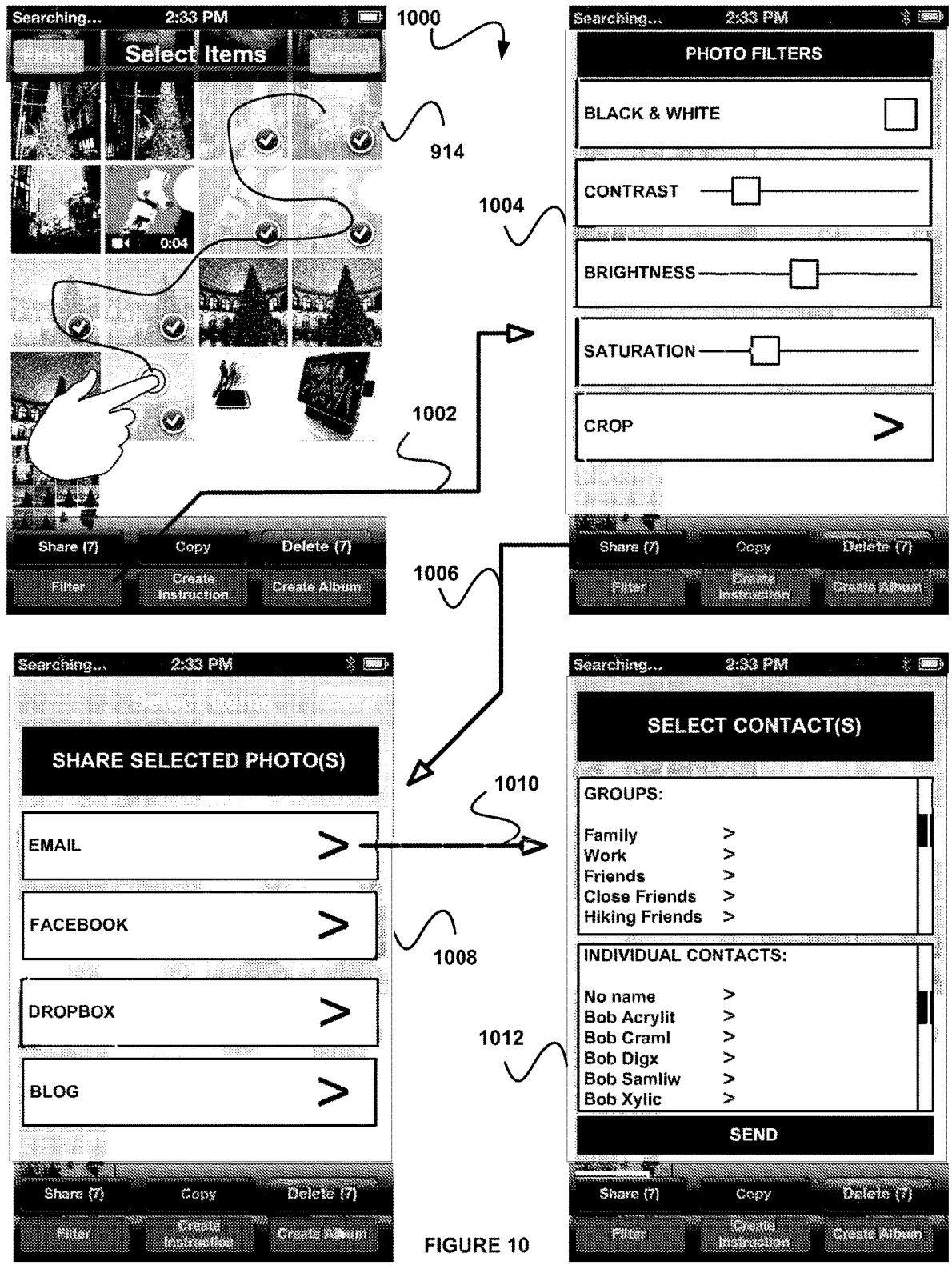
FIG. 10 shows a mobile device interface for receiving one or more triggers, in accordance with another embodiment.

FIG. 10 shows a mobile device interface 1000 for receiving one or more triggers, in accordance with another embodiment. As an option, the mobile device interface 1000 may be implemented in the context of the architecture and environment of the previous Figures and/or any subsequent Figure(s). Of course, however, the mobile device interface 1000 may be implemented in the context of any desired environment. It should also be noted that the aforementioned definitions may apply during the present description.

As shown, interface 914 is displayed. A filter option may be selected 1002 and a photo filter display 1004 may be shown. In various embodiments, a filter option may be selected by an input (e.g., finger, stylus, secondary device, mouse, keyboard, etc.), by a voice command (e.g., "select filter," etc.), and/or in any other manner. In other embodiments, a photo filter display may include filters such as ability to control the contrast, brightness, saturation, color, and/or white balance, ability to crop, to change the photo to black & white, to rotate, to apply a scene mode (e.g., landscape, night, portrait, sunset, backlit, etc.), to apply a border, to insert a caption and/or other modifications (e.g., custom photo edits, etc.), and/or to take any other action to filter the selected one or more photos in some manner.

In various embodiments, a share option associated with the selected one or more photos may be selected 1006. In some embodiments, the share option may be selected before or after the photo filters are applied, and/or may be selected at any time after the one or more photos have been selected. An interface 1008 associated with the share option may be displayed and may include ability to share the selected one or more photos by email, to Facebook (e.g., upload and/or post, etc.), to Dropbox (e.g., backup photos, etc.), to a blog (e.g., public or private, etc.), to an online storage site, to an online social media site, to another detected device (e.g., sent via WiFi, sent via NFC, sent via Bluetooth, etc.), and/or to any other destination selected by the user of the mobile device.

In another embodiment, the option to email the selected one or more photos may be selected 1010 and an interface 1012 associated with the option to email may be displayed. In various embodiments, possible destinations may include one or more contacts and/or groups. In some embodiments, the recipients may be preselected (e.g., associated with a group, commonly selected list of contacts based off of frequency of selection, etc.), associated and/or organized with one or more groups (e.g., based off of tags associated with the individuals, etc.), organized according to a recommendation by a contact, and/or organized in any other manner. In other embodiments, the recipients may be individually selected and/or managed (e.g., added to email, deleted from email, etc.).

After selecting the one or more possible destinations and/or recipients, the user may select "send" to send the photos to the selected destinations (e.g., contacts, groups, etc.). In some embodiments, the photos may be reduced in size (e.g., decreased resolution, etc.) and/or modified in another manner to optimize being sent. Of course, in another embodiment, the original photo(s) may be sent without any modification. In another embodiment, the one or more selected photos may be sent in multiple emails (e.g., batch of emails, etc.) based on a message size (e.g., maximum message size limited by application, etc.), a number of attachments (e.g., no more than 15 attachments per email, etc.), and/or any other criteria which may affect the one or more emails being sent.

In other embodiments, the email may be sent based off of one or more context sensors, including a location (e.g., send email when user is at home, etc.), a network (e.g., send only when connected to WiFi, etc.), one or more devices (e.g., send email when user is within a set geographic threshold to another contact's device, send email when user is within a set geographic threshold to a secondary device, etc.), a time (e.g., a minimum of five minutes at a location before sending the email, send email at 8 pm, etc.), and/or any other context aware criteria.

Figure 11:
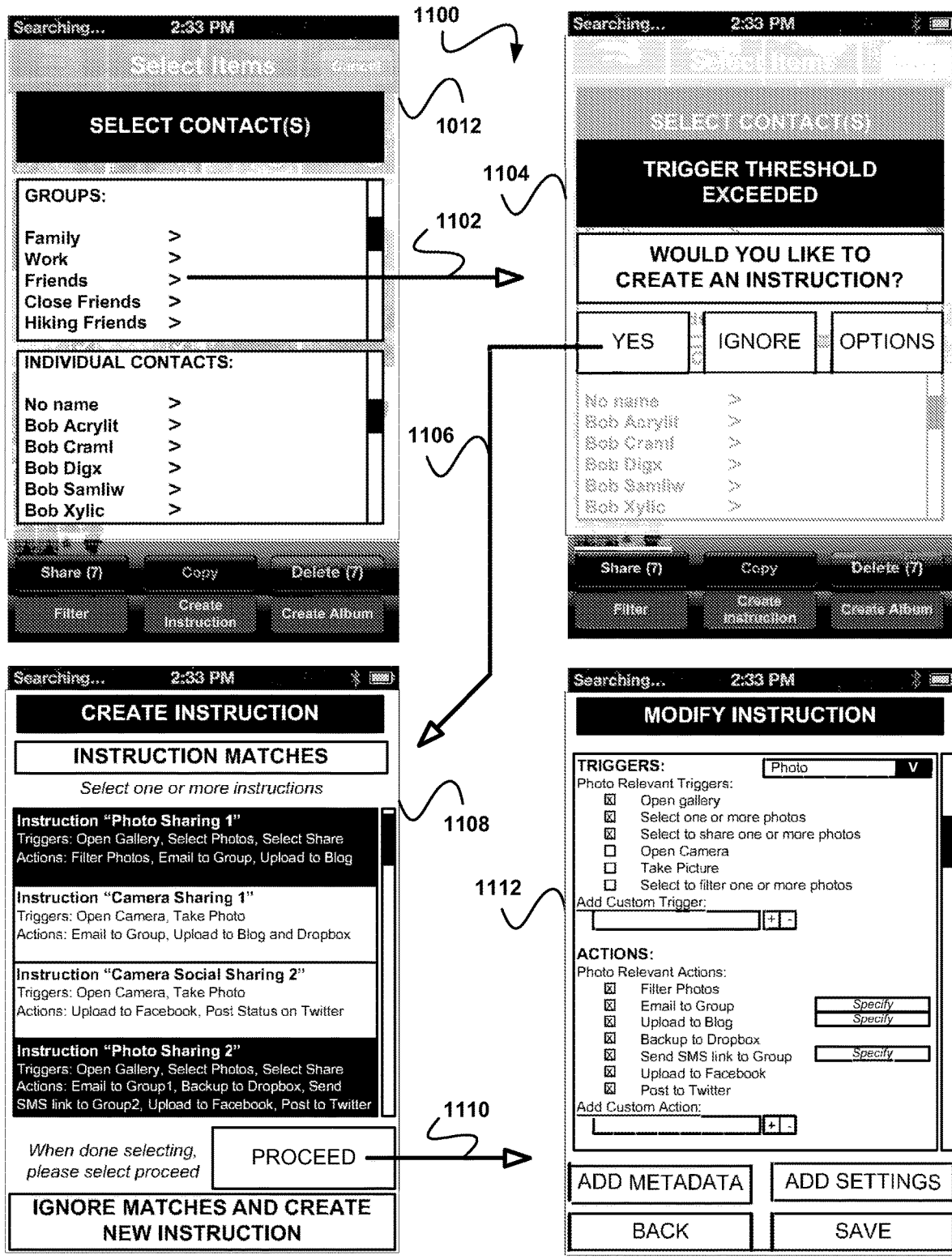
FIG. 11 shows a mobile device interface for creating one or more instructions, in accordance with another embodiment.

FIG. 11 shows a mobile device interface 1100 for creating one or more instructions, in accordance with another embodiment. As an option, the mobile device interface 1100 may be implemented in the context of the architecture and environment of the previous Figures and/or any subsequent Figure(s). Of course, however, the mobile device interface 1100 may be implemented in the context of any desired environment. It should also be noted that the aforementioned definitions may apply during the present description.

As shown, interface 1012 associated with the option to email may be displayed. A group of contacts may be selected 1102. In response to the selection 1102, a trigger threshold interface 1104 may be displayed.

In one embodiment, a trigger threshold may be displayed based on the number of consecutive actions (e.g., within a set time period, e.g., 30 seconds, between each action, etc.) by the user. For example, in one embodiment, the user may open a photo application, select an album, select one or more photos, apply one or more filters to the selected photos, select to share the selected photos via email, and select one or more recipients. In one embodiment, a minimum threshold (e.g., predetermined and/or selected by the user and/or the app, etc.) of six actions may cause a trigger threshold to be displayed. In various embodiments, exceeding a trigger threshold may cause a prompt to be displayed including a prompt to save such detected actions to an instruction, look up an instruction based on the actions, and/or take any other action in response to the set of input actions.

In one embodiment, the user may choose to ignore the trigger instruction prompt. Additionally, in another embodiment, the user may select and/or configure settings under the options prompt. In one embodiment, settings found under the options prompt may include the minimum threshold value before a prompt is displayed, actions to be displayed once a trigger threshold has been exceeded, automatic settings (e.g., after 5 continuous actions, automatically show instruction match screen, etc.), permission settings (e.g., receiving and/or sending one or more instructions, etc.), and/or any other feature which may relate in some manner to an instruction. Of course, in other embodiments, the options prompt may relate to global settings (e.g., device settings, user anonymous settings, etc.), user settings (e.g., user specific settings, etc.), and/or any other set of settings relating to a profile, identity, and/or device.

As shown, a "yes" prompt may be selected 1106, and a create instruction interface 1108 may be displayed. In various embodiments, a create instruction interface may display one or more instruction matches. For example, in one embodiment, the instruction matches may relate in some manner to the identified input actions (e.g., to one or more actions given by the user, etc.). In one embodiment, the user may set a threshold relevancy value (e.g., minimum of two same actions, etc.) that must be met in order for a match to be displayed. Based on one or more camera and/or photo relevant actions, a match may include "Instruction 'Photo Sharing 1'; Triggers: Open Gallery, Select Photos, Select Share; Actions: Filter Photos, Email to Group, Upload to Blog," "Instruction 'Camera Sharing 1'; Triggers: Open Camera, Take Photo; Actions: Email to Group, Upload to Blog and Dropbox," "Instruction 'Camera Social Sharing 2'; Triggers: Open Camera, Take Photo; Actions: Upload to Facebook, Post Status on Twitter," "Instruction 'Photo Sharing 2'; Triggers: Open Gallery, Select Photos, Select Share; Actions: Email to Group1, Backup to Dropbox, Send SMS link to Group2, Upload to Facebook, Post to Twitter," and/or any other relevant match.

In one embodiment, if a threshold of actions matches an instruction, the instruction may be automatically selected. For example, in one embodiment, the input actions may include opening a gallery, selecting photos, and selecting to share the photos via email and Facebook. A threshold may be configured so that if an instruction includes all of the input actions, it may be automatically selected as the relevant instruction match. In another embodiment, if more than one instruction results after the threshold is exceeded, all such results may be presented to the user for selection.

Additionally, in one embodiment, more than one instruction match may be selected. For example, the user may be interested in possible actions and/or triggers from more than one instruction match (e.g., sharing features of a match, productivity features of another match, etc.). As such, selecting more than one instruction match may enable the user to add, remove, and/or modify the combined instruction in any manner.

In another embodiment, the user may disregard the instruction matches and select to create a new instruction. Additionally, in one embodiment, a create instruction interface may display by default a new instruction interface rather than one or more instruction matches. Of course, the default view of the create instruction interface may be set and/or configured by the user (e.g., via options, via app settings, via Native Utility Platform, etc.).

After selecting the one or more instruction matches, the "proceed" prompt may be selected 1110, and a modify instruction interface 1112 may be displayed. In various embodiments, the modify instruction interface page may include possible triggers and actions, the ability to add, remove, and/or customize the triggers and/or actions, the ability to specify details (e.g., specify contacts in a group, specify blog details, specify application, etc.) relating to the triggers and/or actions, identify the relevancy (e.g., photo, calendar, contact management, productivity, video, social media, sharing, etc.) of the triggers and/or actions, and/or any other feature which may modify the instruction in some manner.

In one embodiment, actions and/or triggers relating to the selected one or more instructions may be displayed and/or modified. For example, in one embodiment, the relevancy may be automatically set (e.g., based off of the relevancy tag of the one or more instruction matches, etc.), and/or may be set by the user (e.g., via drop down menu, etc.). In another embodiment, upon selection of the relevancy, the triggers and/or actions may change to display a set of relevant triggers and/or actions. After the relevant triggers and/or actions are displayed, items relevant to the selected one or more instruction matches may be pre-selected. Additionally, if an item included with the one or more instruction matches is not included with the relevant triggers and/or actions, it may be added to the list of triggers and/or actions. In a further embodiment, a custom trigger and/or action may be added and/or deleted, including inserting a trigger and/or action not associated with the relevant triggers/actions (e.g., an item associated with productivity, etc.), creating a new trigger and/or action not associated with any previously created trigger and/or action, and/or adding any item not already listed with the relevant triggers and/or actions.

In some embodiments, a photo relevancy may display photo relevant triggers, including the ability to open a gallery, select one or more photos, select to share one or more photos, open camera, take picture, select to filter one or more photos, and/or select any other function which may relate to photos. Additionally, in another embodiment, a photo relevancy may display photo relevant actions, including the ability to filter photos, email to a group, upload to a blog, backup to Dropbox, send SMS link to a group, upload to Facebook, post to Twitter, and/or select any other action which may relate to photos.

In various embodiments, the modify instruction interface may display one or more options, including the option to add metadata, to add settings, to go back (e.g., to the prior screen and/or interface, etc.), and/or to save. Of course, any option which may relate to the modify instruction interface and/or to navigating the create instruction interface may be displayed. In one embodiment, saving the instruction may include storing the instruction in a local cache on the mobile device, on an online server and/or database, on a local database, and/or on any other device and/or storage hardware. In one embodiment, at the time of saving the instruction, a backup copy of the instruction may be saved in another location. Additionally, in another embodiment, saving the instruction may include sending and/or posting the instruction to an instruction database site to be shared with other users.

Figure 12:
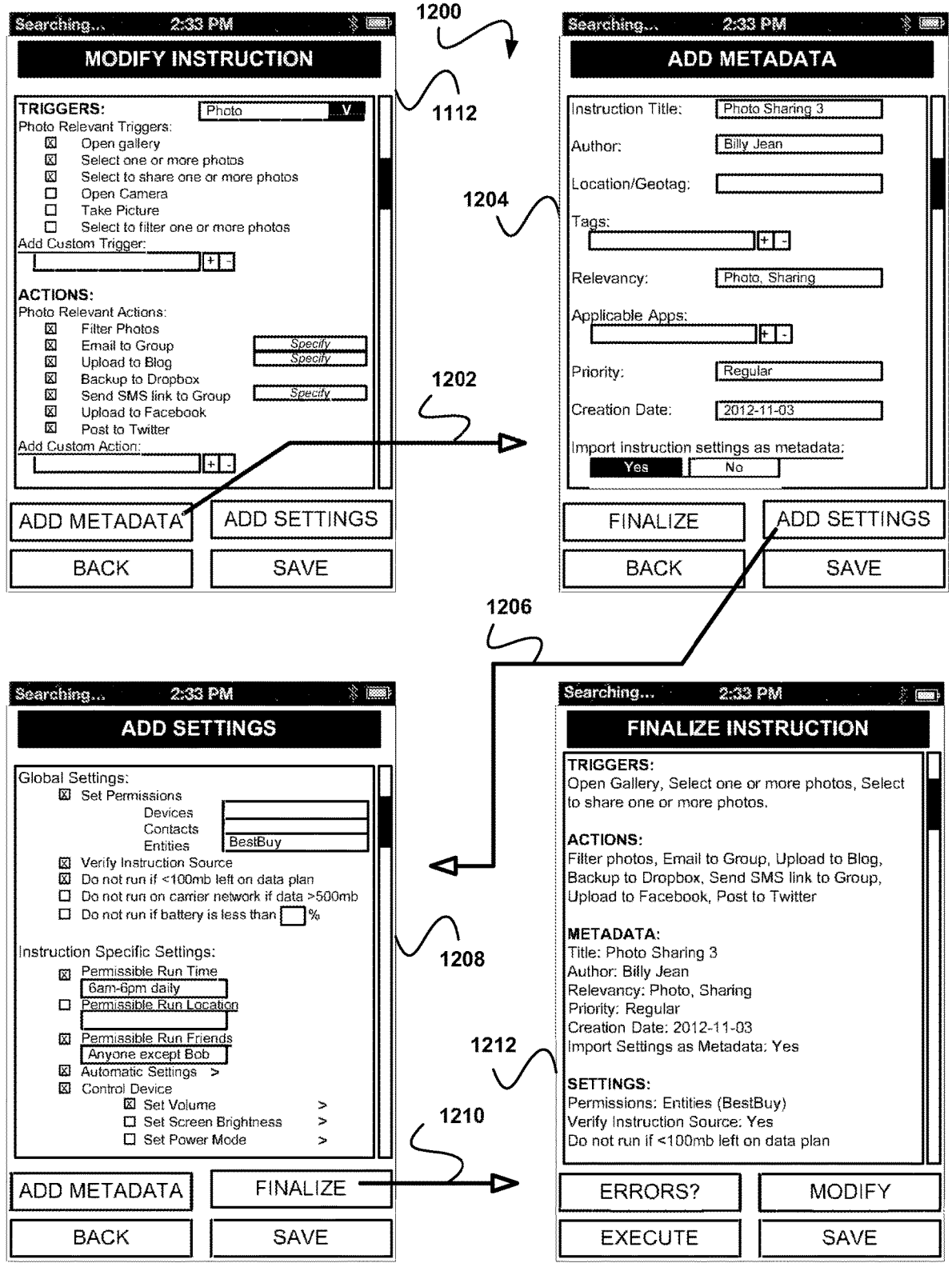
FIG. 12 shows a mobile device interface for creating one or more instructions, in accordance with another embodiment.

FIG. 12 shows a mobile device interface 1200 for creating one or more instructions, in accordance with another embodiment. As an option, the mobile device interface 1200 may be implemented in the context of the architecture and environment of the previous Figures and/or any subsequent Figure(s). Of course, however, the mobile device interface 1200 may be implemented in the context of any desired environment. It should also be noted that the aforementioned definitions may apply during the present description.

As shown, modify instruction interface 1112 may be displayed and the add metadata prompt may be selected 1202. The add metadata interface 1203 may be also displayed.

In one embodiment, the add metadata interface may include the ability to insert an instruction title, an author, a location/geotag, a tag (e.g., data content, application content, etc.), a relevancy (e.g., photo, sharing, etc.), applicable apps (e.g., apps which may relate and/or may be included in the instruction, etc.), priority (e.g., high, regular, low, priority with respect to other instructions being executed, etc.), creation date, the ability to import instruction settings as metadata (e.g., settings are also imported as metadata values associated with the instruction, etc.), and/or any other value which may relate to metadata.

In various embodiments, the metadata may be stored internally (e.g., in the same file as the instruction, etc.) and/or externally (e.g., in a separate file other than the instruction, etc.). Additionally, the metadata may be formatted in a human readable format (e.g., XML, etc.) and/or in a non-human readable format (e.g., binary, etc.).

As shown, an add settings option may be selected 1206, and an add settings interface 1208 may be displayed. In various embodiments, the add settings interface may include global settings, such as permissions (e.g., associated with device, contacts, entities, locations, etc.), ability to verify the instruction source (e.g., in the instance where an instruction is sent from another contact and/or device to the user's mobile device, etc.), restrictions where the instruction will not run if there is less than 100 mb left on the data plan, will not run on the carrier network if the data exceeds 500 mb, will not run if the battery is less than a set amount, and/or any other feature which may relate globally to the instruction and/or the application managing instructions. Of course, in another embodiment, any global setting may be modified on an individual instruction by instruction basis.

In various embodiments, the add settings interface may include instruction specific settings, including permissible run time (e.g., morning, night, 6 am-6 pm daily, Monday-Friday, etc.), permissible run locations (e.g., based off of device location, etc.), permissible run friends (e.g., instruction may be run when a device and/or contact is near, instruction may be prevented to be run when a device and/or contact is near, etc.), automatic settings (e.g., configure user's mobile device based on triggers, actions, and/or settings, etc.), settings associated with controlling the user's mobile device (e.g., set volume, set screen brightness, set power mode, etc.), and/or any other settings which may relate in some manner to the instruction. In another embodiment, a user may download and/or select a set of predefined settings (e.g., included in the instruction file, etc.), and/or may input all settings relating to the instruction.

As shown, a finalize option may be selected 1210 and a finalize instruction interface may be displayed 1212. In one embodiment, the finalize instruction interface may display all triggers, actions, metadata, settings, and/or any further information which may relate in some manner to the created instruction. In one embodiment, the user may select an errors option to verify if there are any errors associated with the instruction (e.g., inconsistent rules, inadequate permissions, etc.) and/or any errors associated with executing the instruction (e.g., with respect to other instructions, with respect to system resources, with respect to other applications, etc.).

In another embodiment, a modify option may be selected to modify the selected triggers, actions, metadata, and/or settings. In one embodiment, an execute option may be selected to immediately execute (e.g., run, etc.) the created instruction. Further, in another embodiment, the instruction may be saved, including storing the instruction in a local cache on the mobile device, on an online server and/or database, on a local database, and/or on any other device and/or storage hardware. In one embodiment, at the time of saving the instruction, a backup copy of the instruction may be saved in another location. Additionally, in another embodiment, saving the instruction may include sending and/or posting the instruction to an instruction database site to be shared with other users.

Figure 13:
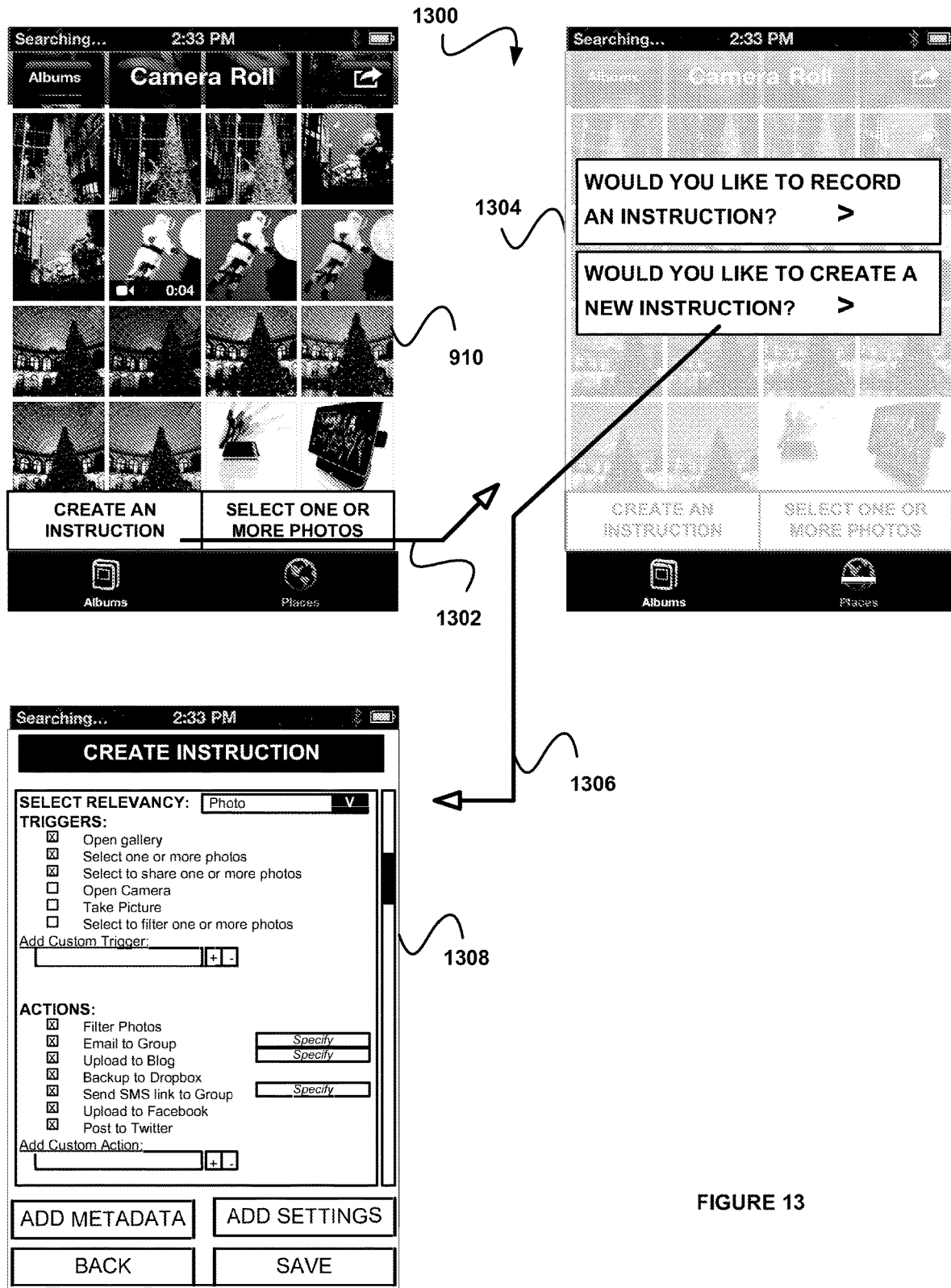
FIG. 13 shows a mobile device interface for creating one or more instructions, in accordance with another embodiment.

FIG. 13 shows a mobile device interface 1300 for creating one or more instructions, in accordance with another embodiment. As an option, the mobile device interface 1300 may be implemented in the context of the architecture and environment of the previous Figures and/or any subsequent Figure(s). Of course, however, the mobile device interface 1300 may be implemented in the context of any desired environment. It should also be noted that the aforementioned definitions may apply during the present description.

As shown, a display 910 showing the photos associated with the album may be displayed. A "create an instruction" option may be selected 1302, and a "create an instruction" prompt interface 1304 may be displayed.

In various embodiments, a create an instruction interface may be displayed automatically (e.g., threshold exceeded of input actions, another device may cause an instruction to be recorded, etc.), and/or may be displayed manually (e.g., in response to selecting a button, etc.). In some embodiments, a create an instruction interface may prompt the user with "would you like to record an instruction?," "would you like to create a new instruction?," and/or any other prompt associated with a new instruction.

In one embodiment, the ability to record an instruction may include giving further input actions, including opening application, navigating within the application (e.g., accessing submenus and/or subpages, etc.), taking an action within the application (e.g., open item, modify item, initiate program, etc.), modifying device setting (e.g., brightness, volume, permissions, network, etc.), interacting with one or more applications (e.g., backup data to Dropbox, share via Facebook, find restaurants via Yelp, etc.), and/or taking any other action which may be inputted and recorded by the mobile device. In a separate embodiment, an instruction may be recorded including input actions on a secondary device (e.g., second mobile device, input device, device associated with a trusted contact, etc.), sensors not physically associated with the mobile device (e.g., sensors on a secondary device, sensors in a car, sensors at an airport, etc.), and/or through any other input system.

In another embodiment, selecting the prompt to create a new instruction 1306 may cause a create instruction interface 1308 to be displayed. In various embodiments, the create instruction interface page may include possible triggers and actions, the ability to add, remove, and/or customize the triggers and/or actions, the ability to specify details (e.g., specify contacts in a group, specify blog details, specify application, etc.) relating to the triggers and/or actions, identify the relevancy (e.g., photo, calendar, contact management, productivity, video, social media, sharing, etc.) of the triggers and/or actions, and/or any other feature which may modify the instruction in some manner.

In one embodiment, any action and/or trigger relating to a relevancy criterion may be displayed and/or modified. For example, in one embodiment, the relevancy may be automatically set (e.g., based off of the relevancy tag of the application source, etc.), and/or may be set by the user (e.g., via drop down menu, etc.). In another embodiment, upon selection of the relevancy, the triggers and/or actions may change to display a set of relevant triggers and/or actions. In a further embodiment, a custom trigger and/or action may be added and/or deleted, including inserting a trigger and/or action not associated with the relevant triggers/actions (e.g., an item associated with productivity, etc.), creating a new trigger and/or action not associated with any previously created trigger and/or action, and/or adding any item not already listed with the relevant triggers and/or actions.

In some embodiments, a photo relevancy may display photo relevant triggers, including the ability to open a gallery, select one or more photos, select to share one or more photos, open camera, take picture, select to filter one or more photos, and/or select any other function which may relate to photos. Additionally, in another embodiment, a photo relevancy may display photo relevant actions, including the ability to filter photos, email to a group, upload to a blog, backup to Dropbox, send SMS link to a group, upload to Facebook, post to Twitter, and/or select any other action which may relate to photos.

In various embodiments, the create instruction interface may display one or more options, including the option to add metadata, to add settings, to go back (e.g., to the prior screen and/or interface, etc.), and/or to save. Of course, any option which may relate to the modify instruction interface and/or to navigating the create instruction interface may be displayed. In one embodiment, saving the instruction may include storing the instruction in a local cache on the mobile device, on an online server and/or database, on a local database, and/or on any other device and/or storage hardware. In one embodiment, at the time of saving the instruction, a backup copy of the instruction may be saved in another location. Additionally, in another embodiment, saving the instruction may include sending and/or posting the instruction to an instruction database site to be shared with other users.

Figure 14:
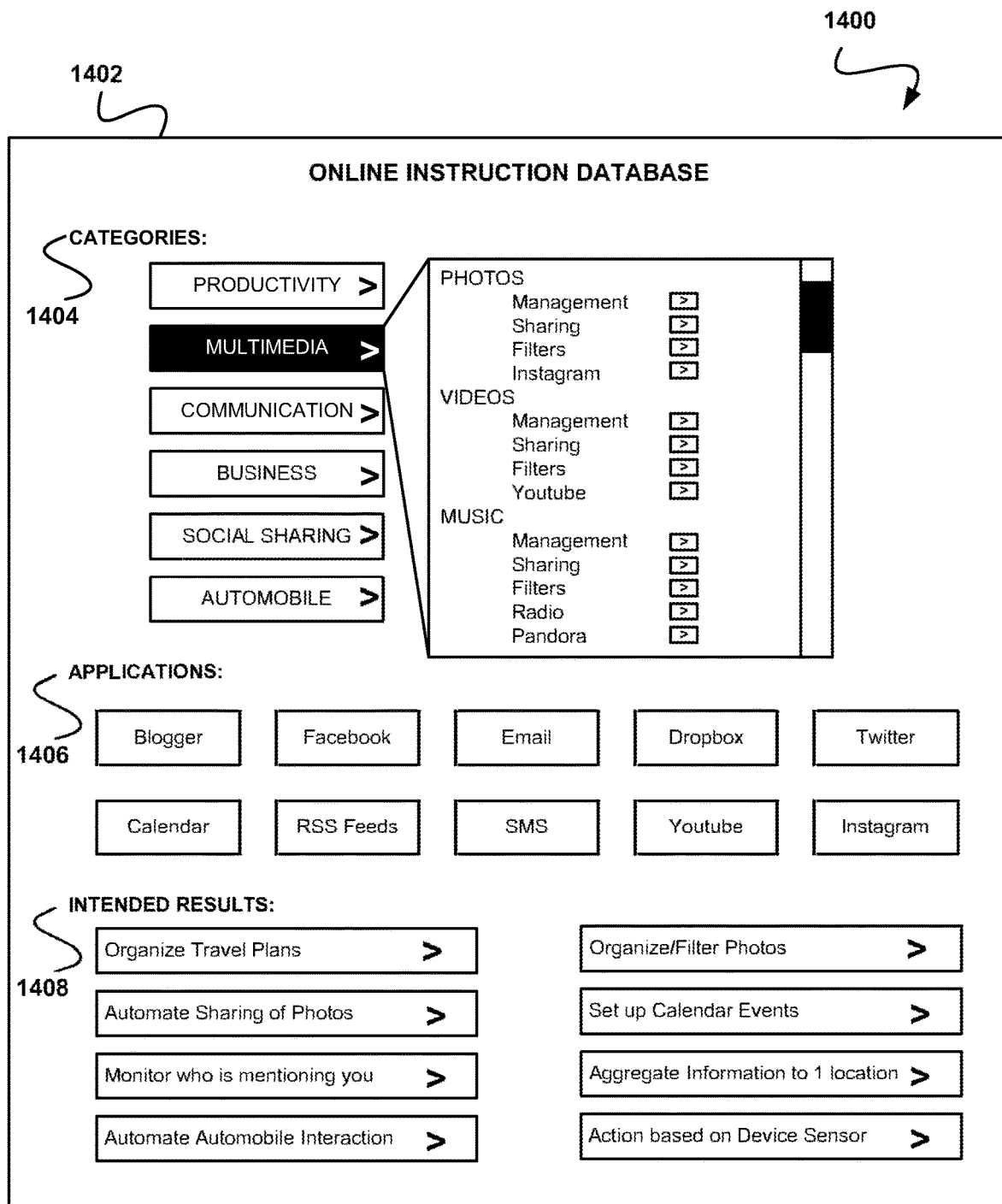
FIG. 14 shows an online interface for selecting one or more instructions, in accordance with another embodiment.

FIG. 14 shows an online interface 1400 for creating one or more instructions, in accordance with another embodiment. As an option, the online interface 1400 may be implemented in the context of the architecture and environment of the previous Figures and/or any subsequent Figure(s). Of course, however, the online interface 1400 may be implemented in the context of any desired environment. It should also be noted that the aforementioned definitions may apply during the present description.

As shown, an online instruction database interface 1402 may be displayed. In one embodiment, the online instruction database may be associated with a website (e.g., accessed via an html address, site external to the user's current network, etc.), with an internal server (e.g., site located within the user's current network, etc.), with one or more secondary devices (e.g., instruction database may be located on another device, etc.), and/or with any other database system. In various embodiments, the online instruction database may be managed by an app (e.g., as downloaded on the user's mobile device, etc.), by a separate entity (e.g., not affiliated with the app, etc.), by a collaboration of more than one user (e.g., a wiki of instructions, etc.), and/or by any other entity which may manage at least in part the online instruction database.

In one embodiment, the online instruction database may be organized by categories 1404, applications 1406, and/or intended results 1408. For example, in another embodiment, categories may include general instruction designation, such as productivity, multimedia, communication, business, social sharing, automobile, and/or any other category which may relate globally to one or many instructions. In one embodiment, each category may be comprised of one or more subcategories. As an example, in one embodiment, the multimedia category may be comprised of several subcategories such as photos, videos, music, and/or any other subcategory which may relate to multimedia. Each subcategory may be further refined. For example, photos may be further refined by relating to management, sharing, filters, and/or Instagram. Videos may relate to management, sharing, filters, and/or YouTube. Music may relate to management, sharing, filters, radio, and/or Pandora. Of course, each subcategory may be comprised of any number and type of refining categories. Additionally, in another embodiment, each refining category (e.g., management, sharing, filters, etc.) and subsequent category may be potentially further refined.

In various embodiments, the categories may be displayed as a set of tabs, as a hierarchal menu (e.g., menu which may be expanded and/or collapsed, etc.), as a set of links, and/or in any other manner whereby the categories and subcategories may be accessed. In some embodiments, a user utilizing the online instruction database may add additional categories and/or may modify existing categories and/or breakdowns. In another embodiment, permission may be granted to a user to modify and/or add categories.

In one embodiment, the online instruction database may be organized by applications. In various embodiments, the applications may relate to applications involved in at least one instruction, applications that are used predominately used (e.g., over half of the triggers and/or actions relate to the application, etc.) by at least one instruction, applications that have been rated as popular, and/or any other application category and/or organization designation. In some embodiments, the applications organization may be edited and/or a new application designation added. In other embodiments, permission may be granted to a user to modify and/or add application designations.

In the instance where an application has not hitherto been used in an instruction, the online instruction database may permit the user to add a new application to be recognized by the online instruction database. In various embodiments, a new application may be added by providing a link (e.g., HTML address, etc.) associated with the application, selecting the application from an online search result (e.g., Google search results, etc.), and/or providing information to validate the authenticity of the application. In one embodiment, validating the authenticity of the application may include confirming the existence of the application, inputting the correct name of the application (i.e., prevent misspellings, etc.), and/or incorporating additional application features to be used by the online instruction database (e.g., other features beyond those targeted and/or used by the user in the created instruction, etc.).

In one embodiment, the online instruction database may be organized by intended results. For example, in various embodiments, intended results may include organize travel plans, automate sharing of photos, monitor who is mentioning you, automate automobile interaction, organize/filter photos, set up calendar events, aggregate information to 1 location, action based on device sensor, and/or any category which is focused on the intended result of the instruction.

In some embodiments, the intended results categories may be populated based off of the popularity of downloaded instructions. Additionally, the online instruction database may request (e.g., through a prompt, question and response, etc.) the intended use of the instruction at the time the user seeks to download (or send) the instruction. In this manner, the online instruction database may collect information relating to each downloaded and/or sent instruction, and may use such information to populate and rank intended results categories.

Figure 15:
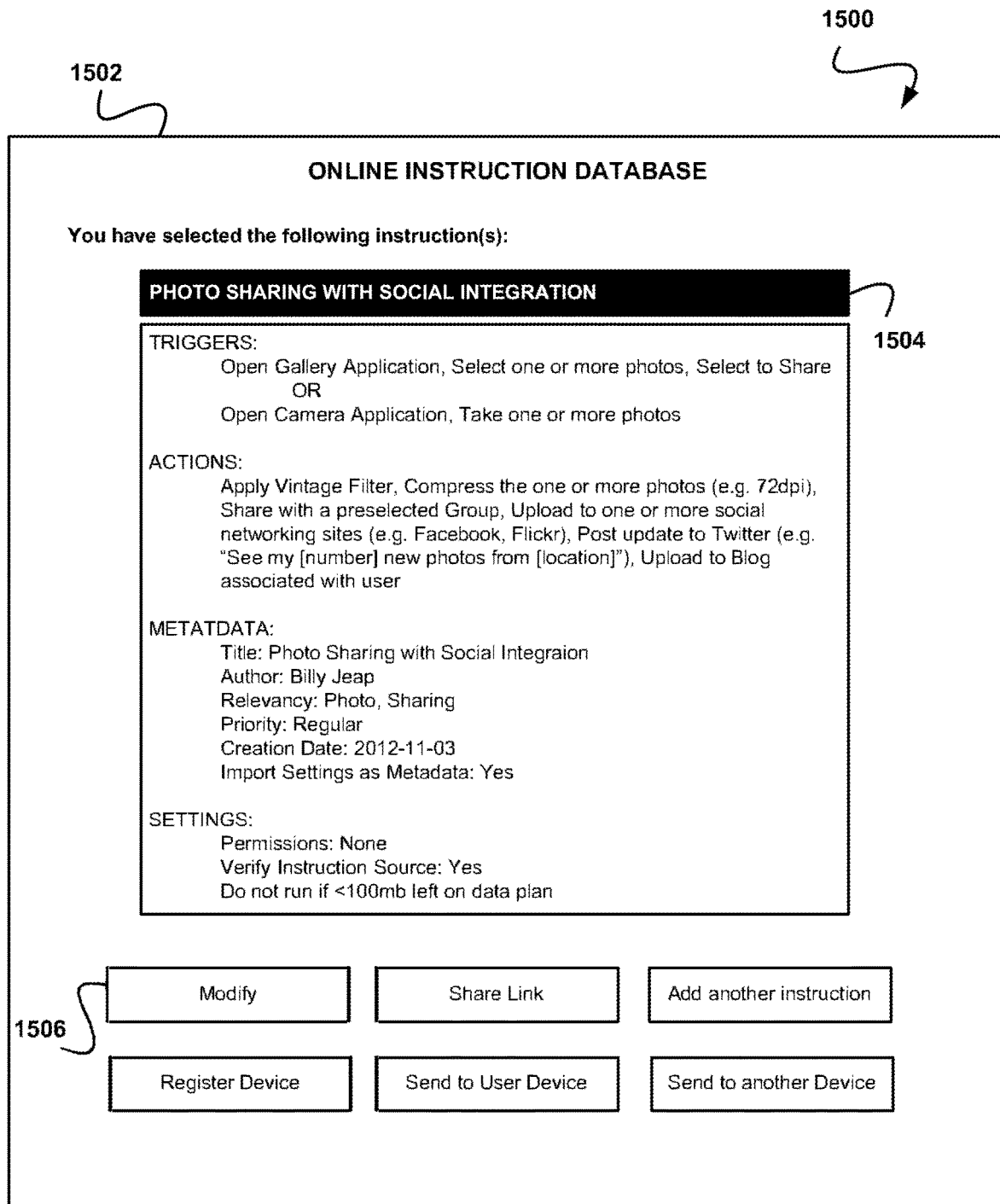
FIG. 15 shows an online interface for viewing one or more selected instructions, in accordance with another embodiment.

FIG. 15 shows an online interface 1500 for viewing one or more selected instructions, in accordance with another embodiment. As an option, the online interface 1500 may be implemented in the context of the architecture and environment of the previous Figures and/or any subsequent Figure(s). Of course, however, the online interface 1500 may be implemented in the context of any desired environment. It should also be noted that the aforementioned definitions may apply during the present description.

As shown, the online instruction database interface 1502 may display one or more selected instructions 1504. In one embodiment, when more than one instruction has been selected, the resulting selected instructions interface will display an instruction combining all previously selected instructions.

As an example, a user may have selected one or more instruction dealing with photo sharing and social integration. The title of the instruction may be displayed as "photo sharing with social integration." Of course, any title may be displayed and the title may be modified as desired by the user. In one embodiment, more than one set of triggers may have been previously selected by the user. The more than one set of triggers may be displayed as one combined set of triggers, or in another embodiment, more than one set of triggers may be associated with the instruction. For example, in one embodiment, one set of triggers may include open gallery application, select one or more photos, and select to share, and another set of triggers may include open camera application, and take one or more photos. The instruction therefore may be associated with both sets of triggers. Of course, any number of sets of triggers may be associated with the instruction.

In various embodiments, one or more actions may be associated with the selected instruction. For example, in one embodiment, the instruction may relate to photo sharing with social integration and the instruction actions may include apply vintage filter, compress the one or more photos, share with preselected group, upload to one or more social networking sites, post update to twitter, and/or upload to blog associated with user. In some embodiments, the user may specify further details relating to each action item, including, for example, specifying the level of compression associated with the photos (e.g., reduce to 72 dpi, etc.), specifying the users to be included in a group to which the photos will be sent, specifying login credentials for one or more social networking sites (e.g., Facebook, Flickr, Twitter, etc.), specifying login credentials for one or more blogs, and/or providing any further information relating to one or more actions.

Additionally, in one embodiment, metadata and settings may be displayed which are associated with the instruction. In another embodiment, where more than one instruction was previously selected, the metadata and settings may reflect more than one creation date and/or author. In one embodiment, the online instruction database will combine items that may be combinable (e.g., relevancy, priority, title, etc.). In various embodiments, metadata may include a title, author, relevancy (e.g., of the intended use, of applications used, etc.), priority (e.g., high, regular, low, priority with respect to other instructions being executed, etc.), creation date, the ability to import instruction settings as metadata (e.g., settings are also imported as metadata values associated with the instruction, etc.), and/or any other value which may relate to metadata.

In various embodiments, the metadata may be stored internally (e.g., in the same file as the instruction, etc.) and/or externally (e.g., in a separate file other than the instruction, etc.). Additionally, the metadata may be formatted in a human readable format (e.g., XML, etc.) and/or in a non-human readable format (e.g., binary, etc.).

In other embodiments, the settings may include global settings, such as permissions (e.g., associated with device, contacts, entities, locations, etc.), ability to verify the instruction source (e.g., in the instance where an instruction is sent from another contact and/or device to the user's mobile device, etc.), restrictions where the instruction will not run if there is less than 100 mb left on the data plan, will not run on the carrier network if the data exceeds 500 mb, will not run if the battery is less than a set amount, and/or any other feature which may relate globally to the instruction and/or the application managing instructions. Of course, in another embodiment, any global setting may be modified on an individual instruction by instruction basis.

In various embodiments, settings may also include instruction specific settings, including permissible run time (e.g., morning, night, 6 am-6 pm daily, Monday-Friday, etc.), permissible run locations (e.g., based off of device location, etc.), permissible run friends (e.g., instruction may be run when a device and/or contact is near, instruction may be prevented to be run when a device and/or contact is near, etc.), automatic settings (e.g., configure user's mobile device based on triggers, actions, and/or settings, etc.), settings associated with controlling the user's mobile device (e.g., set volume, set screen brightness, set power mode, etc.), and/or any other settings which may relate in some manner to the instruction. In another embodiment, a user may download and/or select a set of predefined settings (e.g., included in the instruction file, etc.), and/or may input all settings relating to the instruction.

As shown, the online instruction database interface may include one or more options 1506 associated with the selected one or more instructions, including the ability to modify, share link, add another instruction, register device, send to user device, send to another device, and/or any other feature which may relate to the instruction. In some embodiments, the ability to modify may include add, removing, and/or modifying in any manner the triggers, actions, metadata, settings, and/or any element associated with the instruction; the ability to share a link may include sending (e.g., via email, via html send form, via SMS, via chat, etc.) a link (e.g., HTML address, etc.) associated with the selected one or more instructions; the ability to add another instruction may include searching and adding in an additional one or more instructions; the ability to register device may include registering a device that is associated with the user (e.g., mobile device, desktop device, automobile, etc.); the ability to send to user device may include sending the displayed instruction to a default device (as preselected by the user, etc.); the ability to send to another device may include sending the displayed instruction to another device associated with the user and/or sending the instruction to a device not associated with the user (e.g., a device associated with a trusted contact, a device with permission to the user to modify, etc.). Of course, any option associated with the selected one or more instructions may be displayed.

Figure 16:
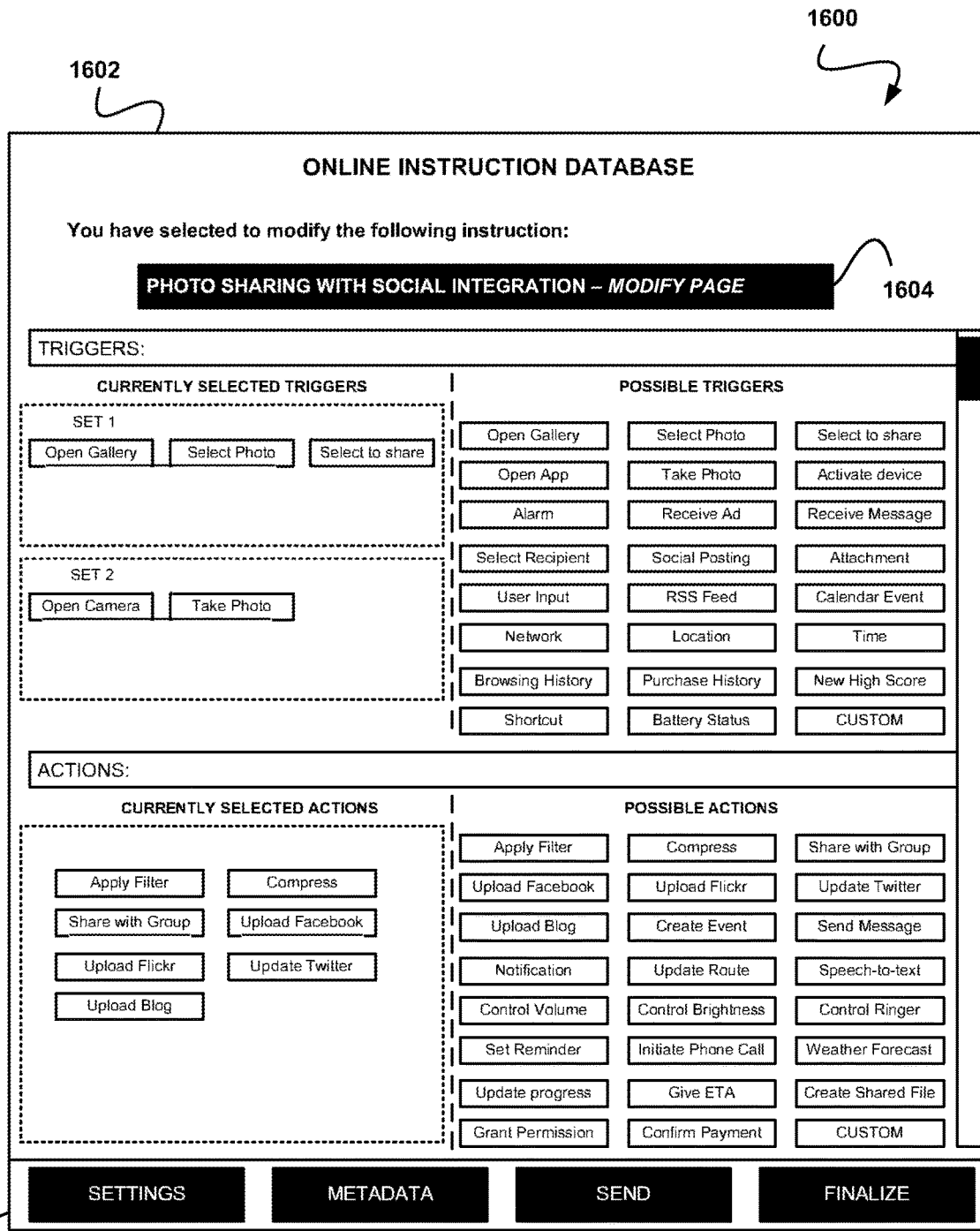
FIG. 16 shows an online interface for modifying an instruction, in accordance with another embodiment.

FIG. 16 shows an online interface 1600 for modifying an instruction, in accordance with another embodiment. As an option, the online interface 1600 may be implemented in the context of the architecture and environment of the previous Figures and/or any subsequent Figure(s). Of course, however, the online interface 1600 may be implemented in the context of any desired environment. It should also be noted that the aforementioned definitions may apply during the present description.

As shown, the online instruction database interface 1602 may display an instruction to be modified 1604. In one embodiment, the modification page may relate to one or more previously selected instructions. In another embodiment, the modification page may relate to creating a new instruction (e.g., not based on any previously existing instructions, etc.).

In various embodiments, the modification page associated with the online instruction database interface may display triggers, actions, settings, metadata and/or any other information. In one embodiment, the triggers may be separated into a "currently selected trigger" column and a "possible trigger" column. In such an embodiment, the user may drag and drop one or more triggers from the "possible trigger" column to the "currently selected trigger" column. Each trigger may be represented by a selectable (e.g., movable, etc.) box. In one embodiment, if a possible trigger has been moved to the "currently selected triggers" column, additional information may be requested of the user. For example, in one embodiment, a possible trigger may be "open app" whereupon when the trigger is moved to "currently selected triggers," a prompt may be displayed requesting the user to indicate what app or type of app the trigger should relate to (e.g., open gallery, open email app, open Facebook, open Yelp, etc.).

In one embodiment, more than one set of triggers associated with the instruction may be configured and/or created by the user. For example, if it was desired to create an instruction focusing on photo sharing with social integration, one set of triggers may focus on the opening of a gallery app whereas another set of triggers may focus on a camera app. Of course, any number of sets of triggers may be created and/or configured.

In one embodiment, all possible triggers may be listed in the "possible triggers" column. In another embodiment, the possible triggers may be displayed in response to a selection of a relevancy criteria, including, for example, productivity (e.g., time management, email, calendar, etc.), multimedia (e.g., photos, videos, music, etc.), communication (e.g., chat, SMS, email, etc.), business (e.g., CRM features, contact management, etc.), social sharing (e.g., social media posting, trusted device management, etc.), automobile (e.g., integration with infotainment system, management of communication, etc.), and/or any other relevancy category which may filter in some manner the possible triggers displayed. In various embodiments, the relevancy criteria may be displayed as a drop-down menu, as a set of links, as set of tabs (e.g., selection of the tab will display the associated possible triggers, etc.), and/or in any other manner.

In other embodiments, the currently selected triggers and the possible triggers may be displayed in any manner, including displaying the one or more triggers (including the currently selected triggers and/or the possible triggers) in a list (e.g., hierarchal list, etc.), as icons, in an interactive frame (e.g., wizard assistance in creating an instruction, etc.), as selectable objects, and/or in any other manner. Additionally, in other embodiments, the one or more possible triggers may be dragged and dropped, selected (e.g., select icon and/or text and/or check a selection mark next to a desired trigger, etc.), written in code (e.g., formulate instruction via code including requests and/or integration of possible triggers, etc.), and/or used in any manner.

In various embodiments, possible triggers may include the ability to open a gallery, select a photo, select to share an item, open an app, take a photo, activate a device, set an alarm, receive an ad, receive a message, select a recipient, create and/or receive a social posting, send and/or receive an attachment, request and/or receive user input, receive an RSS feed, receive and/or create a calendar event, connect to a network, and/or be associated with a location, time, browsing history, purchase history, new high score, a shortcut, a battery status, a custom item, and/or any other item which may relate to some input to the user device. In other embodiments, the possible trigger may relate to an action by a user, by another device (e.g., secondary device, server, etc.), by another user (or trusted contact), by an app (e.g., associated with the user's mobile device, associated with another device and/or user, etc.), and/or any input source.

In other embodiments, possible actions may include ability to apply a filter, to compress a file (e.g., photo, music, video, pdf, document, etc.), share an item with a group, upload item to Facebook, upload item to Flickr, update Twitter, upload an item to a blog, create an event (e.g., calendar appointment, party, e-vite invitation, etc.), send a message, receive and/or create a notification, update a route (e.g., GPS route, GPS tracks, etc.), enable and/or disable speech-to-text, control volume (e.g., of the device, of another associated device, etc.), control brightness (e.g., of the device, of another associated device, etc.), control ringer (e.g., of the device, etc.), set a reminder, initiate a phone call, provide and/or request a weather forecast, update progress (e.g., on a project, on a route, etc.), give an ETA (e.g., when the user will arrive at a destination, when a project will be turned in, etc.), create a shared file, grant a permission (e.g., to a user, to a device, to a group, etc.), confirm a payment (e.g., electronic transfer of funds, electronic purchase, etc.), apply a custom action, and/or take any other action. In some embodiments, the action may relate to a user, a user's mobile device, another device (e.g., secondary device, server, etc.), another user (or trusted contact), an app (e.g., associated with the user's mobile device, associated with another device and/or user, etc.), and/or any device or entity.

As shown, the online instruction database interface modification page may include one or more options 1606, including settings, metadata, send, and/or finalize. In one embodiment, the settings option may include global settings, such as permissions (e.g., associated with device, contacts, entities, locations, etc.), ability to verify the instruction source (e.g., in the instance where an instruction is sent from another contact and/or device to the user's mobile device, etc.), restrictions where the instruction will not run if there is less than 100 mb left on the data plan, will not run on the carrier network if the data exceeds 500 mb, will not run if the battery is less than a set amount, and/or any other feature which may relate globally to the instruction and/or the application managing instructions. Of course, in another embodiment, any global setting may be modified on an individual instruction by instruction basis.

In various embodiments, the settings may include instruction specific settings, including permissible run time (e.g., morning, night, 6 am-6 pm daily, Monday-Friday, etc.), permissible run locations (e.g., based off of device location, etc.), permissible run friends (e.g., instruction may be run when a device and/or contact is near, instruction may be prevented to be run when a device and/or contact is near, etc.), automatic settings (e.g., configure user's mobile device based on triggers, actions, and/or settings, etc.), settings associated with controlling the user's mobile device (e.g., set volume, set screen brightness, set power mode, etc.), and/or any other settings which may relate in some manner to the instruction. In another embodiment, a user may download and/or select a set of predefined settings (e.g., included in the instruction file, etc.), and/or may input all settings relating to the instruction.

In one embodiment, the metadata may include the ability to insert an instruction title, an author, a location/geotag, a tag (e.g., data content, application content, etc.), a relevancy (e.g., photo, sharing, etc.), applicable apps (e.g., apps which may relate and/or may be included in the instruction, etc.), priority (e.g., high, regular, low, priority with respect to other instructions being executed, etc.), creation date, the ability to import instruction settings as metadata (e.g., settings are also imported as metadata values associated with the instruction, etc.), and/or any other value which may relate to metadata.

In various embodiments, the metadata may be stored internally (e.g., in the same file as the instruction, etc.) and/or externally (e.g., in a separate file other than the instruction, etc.). Additionally, the metadata may be formatted in a human readable format (e.g., XML, etc.) and/or in a non-human readable format (e.g., binary, etc.).

In one embodiment, the send option may include sending the created instruction to a device associated with a user, a device associated with another contact (e.g., permission may be granted to the user [either preselected or when the instruction is received] to control some aspect of another device, etc.), an instruction repository (e.g., online instruction database, internal server, etc.), an email address, a backup archive (e.g., Dropbox, etc.), and/or to any other location desired by the user.

In another embodiment, a finalize option may display all triggers, actions, metadata, settings, and/or any further information which may relate in some manner to the created instruction. In one embodiment, a finalize option may include an ability to check for errors in the created instruction, including checking for inconsistent rules, inadequate permissions, instruction execution inconsistences (e.g., with respect to other instructions, with respect to system resources, with respect to other applications, etc.), and/or any possible error associated with the instruction.

Figure 17:
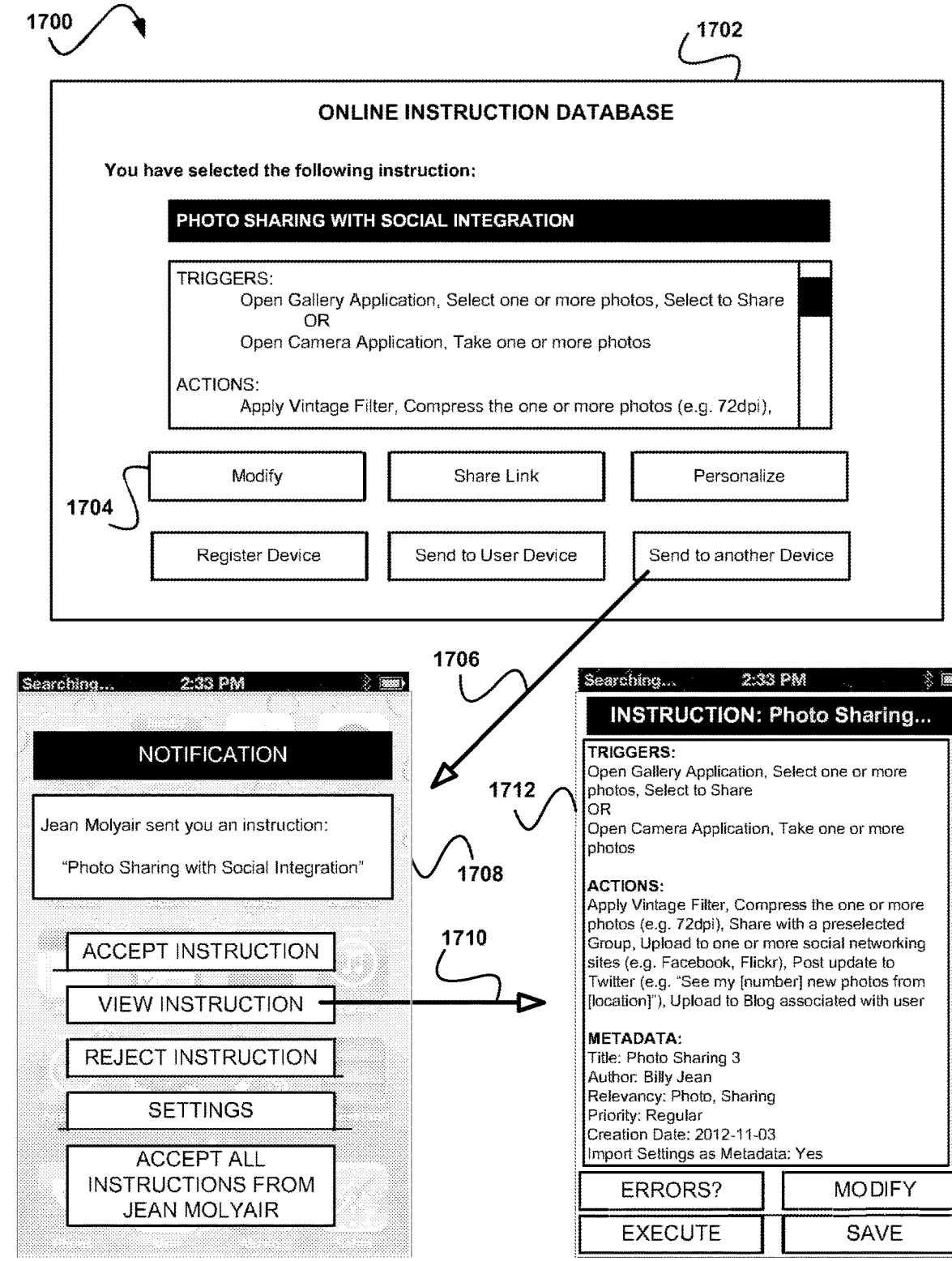
FIG. 17 shows an online and mobile interface for sending and receiving an instruction, in accordance with another embodiment.

FIG. 17 shows an online and mobile interface 1700 for sending and receiving an instruction, in accordance with another embodiment. As an option, the online and mobile interface 1700 may be implemented in the context of the architecture and environment of the previous Figures and/or any subsequent Figure(s). Of course, however, the online and mobile interface 1700 may be implemented in the context of any desired environment. It should also be noted that the aforementioned definitions may apply during the present description.

As shown, an online instruction database interface 1702 may include displaying an instruction. In various embodiments, the displayed instruction may have been created and/or modified previously by the user, may be the result of selecting one or more instructions by the user, may have been sent by a trusted contact (e.g., a friend, etc.) to the user (e.g., via email, via link, via recommendation, etc.), and/or may have been created and/or selected in any manner.

In various embodiments, the online instruction database interface may include one or more options 1704 associated with the instruction, including the ability to modify, share link, add another instruction, register device, send to user device, send to another device, and/or any other feature which may relate to the instruction. In some embodiments, the ability to modify may include add, removing, and/or modifying in any manner the triggers, actions, metadata, settings, and/or any element associated with the instruction; the ability to share a link may include sending (e.g., via email, via html send form, via SMS, via chat, etc.) a link (e.g., HTML address, etc.) associated with the selected one or more instructions; the ability to add another instruction may include searching and adding in an additional one or more instructions; the ability to register device may include registering a device that is associated with the user (e.g., mobile device, desktop device, automobile, etc.); the ability to send to user device may include sending the displayed instruction to a default device (as preselected by the user, etc.); the ability to send to another device may include sending the displayed instruction to another device associated with the user and/or sending the instruction to a device not associated with the user (e.g., a device associated with a trusted contact, a device with permission to the user to modify, etc.). Of course, any option associated with the instruction may be displayed.

As shown, the send to another device option may be selected 1706. In various embodiments, the user of the online instruction database may be presented with an interface to select the appropriate device to send the instructions. In one embodiment, the user may select one or more devices, may input information (e.g., phone number, device id, etc.) relating to a new device, and/or modify information of any existing device profiles. In another embodiment, a permission level may be associated with each device. For example, in various embodiments, the permission level may relate to a granted permission level sent by a user of the device (e.g., the recipient on the mobile device may designate a permission level associated with the sender of the instruction, etc.), to a permission level associated with a group (e.g., permission to implement instructions based on role and/or user identity, etc.), and/or to any other permission which may be associated with a device and the sending user of the instruction.

In one embodiment, a device may not have an associated permission. In such an embodiment, when the user of the device receives an instruction from the user (or device), the receiving user may designate a permission level to be associated with the sending user (or device). In various embodiments, the receiving user may permit the sending user (or device) to have permission to add and install instructions, to push information relating to the instruction to the receiving user's device (e.g., but not to install them, etc.), to install a temporary and/or trial version (e.g., limited features, etc.) of the instruction, and/or to have any other permission to interact with the receiving user's mobile device in some manner.

As shown, in response to an instruction being sent (e.g., from an online instruction database, etc.), a notification interface 1708 may be displayed on the receiving user's mobile device. Of course, in other embodiments, any device may function as the receiving device. In one embodiment, the notification may indicate the user that sent the instruction and the instruction title. For example, in one embodiment, the notification may display "Jean Molyair sent you an instruction: 'Photo Sharing with Social Integration.'" Of course, any notification may be displayed. For example, in another embodiment, the user of the mobile device may have already granted permission to "Jean Molyair" to add and install instructions on the user's mobile device. In such an embodiment, the notification may notify the user of an instruction that was added by "Jean Molyair."

In various embodiments, the notification interface may also include one or more options, including accept instruction, view instruction, reject instruction, settings, and/or accept all instructions. In one embodiment, the accept instruction may include installing and saving the instruction to a device instruction database. In some embodiments, the device instruction database may be synced with an online instruction database.

In another embodiment, the reject instruction may include denying installation of the instruction, filtering (e.g., blocking, etc.) further instruction notifications from a specific source (e.g., Jean Molyair, etc.), and/or rejecting in some manner the sent instruction. In some embodiments, settings may include management of sources (e.g., black list, white list, acceptable sources, etc.), the granting of one or more permissions (e.g., user X has permission to send and install one or more instructions, user permissions, device permissions, app permissions, etc.), the manner of notifications (e.g., notification display, notification sound, notification action, etc.), requests for recommended instructions (e.g., by the device, by the app, invitation sent to one or more contacts, etc.), communication between one or more device (e.g., do not accept an instruction from an unknown device, unknown device must be determined as trustworthy before acceptance of an instruction, etc.), communication between an online instruction database and a device instruction database, and/or any other setting associated in some manner with the instruction notification page.

In one embodiment, the user may select an option to accept all instruction. In one embodiment, the option may relate to a specific instruction source (e.g., Jean Molyair, etc.). In other embodiments, the option may relate to a device source (e.g., device ID xxxxx, etc.), an IP address, a website, a genre (e.g., instruction may relate to "productivity," etc.), and/or any other feature and/or identification which may relate in some manner to the instruction.

As shown, the view instruction option may be selected 1710. In response an instruction interface 1712 may be displayed. In various embodiments, the instruction interface may include triggers, actions, settings, metadata, and/or any other information associated with the instruction. As an example, in one embodiment, the sent instruction may be entitled "Photo Sharing with Social Integration;" the triggers may include open gallery application, select one or more photos, select to share, or open camera application, take one or more photos, and/or any other trigger which may relalte to the photo sharing with social integration; the actions may include apply vintage filter, compress the one or more photos (e.g., 72 dpi), share with a preselected group, upload to one or more social networking sites (e.g., Facebook, Flickr, etc.), post update to Twitter (e.g., "see my [number] new photos from [location]," etc.), upload to blog associated with user, and/or taking any other action in response to the one or more triggers; the metadata may include the title of the instruction, the author, relevancy, priority, creation date, the ability to import settings as metadata, and/or any other relevant information; the settings may include any further information relating in some manner to the instruction.

In one embodiment, the instruction interface may include one or more options, including ability to check for errors, to modify the instruction, to execute the instruction, and to save the instruction. Of course, in other embodiments, any type of option may be associated with the instruction.

In one embodiment, the ability to check for errors may include verifying device capability (e.g., sufficient resources, applicable apps have been downloaded, etc.), one or more permissions (e.g., user must have permission to access database X in order to run the instruction, etc.), one or more triggers and/or actions (e.g., verify that the correct order of triggers and/or actions is included, etc.), and/or any other feature which may in some manner check for errors in the instruction. In other embodiments, the ability to modify the instruction may include modifying in some manner the one or more triggers, actions, metadata, and/or settings.

As an example, in one embodiment, a user accessing an online instruction database may select an instruction and choose to send the instruction to another device, or a device not associated with the user. A page (or pop-up display, etc.) may be displayed requesting further information from the user including the name of the new device, the cell phone number of the device (e.g., if the device was a mobile phone, etc.), the name of the user associated with the device, an identification associated with the device (e.g., device id, etc.), a time of delivery (e.g., immediate, 6 pm on 12/02/12, etc.), and/or any other information which may relating to sending the instruction to another device. After sending the instruction, a confirmation page (or pop-up display, etc.) may be displayed indicating that the instruction was successfully sent. In the event that there was an error in sending the instruction, an error page may be displayed indicating the applicable error (e.g., insufficient permission, no such device exists, etc.).

In one embodiment, devices may be registered (e.g., provide detailed information associated with the device, etc.) with an online instruction database or with a device instruction database. In one embodiment, in order for an instruction to be downloaded, sent, and/or created on a device, the device may be registered with an instruction database (e.g., online, on device, etc.). In other embodiments, a device may not need to be registered with an instruction database in order to download and/or receive an instruction. In such an embodiment, at the receipt (e.g., from downloading and/or receiving, etc.) of an instruction, a link may also be provided to register the device with an online or device instruction database. In a further embodiment, registering a device may permit additional features (e.g., premium features, etc.) to be accessed and/or used by the user.

Figure 18:
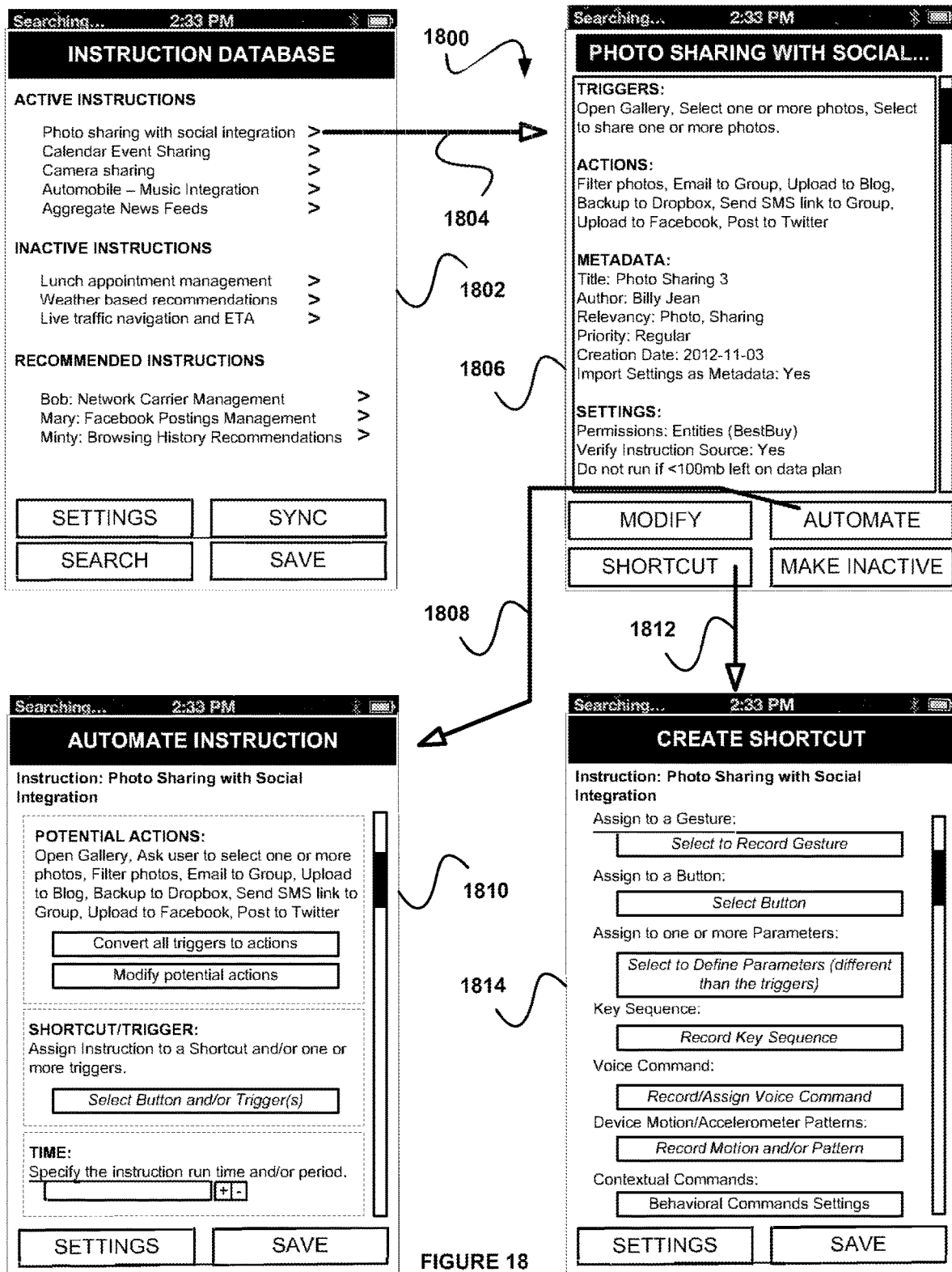
FIG. 18 shows a mobile interface for managing one or more instructions, in accordance with another embodiment.

FIG. 18 shows a mobile interface 1800 for managing one or more instructions, in accordance with another embodiment. As an option, the mobile interface 1800 may be implemented in the context of the architecture and environment of the previous Figures and/or any subsequent Figure(s). Of course, however, the mobile interface 1800 may be implemented in the context of any desired environment. It should also be noted that the aforementioned definitions may apply during the present description.

As shown, an instruction database interface 1802 may be displayed. In one embodiment, the instruction database interface may include a list of active instructions, inactive instructions, recommended instructions, and/or options associated with the instruction database. In another embodiment, the active instructions may include any instruction which is actively being used. In various embodiments, the separation of active and inactive instructions may occur automatically by the device. For example, in one embodiment, a created instruction may indicate that the instruction would be valid (i.e., would be active, etc.) for one week. After a week of use, the instruction may then be designated as "inactive." In other embodiments, if an error is found in the instruction (e.g., with a trigger, with an action, etc.), an instruction may also be placed in an "inactive instructions" category. Of course, in another embodiment, the categorization of active and inactive instructions may occur manually by the user.

In one embodiment, the recommended instructions may include one or more instructions which have been received but not yet installed and made active. For example, in one embodiment, a recommended instruction may be received from a contact (e.g., trusted contact, friend, device, etc.). In another embodiment, a recommended instruction may be included based on a recommendation from the user's device. For example, in one embodiment, the user may have given a set of input actions repeatedly (e.g., twice in a month, etc.) but not sufficiently frequent (e.g., at least twice in a week, etc.) to trigger a display associated with an instruction creation threshold. In such an embodiment, the mobile device may recommend one of more instructions based on the device usage history (e.g., actions taken by the user, actions taken by one or more apps, etc.). Of course, in another embodiment, the device may recommend one or more instructions based on any input and/or history associated with the device.

In one embodiment, the sync option may include syncing one or more instructions between the user's device and another database, including for example, a database in the cloud (e.g., cloud database, etc.), on a server (e.g., on local network, on external network, etc.), on another device (e.g., secondary device, device associated with a trusted contact, etc.), and/or any other device which may also store one or more instructions. In another embodiment, the search option may include the ability to search among previously used instructions (e.g., inactive instructions, etc.), active instructions, recommended instructions, as well as search potential instructions on an instruction database. In a further embodiment, the save option may include the ability to save the instruction database to more than one location (e.g., on the device, on a separate storage card associated with the device, etc.).

As an example, in one embodiment, active instructions may include "photo sharing with social integration," "calendar event sharing," "camera sharing," "automobile—music integration," and/or "aggregate news feeds;" inactive instructions may include "lunch appointment management," "weather based recommendations," "live traffic navigation and ETA;" recommended instructions may include "Bob: Network Carrier Management," "Mary: Facebook Postings Management," "Minty: Browsing History Recommendations."

In one embodiment, an active instruction "Photo Sharing with social integration" may be selected 1804 and an instruction page 1806 may be displayed. In various embodiments, an instruction page may include the one or more triggers and actions, metadata, and settings previously selected and/or accepted. In various embodiments, one or more options may be displayed including modify (e.g., change some aspect of the triggers, actions, metadata, and/or settings, etc.), automate, shortcut, and/or make inactive (e.g., remove the instruction from an active instruction designation, etc.). In other embodiments, the one or more options may be displayed as drop down menus. In another embodiment, an option to delete the instruction may be displayed.

As shown, an automate option may be selected 1808 and an automate instruction interface 1810 may be displayed. In various embodiments, an automate instruction interface may include displaying potential actions. In one embodiment, it may be desired to convert all triggers to actions. For example, in one embodiment, the number of triggers may be reduced by saving the instruction to a shortcut (e.g., button, gesture, etc.). Of course, in another embodiment, an option to modify the potential actions may be displayed, which may permit the user to add and/or remove potential action items (e.g., taken from the prior triggers, taken from the prior actions, taken from action and/or trigger database, etc.), and/or taken any other action to modify in some manner the instruction. In one embodiment, the potential actions may be modified after converting all triggers to actions.

In another embodiment, the automate instruction interface may include an option to assign the instruction to a shortcut and/or one or more triggers (e.g., other than those initially associated with the instruction, etc.). In various embodiments, the shortcut may be associated with a gesture, a button, a parameter, a sequence, a voice command, a device input, and/or any other feature which may be capable of causing the execution of an instruction. Of course, in other embodiments, any trigger (e.g., any input action, etc.) may be used as a shortcut and/or trigger.

In one embodiment, the automate instruction interface may include the ability to add in time instruction, including specifying the run time (e.g., run at 6 am, etc.), run period (e.g., daily, weekly, February 23, etc.), run duration (e.g., only run for maximum of 10 minutes, etc.), run cycle (e.g., only run 10 times, etc.), and/or any other option relating to time and the instruction. In another embodiment, the automate instruction interface may also include one or more thresholds (e.g., shortcut will not execute the instruction unless the user is at location X, the shortcut and/or trigger are pressed for a minimum of 3 seconds, etc.).

As shown, a shortcut option may be selected 1812 and a create shortcut interface 1814 may be displayed. In various embodiments, the create shortcut interface may include the ability to assign the instruction to a gesture (e.g., ability to record a custom gesture, selection of a predefined gesture, an input gesture on the device display, etc.), to a button (e.g., device physical button, software button, icon, etc.), to one or more parameters (e.g., input actions, device sensors, etc.), to a key sequence (e.g., keyboard command sequence, keyboard shortcut, etc.), to a voice command (e.g., record command, select from preconfigured commands, etc.), to a device motion/accelerometer pattern (e.g., move device in an "8" motion, move device up, move device to the side, etc.), to one or more contextual commands (e.g., identification of environment, identification of users, user is standing up or sitting down, user has entered a specific room, etc.), and/or any other feature (e.g., software based, physical, etc.) which may include assignment of a shortcut. Of course, any item associated with the device may potentially be assigned a shortcut. In another embodiment, options associated with the create shortcut interface may include settings (e.g., displayed options, etc.), save (e.g., to the device, to an online database, etc.), and/or any other item associated with creating a shortcut.

Figure 19:
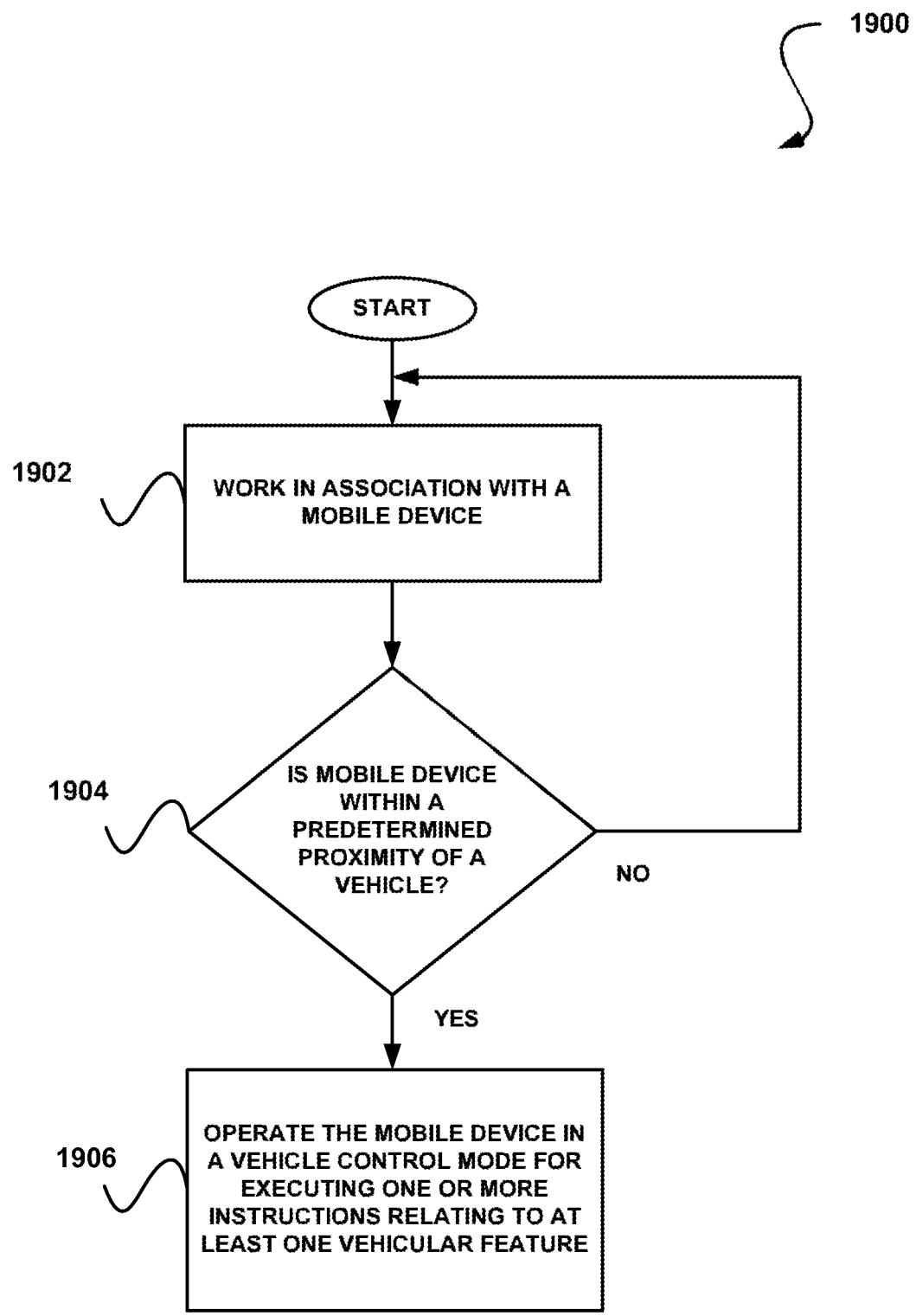
FIG. 19 shows a method for executing one or more instructions with a mobile device in a vehicle control mode, in accordance with another embodiment.

FIG. 19 shows a method 1900 for executing one or more instructions with a mobile device in a vehicle control mode, in accordance with another embodiment. As an option, the method 1900 may be implemented in the context of the architecture and environment of the previous Figures and/or any subsequent Figure(s). Of course, however, the method 1900 may be implemented in the context of any desired environment. It should also be noted that the aforementioned definitions may apply during the present description.

As shown, a computer readable medium works in association with a mobile device. See operation 1902. In one embodiment, the mobile device may include a device with cellular phone capabilities. In another embodiment, the mobile device may include a short-range wireless communication protocol headset, including Wireless USB, Bluetooth, Wi-Fi, or any other wireless protocol which may function at a short-range.

Additionally, a computer readable medium determines whether the mobile device is within a predetermined proximity of a vehicle. See operation 1904. In one embodiment, the mobile device may detect the presence of a particular device (e.g., the vehicular system, etc.) by receiving a transmitted signal (e.g., RFID, NFC, WiFi, ZigBee, Bluetooth, etc.). In another embodiment, the vehicular system may detect the presence of the mobile device.

In some embodiments, the proximity may be set to a specific threshold. For example, the signal strength may be set at a predetermined quality (e.g., HIGH, etc.) before connection is established. In other embodiments, the transmitted signal may only be accessible within a set threshold range (e.g., 3 feet, etc.) around the vehicle.

In one embodiment, the determination of whether the mobile device is within a predetermined proximity of a vehicle may be automatic (e.g., an automatic connection established between the car system and the mobile device, etc.). In other embodiments, the determination may occur manually (e.g., mobile device must be placed in a mount, a mobile device must receive a wired connection, an "accept connection" screen must be accepted, etc.).

In some embodiments, the determination may include an authentication step. For example, in one embodiment, the mobile device may exchange security tokens with the vehicle system as part of determining whether the mobile device is within a predetermined proximity of a vehicle. Of course, any cryptography and/or security features may be implemented in determining whether the mobile device is within a predetermined proximity of a vehicle.

In various embodiment, the determination as to whether the mobile device is within the predetermined proximity of the vehicle may be accomplished by determining whether the mobile device is in communication with the vehicle via a short range wireless communication protocol, by determining whether the mobile device has been manually put in a vehicular control mode, by determining whether the mobile device has been physically coupled to the vehicle, and/or by any other method whereby the mobile device is determined to be within a predetermined proximity of the vehicle.

As shown, if the mobile device is within a predetermined proximity of a vehicle, the mobile device is operated in a vehicle control mode for executing one or more instructions relating to at least one vehicular feature. See operation 1906. In one embodiment, vehicle control mode may include a collection of properties in association with at least one vehicle feature. For example, in various embodiments, the properties may include, but are not limited to, user preferences, input options, output options, power conservation policies, processing capacity, access permissions, and/or any other type of setting that may be attributable to a tablet computer or a phone device.

In one embodiment, the vehicle control mode may include static settings. In other embodiments, the vehicle control mode may include dynamic features (e.g., settings based on devices in a predetermined proximity, etc.). In a further embodiment, the vehicle control mode may include more than one sub-mode (e.g., season mode, time of day mode, etc.). For example, switching between modes may be done automatically (e.g., environmental, spatial, temporal, and/or situational triggers, etc.) or manually (e.g., triggered by user input, etc.). In this way, the properties can be tailored to specific use environments and situations, maximizing the functionality and interaction of the tablet computer or phone device and the vehicle. Further, in another embodiment, a vehicular feature may include any feature associated with a vehicle. For example, in various embodiments, the vehicular feature may include an audio feature, a video feature, a navigation feature, an augmented reality feature, a social networking feature, a vehicle control feature (e.g., heated seats, air conditioning, etc.), and/or any other feature which may be associated with a vehicle.

In one embodiment, the vehicle control mode may be activated automatically. For example, in one embodiment, when the mobile device is within a predetermined proximity of the vehicle, an application on the device may be activated to control at least some aspect of the vehicular system (e.g., music selection, volume, directions, lighting, heated seats, emergency services etc.).

In other embodiments, the vehicle control mode may be activated manually. For example, in one embodiment, the mobile device may be placed on a mount within the vehicle, and thereby, activate an application on the device to control at least some aspect of the vehicular system (e.g., music selection, volume, directions, lighting, heated seats, emergency services etc.).

Of course, the mobile device may be connected in any manner (e.g., wired or wirelessly, etc.) to the vehicle assembly. Additionally, any number of devices may be connected to the vehicular system and control at least one vehicular feature.

In another embodiment, operating the mobile device in a vehicle control mode for controlling at least one vehicular feature may be based upon user input (e.g., hardware switch, GUI input, etc.). In another embodiment, the determination may be based on peripherals geographically near the device. For example, in one embodiment, a car display arrangement (e.g., vehicle system, etc.) may include a wireless microphone, a wireless database (e.g., to store contacts, directions, pushed notifications, etc.), and/or any other type of peripheral which may be used within a vehicle. Upon being brought near any of these peripherals, the mobile device may recognize the peripherals, and based off of the recognition, automatically operate the table computer or phone device in a vehicle control mode.

In some embodiments, operating the mobile device in a vehicle control mode may serve as a trigger for one or more instructions. For example, in one embodiment, an instruction may relate to a vehicle audio system, which may include a vehicle mode trigger, the user sitting down (e.g., based off of accelerometer sensor, etc.), and interaction with a Bluetooth audio system. Based off of these triggers, an instruction may run including activating Pandora, selecting a specific channel, and setting the volume level. Of course, any instruction may be configured to run in vehicle control mode.

In a separate embodiment, an instruction may relate to receiving a communication (e.g., email, chat, etc.) while in the vehicle. One or more triggers may include a vehicle mode trigger, and receiving an email or a text or a chat. Using the audio system on the vehicle assembly, the device may request whether the user wishes the device to read (e.g., text-to-speech capabilities, etc.) to the user. Upon input from the user (e.g., voice command "yes," etc.), the device may proceed to read the communication. After reading, the device may request whether the user wishes to respond in some manner (e.g., call back, send a communication back, etc.) to the received communication. Of course, in other embodiments, any instruction may be configured to relate in some manner to the vehicle mode.

Figure 20:
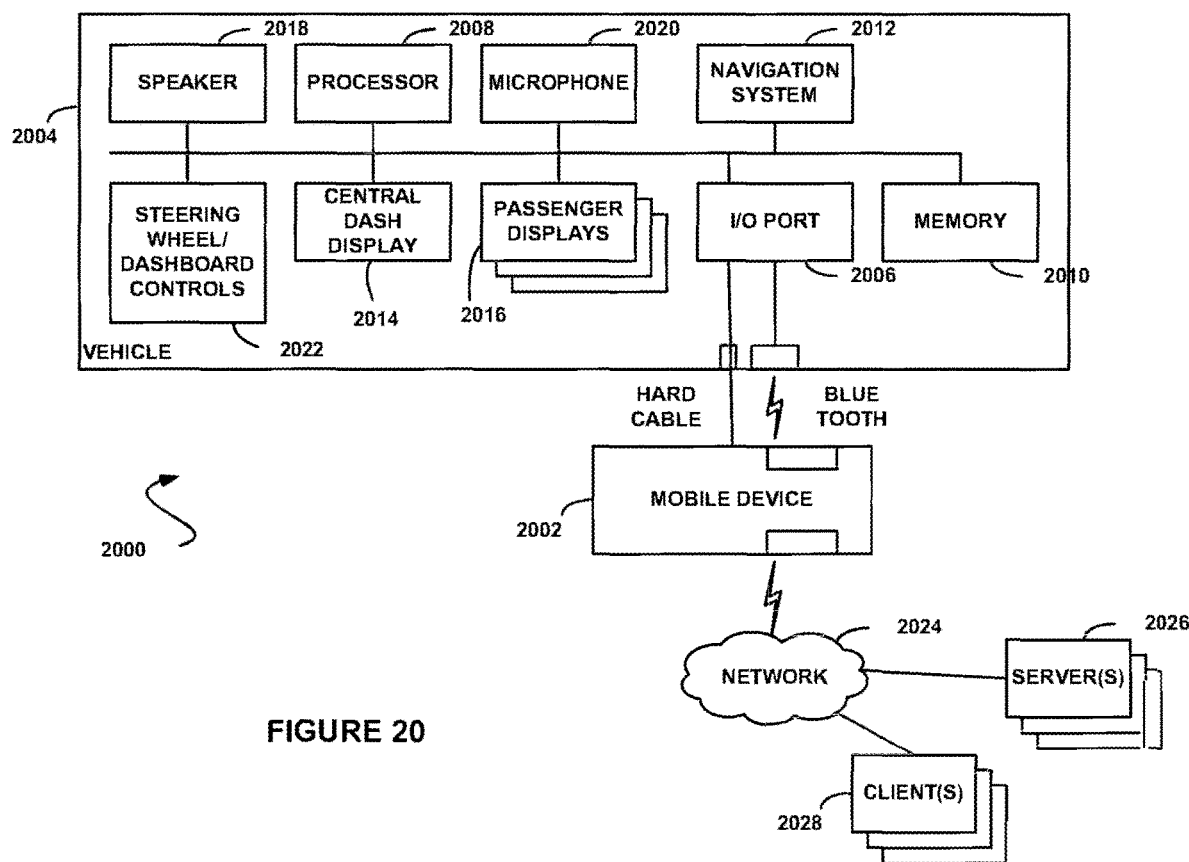
FIG. 20 shows a communication system, in accordance with another embodiment.

FIG. 20 shows a communication system 2000, in accordance with one possible embodiment. As an option, the system 2000 may be implemented in the context of the architecture and environment of the previous Figures or any subsequent Figure(s). Of course, however, the system 2000 may be carried out in any desired environment. It should also be noted that the aforementioned definitions may apply during the present description.

As shown, a mobile device 2002 is capable of interfacing with a vehicle 2004 including various components of the vehicle 2004. The phone device or tablet computer 2002 may include any mobile device capable of interfacing with a vehicle 2004 including a lap-top computer, hand-held computer, mobile phone, personal digital assistant (PDA), a music player (e.g., a digital music player, etc.), a GPS device, etc.

In various embodiments, the mobile device 2002 may communicate with a vehicular assembly system (e.g., a communication and entertainment system, etc.) corresponding to the vehicle 2004 via a wireless connection (e.g., Bluetooth, etc.), or via a cable connection (e.g., a USB cable, a serial cable, etc.). As an option, the mobile device 2002 may interface with the communication and entertainment system vehicle utilizing an I/O port 20106 of the vehicle 2004. In various embodiments, the I/O port 2006 may include a serial port, a USB port, FireWire/i.LINK ports, etc. In one embodiment, the I/O port 2006 may include a wireless communication port.

Using this interface, the mobile device 2002 may interface with various components and functionality of the vehicle, such as an onboard computer system including a processor 2008, memory 2010 (e.g., DRAM, flash memory, etc.), an onboard navigation system 2012, displays (e.g., a central display 2014, and one or more passenger displays 2016, etc.), audio communication devices (e.g., speakers 2018, a microphone 2020, etc.), and various other components and functionality of the vehicle included in the vehicular assembly system. The interface may also allow a user of the vehicle 2004 to access and/or control the phone device or tablet computer 2002 utilizing controls associated with the vehicle 2004, such as steering wheel, and dashboard radio controls 2022. Additionally, the user may access and/or control the mobile device utilizing the microphone 2020 through voice commands.

Using these components and controls, a user may access and utilize one or more wireless networks 2024 associated with the mobile device 2002. Coupled to the networks 2024 may be servers 2026 which are capable of communicating over the networks 2024. Also coupled to the networks 2024 and the servers 2026 is a plurality of clients 2028.

Such servers 2026 and/or clients 2028 may each include a desktop computer, lap-top computer, hand-held computer, mobile phone, personal digital assistant (PDA), peripheral (e.g., printer, etc.), any component of a computer, and/or any other type of logic. In order to facilitate communication among the networks 2024, at least one gateway is optionally coupled therebetween.

It should be noted that the computer system of the vehicle 2004 may include various software and applications for facilitating communication between the vehicle 2004 and the mobile device 2002. For example, in various embodiments, the vehicle computer system may include an operating system (e.g., Windows Mobile, Linux, etc.), embedded speech recognition software, telephone call steering systems, automated telephone directory services, character recognition software, and imaging software.

In one embodiment, the user's mobile device may be used to control in some manner an aspect of the vehicle (e.g., in response to an ad/content, etc.). In a further embodiment, the mobile device may identify additional peripherals and/or devices associated with the vehicle, and based off of the identification, use such peripherals and/or devices to interact more fully with the user. For example, in one embodiment, an instruction may be executed by the mobile device which controls in some manner a feature and/or device (e.g., display, audio setting, etc.) associated with the vehicle. In another embodiment, an instruction may be executed by a different device (e.g., associated with a friend, associated with a contact, associated by a nearby device, etc.) which controls in some manner an aspect of the vehicle. In such an embodiment, the ability to control the vehicle may be dependent on the allocation of sufficient permissions. In this manner, instruction from more than one device may be used to interact with other users and the car assembly.

In one embodiment, a vehicle may be a trigger for an instruction. For example, in one embodiment, the vehicle mode may trigger ads and/or content relating to possible destinations and/or relevant content en route, pursuant to a predefined instruction. In another embodiment, a relevant instruction (e.g., based off of usage history, preferences, etc.) may be presented to the user. In one embodiment, the mobile device may determine that the user is in a vehicle, that it is near lunch time, and that the user's next appointment is in one hour. Based off of these triggers, the mobile device may execute an instruction including giving a recommend (e.g., through the vehicle's audio, etc.) a lunch destination to the user. If the user agrees (e.g., voice command of "yes," etc.), the mobile device may update the navigation system with the new lunch destination.

In another embodiment, a user may be in a new city. Traveling through the city, the mobile device may receive one or more triggers including recognizing that the user has not been to the city before and is currently in a vehicle. Based off of such triggers, an instruction may be run requesting to the user whether a tour audio stream is desired. If the user gives an affirmative voice command, the mobile device may play tour audio streams to the vehicle (e.g., "On your left is the oldest Bank Building in the area. Built in 1864, it survived the fire of 1880 and the earthquake of 1910," etc.). Of course, anything may be presented to the user based on the instruction.

Figure 21:
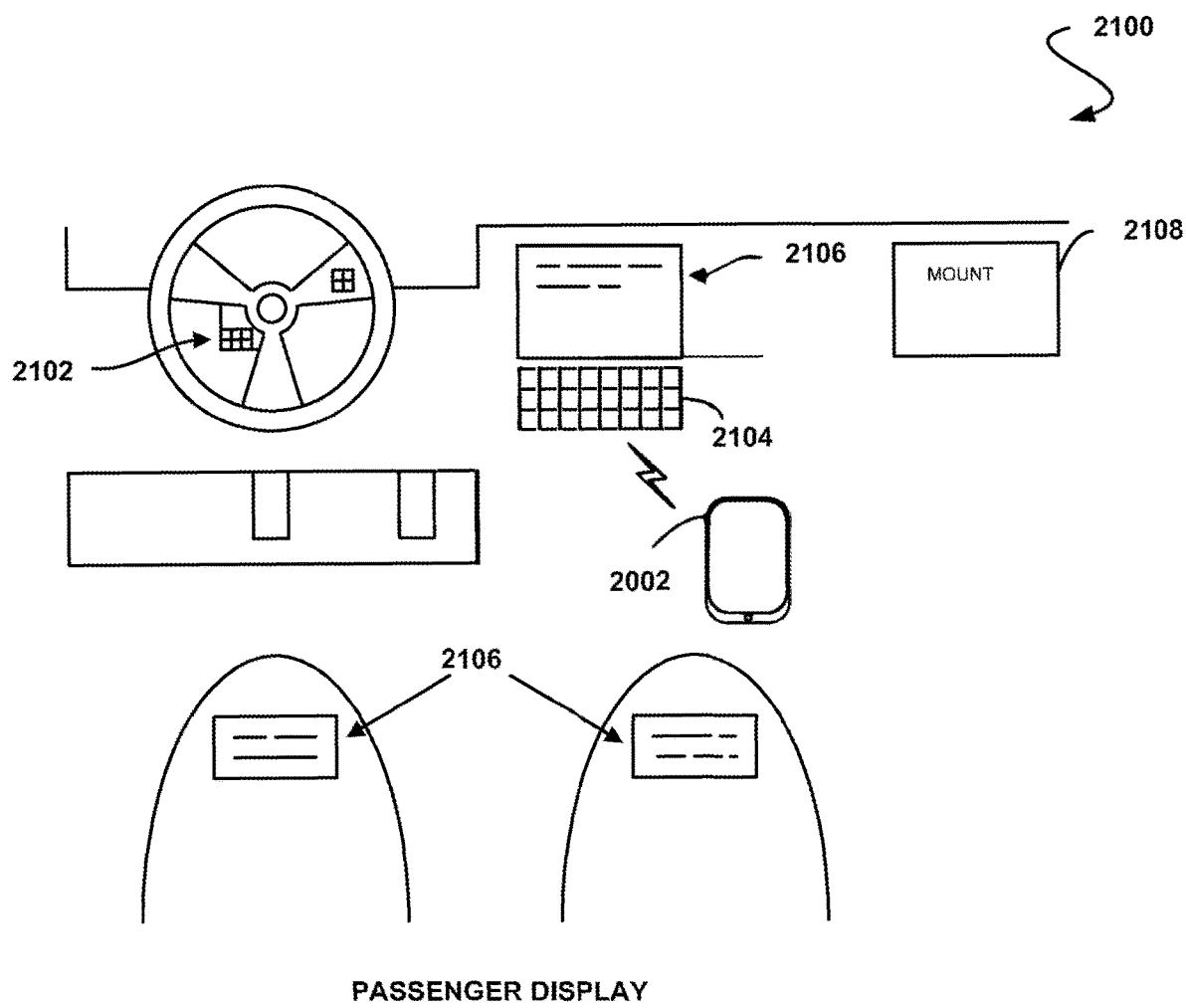
FIG. 21 shows a configuration for an automobile capable of interfacing with the mobile device of FIG. 20, in accordance with another embodiment.

FIG. 21 shows a configuration 2100 for an automobile capable of interfacing with the mobile device of FIG. 20, in accordance with one possible embodiment. As an option, the configuration 2100 may be implemented in the context of the architecture and environment of the previous Figures or any subsequent Figure(s). Of course, however, the configuration 2100 may be carried out in any desired environment. It should also be noted that the aforementioned definitions may apply during the present description.

As shown, the mobile device 2002 may be coupled to the automobile utilizing a wired connection (e.g., a USB connection, etc.), or a wireless connection (e.g., Bluetooth, etc.). In one embodiment, the mobile device 2002 may be placed on a mount 2108. The mount may provide a wired or wireless connection to the automobile system.

Using this connection, a user (e.g., a driver or passenger, etc.) may operate the mobile device 2002, via the automobile, using voice commands, steering wheel controls 2102, radio controls 2104, and/or dashboard controls. Furthermore, the mobile device may communicate with vehicle displays (e.g., main displays, passenger displays 2106, etc.) such that content associated with the mobile device (e.g., stored content, streaming content, etc.) may be displayed. For example, the mobile device may communicate stored video to at least one of the passenger displays 2106. Additionally, the mobile device may communicate streaming (e.g., new ad/content, etc.) or stored audio (e.g., saved past ad/content, etc.) such that the audio may be transmitted utilizing an audio system of the automobile.

By interfacing the mobile device 2002 with the automobile, voice-activated, hands-free calling may also be implanted. For example, a "Push to Talk" button on the steering wheel may allow the user to access contacts stored in a contact list of the mobile device 2002 by voice command. Furthermore, the user may be able to switch use from the mobile device 2002 to the vehicle control system transparently. For example, a user may push a "Telephone" button on the steering wheel to automatically transfer a current telephone call to the automobile communication system of the automobile without having to hang up and call again.

As an option, the text messages received by the mobile device 2002 may be converted to audio utilizing a vehicle on-board processor and associated voice-to-text software. The communication system of automobile may then output the converted text in an audio stream via speakers. In one embodiment, the communication system associated with the automobile may include a main display 2106 for displaying activities associated with the mobile device 2002, along with other functionality (e.g., navigational functionality, etc.).

For example, the communication system may display any feature that is capable of being displayed using the mobile device 2002. In various embodiments, such features may include an ad and/or content notification, caller ID, call waiting, conference calling, a caller log, a list of contacts, a signal strength icon, and a phone battery charge icon, a music list, a content list, etc. Additionally, voice-activated music may also be implemented. For example, the on-board communication and entertainment system may allow a user to browse through music collections by genre, album, artist, and song title using simple voice commands.

In one embodiment, the passenger displays 2106 may all display the same material (e.g., video, music, ad, content, etc.). In another embodiment, the passenger displays may be independently operated (e.g., each displaying a different video stream, personalized ads and/or content, etc.) and/or operated independently by the mobile device 2002. In a further embodiment, the passenger displays 2106 may include permanent displays. For example, the passenger displays may be installed into the automobile architecture (e.g., installed into the dashboard, the backs of seats, etc.). In another embodiment, the passenger displays 2106 may include transportable displays. For example, the passenger displays may include a tablet computer or mobile device and each may be placed in an installed mount on the automobile (e.g., on the dashboard, in the backs of seats, in a roof mount, etc.).

In various embodiments, the mobile device 2002 may be set up to operate in a master-slave relationship with the passenger displays on the automobile. In one embodiment, the mobile device may automatically configure the passenger displays based on predetermined settings (e.g., the screen most in the front of the automobile displays navigation details, screens in the back of the automobile display videos and/or relevant ads and/or content, etc.). Of course, the screens may be configured in any manner based on input from the phone device or tablet computer.

In a further embodiment, if multiple mobile devices or tablet computers are present in an automobile, the mobile devices or tablet computers may apply preconfigured settings wherein only one mobile device may control the automobile system features, and the other mobile devices or tablet computers may remain as slave devices to the one master mobile device. For example, in one embodiment, a parent passenger may wish to control automobile features (e.g., navigation, music, etc.) as well as control what is displayed (e.g., ad and/or content, etc.) on each of the child passenger's display (e.g., on the passenger displays, on another phone device or tablet computer, etc.). The parent passenger's mobile device may be used to control at least some vehicular feature, as well as control other devices and/or displays within a preconfigured proximity range.

In a separate embodiment, if multiple mobile devices or tablet computers are present in an automobile, one or more instructions may be executed. For example, in one embodiment, an instruction on a device associated with a parent may relate to child restrictions. A trigger may include a vehicle control mode and the identification of one or more known devices (e.g., associated with another passenger, associated with a child, etc.). Based on the triggers, an instruction may be run from the device associated with the parent whereby one or more settings (e.g., music control restrictions, volume restriction, dvd content restrictions, etc.) are implemented on each of the other devices in the vehicle. Of course, any instruction relating to any number of devices may be configured and executed.

Figure 22:
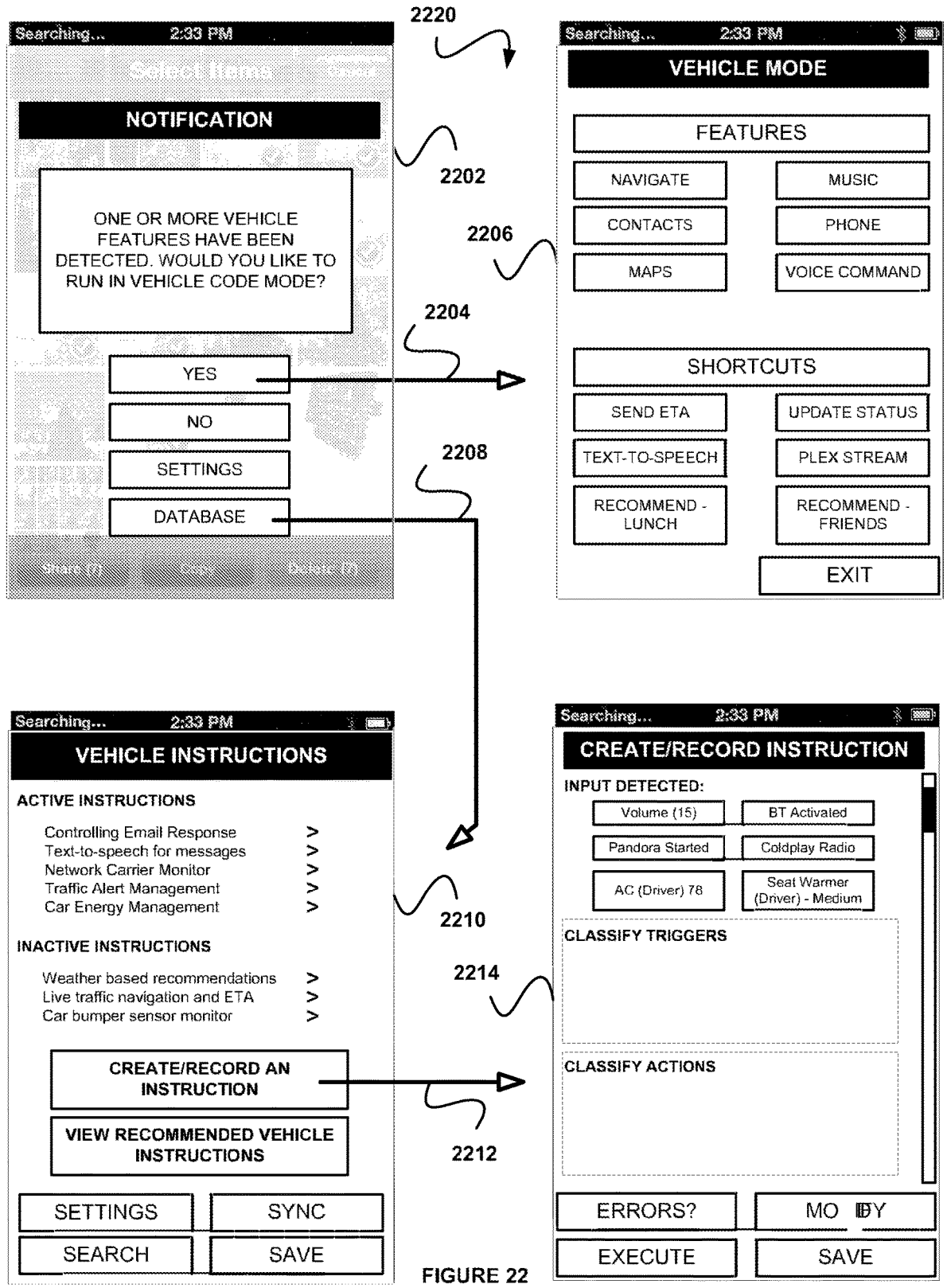
FIG. 22 shows a mobile device interface for interacting with one or more instructions, in accordance with another embodiment.

FIG. 22 shows a mobile device interface 2220 for interacting with one or more instructions, in accordance with one possible embodiment. As an option, the mobile device interface 2200 may be implemented in the context of the architecture and environment of the previous Figures or any subsequent Figure(s). Of course, however, the mobile device interface 2200 may be carried out in any desired environment. It should also be noted that the aforementioned definitions may apply during the present description.

As shown, a notification interface 2202 may be displayed. In one embodiment, the notification interface may relate to a vehicle control mode. For example, the notification may include a text box displaying "One or more vehicle features have been detected. Would you like to run in vehicle control mode?" Of course, in other embodiments, the text box may include any text. In one embodiment, the user may respond by giving a voice command (e.g., "yes," "no," etc.), providing a motion (e.g., motioning up with the device to indicate 'yes,' etc.), selecting an icon and/or button on the device display (e.g., "yes" button, "no" button, etc.), and/or providing any other action to indicate a response. In one embodiment, one or more options may be displayed, including a "yes" button, a "no" button, settings, and/or a database button.

In one embodiment, a "yes" button may be selected 2204, and a vehicle mode interface 2206 may be displayed. In various embodiments, the vehicle mode may include one or more features including the ability to navigate, access music, access contacts, use a phone, access maps, and provide a voice command. Of course, in other embodiments, any feature may be displayed. In one embodiment, most frequently used features may be displayed. In other embodiments, the features may be manually selected by the user, may be inputted based on a recommendation from another contact, and/or managed in some other manner.

In other embodiments, one or more instruction shortcuts may be displayed, including send ETA (e.g., to contacts, to predefined group, etc.), update status (e.g., via Facebook, via Twitter, etc.), provide text-to-speech (e.g., for incoming communication, etc.), plex stream (e.g., provide audio stream from plex server, etc.), recommend lunch (e.g., provide recommendation for lunch based off of preferences and the presence of other contacts near the user, etc.), recommendations from friends (e.g., provide and/or filter recommendations from friends relating to nearby sites and/or locations, etc.), and/or any other instruction which may be saved as a shortcut.

As shown, in one embodiment, a database option may be selected 2208, and a vehicle instruction database interface 2210 may be displayed. In one embodiment, the vehicle instruction database interface may display active instructions, inactive instructions, the ability to create/record an instruction, the ability to view recommended vehicle instructions, and one or more options.

In one embodiment, the active instructions may include any instruction which is currently configured to actively be executed (e.g., in response to one or more triggers, etc.). As an example, in various embodiments, active instructions may include controlling email response, text-to-speech for messages, network carrier monitor, traffic alert management, and/or car energy management. Additionally, in another embodiment, the inactive instructions may include any instruction which is no longer configured to actively be executed (e.g., instruction which has expired, instruction which is no longer valid, instruction which has one or more errors, etc.). As an example, in various embodiments, inactive instructions may include weather based recommendations, live traffic navigation and ETA, and/or car bumper sensor monitor. Of course, any instruction may be designated as active or inactive.

In various embodiments, the user may select any of the active or inactive instructions to view the instruction and/or to modify in some manner the instruction. In another embodiment, an instruction may be created and/or recorded. For example, in one embodiment, a user may select to record an instruction including setting the volume on the car assembly system, setting a driver side air temperature (e.g., air conditioning, heater, etc.), starting Pandora, and selecting a specific radio station to run. After recording the actions, the user may select one or more triggers to trigger the actions, including running the phone in vehicle control mode, and exceeding a time threshold of the mobile device being in the vehicle for longer than 30 seconds. Of course, any input action may be set as a trigger for the instruction.

In other embodiments, the one or more options may include settings, ability to sync, ability to search, and ability to save. In various embodiments, settings may include one or more adjustments (e.g., notifications, audible alerts, display configuration, interaction with vehicle assembly configuration, etc.), vehicle control global settings (e.g., how the mobile device interacts with the vehicle assembly, etc.), and/or any other setting which may relate to the instruction.

In one embodiment, the sync option may include syncing one or more instructions between the user's device and another database, including for example, a database in the cloud (e.g., cloud database, etc.), on a server (e.g., on local network, on external network, etc.), on another device (e.g., secondary device, device associated with a trusted contact, etc.), and/or any other device which may also store one or more instructions. In another embodiment, the search option may include the ability to search among previously used instructions (e.g., inactive instructions, etc.), active instructions, recommended instructions, as well as search potential instructions on an instruction database. In a further embodiment, the save option may include the ability to save the instruction database to more than one location (e.g., on the device, on a separate storage card associated with the device, etc.). Of course, in another embodiment, any option associated with the instruction may be displayed.

As shown, the ability to caret/record an instruction may be selected 2212 and a create/record instruction interface 2214 may be displayed. In various embodiments, the create/record instruction interface may include one or more input actions. For example, in one embodiment, it may have been detected (e.g., via record an instruction, etc.) that user altered the car system volume, activated Bluetooth, started Bluetooth, selected Coldplay radio station, set the AC (driver side) to 78 degrees, set the seat warmer (driver side) to medium. In one embodiment, the user may classify such input actions as a trigger or as an action. In a further embodiment, the user may record additional input actions to be included as a trigger and/or action.

In other embodiments, the user may select one or more possible inputs without recording an action input. For example, in one embodiment, the user may select a trigger or action from a list of possible triggers and/or actions. In another embodiment, the possible triggers and/or actions to be selected may be organized by popularity, category (e.g., business, social media, etc.), application (e.g., vehicle, device integration, etc.), and/or by any other organization feature.

In one embodiment, the ability to check for errors may include verifying device capability (e.g., sufficient resources, applicable apps have been downloaded, vehicle assembly capability, etc.), one or more permissions (e.g., user must have permission to access database X in order to run the instruction, etc.), one or more triggers and/or actions (e.g., verify that the correct order of triggers and/or actions is included, etc.), and/or any other feature which may in some manner check for errors in the instruction. In other embodiments, the ability to modify the instruction may include modifying in some manner the one or more triggers, actions, metadata, and/or settings. In a further embodiment, the user may select to execute the instruction immediately (e.g., run the instruction, etc.), or may select to save the instruction (e.g., active instruction, etc.).

Figure 23:
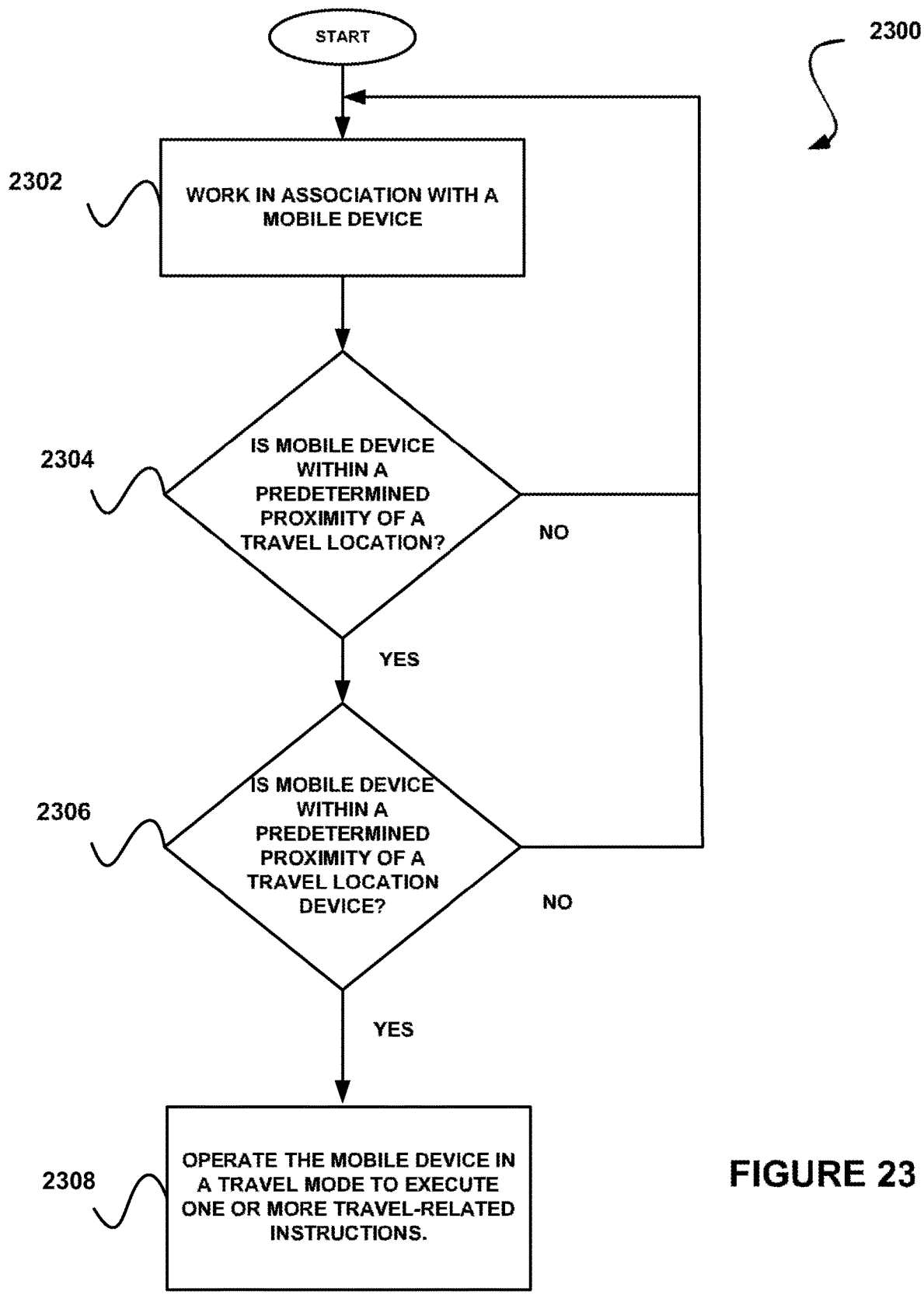
FIG. 23 shows a method for executing one or more instructions with a mobile device in a travel mode, in accordance with another embodiment.

FIG. 23 shows a method 2300 for executing one or more instructions with a mobile device in a travel mode, in accordance with another embodiment. As an option, the method 2300 may be implemented in the context of the architecture and environment of the previous Figures and/or any subsequent Figure(s). Of course, however, the method 2300 may be implemented in the context of any desired environment. It should also be noted that the aforementioned definitions may apply during the present description.

As shown, a computer readable medium works in association with a mobile device. See operation 2302. In one embodiment, the mobile device may include a device with cellular phone capabilities. In another embodiment, the mobile device may include a short-range wireless communication protocol headset, including Wireless USB, Bluetooth, Wi-Fi, or any other wireless protocol which may function at a short-range. In other embodiments, the computer readable medium may include any device capable of communicating via a wireless communication protocol.

Additionally, a computer readable medium determines whether the mobile device is within a predetermined proximity of a travel location. See operation 2304. In one embodiment, the mobile device may be aware of a calendar event involving a travel location and may sense (e.g., via GPS, etc.) when the mobile device is near the travel location. In another embodiment, the mobile device may include context awareness sensors (e.g., location sensors, environment sensors, network sensors, device communication sensors, etc.) to determine that the mobile device is near a travel location.

As an example, in one embodiment, the mobile device may receive a GPS signal indicating the user is near an airport (e.g., or a popular tourist destination site, or a car rental agency, or a hotel, or any travel location, etc.), may sense one or more wireless networks (e.g., via WiFi, etc.) whose identification includes an airport relevant string (e.g., Oakland Airport Wifi, etc.), may identify one or more devices (e.g., baggage scanners, airline check-in, etc.) which may be associated with an airport, and/or detect and/or receive an input indicating an airport context.

In some embodiments, the proximity of a travel location may be set to a specific threshold. For example, the signal strength may be set at a predetermined quality (e.g., HIGH, etc.) before connection is established. In other embodiments, the transmitted signal may only be accessible within a set threshold range (e.g., 3 feet, etc.) around the travel location.

As shown, if it determined that a mobile device is within a predetermined proximity of a travel location, a computer readable medium determines whether the mobile device is within a predetermined proximity of a travel location device. See operation 2306. In one embodiment, the mobile device may detect the presence of a particular device (e.g., located at the travel location, etc.) by receiving a transmitted signal (e.g., RFID, NFC, WiFi, ZigBee, Bluetooth, etc.). In another embodiment, the travel location device may detect the presence of the mobile device. In other embodiments, the computer readable medium may include any device capable of communicating via a wireless communication protocol.

In one embodiment, the determination of whether the mobile device is within a predetermined proximity of a travel location device may be automatic (e.g., an automatic connection established between a device at the travel location and the mobile device, etc.). In other embodiments, the determination may occur manually (e.g., mobile device must be connected to a temporary airport system, a mobile device must receive a wired connection, an "accept connection" screen must be accepted, etc.).

In various embodiment, the determination as to whether the mobile device is within the predetermined proximity of the travel location device may be accomplished by determining whether the mobile device is in communication with the travel location device via a short range wireless communication protocol, by determining whether the mobile device has been manually put in a travel mode, by determining whether the mobile device has been physically coupled to a device at the travel location, and/or by any other method whereby the mobile device is determined to be within a predetermined proximity of the travel location.

Of course, the mobile device may be connected in any manner (e.g., wired or wirelessly, etc.) to the travel location device. Additionally, any number of devices may be connected to the travel location device.

In some embodiments, the determination may include an authentication step. For example, in one embodiment, the mobile device may exchange security tokens with the travel location device as part of determining whether the mobile device is within a predetermined proximity of a travel location. Of course, any cryptography and/or security features may be implemented in determining whether the mobile device is within a predetermined proximity of a travel location.

As shown, if the mobile device is within a predetermined proximity of a travel location device, the mobile device is operated in a travel mode for executing one or more travel-related instructions. See operation 2308. In one embodiment, travel mode may include a collection of properties in association with at least one travel feature. For example, in various embodiments, the properties may include, but are not limited to, user preferences, input options, output options, power conservation policies, processing capacity, access permissions, and/or any other type of setting that may be attributable to a tablet computer or a phone device.

In one embodiment, the travel mode may include static settings. In other embodiments, the travel mode may include dynamic features (e.g., settings based on devices in a predetermined proximity, etc.). In a further embodiment, the travel mode may include more than one sub-mode (e.g., season mode, time of day mode, etc.). For example, switching between modes may be done automatically (e.g., environmental, spatial, temporal, and/or situational triggers, etc.) or manually (e.g., triggered by user input, etc.). In this way, the properties can be tailored to specific use environments and situations, maximizing the functionality and interaction of the tablet computer or phone device and the travel location. Further, in another embodiment, a travel location feature may include any feature associated with a travel location. For example, in various embodiments, the travel location feature may include an audio feature, a video feature, a navigation feature, an augmented reality feature, a social networking feature, a checking-in feature, a points of interest feature, a baggage recovery and/or tracking feature, a travel status update feature, and/or any other feature which may be associated with a travel location.

In one embodiment, the travel mode may be activated automatically. For example, in one embodiment, when the mobile device is within a predetermined proximity of the travel location, an application on the device may be activated to control at least some aspect of the mobile device system (e.g., audio, volume, directions, lighting, emergency services, ticket display, parking spot id, etc.).

In other embodiments, the travel mode may be activated manually. For example, in one embodiment, the mobile device may be placed on a mount at a check-in kiosk, and thereby, activate an application on the device to execute a travel-related instruction (e.g., check-in the passenger, verify the passenger identity, pass through security related requirements, etc.).

In another embodiment, operating the mobile device in a travel mode for may be based upon user input (e.g., hardware switch, GUI input, etc.). In another embodiment, the determination may be based on peripherals geographically near the device. For example, in one embodiment, a travel location display arrangement (e.g., at a kiosk, at a terminal, etc.) may include a wireless database (e.g., flight status information, directions, emergency contact information, etc.), one or more devices to assist travelers (e.g., devices to give recommendations, devices to pass a coupon and/or discount, etc.), and/or any other type of peripheral which may be used at the travel-related location. In one embodiment, upon being brought near any of these peripherals, the mobile device may recognize the peripherals, and based off of the recognition, automatically operate the table computer or phone device in a travel mode.

In some embodiments, operating the mobile device in a travel mode may serve as a trigger for one or more instructions. For example, in one embodiment, an instruction may relate to a travel location check-in system, which may include a travel mode trigger, and the mobile device approaching a check-in kiosk. Based off of these triggers, an instruction may run including activating a travel app, displaying ticket purchase information (e.g., confirmation code, etc.), and/or rejecting all unimportant phone calls while the user is at the kiosk. Of course, any instruction may be configured to run in travel mode.

In a separate embodiment, an instruction may relate to passing through a security screening check point at an airport. The instruction may include one or more triggers including operating in travel mode, sensing one or more travel location devices (e.g., wireless database system, etc.), and coming within a set proximity (e.g., 10 feet, etc.) of a security screening device. In response, the instruction may run one or more actions including displaying identification information (e.g., photo, individual id, current address, etc.), validating a security device (e.g., security token, etc.), prompting the user to accept the security token, and after receiving acceptance, validating identification information from the mobile device. In one embodiment, the mobile device may be used to receive and/or transfer a finger associated with the user of the mobile device. In one embodiment, the request for information (e.g., at a security screening, etc.) may be received from a travel location device. In another embodiment, the mobile device may initiate and/or send information regardless of a request from a travel location device.

Figure 24:
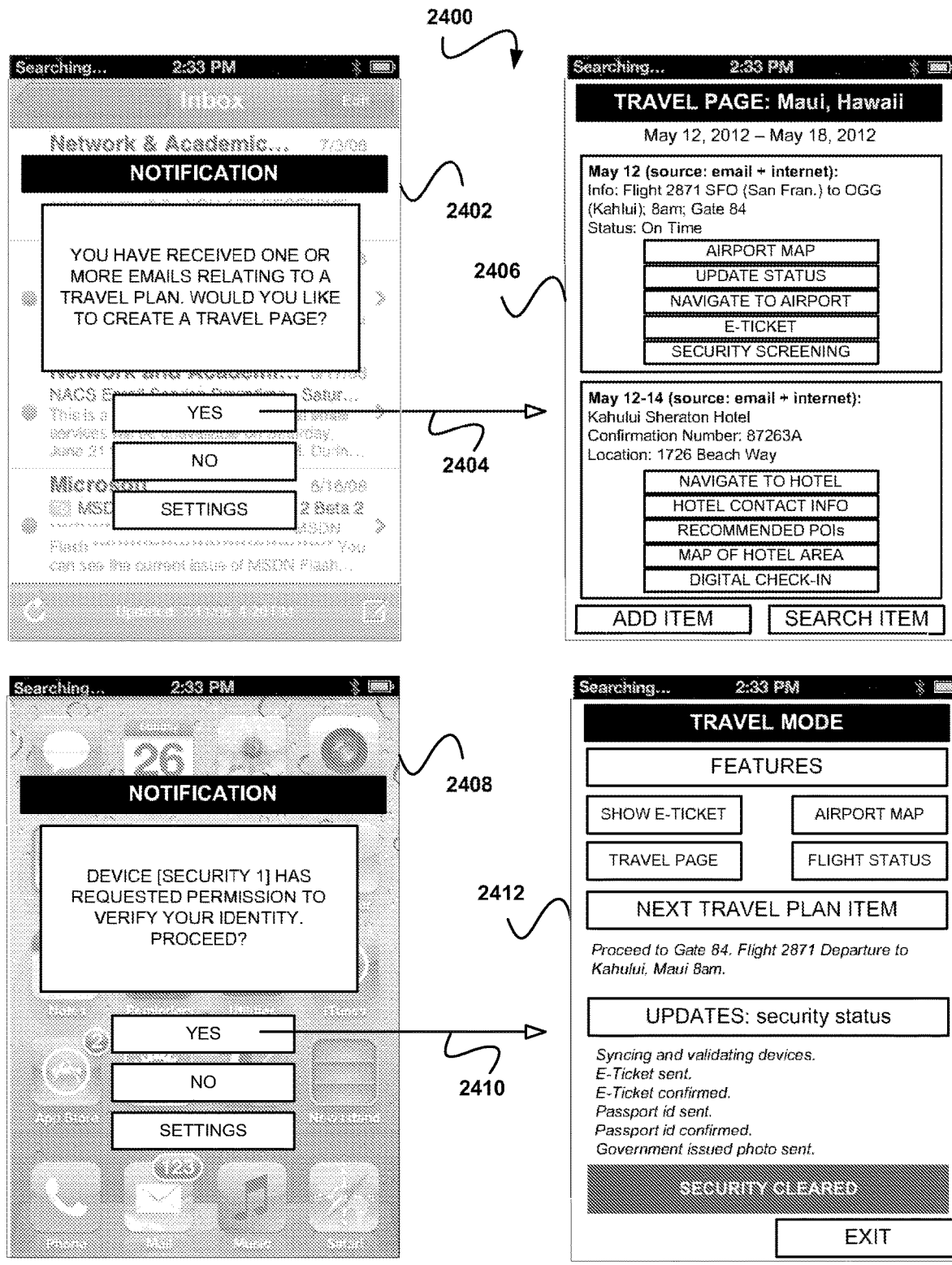
FIG. 24 shows a mobile device interface for interacting with one or more instructions, in accordance with another embodiment.

FIG. 24 shows a mobile device interface 2400 for interacting with one or more instructions, in accordance with one possible embodiment. As an option, the mobile device interface 2400 may be implemented in the context of the architecture and environment of the previous Figures or any subsequent Figure(s). Of course, however, the mobile device interface 2400 may be carried out in any desired environment. It should also be noted that the aforementioned definitions may apply during the present description.

As shown, a notification interface 2402 may be displayed. In one embodiment, the notification interface may relate to a context-aware program. For example, in one embodiment, the notification may display "You have received an email relating to a travel plan. Would you like to create a travel page?" Of course, any notification may be displayed. In various embodiments, an app associated with managing one or more instructions may be used to be context aware (e.g., of input communications such as email or text, of new apps on the device, of device capabilities, etc.). In other embodiments, a device OS platform system, an online (e.g., website, etc.) system, may be used to gather context aware information relating to the user, the mobile device, any app, and/or any other item associated with the user of the mobile device.

In various embodiments, one or more options may be presented to the user, including the ability to indicate "yes," the ability to indicate "no," and/or settings. In one embodiment, settings may relate to the instruction app, the device OS platform system (e.g., which may manage the instructions, etc.), and/or any other system and/or app which may relate to the instruction. In various embodiments, the settings may include global settings (e.g., notifications for all alerts, manner of display, audible alerts, etc.), travel mode (or any mode) specific settings, an instruction specific settings, and/or any other setting associated with the notification and/or instruction.

As shown, in one embodiment, a "yes" option may be selected 2404, and a travel page interface 2406 may be displayed. In one embodiment, the travel page may aggregate information from one or more sources which may relate to the same travel plans. In various embodiments, information may have been received via a text message, a chat message, a telephone voice recording (e.g., voice mail, etc.), browsing history (e.g., user entered in information on a travel related site, etc.), and/or any other source.

For example, in one embodiment, the user may have received an email relating to a flight reservation, and another email relating to a hotel reservation. Based on the receipt of the email, a notification may be displayed requesting if the user would like to create a travel page. If it is desired to create a travel page, a travel page associated with the reservations (e.g., flight reservation, hotel reservation, etc.) may be created. In various embodiments, the travel page may aggregate information (e.g., taken from one or more emails, taken from online sources, etc.), provide one or more information-specific options (e.g., maps, status, ticket information, navigation assistance, etc.), and/or provide any other relevant option and/or ability. In one embodiment, the aggregation may occur based off of one or more similar criteria (e.g., dates, content, destination, activity, etc.).

In one embodiment, the flight reservation and hotel reservation may relate to a similar date and location. For example, in various embodiments, the travel page may display a pane associated with the flight reservation and another pane associated with the hotel reservation. Of course, in other embodiments, the information may be displayed in any manner.

In one embodiment, the pane associated with the flight reservation may include information-specific options, including an airport map, ability to update status (e.g., arrival time of flight, departure gate, etc.), ability to navigate to airport (e.g., in a car, etc.), e-ticket (e.g., confirmation code, digital ticket, etc.), and/or security screening (e.g., information to assist in passing through security, etc.). In another embodiment, the pane associated with the hotel reservation may include information-specific options, including ability to navigate to hotel, hotel contact information, recommended POIs (points of interest, etc.), map of hotel area, and/or ability to digital check-in. Of course, any relevant option associated with the reservation (and/or activity, etc.) may be presented to the user.

In another embodiment, the user of the mobile device may control the manner that the information-specific options are displayed. For example, in one embodiment, the instruction app (or OS platform system, etc.) may automatically determine the most relevant options to be displayed associated with the travel information. In other embodiments, the user may manually select the options (e.g., from a list, etc.) to be displayed associated with the travel information.

In other embodiments, additional information may be collected and displayed on the travel page. For example, in one embodiment, information may be gathered from a reservation email, and additional information relating to the reservation may be gathered from another source (e.g., website, app, etc.). As an example, in one embodiment, an email may be received associated with a flight reservation. Such an email may contain the flight number, the confirmation reservation number, the departure city, the arrival city, and/or other information. Additional information related to the flight reservation may be gathered from the internet, including the departure gate and the status associated with the flight (e.g., on time, delayed, etc.). Further, additional information may relate to the one or more information-specific options. For example, an airport map, ability to navigate to the airport, ability to update status (e.g., on time, delayed, etc.), and/or security screening (e.g., provide information to facilitate security, security-specific app options, identity verification process, etc.) may be gathered, at least in part, from information on the internet and/or from another source (e.g., airport database, secondary device, etc.).

In another embodiment, additional information may be gathered based off of information in an email relating to a hotel reservation. In various embodiments, the hotel reservation email may indicate the dates, location, confirmation number, and/or other reservation relevant information. Additional information may be provided in the form of additional text and/or information-specific options, including ability to navigate to the hotel, recommended points of interest (e.g., from Yelp reviews, etc.), map of the hotel area, and/or ability to digitally check-in. Of course, in other embodiments, any additional information may be displayed and may be gathered from any source (e.g., internet, app, secondary device, etc.).

In a further embodiment, the travel page may include one or more options, including the ability to add an item, search for an item, and/or take any other option associated with the travel page. In one embodiment, an item may include a reservation, an activity (e.g., theater, concert, etc.), a restaurant, a meeting, and/or any other item which may relate in some manner to the travel page. In another embodiment, the ability to search for one or more items may permit the user to find one or more pertinent items (e.g., if the travel page had many items, searching for a particular item may be useful, etc.). In one embodiment, the displayed panes may change according to what would be most pertinent. For example, in one embodiment, the panes may change depending on the time associated with each pane. For example, after a pane's pertinence has expired (e.g., departing flight has been boarded and taken off, etc.), then the next relevant pane (e.g., the next activity and/or event, etc.) may be displayed.

As shown, a notification interface 2408 may be displayed. In one embodiment, the notification interface may relate to another device. For example, in one embodiment, the notification may display "Device [security 1] has requested permission to verify your identity. Proceed?" Of course, any notification may be displayed. In one embodiment, the notification may display information at the request of another device. In another embodiment, the notification may display information at the request of the user's mobile device (e.g., instruction app, any app, OS platform system, etc.).

As an example, in one embodiment, the user may be near a security screening checkpoint. In response to coming within a threshold proximity of a security device (e.g., associated with a security personnel, etc.), a prompt may be displayed on the user's mobile device requesting if it was desired to permit the security personnel's device to verify the user's identity. In various embodiments, one or more security protocols may be implemented to ensure the integrity of the identity validation. In some embodiments, a wired connection, a NFC protocol, and/or any other system may be used to preserve the integrity of the identity validation.

In various embodiments, one or more options may be presented to the user, including the ability to indicate "yes," the ability to indicate "no," and/or settings. In one embodiment, settings may relate to the instruction app, the device OS platform system (e.g., which may manage the instructions, etc.), and/or any other system and/or app which may relate to the instruction. In various embodiments, the settings may include global settings (e.g., notifications for all alerts, manner of display, audible alerts, etc.), travel mode (or any mode) specific settings, an instruction specific settings, and/or any other setting associated with the notification and/or instruction.

As shown, a "yes" option may be selected 2410, and a travel mode interface 2412 may be displayed. In one embodiment, a travel mode interface may include security relevant features (e.g., e-ticket check-in, identity validation, etc.). In other embodiments, a separate security interface may be provided.

In various embodiments, a travel mode interface may include one or more features, a next travel plan item, and/or relevant updates. In one embodiment, one or more features may include show e-ticket, display airport map, display travel page, display flight status, and/or any other feature which may be relevant to the travel mode. Of course, in various embodiments, any feature option may be displayed. In one embodiment, the features options may be automatically displayed according to a relevancy (e.g., based off of most frequently used features, popularity from other users, etc.). In other embodiments, the features options may be manually selected by the user (e.g., by a list of all possible features, etc.).

In another embodiment, the next travel plan item may be displayed, which may include the next scheduled activity, reservation, and/or any item which may be relevant to the travel mode. In one embodiment, the next travel plan item may be taken from a travel page associated with a travel. Of course, in other embodiments, the next travel item may be taken from any source (e.g., online itinerary database, secondary device, etc.).

In one embodiment, relevant updates may relate to a notification, a next travel plan item, an input from another device, and/or any other information which may include an update. As an example, in one embodiment, the update may relate to a notification associated with a request for a security device to verify the user's identity. In response, the update may indicate the status of verifying the user's identity, including syncing and validating the devices, sending an e-ticket, confirming the e-ticket, sending a passport id, confirming the passport id, sending a government issued photo, and/or displaying any other update associated with the security identity validation. In one embodiment, an update result may be displayed below the updates, including, for example, "security cleared," and/or any other update result which may relate in some manner to the one or more updates. In one embodiment, an option to exit the travel mode may be displayed, whereupon if the option is selected, the travel mode may end. Of course, even after the travel mode has been exited, one or more triggers may later activate the travel mode.

Figure 25:
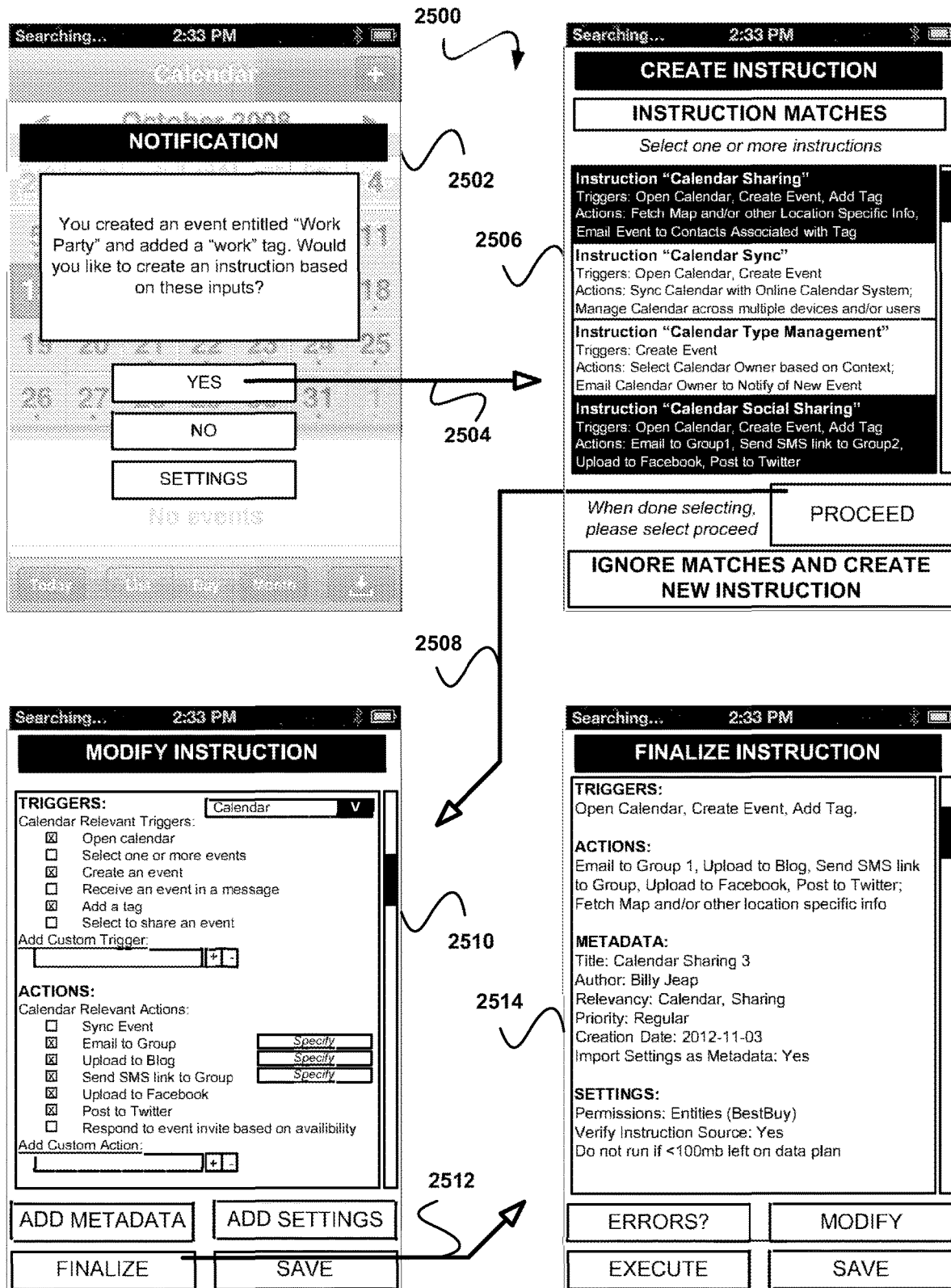
FIG. 25 shows a mobile device interface for interacting with one or more instructions, in accordance with another embodiment.

FIG. 25 shows a mobile device interface 2500 for interacting with one or more instructions, in accordance with one possible embodiment. As an option, the mobile device interface 2500 may be implemented in the context of the architecture and environment of the previous Figures or any subsequent Figure(s). Of course, however, the mobile device interface 2500 may be carried out in any desired environment. It should also be noted that the aforementioned definitions may apply during the present description.

As shown, a notification interface 2502 may be displayed. In one embodiment, the notification interface may relate to an event (e.g., the mobile device and/or an app may be context-aware, etc.). For example, in one embodiment, the notification may display "You created an event entitled 'Work Party' and added a "work" tag. Would you like to create an instruction based on these inputs?" Of course, any notification may be displayed. In various embodiments, an app associated with managing one or more instructions may be used to be context aware (e.g., of app events and/or updates, of input communications such as email or text, of new apps on the device, etc.). In other embodiments, a device OS platform system, an online (e.g., website, etc.) system, may be used to gather context aware information relating to the user, the mobile device, any app, and/or any other item associated with the user of the mobile device.

In various embodiments, one or more options may be presented to the user, including the ability to indicate "yes," the ability to indicate "no," and/or settings. In one embodiment, settings may relate to the instruction app, the device OS platform system (e.g., which may manage the instructions, etc.), and/or any other system and/or app which may relate to the instruction. In various embodiments, the settings may include global settings (e.g., notifications for all alerts, manner of display, audible alerts, etc.), travel mode (or any mode) specific settings, an instruction specific settings, and/or any other setting associated with the notification and/or instruction.

In some embodiments, the instruction app (or OS platform system, another app, etc.) may monitor the input actions to create a possible instruction. For example, creating a calendar event, sending a photo, updating a social networking page, posting a blog post, checking for restaurants with good reviews, receiving an email, traveling to a same location, and/or giving and/or receiving any input action may be used to display a prompt for creating a new instruction. In some embodiments, a threshold requirement (e.g., two times, etc.) on the input actions may be required before a notification prompt is displayed.

As shown, a "yes" option may be selected 2504, and a create instruction interface 2506 may be displayed. In various embodiments, a create instruction interface may display one or more instruction matches. For example, in one embodiment, the instruction matches may relate in some manner to the identified input actions (e.g., to one or more actions given by the user, etc.). In one embodiment, the user may set a threshold relevancy value (e.g., minimum of two same actions, etc.) that must be met in order for a match to be displayed. Based on creating an event and adding a work tag, a possible match may include "Instruction 'Calendar Sharing'; Triggers: Open Calendar, Create Event, Add Tag; Actions: Fetch Map and/or other Location Specific Info; Email Event to Contacts Associated with Tag," "Instruction 'Calendar Sync'; Triggers: Open Calendar, Create Event; Actions: Sync Calendar with Online Calendar System; Manage Calendar across multiple devices and/or users," "Instruction 'Calendar Type Management'; Triggers: Create Event; Actions: Select Calendar Owner based on Context; Email Calendar Owner to Notify of New Event," "Instruction 'Calendar Social Sharing'; Triggers: Open Calendar, Create Event, Add Tag; Actions: Email to Group1, Send SMS link to Group2, Upload to Facebook, Post to Twitter," and/or any other relevant match.

In one embodiment, if a threshold of actions matches an instruction, the instruction may be automatically selected. In another embodiment, if more than one instruction results after the threshold is exceeded, all such results may be presented to the user for selection. Additionally, in one embodiment, more than one instruction match may be selected. For example, the user may be interested in possible actions and/or triggers from more than one instruction match (e.g., sharing features of a match, productivity features of another match, etc.). As such, selecting more than one instruction match may enable the user to add, remove, and/or modify the combined instruction in any manner.

In another embodiment, the user may disregard the instruction matches and select to create a new instruction. Additionally, in one embodiment, a create instruction interface may display by default a new instruction interface rather than one or more instruction matches. Of course, the default view of the create instruction interface may be set and/or configured by the user (e.g., via options, via app settings, via Native Utility Platform, etc.).

After selecting the one or more instruction matches, the "proceed" prompt may be selected 2508, and a modify instruction interface 2510 may be displayed. In various embodiments, the modify instruction interface page may include possible triggers and actions, the ability to add, remove, and/or customize the triggers and/or actions, the ability to specify details (e.g., specify contacts in a group, specify blog details, specify application, etc.) relating to the triggers and/or actions, identify the relevancy (e.g., photo, calendar, contact management, productivity, video, social media, sharing, etc.) of the triggers and/or actions, and/or any other feature which may modify the instruction in some manner.

In one embodiment, actions and/or triggers relating to the selected one or more instructions may be displayed and/or modified. For example, in one embodiment, the relevancy may be automatically set (e.g., based off of the relevancy tag of the one or more instruction matches, etc.), and/or may be set by the user (e.g., via drop down menu, etc.). In another embodiment, upon selection of the relevancy, the triggers and/or actions may change to display a set of relevant triggers and/or actions. After the relevant triggers and/or actions are displayed, items relevant to the selected one or more instruction matches may be pre-selected. Additionally, if an item included with the one or more instruction matches is not included with the relevant triggers and/or actions, it may be added to the list of triggers and/or actions. In a further embodiment, a custom trigger and/or action may be added and/or deleted, including inserting a trigger and/or action not associated with the relevant triggers/actions (e.g., an item associated with productivity, etc.), creating a new trigger and/or action not associated with any previously created trigger and/or action, and/or adding any item not already listed with the relevant triggers and/or actions.

In some embodiments, a calendar relevancy may display calendar relevant triggers, including the ability to open calendar, select one or more events, create an event, receive an event in a message, add a tag, select to share an event, and/or select any other function which may relate to a calendar. Additionally, in another embodiment, a calendar relevancy may display calendar relevant actions, including the ability to sync event, email to group, upload to blog, send SMS link to group, upload to Facebook, post to Twitter, respond to event invite based on availability, and/or select any other action which may relate to a calendar.

In various embodiments, the modify instruction interface may display one or more options, including the option to add metadata, to add settings, to finalize, and/or to save. Of course, any option which may relate to the modify instruction interface and/or to navigating the create instruction interface may be displayed. In one embodiment, saving the instruction may include storing the instruction in a local cache on the mobile device, on an online server and/or database, on a local database, and/or on any other device and/or storage hardware. In one embodiment, at the time of saving the instruction, a backup copy of the instruction may be saved in another location. Additionally, in another embodiment, saving the instruction may include sending and/or posting the instruction to an instruction database site to be shared with other users.

As shown, a finalize option may be selected 2512 and a finalize instruction interface may be displayed 2514. In one embodiment, the finalize instruction interface may display all triggers, actions, metadata, settings, and/or any further information which may relate in some manner to the created instruction. In one embodiment, the user may select an errors option to verify if there are any errors associated with the instruction (e.g., inconsistent rules, inadequate permissions, etc.) and/or any errors associated with executing the instruction (e.g., with respect to other instructions, with respect to system resources, with respect to other applications, etc.).

In another embodiment, a modify option may be selected to modify the selected triggers, actions, metadata, and/or settings. In one embodiment, an execute option may be selected to immediately execute (e.g., run, etc.) the created instruction. Further, in another embodiment, the instruction may be saved, including storing the instruction in a local cache on the mobile device, on an online server and/or database, on a local database, and/or on any other device and/or storage hardware. In one embodiment, at the time of saving the instruction, a backup copy of the instruction may be saved in another location. Additionally, in another embodiment, saving the instruction may include sending and/or posting the instruction to an instruction database site to be shared with other users.

Figure 26:
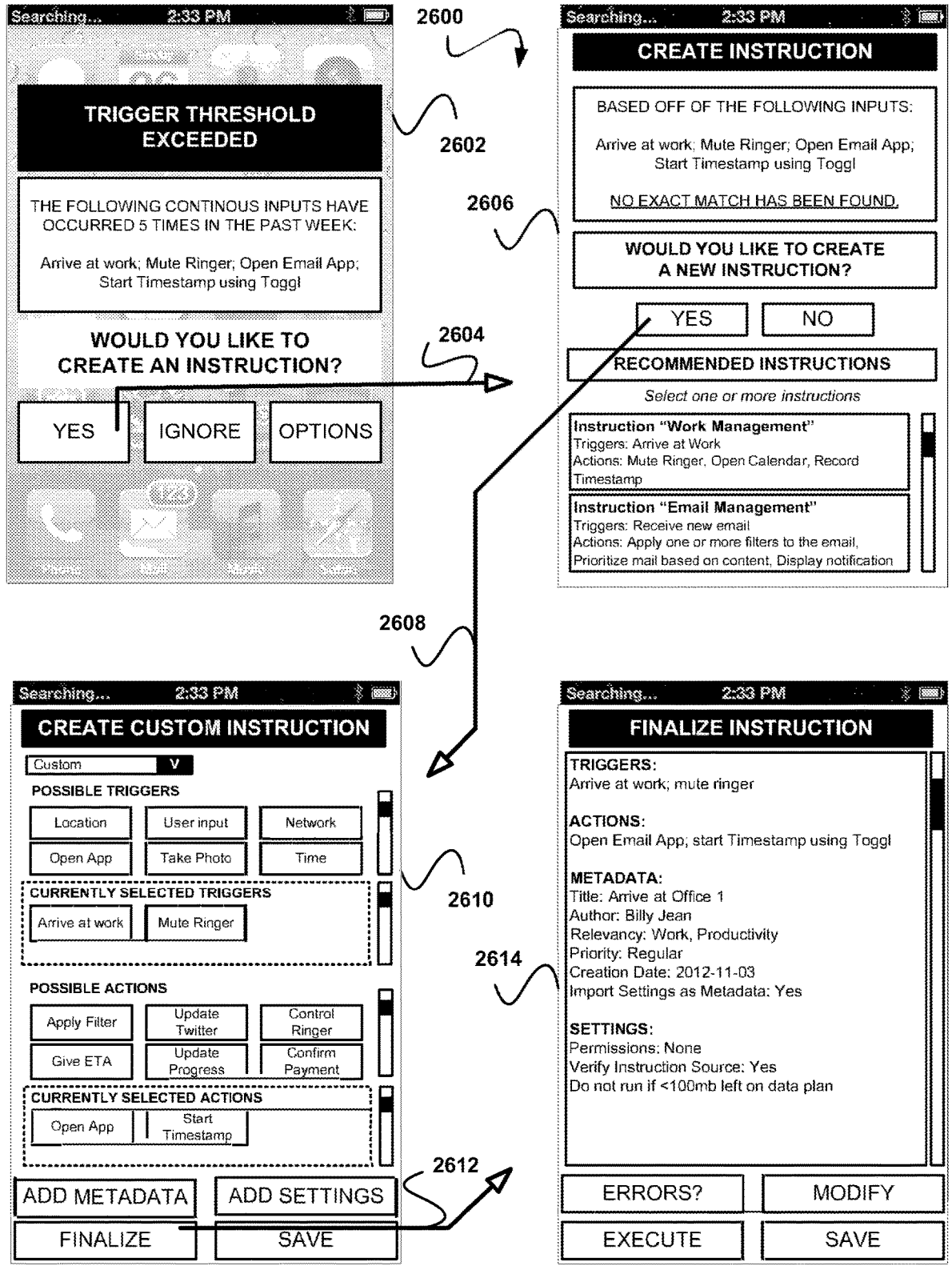
FIG. 26 shows a mobile device interface for interacting with one or more instructions, in accordance with another embodiment.

FIG. 26 shows a mobile device interface 2600 for interacting with one or more instructions, in accordance with one possible embodiment. As an option, the mobile device interface 2600 may be implemented in the context of the architecture and environment of the previous Figures or any subsequent Figure(s). Of course, however, the mobile device interface 2600 may be carried out in any desired environment. It should also be noted that the aforementioned definitions may apply during the present description.

In one embodiment, a notification interface 2602 may be displayed. In one embodiment, the notification interface may relate to exceeding a trigger threshold. For example, in various embodiments, the trigger threshold may relate to receiving a set of continuous action inputs repeatedly (e.g., five times, etc.) in a given time period (e.g., week, month, etc.). In one embodiment, the action inputs and trigger threshold may be monitored by the instruction app. However, in other embodiments, an instruction database (e.g., associated with an online system, associated with the mobile device, etc.), another app, an OS/Platform native utility system, and/or any other software system may monitor the action inputs and trigger threshold.

As an example, in one embodiment, a trigger threshold notification may display "The following continuous inputs have occurred 5 times in the past week: arrive at work, mute ringer, open email app, start timestamp using Toggl." A prompt may also be displayed "Would you like to create an instruction."

In various embodiments, the trigger threshold may be based off a behavioral context. For example, in some embodiments, a behavioral context may include monitoring keystrokes, motions, destinations, and/or any other input which may provide a context to the behavior of the user. As an example, in one embodiment, a user may have repeatedly in the past performed a set of input actions (e.g., but not sufficient to trigger a threshold, etc.). Based off of the past input actions, the instruction app (or whatever system is monitoring the input actions) may prompt the user if the user would like the device to finish a combination of keystrokes, motions, and/or any other input the user would normally give. In this manner, the device may learn from the user and recommend instructions based off of past usage and/or actions. Additionally, in learning from the user, the device may assist in increasing the efficiency (e.g., decreasing the actions taken by the user, etc.) of the user. Of course, the behavioral context may monitor any action and/or may be restricted as desired by the user.

In some embodiments, one or more options associated with the notification interface may include a "yes" button, an "ignore" button, and an "options" button. In some embodiments, selecting ignore will cause the notification to exit. In other embodiments, selecting ignore may also cause any future related notifications to not be displayed. In one embodiments, selecting options may include adjusting one or more settings (e.g., adjust threshold, notification display, audible alerts, etc.) relating to a trigger threshold. In some embodiments, the options may relate globally to an instruction app. In other embodiments, the options may relate specifically to the displayed notification.

As shown, a "yes" button may be selected 2604, and a create instruction interface 2606 may be displayed. In one embodiment, the detected action inputs may be displayed. In some embodiments, one or more matches (e.g., based on the action inputs, etc.) may be displayed. In one embodiment, an exact match (e.g., using all of the action inputs, etc.) may not be found. In another embodiment, one or more recommended instructions may be displayed which may relate in some manner to at least one of the input actions. For example, in one embodiment, an exact match to the action inputs (e.g., arrive at work, mute ringer, open email app, start timestamp using Toggl, etc.) may not be found, but a recommended instruction may be found, including "Instruction 'Work Management'; Triggers: Arrive at Work; Actions: Mute Ringer, Open Calendar, Record Timestamp," "Instruction 'Email Management'; Triggers: Receive new email; Actions: Apply one or more filters to the email, Prioritize mail based on content, Display notification," and/or display any other instruction which may relate in some manner to the input actions.

As shown, a "yes" option may be selected 2608, and a create custom instruction interface 2610 may be displayed. In various embodiments, the create custom instruction interface may include a relevancy drop-down box (e.g., photo, calendar, business, social networking, etc.), one or more possible triggers, currently selected triggers, one or more possible actions, currently selected actions, and/or options associated with the custom instruction interface including add metadata, add settings, finalize, and/or save. Of course, any feature and/or item may be displayed on the create custom instruction interface.

In one embodiment, the possible triggers may include location, user input, network, open app, take photo, time, and/or any other trigger. In another embodiment, the possible actions may include apply filter, update twitter, control ringer, give ETA, update progress, confirm payment and/or any other action. In one embodiment, possible triggers and/or actions may be dragged and dropped to the currently selected triggers pane and/or currently selected actions pane, respectively. In other embodiments, the possible triggers and/or actions may be displayed as a list of selectable options (e.g., a user may star and/or select in some manner desired triggers and/or actions, etc.), as a dropdown menu of possibilities, and/or in any other manner.

In one embodiment, an add metadata option may provide an interface which includes the ability to insert an instruction title, an author, a location/geotag, a tag (e.g., data content, application content, etc.), a relevancy (e.g., photo, sharing, etc.), applicable apps (e.g., apps which may relate and/or may be included in the instruction, etc.), priority (e.g., high, regular, low, priority with respect to other instructions being executed, etc.), creation date, the ability to import instruction settings as metadata (e.g., settings are also imported as metadata values associated with the instruction, etc.), and/or any other value which may relate to metadata.

Additionally, an add settings option may provide an interface which includes global settings, such as permissions (e.g., associated with device, contacts, entities, locations, etc.), ability to verify the instruction source (e.g., in the instance where an instruction is sent from another contact and/or device to the user's mobile device, etc.), restrictions where the instruction will not run if there is less than 100 mb left on the data plan, will not run on the carrier network if the data exceeds 500 mb, will not run if the battery is less than a set amount, and/or any other feature which may relate globally to the instruction and/or the application managing instructions. Of course, in another embodiment, any global setting may be modified on an individual instruction by instruction basis.

In various embodiments, the add settings interface may also include instruction specific settings, including permissible run time (e.g., morning, night, 6 am-6 pm daily, Monday-Friday, etc.), permissible run locations (e.g., based off of device location, etc.), permissible run friends (e.g., instruction may be run when a device and/or contact is near, instruction may be prevented to be run when a device and/or contact is near, etc.), automatic settings (e.g., configure user's mobile device based on triggers, actions, and/or settings, etc.), settings associated with controlling the user's mobile device (e.g., set volume, set screen brightness, set power mode, etc.), and/or any other settings which may relate in some manner to the instruction. In another embodiment, a user may download and/or select a set of predefined settings (e.g., included in the instruction file, etc.), and/or may input all settings relating to the instruction.

As shown, a finalize option may be selected 2612 and a finalize instruction interface may be displayed 2614. In one embodiment, the finalize instruction interface may display all triggers, actions, metadata, settings, and/or any further information which may relate in some manner to the created instruction. In one embodiment, the user may select an errors option to verify if there are any errors associated with the instruction (e.g., inconsistent rules, inadequate permissions, etc.) and/or any errors associated with executing the instruction (e.g., with respect to other instructions, with respect to system resources, with respect to other applications, etc.).

In another embodiment, a modify option may be selected to modify the selected triggers, actions, metadata, and/or settings. In one embodiment, an execute option may be selected to immediately execute (e.g., run, etc.) the created instruction. Further, in another embodiment, the instruction may be saved, including storing the instruction in a local cache on the mobile device, on an online server and/or database, on a local database, and/or on any other device and/or storage hardware. In one embodiment, at the time of saving the instruction, a backup copy of the instruction may be saved in another location. Additionally, in another embodiment, saving the instruction may include sending and/or posting the instruction to an instruction database site to be shared with other users.

Figure 27:
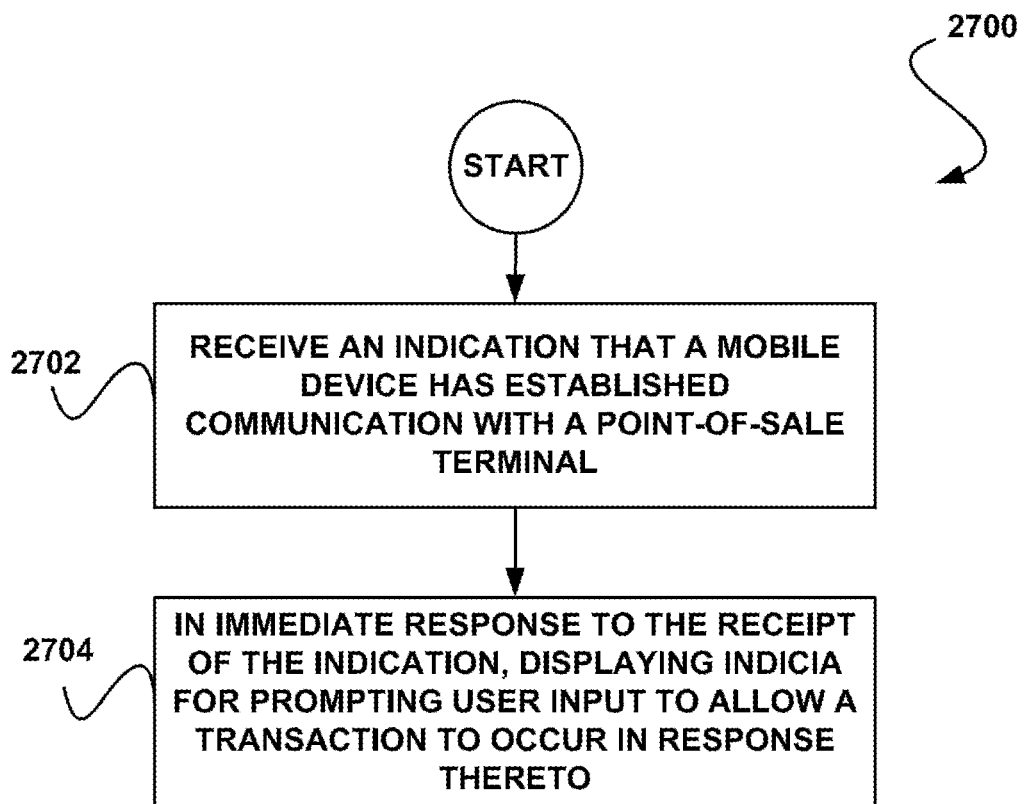
FIG. 27 shows a method for a mobile device transaction, in accordance with one embodiment.

FIG. 27 shows a method 2700 for a mobile device transaction, in accordance with one embodiment. As an option, the method 2700 may be implemented in the context of the architecture and environment of the previous Figures and/or any subsequent Figure(s). Of course, however, the method 2700 may be carried out in any desired environment.

As shown, an indication is received that a mobile device has established communication with a point-of-sale terminal. See operation 2702. Further, in immediate response to the receipt of the indication, indicia is displayed for prompting user input to allow a transaction to occur in response thereto. See operation 2704.

In the context of the present description, a point-of-sale terminal refers to any terminal capable of facilitating a sale between entities. For example, in one embodiment, the point-of-sale terminal may include a point-of-sale terminal located a retailer location (e.g., a department store, a grocery store, a restaurant, a service center, a fueling station, etc.). As an option, the point-of-sale terminal may or may not be equipped with a cash register, inventory management system, etc.

The mobile device may include any type of mobile device. For example, in various embodiments, the mobile device may include a mobile phone, a tablet computer, an e-reader, a PDA, a handheld computer, a media device (e.g., a digital music player, a digital video player, etc.), and/or any other type of device that is mobile, for that matter.

The communication between the mobile device and the point-of-sale terminal may include various types of communication. For example, in one embodiment, the communication may be established utilizing near field communication (NFC). In another embodiment, the communication may be established utilizing Wi-Fi functionality (e.g., Wi-Fi direct, etc.). In another embodiment, the communication may be established utilizing Bluetooth functionality. In another embodiment, the communication may be established utilizing bump technology (e.g., direct contact, etc.). For example, in one embodiment, such bump technology may or may not include one or more of the features set forth in U.S. Application Publication No.: US2011/0191823A1 filed Feb. 3, 2010, which is incorporated herein by reference for all purposes. In still yet another embodiment, the communication may be established via the Internet (e.g., via a cellular network, Wi-Fi network, etc.).

The indication may be received in a various ways. For example, in one embodiment, the indication may be received based on a physical contact between the mobile device and the point-of-sale terminal. In this case, in one embodiment, the physical contact may be detected utilizing bump technology. In another embodiment, the indication may be received in response to an exchange of information via any of the aforementioned communication techniques (e.g., Wi-Fi, cellular, Internet, etc.).

For instance, in one possible embodiment, a service (administered, for example, by an application on the mobile phone and software at the point-of-sale) may determine that a first dynamic location of the mobile device being determined to be the same (or within a predetermined distance) as a second predetermined location of the point-of-sale terminal. Upon such determination, the service may send an indication signal to the mobile device (e.g., via the application).

In one embodiment, in connection with the indication, transaction information may or may not be received by the mobile device from the point-of-sale terminal. Additionally, in one embodiment, such transaction information may be displayed simultaneously with the indicia. The transaction information may include any information associated with a transaction. For example, in various embodiments, the transaction information may include a price, credit card information, loyalty information, product information, store information, time information, location information, discount information, method of purchase information, and/or any other type of transaction-related information.

Further, the indicia displayed for prompting user input to allow the transaction to occur may include any type of indicia capable of prompting the aforementioned user input. For example, in one embodiment, the indicia may include an accept icon. The accept icon may include any icon indicating acceptance of the transaction. For example, in one embodiment, the accept icon may include an icon with the word "Accept." In another embodiment, the accept icon may include a thumbs-up icon. In another embodiment, the accept icon may include an "OK" indicator. In another embodiment, the accept icon may include a "YES" indicator. In another embodiment, the accept icon may include a "Purchase" indicator. In another embodiment, the accept icon may include a transaction price indicator, capable of being selected to indicate acceptance. In another embodiment, the accept icon may include a button. In another embodiment, the accept icon may include a slider.

Additionally, in one embodiment, the indicia may include a password entry menu. For example, a keyboard may be presented to a user of the mobile device, along with an entry portion. As an option, the password entry may be displayed in response to a slide gesture in connection with a slider icon.

In another embodiment, the indicia may include fingerprint scanner indicia. For example, in one embodiment, an indicator (and/or text) to scan a fingerprint may be displayed on the screen of the mobile device. In another embodiment, an area to scan a fingerprint may be displayed on at least a portion of a screen of the mobile device. In one embodiment, the user may be prompted to capture an image of a fingerprint, for analysis.

In another embodiment, the indicia may include facial recognition indicia. For example, in one embodiment, an indicator (and/or text) to scan or present a face may be displayed on the screen of the mobile device. In another embodiment, a button or icon to capture a face may be displayed on at least a portion of a screen of the mobile device.

In another embodiment, the indication may be capable of being received while a screen-lock graphical user interface is being displayed by the mobile device. For example, in one embodiment, the user may be required to enter a password/ passcode to access some or most functionally associated with the mobile device. In this case, in one embodiment, the screen-lock graphical user interface may be displayed, and the indication may be capable of being received and/or the indicia may be capable of displayed on the screen-lock graphical user interface. In one embodiment, the indicia may be capable of being displayed on a portion of the screen-lock graphical user interface (e.g., between an upper time and/or date indicia and lower screen-lock graphical user interface functionality in the form of a slider bar and/or password entry interface, etc.).

In another embodiment, the indication may be capable of being received while the mobile device is in a standby mode. In one embodiment, the standby mode may include displaying a standby screen on the mobile device. In another embodiment, the standby mode may include the display (e.g., backlight, etc.) of the mobile device being powered off. In this case, in one embodiment, the indication may cause the automatic powering of the display screen (e.g., backlight, etc.), in addition to the display of the indication. In such embodiment, after the display screen is powered on, the indication may or may not be displayed in connection with a screen-lock graphical user interface (as set forth in the previous embodiment).

In yet another embodiment, the indicia may be displayed utilizing a transaction application installed on the mobile device. For example, in one embodiment, a mobile wallet application may be installed on the mobile device. In this case, in one embodiment, the mobile wallet application or an application associated therewith may be utilized to display the indicia.

In another embodiment, the indicia may be displayed utilizing a transaction application installed on the mobile device, that is automatically executed in immediate response to the receipt of an indication that the mobile device has established a first communication with the point-of-sale terminal via a first communication protocol other than a second communication protocol associated with the established communication that allows the transaction to occur.

The communication protocols may include any type of protocol. For example, in one embodiment, the first communication protocol may include a Wi-Fi or Bluetooth communication protocol and the second communication protocol may include a near field communication protocol. In another embodiment, the first communication protocol and/or the second communication protocol may include a cellular, Internet, Wi-Fi, Bluetooth, and/or a near field communication protocol.

In another embodiment, pre-transaction functionality may be provided by the transaction application. In various embodiments, the pre-transaction functionality may include advertising, suggestion-related functionality, location-related functionality (e.g., store location related functionality, product-related functionality, etc.), point-of-sale terminal-related functionality, and/or loyalty-related functionality, etc. In one embodiment, the pre-transaction functionality may be utilized to initiate a transaction.

In one embodiment, it may be desired that the pre-transaction functionality occur before reaching a point-of-sale termination. Thus, in one possible embodiment, a service (administered, for example, by an application on the mobile phone and software at the point-of-sale terminal) may determine that a first dynamic location of the mobile device being within a predetermined distance (e.g., a few feet, yards, within a radius, within a building/retail location perimeter, etc.) of a second predetermined location of the point-of-sale terminal. Upon such determination, the service may send an indication signal to the mobile device (e.g., via the application) to initiate or otherwise cause the pre-transaction functionality.

Additionally, in one embodiment, the indication may be received based on a physical contact between the mobile device and the point-of-sale terminal. In one embodiment, the physical contact may include physical contact with a designated portion of the mobile device and/or the point-of-sale terminal. In another embodiment, the indication may be received based on close physical proximity between the mobile device and the point-of-sale terminal. Further, in one embodiment, the physical contact may be detected utilizing bump technology.

The transaction information may be received from a variety of devices. For example, in one embodiment, the transaction information may be received by the mobile device from the point-of-sale terminal. In another embodiment, the transaction information may be received by the mobile device from a network server. In another embodiment, the transaction information may be received by the mobile device from a payment provider service or server.

In one embodiment, the transaction information may be displayed simultaneously with the indicia. For example, in various embodiments, a price, credit card information, and/or loyalty information may be displayed simultaneously with an accept icon, a password entry menu, a fingerprint scanner indicia, and/or a facial recognition indicia. Further, in one embodiment, the indicia may be displayed utilizing a transaction application installed on the mobile device, which may be automatically executed in immediate response to the receipt of the indication. In various embodiments, the transaction application may include a mobile payment application, a mobile wallet application, a credit card application, and/or various other transaction-related applications.

In another embodiment, the indicia may be displayed utilizing a transaction application installed on the mobile device that provides post-transaction functionality. In various embodiments, the post-transaction functionality may include at least of advertising, loyalty-related functionality, return visit-related functionality, and/or suggestion-related information. Of course, embodiments are contemplated whereby the post-transaction functionality is provided without a transaction application (e.g., via a web-service, browser, etc.).

The user input prompted by the indicia may include various user input. For example, in various embodiments, the user input that is prompted may be in direct connection with the indicia (e.g., touch the icon displayed with a touchscreen, etc.) and/or may be indirectly connected (e.g., indicia prompting user input via a mechanical button, voice input, etc. and/or other input not based on the touch screen, etc.). In one embodiment, the indicia may instruct the user to provide a specific input. For example, in one embodiment, the indicia may include text instructions. Further, in various embodiments, the user input may include a finger swipe, a finger depression, an image of the user (e.g., for the purposes of facial recognition, etc.), voice input, text input, and/or various other user input.

In one embodiment, the indicia may be displayed in immediate response to the receipt of the indication, by displaying the indicia without any intermediate graphical user interfaces. For example, in one embodiment, upon a mobile device establishing communication with the point-of-sale terminal, the indicia for prompting the user input may be automatically and immediately displayed on a screen of the mobile device. In one embodiment, the indicia for prompting the user input may be automatically and immediately displayed on a screen of the mobile device only if a potential transaction is available (e.g., if there are item in a digital shopping cart, if there are items in a physical shopping cart, etc.).

Further, in one embodiment, the transaction may be immediately allowed to occur in response to the receipt of the user input. In one embodiment, the transaction may be immediately allowed to occur in response to the receipt of the user input, by allowing the transaction to occur without any additional graphical user interfaces.

In one embodiment, the mobile device and/or the point-of-sale terminal may include transaction-related functionality. In various embodiments, the transaction-related functionality may include pre-transaction functionality, a transaction, and/or post-transaction functionality. It should be noted that the aforementioned pre-transaction, transaction, and/or post-transaction functionality may or may not include any of the techniques disclosed during the description of any of the figures herein. Further, in one embodiment, the transaction-related functionality may be provided by a transaction application installed on the mobile device.

Still yet, in one embodiment, the point-of-sale terminal may be associated with (e.g., in communication with, etc.) one or more service providers (e.g., advertisers, social network systems, retailers, etc.). Additionally, in one embodiment, the point-of-sale terminal and/or the mobile device may be in communication with a system capable of storing profile information associated with members of a service network, storing advertisement trigger information associated with advertisements of an advertiser, and/or for causing presentation of at least one of the advertisements outside of the service network, based on the profile information and the advertisement trigger information. Of course, any description herein of such presentation of one or more advertisements outside of the service network (and any related functionality disclosed herein) may be implemented without involving a point-of-sale terminal.

In various embodiments, the service network may include at least one of a social network, an e-commerce network, an e-wallet network, or a search network, etc. Further, the profile information may include any type of profile information. For example, in one embodiment, the profile information may include interest information and/or demographic information.

Of course, in various embodiments, the profile information may include any type of information, such as browsing history, social network information, a gender, an age, a birth date, an astrological sign, a nationality, a religion, a political affiliation (e.g., Democrat, Republican, etc.), a height, a weight, a hair color, an eye color, an ethnicity, a living address (e.g., a home address, etc.), a work address, an occupation (e.g., student, engineer, barista, unemployed, etc.), a sexual preference, an education level (e.g., a high school education, a college education, a postgraduate degree, etc.), a birth place, a school attended (e.g., an elementary school attended, a middle school attended, a high school attended, a college attended, etc.), an area once lived (e.g., during adolescence, after high school, during adult years, etc.), a relationship status (e.g., single, married, significant other, etc.), a family status (e.g., living parents, divorced parents, estranged from parents, etc.), a number of siblings, an income level, a car status (e.g., a car model, a car make, a car year, a car price, etc.), a number of children, hobbies (e.g., reading, running, volunteering, biking, golf, climbing, etc.), exercise habits (e.g., number of hours/minutes a week, number of times a month, type of exercise preferred, etc.), a number of pets owned, a type of pets owned (e.g., dogs, cats, fish, gerbils, etc.), food preferences (e.g., vegetarian, vegan, mainly meat, Chinese cuisine, Mexican cuisine, etc.), drinking habits (e.g., daily, weekly, monthly, etc.), eating habits (e.g., eat in, dine out, snacks, meals, etc.), TV watching preferences (e.g., types of preferred shows, number of hours/minutes per day/week, etc.), movie watching preferences (e.g., types of preferred movies, number of movies per day/week/month, etc.), music preferences (e.g., preferred genre, preferred artist, etc.), sleeping preferences (e.g., the number of hours of sleep preferred, the preferred bed time/rise time, etc.), moods (e.g., generally a good mood, generally a bad mood, etc.), feelings (e.g., generally happy, generally sad, generally angry, etc.), desires (e.g., goals, wishes, etc.), and/or any other personal information.

In various embodiments, the personal information may include permanent personal information (e.g., physical traits, history, etc.), temporal personal information (e.g., what the user is doing/feeling/experiencing now or within a predetermined window of time, etc.), and/or future goal-oriented personal information (e.g., wants, desires, etc.).

In one optional embodiment, the personal information may be received in association with a social networking site that allows users to define themselves in a profile (e.g., which may include any one or more of the personal information parameters disclosed hereinabove and/or herein below, etc.); associate themselves with others (e.g., friends, colleagues, other groups, etc.) by connecting to each other; and/or engage in activities (e.g., using applications such as games, reviewing content, sharing content (e.g., interests, thoughts, questions, media, etc.), etc.

In such embodiment, the personal information may be received from a social networking profile of the user associated with a social networking site. Further, the personal information may include any entities (e.g., people, groups, institutions, products, etc.) to which the user is associated (e.g., connected, subscribed, linked) during use of the social networking site. Such associations may also be extended to "associations-of-associations" (e.g., friends of friends, etc.). Even still, tracking such associations as personal information may be extended to a threshold number (e.g., 1, 2, 3, 4, 5, etc.) of degrees-of-separation. As a further option, the personal information may be received based on any of the aforementioned activity of the user in connection with the social networking site. In such example, any profiling metadata collected based on the activity of the user may be utilized as the personal information.

One optional embodiment is contemplated wherein an on-line application associated with the social networking site may collect and/or use the aforementioned social networking site-related personal information in connection with any of the functionality disclosed hereinabove and/or herein below. Of course, such social networking site-related on-line application may do so by itself and/or in connection with other one or more social networking site-related on-line application(s) or separate/independent site-related on-line application(s).

In one embodiment, a pre-existing social networking site may be leveraged to accomplish any one or more of the operations disclosed herein. With that said, any site that collects any of the personal information disclosed herein may optionally be used in lieu of or in combination with the aforementioned social networking site. For example, an e-commerce site (e.g., product supply website, etc.) that collects profile information, etc. may be utilized in a similar manner.

More information regarding leveraging service providers to collect information may be found in U.S. Provisional Patent Application No. 61/563,741, filed Nov. 25, 2011, titled "SYSTEM, METHOD, AND COMPUTER PROGRAM PRODUCT FOR PRESENTING DECISION RELATED INFORMATION;" and U.S. Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER," which are incorporated herein by reference in their entirety.

Further, in one embodiment, targeted advertisements may be presented to the user on the mobile device, based on any user information. In one embodiment, the advertisement may be presented outside of the service network. In this case, in one embodiment, the presentation of the advertisement outside of the service network may be accomplished by the service network transmitting a signal outside the service network.

Further, in one embodiment, the signal may be time-stamped. Additionally, in one embodiment, the presentation of the at least one advertisement outside of the service network may be accomplished by the service network transmitting the advertisement outside the service network. In one embodiment, a format of the advertisement may be based on presentation medium specification information. For example, in one embodiment, the advertisement may be formatted to present on the mobile device. In another embodiment, the advertisement may be formatted to be presented on a display associated with the point-of-sale terminal. In another embodiment, the advertisement may be formatted to be displayed on a billboard and/or an in store display. In still another embodiment, the advertisement may be displayed via a television.

Additionally, in one embodiment, the at least one advertisement may be time-stamped. In one embodiment, the time stamp me be utilized to determine a duration in which the advertisement is to be displayed. In another embodiment, the time stamp may be utilized to determine a time in which the advertisement is to expire.

Further, in one embodiment, the advertisement may be presented via a server in communication with a plurality of presentation mediums, where the server is operable to cooperate with the server network. In another embodiment, the advertisement may be presented via at least one of a plurality of presentation mediums each with client code operable to cooperate with the server network. In various embodiments, the advertisement may be presented by the advertiser or a party separate from the service network and the advertiser.

Additionally, in one embodiment, the advertisement may be presented based on location information associated with members of the service network. In one embodiment, the location information may be determined by the service network. In various embodiments, the location information may be determined utilizing GPS, Wi-Fi, an IP address, and/or various other techniques (e.g., manual indication by the member(s), etc.). Furthermore, in various embodiments, the service network may include any number of service networks, such as a social network, an e-commerce network, an e-wallet network, and/or a search network, etc.

More illustrative information will now be set forth regarding various optional architectures and features with which the foregoing techniques discussed in the context of any of the present or previous figure(s) may or may not be implemented, per the desires of the user. For instance, various optional examples and/or options associated with the communication/indication of operation 2702, the transaction/indicia of operation 2704, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 28:
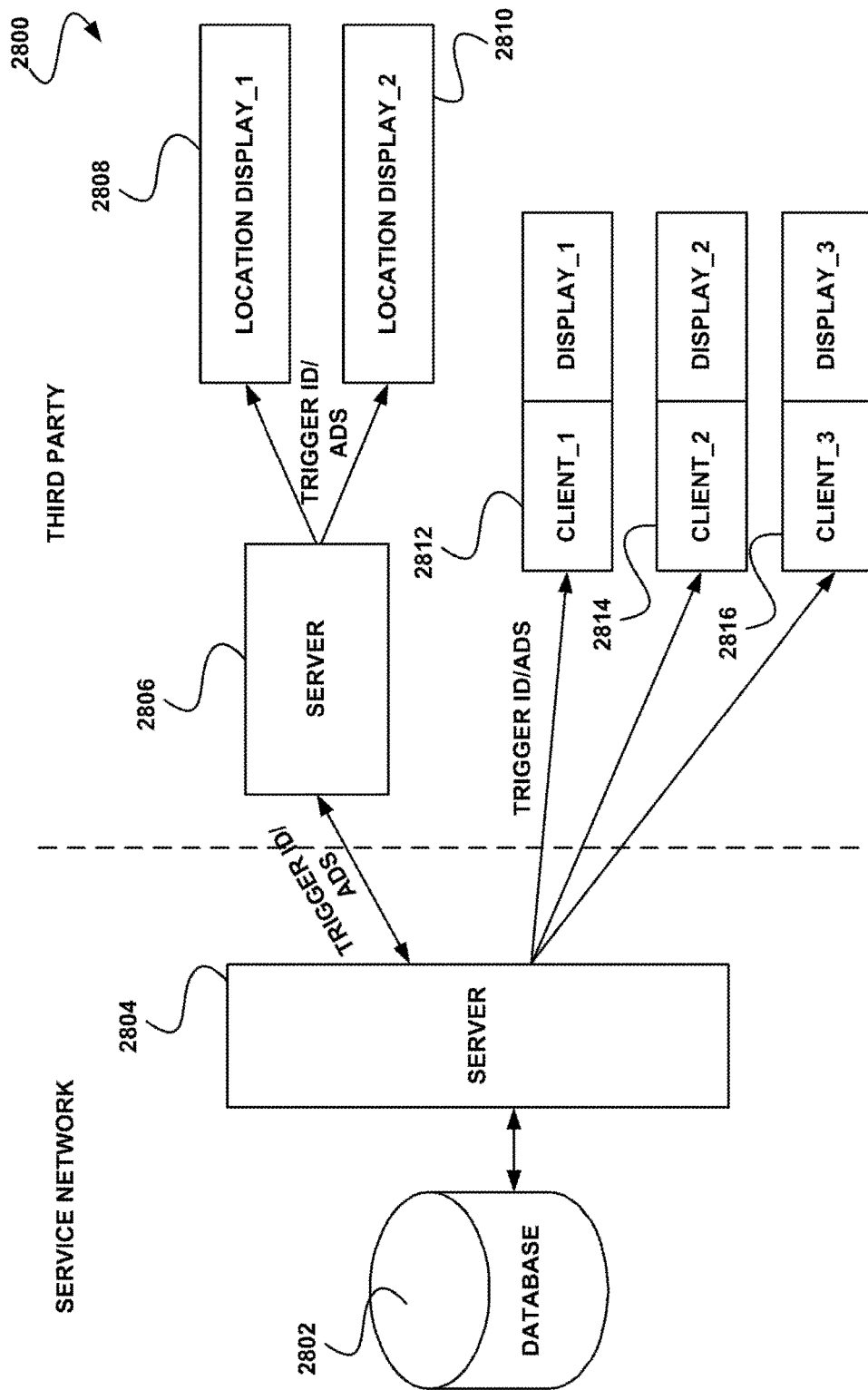
FIG. 28 shows a system for mobile device transactions, in accordance with another embodiment.

FIG. 28 shows a system 2800 for mobile device transactions, in accordance with another embodiment. As an option, the system 2800 may be implemented in the context of the architecture and environment of the previous Figures and/or any subsequent Figure(s). Of course, however, the system 2800 may be implemented in the context of any desired environment. It should also be noted that the aforementioned definitions may apply during the present description.

As shown, a service network system may include a database 2802 and server 2804. The service network system may be associated with a variety of service networks, including a social network, a retailer, a payment provider, payment facilitator, an advertiser, a search engine system, a mobile wallet system, a media provider, and/or any other service network system that provides one or more services to its members.

The service network system may be in communication with one or more third party systems. For example, in one embodiment, the service network system may be in communication with a third party retailer, advertiser, and/or payment system that each include one or more third party server(s) 2806. Additionally, in one embodiment, the service network system may be in communication with one or more third party client devices 2812-2816. In various embodiments, the client devices may include mobile phones, computers, media devices, displays, payment systems, point-of-sale terminals, and/or various other devices.

In another embodiment, the devices 2808-2818 may include a vehicular head-unit display associated with a vehicular assembly. One example of such a vehicular assembly may include that which is disclosed in U.S. Pat. No. 8,131,458 issued Mar. 6, 2012 and entitled "SYSTEM, METHOD, AND COMPUTER PROGRAM PRODUCT FOR INSTANT MESSAGING UTILIZING A VEHICULAR ASSEMBLY," which is incorporated herein by reference in its entirety. In the present embodiment, such head-unit display may communicate with the servers 2804 and/or 2806 via a communication channel of a mobile device (as taught in U.S. Pat. No. 8,131,458). Of course, in other embodiments, the vehicle (and thus the head-unit display) may be equipped with its own modem for communicating directly with the servers 2804 and/or 2806.

In different embodiments, the displays 2808-2816 may or may not be equipped with software (e.g., a plug-in and/or an application program, etc.) for providing an interface to receive/send signals with respect to the server 2806 and/or 2804. Such software may also include interface code (e.g., driver, etc.) for accommodating the specific protocol/format, etc. of the displays 2808-2816 and otherwise controlling the same (and content displayed). In other embodiments, of course, the signals/control administered by the server 2806 and/or 2804 may be standardized such that communications may be directed at the displays 2808-2816 without the need for additional software.

Furthermore, in one embodiment, the service network system may be in communication with systems/displays dedicated (at least in part) to displaying advertisements, deals, and/or for facilitating payment of products and/or services. For example, in one embodiment, the service network system may be in communication with a third party server 2806 and/or one or more location specific displays 2808-2810.

In the context of the present description, a location specific display refers to a display associated with a location. For example, in various embodiments, the location specific display may include a display at a business location (e.g., a monitor, a television, a computer display, etc.), a billboard, a display associated with a point-of-sale terminal, a display associated with a product/service (e.g., a display at a gas pump, etc.), and/or any other type of display.

The communication between the service network system and the third party system may be facilitated utilizing a variety of techniques. For example, in one embodiment, the communication between the service network system and the third party system may include direct communication (e.g., a wireless direct connection, a wired direct connection, etc.). In another embodiment, the communication between the service network system and the third party system may include indirect communication (e.g., communication via a server, communication via a cloud, communication via one or more other systems, etc.).

In operation, in one embodiment, the service network may be operable to cause the display of targeted advertisements and/or targeted content on the location specific displays 2808-2810 and/or the client devices 2812-2816. In one embodiment, the service network system may push the advertisements (e.g., including advertisement content, etc.) to the location specific displays 2808-2810 and/or the client devices 2812-2816. In another embodiment, the service network system may push an advertisement trigger ID to another system (e.g., the server 2806, etc.) such that the advertisements are displayed on the location specific displays 2808-2810 and/or the client devices 2812-2816. Of course, in some embodiments, the aforementioned advertisement trigger ID may be sent directly to the location specific displays 2808-2810 and/or the client devices 2812-

2816, for using the same to access appropriate advertisements locally and/or remotely.

For example, in one embodiment, it may be determined that a user is in the vicinity of the one or more location specific displays 2808-2810. Accordingly, in one embodiment, targeted content and/or advertisements may be presented to the user on the one or more location specific displays 2808-2810. In one embodiment, the targeted content and/or advertisements presented to the user on the one or more location specific displays 2808-2810 may include targeted content and/or advertisements associated with the location.

The location of the user may be determined utilizing a variety of techniques. For example, in one embodiment, the user may digitally check in to a location. In various embodiments, the user may check-in to the location utilizing a mobile device associated with the user, a system associated with the location, and/or another device. In one embodiment, the user may check in to a location utilizing an application stored on the mobile device of the user. In various embodiments, the application may include a social network application, an application associated with the location, a mapping application, a geo-caching application, a mobile payment application, and/or various other applications. In another embodiment, the user may check in to a location utilizing a check-in system associated with the location.

In another embodiment, a mobile device of the user may be utilized to automatically check in to a location. For example, in one embodiment, an application stored on the mobile device may be utilized to automatically check in to a location (e.g., based on a wireless signal, based on a wireless network availability, based on GPS, a bump signal, an NFC signal, etc.).

More information regarding checking in to a location, etc. may be found in U.S. Provisional Patent Application No. 61/590,767, filed Jan. 25, 2012, titled "SYSTEM, METHOD AND COMPUTER PROGRAM PRODUCT FOR LOCATION-SPECIFIC PRIVACY SETTINGS;" U.S. Provisional Patent Application No. 61/591,819, filed Jan. 27, 2012, titled "SYSTEM, METHOD, AND COMPUTER PROGRAM PRODUCT FOR ALTERING AT LEAST ONE ASPECT OF AN INTEGRATED E-COMMERCE ON-LINE APPLICATION;" and U.S. Provisional Patent Application No. 61/596,174, filed Feb. 7, 2012, titled "SYSTEM, METHOD, AND COMPUTER PROGRAM PRODUCT FOR ALTERING AT LEAST ONE ASPECT OF AN INTEGRATED E-COMMERCE ON-LINE APPLICATION," which are each incorporated herein by reference in their entirety.

Further, in one embodiment, the location of the user may be determined based on GPS. For example, the mobile device (and/or an application/OS associated therewith) may share GPS data associated with the mobile device, such that the location of the mobile device/user is determined. In one embodiment, the GPS data may be shared with the service network system. In another embodiment, the GPS data may be shared with one or more third party systems.

In another embodiment, the location of the user may be determined based on a signal provided by the mobile device of the user. For example, in one embodiment, the mobile device of the user may provide a Bluetooth signal that is capable of being received by a device associated with the location (e.g., a display, a computer, a location detection device, a point-of-sale device, etc.), such that location may be determined. In another embodiment, the mobile device of the user may provide a NFC signal that is capable of being received by a device associated with the location (e.g., a display, a computer, a location detection device, a point-of-sale device, etc.), such that location may be determined.

In another embodiment, the mobile device of the user may provide a Wi-Fi signal that is capable of being received by a device associated with the location (e.g., a router, a display, a computer, a location detection device, a point-of-sale device, etc.), such that location may be determined. In another embodiment, the mobile device of the user may provide a chirp signal that is capable of being received by a device associated with the location, such that location may be determined. In one embodiment, the chirp signal may include information associated with the location (e.g., GPS coordinates, etc.). In one embodiment, a signal strength associated with the chirp may be used to associate the user with a location.

In another embodiment, the mobile device may be connected to a wireless network associated with the location automatically (or manually), such that a location may be determined. In still another embodiment, the location of the user may be determined utilizing facial recognition techniques. For example, in one embodiment, a system associated with the location may be utilized to determine the user is present based on facial recognition.

More information regarding facial recognition and other features that may or may not be incorporated into any of the embodiments disclosed herein, may be found in U.S. patent application Ser. No. 13/652,458, filed Oct. 15, 2012, titled "MOBILE DEVICE SYSTEM, METHOD, AND COMPUTER PROGRAM PRODUCT," which is incorporated herein by reference in its entirety.

In another embodiment, the location of the user may be determined utilizing social network status associated with the user. Optionally, such social network status may be set by another person (e.g., friend, etc. of the user, etc.). This may be accomplished by "tagging" the user in association with a particular location (e.g., by naming the location or tagging the user in association with a location associated with the friend, etc.).

In another embodiment, the location of the user may be determined based on an action of the user. For example, in one embodiment, the user may utilize the mobile device to scan a bar code of an item (e.g., a product, a poster, a billboard, etc.), such that the location of the user may be determined. In another embodiment, the user may utilize the mobile device to capture an image of an item (e.g., a building, a sign, a product, a poster, a billboard, etc.), such that the location of the user may be determined.

In another embodiment, the location of the user may be determined and/or the aforementioned/following determination techniques may be confirmed by an interaction of the user with the display. As an option, such interaction may include detecting a touch or gesture (or other input) by the user of a touchscreen associated with the display (2808-2816) and/or a separate control display/controller associated with the display (2808-2816).

In another embodiment, the user may utilize the mobile device to facilitate a purchase at a location (e.g., utilizing an e-wallet application, utilizing a digital credit card, utilizing a digital debit card etc.), such that the location of the user may be determined. In another embodiment, the user may utilize a payment technique attributable to the user to facilitate a purchase at a location (e.g., utilizing gift card, utilizing a credit card, utilizing a debit card etc.), such that the location of the user may be determined. In another embodiment, the user may scan a loyalty card at a location, such that the location of the user may be determined. Of course, any technique may be utilized to determine a location associated with the user.

Once the location of the user is determined, in one embodiment, it may or may not be determined whether the user is in the vicinity of a display capable of displaying targeted advertisements/content. In one embodiment, the location specific display (or a system associated therewith) may determine the user is in the vicinity (e.g., utilizing one of the various location determination techniques described, etc.). In another embodiment, the location of the location specific displays may be known. For example, in one embodiment, the location specific displays may be registered and the location may be logged (e.g., utilizing the database 2802, the server 2804, another database or server, etc.).

If the location of the location specific display is known, and the location of the user is known (at least to within a threshold distance, etc.), targeted advertisements/content may be displayed to the user on the location specific displays 2808-2810 and/or on the client devices 2812-2816, based on the location of the user. As an example, the user may utilize the client device 2812 (e.g., a point-of-sale terminal, etc.) to initiate a purchase of products. Accordingly, the location of the user and the client device 2812 are determined and targeted advertisements/content may be presented to the user on a display associated with the client device 2812.

As another example, the location of the user may be determined (e.g., utilizing one or more of the location determination techniques described above, etc.) and it may be determined that the user is in the vicinity of a known location specific display 2808. Accordingly, targeted advertisements/content may be presented to the user on the location specific display 2808.

As yet another example, the location specific display may determine that the user is in the vicinity (e.g., utilizing one or more of the location determination techniques described above, etc.). Accordingly, targeted advertisements/content may be presented to the user on the location specific display 2808. In one embodiment, the targeted advertisements/content may be pushed from the service network system server 2804 (e.g., to the location specific displays 2808-2810 and/or the client devices 2812-2816, etc.). In another embodiment, the targeted advertisements/content may be pushed from the third party system server 2806 (e.g., to the location specific displays 2808-2810 and/or the client devices 2812-2816, etc.).

The targeted advertisements/content may be determined utilizing a variety of criteria associated with the user and/or the location. For example, in one embodiment, social network information may be utilized to determine targeted advertisements/content. In another embodiment, online retailer information may be utilized to determine targeted advertisements/content.

In another embodiment, previous purchase information may be utilized to determine targeted advertisements/content. In another embodiment, mobile wallet application information may be utilized determine targeted advertisements/content. In another embodiment, loyalty information may be utilized determine targeted advertisements/content. In another embodiment, personal information may be utilized determine targeted advertisements/content.

More information regarding targeted advertisements/content and the information utilized to determine such advertisements/content may be found in U.S. Provisional Patent Application No. 61/563,741, filed Nov. 25, 2011, titled "SYSTEM, METHOD, AND COMPUTER PROGRAM PRODUCT FOR PRESENTING DECISION RELATED INFORMATION;" and U.S. Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER," which are incorporated herein by reference in their entirety.

In various embodiments, the personal information may include any type of information, such as browsing history, social network information, a gender, an age, a birth date, an astrological sign, a nationality, a religion, a political affiliation (e.g., Democrat, Republican, etc.), a height, a weight, a hair color, an eye color, an ethnicity, a living address (e.g., a home address, etc.), a work address, an occupation (e.g., student, engineer, barista, unemployed, etc.), a sexual preference, an education level (e.g., a high school education, a college education, a postgraduate degree, etc.), a birth place, a school attended (e.g., an elementary school attended, a middle school attended, a high school attended, a college attended, etc.), an area once lived (e.g., during adolescence, after high school, during adult years, etc.), a relationship status (e.g., single, married, significant other, etc.), a family status (e.g., living parents, divorced parents, estranged from parents, etc.), a number of siblings, an income level, a car status (e.g., a car model, a car make, a car year, a car price, etc.), a number of children, hobbies (e.g., reading, running, volunteering, biking, golf, climbing, etc.), exercise habits (e.g., number of hours/minutes a week, number of times a month, type of exercise preferred, etc.), a number of pets owned, a type of pets owned (e.g., dogs, cats, fish, gerbils, etc.), food preferences (e.g., vegetarian, vegan, mainly meat, Chinese cuisine, Mexican cuisine, etc.), drinking habits (e.g., daily, weekly, monthly, etc.), eating habits (e.g., eat in, dine out, snacks, meals, etc.), TV watching preferences (e.g., types of preferred shows, number of hours/minutes per day/week, etc.), movie watching preferences (e.g., types of preferred movies, number of movies per day/week/month, etc.), music preferences (e.g., preferred genre, preferred artist, etc.), sleeping preferences (e.g., the number of hours of sleep preferred, the preferred bed time/rise time, etc.), moods (e.g., generally a good mood, generally a bad mood, etc.), feelings (e.g., generally happy, generally sad, generally angry, etc.), desires (e.g., goals, wishes, etc.), and/or any other personal information.

In various embodiments, the personal information may include permanent personal information (e.g., physical traits, history, etc.), temporal personal information (e.g., what the user is doing/feeling/experiencing now or within a predetermined window of time, etc.), and/or future goal-oriented personal information (e.g., wants, desires, etc.).

Further, in one embodiment, the personal information may be received in association with a social networking site that allows users to define themselves in a profile (e.g., which may include any one or more of the personal information parameters disclosed hereinabove and/or herein below, etc.); associate themselves with others (e.g., friends, colleagues, other groups, etc.) by connecting to each other; and/or engage in activities (e.g., using applications such as games, reviewing content, sharing content (e.g., interests, thoughts, questions, media, etc.), etc. In such embodiment, the personal information may be received from a social networking profile of the user associated with a social networking site. Further, the personal information may include any entities (e.g., people, groups, institutions, products, etc.) to which the user is associated (e.g., connected, subscribed, linked) during use of the social networking site.

Such associations may also be extended to "associations-of-associations" (e.g., friends of friends, etc.). Even still, tracking such associations as personal information may be extended to a threshold number (e.g., 1, 2, 3, 4, 5, etc.) of degrees-of-separation. As a further option, the personal information may be received based on any of the aforementioned activity of the user in connection with the social networking site. In such example, any profiling metadata collected based on the activity of the user may be utilized as the personal information.

One optional embodiment is contemplated wherein an on-line application associated with the social networking site may collect and/or use the aforementioned social networking site-related personal information in connection with any of the functionality disclosed hereinabove and/or herein below. Of course, such social networking site-related on-line application may do so by itself and/or in connection with other one or more social networking site-related on-line application(s) or separate/independent site-related on-line application(s).

Still yet, in one embodiment, the database 2802 may include loyalty card information. In various embodiments, such loyalty card information may include types of products purchased, frequency that products are purchased, brands of products purchased, number of days/hours shopping per week/month, amount of money spent (e.g., average amount per outing, average amount per month, average amount per week, least amount per outing, etc.), discount amount (e.g., average amount per outing, average amount per month, average amount per week, least amount per outing, etc.), awards points, and/or various other information.

Furthermore, in one embodiment, the database 2802 may store location based information. For example, in various embodiments, the database 2802 may store information associated with product offerings associated with a location, store options associated with a location, service options associated with a location, advertisements associated with a location, maps associated with the location, and/or various other information.

Further, in one embodiment, the database 2802 may store business related information. For example, in various embodiments, the business related information may include business location information, business operation information, business hours, business specials, business offerings, business deals, and/or various other business related information. Additionally, in one embodiment, the database 2802 may include targeted content/advertisement information (e.g., advertisement IDs, advertisements, advertisement trigger IDs, etc.).

In various embodiments, any information stored in the database 2802 (or any other accessible database, etc.) may be utilized to determine advertisements/content to present to a user. Of course, in one embodiment, the information stored in the database 2802 (or any other accessible database, etc.) may be associated with individual users and/or groups of users.

As one exemplary implementation associated with one embodiment, a user may be shopping in a market. Utilizing one or more location determination techniques discussed above, the location of the user may be determined and a display that is capable of being viewed by the user may be determined. In one embodiment, information associated with the user may be utilized to determine an advertisement/content to be presented to the user on the display. In one embodiment, the server 2804 may determine the advertisement/content to display, based on the information. In another embodiment, the server 2806 may determine the advertisement/content to display, based on the information. In another embodiment, at least one of the client devices 2812-2816 may determine the advertisement/content to display.

Further, in various embodiments, the server 2804 and/or the server 2806 may send the targeted advertisements/content and/or advertisement/content trigger IDs. In the case that the server 2804 and/or the server 2806 sends advertisement/content trigger IDs, the receiving apparatus or system (e.g., the client devices 2812-2816, the server 2806, the location specific displays 2808-2810, etc.) may utilize the advertisement/content trigger IDs to select and display the advertisement/content. In one embodiment, each advertisement/content or group of advertisements/content may be associated with at least one advertisement/content trigger ID, such that the advertisement/content trigger ID may be utilized to look up associated advertisement/content. In various embodiments, the advertisement/content trigger IDs may include numerical IDs, alpha-numeric IDs, key word IDs, and/or various other IDs. In one embodiment, the third party system may include its own advertisement/content database, where advertisements/content may be accessed.

As another exemplary implementation, a user may be shopping and initiate a checkout/payment utilizing a point-of-sale terminal (e.g., one or more of the client devices 2812-2816, etc.). In various embodiments, the user may initiate payment utilizing a mobile phone (e.g., in association with an e-wallet application, a credit card application, etc.), a credit card, a loyalty card, a loyalty card and cash, a check, and/or various other techniques. Utilizing loyalty card information, mobile device information, payment information, and/or various other information, the user identification may be determined (and/or information associated with the user, which is capable of being utilized to determined targeted advertisements/content may be determined, etc.). Because the user is checking out at a known location, advertisements/content may be selected for the user (based on known or determined information about the user, etc.) and one or more advertisements/content may be displayed on a display associated with the point-of-sale terminal (and/or a display in proximity to the point-of-sale terminal, on a mobile device of the user, etc.).

The content/advertisements may include any type of content and/or advertisements. For example, in various embodiments, the content/advertisements may include product/service suggestions based on user purchase history, product/service suggestions based on items omitted during checkout, product/service suggestions based on items purchased, product/service suggestions based on location, product/service suggestions based on amount of money spent on particular products/services (e.g., per week, per month, per shopping experience, etc.), product/service suggestions based on a demographic category associated with the user, product/service suggestions based on user personal information, and/or any other type of content/advertisement.

Furthermore, the advertisement/content presentation may be triggered in a variety of ways. For example, in one embodiment, the advertisement/content presentation may be triggered upon initiation of check-out (e.g., upon scanning a loyalty card, upon scanning a first item, etc.). In another embodiment, the advertisement/content presentation may be triggered upon initiation of payment. In another embodiment, the advertisement/content presentation may be triggered upon approval of payment. In another embodiment, the advertisement/content presentation may be triggered upon a determination of a location of the user.

In another embodiment, the advertisement/content presentation may be triggered utilizing a signal associated with the mobile device (e.g., an NFC signal, a Bluetooth signal, a Wi-Fi direct signal, etc.). In another embodiment, the advertisement/content presentation may be triggered based on a facial recognition program identifying the user. In another embodiment, the advertisement/content presentation may be triggered upon a user check-in (e.g., a manual check-in, an automatic check-in, etc.).

In another embodiment, the advertisement/content presentation may be triggered when a user scans an item utilizing the mobile device. For example, in one embodiment, the user may scan a barcode of an item utilizing the mobile device and an advertisement/content may be presented to the user on a display of the mobile device and/or on another display (e.g., a display determined to be in the vicinity of the user, etc.). In another embodiment, the user may capture an image of an item and an advertisement/content may be presented to the user on a display of the mobile device and/or on another display (e.g., a display determined to be in the vicinity of the user, etc.).

In another embodiment, the advertisement/content presentation may be triggered in response to a user request. For example, in one embodiment, a user may utilize an associated mobile device to view available advertisements/content and/or to request targeted advertisements/content. In this case, in various embodiments, the advertisements/content may be displayed on a display associated with the mobile device and/or another display.

In one embodiment, the advertisement/content may be displayed in a non-intrusive manner on the mobile device display. For example, in one embodiment, the advertisement/content may be displayed on a lock screen of the mobile device. In another embodiment, the advertisement/content may be displayed utilizing a specific advertisement/content display application.

More information about non-intrusively displaying advertisements on a mobile device may be found in U.S. Provisional Patent Application No. 61/711,727, filed Oct. 9, 2012, titled "SYSTEM, METHOD, AND COMPUTER PROGRAM PRODUCT FOR DETERMINING WHETHER TO PROMPT AN ACTION BY A PLATFORM IN CONNECTION WITH A MOBILE DEVICE," which is incorporated herein by reference in its entirety.

Further, in one embodiment, an advertisement/content may be displayed on a display separate from a mobile device and the user may have the option to transfer display of the advertisement/content to the mobile device, or to receive the advertisement/content on the mobile device. For example, in one embodiment, an application on the mobile device may present the user an option to display an advertisement/content on the mobile device, which is currently being displayed on a third party display. In another embodiment, bump technology may be utilized to transfer an advertisement/content to the mobile device. For example, in one embodiment, advertisement/content may be displayed on a third party display and a user may touch the display (or an interface associated with the display, etc.) such that the advertisement/content is transferred to the mobile device for display. Of course, in various embodiments, various techniques may be utilized to transfer the advertisement/content to the mobile device.

It should be noted that, although the apparatuses/systems/devices illustrated in FIG. 28 are described in the context of individual devices, in other embodiments, such apparatuses/systems/devices may be combined or implemented across multiple devices. For example, in one embodiment, the database 2802 may include a plurality of databases (e.g., controlled by different entities, etc.). In another embodiment, the server 2804 may represent a plurality of servers (e.g., controlled by different entities, etc.). Furthermore, in one embodiment, multiple service network systems and/or multiple third party systems may communicate with one another. For example, in one embodiment, a social network system and a mobile wallet system may be in communication and both systems may be capable of communicating with one or more retailers and/or one or more service providers, etc.

To this end, in some embodiments, advertisements (and/or other content) may be displayed to a user in an intelligent manner; without having to necessarily utilize precious interface "real-estate" (i.e., area, etc.) of the mobile device and/or of one particular application (e.g., associated with the service network, etc.) on a mobile device; and/or when the mobile device and/or application is not even being utilized (e.g., viewed, etc.) during a relevant time for the advertisement/content to be displayed, etc. Further, as an option, this may be accomplished by going beyond allowing third parties to associate advertisements with certain profile criteria, for triggering the display of such advertisements in connection with service network content on a service network interface (via a service network application, etc.). Specifically, advertisements/triggers may be associated with certain profile criteria (which may or may not be the same used above), so that, instead of the aforementioned display of the advertisements in connection with service network content, triggers and/or the advertisements are ultimately pushed to a separate display (e.g., 2808-2816, etc.) or a separate context (e.g., different application, etc.) on the same display/device, for presentation.

Further, the various features disclosed herein may, in some optional embodiments, be accomplished by both the service network and advertiser tracking, storing, sharing, etc. at least one aspect of the user for uniquely or non-uniquely identifying the same, which may be done in an anonymous or non-anonymous manner. In various embodiments, such user identifying aspect may take the form of data that includes and/or is based, at least in part, on service network and/or advertiser username and/or password, a name, an alias, a user ID, a user email address, a user residence or business physical address, a user phone (e.g., cell) number, an application identifier, a user context identifier, a cookie, a session identifier, a purchase receipt reflecting a purchase by the user, a credit card/bank account number and/or alias, a randomly generated identifier, a comment/posting, text/e-mail content, a facial recognition result, a fingerprint scan result, an Internet search query, a photo taken by and/or including the user, a scan of a code (Quick Response Code), an automatically (GPS, WiFi, etc.) generated location, a manual or automatically generated check-in status (e.g., with precise time-stamped location), a bump technology transaction/signal, any unique or semi-unique identifier, etc.). In one embodiment, the user identifying aspect(s) may include location triggers. In various embodiments, the above user identifying aspect(s) may be sourced from the service network (and/or related application), the advertiser, an operating system of the mobile device and/or any other source.

In use, in accordance with one possible embodiment, the aforementioned user identifying aspect may be submitted with, linked to, and/or otherwise associated with a profile-related query that is defined by the advertiser. To this end, the profile criteria associated with various preconfigured advertisements of the advertiser may be compared against the appropriate profile (and content) of the correct/relevant user in the service network database (that is identified by the identifying aspect), to be the subject of presentation of the advertisement.

In various embodiments, the aforementioned user identifying aspect may be encrypted for ensuring anonymity of the user. More information regarding various possible features and/or utilization of the aforementioned user identifying aspect may be found in U.S. Provisional Patent Application No. 61/563,741, filed Nov. 25, 2011, titled "SYSTEM, METHOD, AND COMPUTER PROGRAM PRODUCT FOR PRESENTING DECISION RELATED INFORMATION;" and U.S. Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER," which are incorporated herein by reference in their entirety.

Of course, embodiments are contemplated where the advertisements may also be triggered for display in a manner that utilizes the service network interface(s) and is integrated with service network content (e.g., "on-platform") vs. the aforementioned "off-platform" advertising. In such other embodiments, the on- and off-platform advertising may be coordinated for increased effectiveness. For example, after the display of an off-platform advertisement and in response to user input received in connection with such off-platform advertisement, an additional escalation of advertising may be accomplished by displaying a related/follow-up/supplemental on-platform advertisement. Of course, pricing of the related/follow-up/supplemental on-platform advertisement may be varied (e.g., increased, etc.) to reflect the effectiveness of such sequential targeted advertisements across multiple platforms. Still yet, off-platform advertisements may be bid upon, since there often is a single advertisement impression opportunity in connection with the user as he/she passes from location/context to location/context.

Even still, the service network may also establish policies to regulate the issues that may arise when providing on- and off-platform advertisements. Just by way of example, the service network may preclude the triggering of both an on- and off-platform advertisement to the same person at the same time.

In still other embodiments, the off-service network platform advertisements may be displayed in connection with an application that is initiated, accessible, etc. via an application associated with the service network. As an option, any enabling off-platform advertisement techniques (e.g., sharing of user information) and/or the display of off-platform advertisements themselves may be conditioned on the user authorizing the same. For that matter, any technique disclosed herein may be subject to such user authorization.

Figure 29:
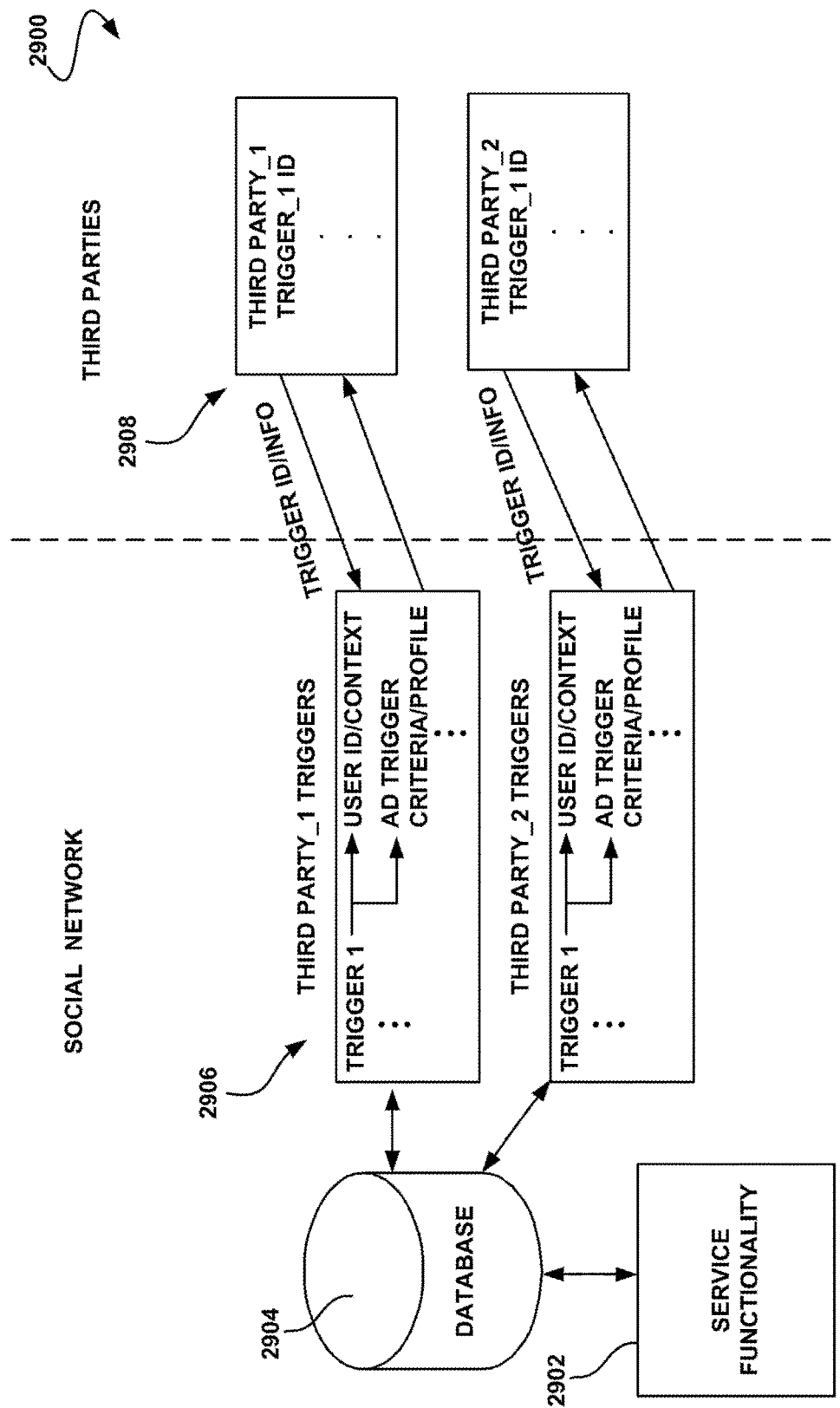
FIG. 29 shows a system for presenting advertisements/content, in accordance with another embodiment.

FIG. 29 shows a system 2900 for presenting advertisements/content, in accordance with another embodiment. As an option, the system 2900 may be implemented in the context of the architecture and environment of the previous Figures and/or any subsequent Figure(s). Of course, however, the system 2900 may be implemented in the context of any desired environment. It should also be noted that the aforementioned definitions may apply during the present description.

As shown, a social network system may be in communication with one or more third party systems. In one embodiment, the social network system may include service functionality 2902 that is in communication with one or more databases 2904. It should be strongly noted that, while a social network system is provided in the present embodiment, any service network system may be substituted therewith.

The social networking service functionality may include any online service, platform, or site the helps facilitate the building of social networks or social relations among people, groups, and/or businesses, etc., who, for example, share interests, activities, backgrounds, or real-life connections. In various embodiments, the social network service may include a representation of each user (e.g., a profile, etc.), social link information, and a variety of additional services. In one embodiment, the social network service may be web-based and may allow for users to interact over the Internet, such as e-mail and instant messaging.

In one embodiment, the social network service functionality may allow a profile to be generated from a user answering to questions, such as age, location, interests, etc. In one embodiment, the social networking service functionality may allow the upload of pictures, multimedia content, and/or modification of the look and feel of the profile. Further, in one embodiment, the social network service functionality may allow users to enhance their profile by adding modules or applications.

In one embodiment, the social network service functionality may allow users to post blog entries, search for others with similar interests, and compile and share lists of contacts. Additionally, in one embodiment, the user profiles may have a section dedicated to comments from friends and other users. Further, in one embodiment, to protect user privacy, the social network service functionality may offer controls that allow users to choose who can view their profile, contact them, add them to their list of contacts, etc.

In another embodiment, the social network service functionality may allow the user to create groups that share common interests or affiliations, upload or stream live videos, and/or hold discussions in forums. Further, in one embodiment, the social network service may implement geo-social networking that co-opts Internet mapping services to organize user participation around geographic features and their attributes.

In one embodiment, the social networking service may include a time and/or a location based social network. More information regarding location based applications may be found in U.S. Provisional Patent Application No. 61/511,750, filed Jul. 26, 2011, titled "SYSTEM, METHOD, AND COMPUTER PROGRAM PRODUCT FOR MANAGING A SOCIAL NETWORK BASED ON AT LEAST A TIME OR A LOCATION," and U.S. patent application Ser. No. 13/557,198, filed Jul. 24, 2012, titled "SYSTEM, METHOD, AND COMPUTER PROGRAM PRODUCT FOR MANAGING A SOCIAL NETWORK BASED ON AT LEAST A TIME OR A LOCATION," which are incorporated herein by reference in their entirety.

In one embodiment, the social network system (or, again, any service network) may utilize information known about users of the social network to generate advertisement/content suggestions and/or trigger IDs. In another embodiment, another system may utilize information known about users of the social network to generate advertisement/content suggestions and/or trigger IDs (e.g., the social network system may share the information, etc.). For example, social network information about a first user of the social network system may be utilized to determine one of more advertisements/content to display to the first user. In one embodiment, information in addition to the social network information may be utilized (e.g., user information provided by a retailer, etc.).

In another embodiment, the social network system may associate users with advertisement/content trigger IDs. For example, based on user information associated with the social network, the user may be associated with one or more third party advertisement/content trigger IDs 2906. In one embodiment, users with similar information may be associated with one or more of the same trigger IDs.

In one embodiment, the trigger IDs may be sent to one or my third party systems 2908 in real-time. Further, in one embodiment, the third party system may utilize the trigger IDs (and/or information associated therewith, etc.) to select one or more advertisements/content to be presented to one or more users associated with the trigger IDs. To accomplish this, a data structure may be utilized to link the trigger IDs and the associated with specific advertisements/content (e.g., advertisement content, etc.) such that the latter may be looked up utilizing the former.

For example, in one embodiment, the first user of the social networking site may log onto an online retailer. In this case, in one embodiment, the social network system may send advertisement/content trigger IDs associated with the first user to the online retailer (or an advertiser, etc. associated with the online retailer, etc.), such that the online retailer (or an advertiser, etc. associated with the online retailer, etc.) may select one or more advertisements/content to display to the first user (e.g., on a portion of a web page associated with the online retailer, etc.).

While, in the foregoing embodiment, the advertisements/content may be displayed to the first user via a web page, it should be noted that the trigger IDs may be used to display the advertisement/content in connection with any application, display, device, etc. separate from the service network interface. Further, in any embodiment disclosed herein, the advertisement(s) itself may be sent in lieu of (or in addition to) the trigger ID(s).

In one embodiment, the third party may have one or more advertisements/content associated with the trigger IDs. In this way, in one embodiment, the third party may identify an advertisement opportunity (e.g., by ascertaining one of the aforementioned user identifying aspects which correlates to a user, etc.), query the social network system for a trigger ID (e.g., that is determined by the service network by matching profile criteria known about the user (as identified by the user identifying aspect) with profile criteria associated with one of the trigger IDs/associated advertisements), receive the trigger ID, and display one or more advertisements associated with the trigger ID.

As mentioned above, in one embodiment, the third party may query the social network system with user information (e.g., a username, a name, an alias, a user ID, a user email address, an application/location identifier, unique user context identifier, cookie, and/or any of the aforementioned user identifying aspects, etc.). Specifically, the service network may track any identifying aspect of the user (e.g., anonymously or otherwise, etc.) so that such identifying aspect can be included with a profile-related query (e.g., to determine an appropriate advertisement/content, if any) for display in connection with the user.

In another embodiment, the social network system may send information associated with one or more social network users to the third party system, such that the third party system may select targeted advertisements to display to the user. In one embodiment, the user of the social network system may have an option to allow sharing of information between the third party system and the social network system. Further, in one embodiment, the user may be incentivized to allow sharing between the third party system and the social network system. In various embodiments, the user may be incentivized by receiving discounts, receiving credits (e.g., store credit, etc.), receiving free items, receiving money, and/or utilizing various other incentives.

More information regarding sharing information between a social networking system and a third party system, etc. may be found in U.S. Provisional Patent Application No. 61/591,819, filed Jan. 27, 2012, titled "SYSTEM, METHOD, AND COMPUTER PROGRAM PRODUCT FOR ALTERING AT LEAST ONE ASPECT OF AN INTEGRATED E-COMMERCE ON-LINE APPLICATION;" and U.S. Provisional Patent Application No. 61/596,174, filed Feb. 7, 2012, titled "SYSTEM, METHOD, AND COMPUTER PROGRAM PRODUCT FOR ALTERING AT LEAST ONE ASPECT OF AN INTEGRATED E-COMMERCE ON-LINE APPLICATION."

Further, in one embodiment, the third party system may select advertisements to be displayed on a website associated with the social network system. For example, in one embodiment, information associated with the third party may be shared with the social network system, such that advertisements are presented to the user while the user is utilizing a social networking site. Additionally, in one embodiment, the advertisements/content selected may be presented on a third party display (e.g., at a business, on a billboard, etc.).

Still yet, in one embodiment, the social networking system may provide information (e.g., user information, trigger IDs, etc.) to company advertisers and/or other related-third party advertisers to trigger advertisements. More information about providing dynamic advertisements may be found in U.S. Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER," which is incorporated herein by reference in its entirety.

In one embodiment, administrators associated with the third party systems may be capable of configuring and/or registering advertisement/content triggers and/or associated content/trigger IDs. In one embodiment, the social network system may provide a GUI for configuring such triggers and/or advertisements. In another embodiment, an advertisement system may provide a GUI for configuring such triggers. In yet another embodiment, the third party system owner may have control over a GUI for configuring advertisement/content triggers.

Figure 30:
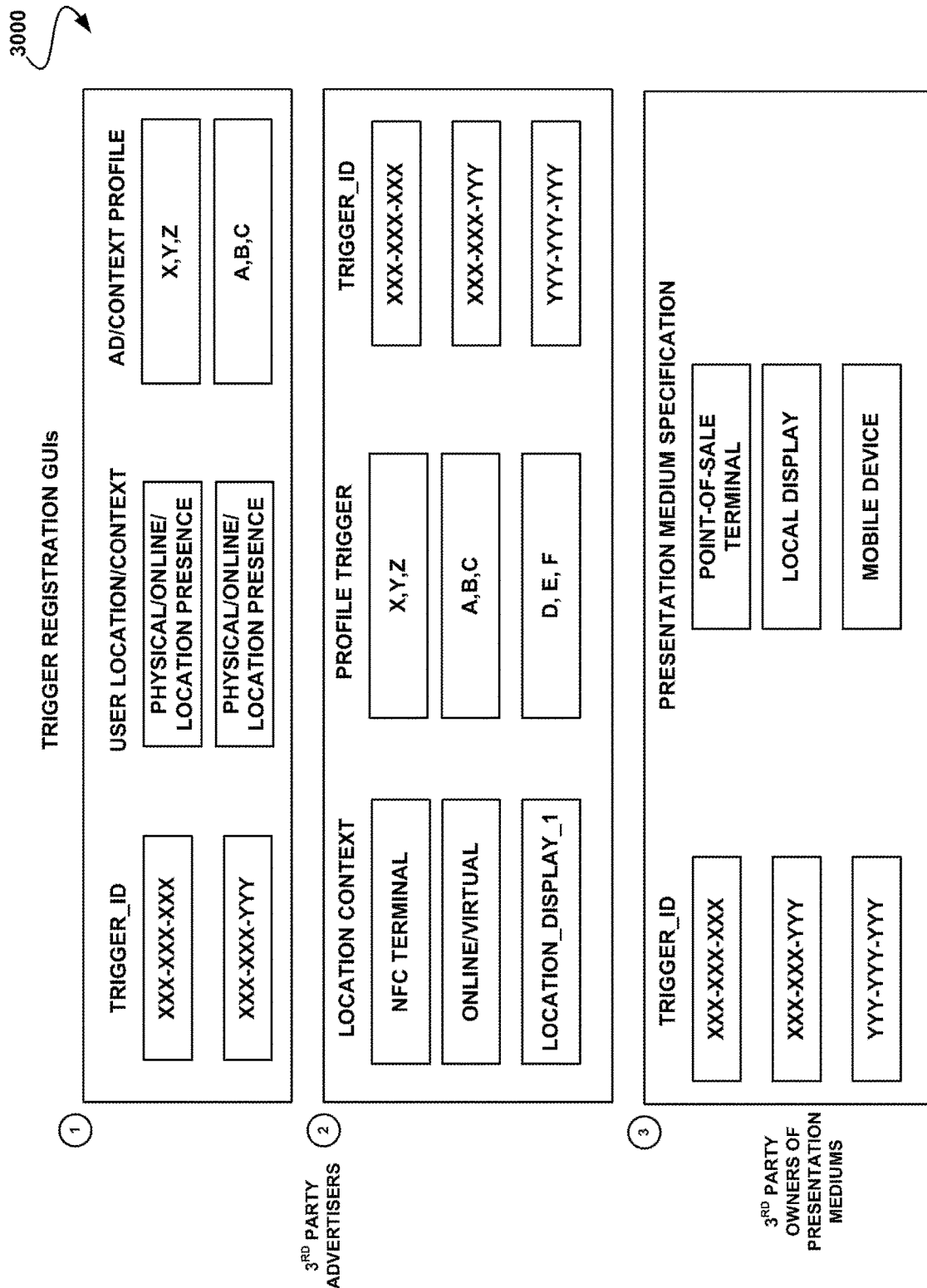
FIG. 30 shows exemplary interfaces for configuring and/or registering advertisement/content triggers, in accordance with another embodiment.

FIG. 30 shows exemplary interfaces 3000 for configuring and/or registering advertisement/content triggers, in accordance with another embodiment. As an option, the interfaces 3000 may be implemented in the context of the architecture and environment of the previous Figures and/or any subsequent Figure(s). Of course, however, the interfaces 3000 may be implemented in the context of any desired environment. It should also be noted that the aforementioned definitions may apply during the present description.

As shown, an advertiser may utilize one or more of the interfaces 3000 to configure various aspects associated with triggering and/or displaying targeted advertisements/content. In the context of the present description, an advertiser refers to any entity aspiring to present a product, service, and/or incentive to one or more other entities (e.g., people, businesses, etc.).

As shown in interface 1, the advertiser may have the ability to associate a trigger ID with one or more advertisement/context profiles. In one embodiment, the one or more advertisement/context profiles may be associated with one or more advertisements/content that has been designed to target (or is logically attributable) to a particular demographic or desired audience (e.g., males in their 30s, female homemakers, children, parents, dog owners, etc.). Accordingly, in one embodiment, a trigger ID may be associated with profile criteria that is, in turn, associated with one or more of the advertisements targeted towards a specific demographic. In this way, in one embodiment, social network systems (and/or other service systems) may utilize user information to associate trigger IDs with users, such that when a specific user is available for a third party advertisement opportunity, the associated trigger ID may be sent to the third party service, and an appropriate advertisement/content profile may be selected and presented, based on the trigger ID.

Further, in one embodiment, a location and/or context in which the advertisement is to be presented may be specified. For example, in various embodiments, an advertiser may have the ability to specify that the advertisements/content associated with the advertisement/content profile are presented at a physical display (e.g., a specific physical display, a display determined to be in proximity to the user, etc.), online (e.g., on a portion of a web page being viewed by the user, on a portion of a web page associated with the third party, on a portion of a web page associated with a social networking site, etc.), on a mobile device associated with the user (e.g., via a specific screen, via a specific application, etc.), any of the device(s) disclosed in the description of FIG. 28, and/or based on a location of the user.

In the case that the advertiser desires to present the advertisement/content based on a location of the user, in one embodiment, the advertisement/content may be presented on available displays, which are determined to be in the proximity of the user (e.g., a store display, a point-of-sale terminal, etc.). In one embodiment, if the advertiser desires to present the advertisement/content based on a location of the user, in one embodiment, the display in which to present the advertisement will be selected upon determination that the specific user is a specific location (e.g., and/or upon another triggering event, etc.).

As shown in interfaces 2 and 3, in one embodiment, the advertiser may be presented with specific location context options for advertisement/content presentation. For example, in various embodiments, the advertiser may specify that the advertisement be presented at an NFC terminal, online, a mobile device associated with the user, a specific location display, a general area location display, a point-of-sale terminal, a specific website, a general website, and/or various other displays. Furthermore, in one embodiment, the location presentation options may be configurable such that they are different for each trigger ID.

Specifically, in one embodiment in connection with interfaces 2 and 3, a specific display may be specifically identified (e.g., utilizing an IP, GPS, or other destination address, etc.) and even given an alias (e.g., "Discount Store Sports Department Display #1," etc.) such that a plurality of triggering profile criteria sets (each with a plurality of correlating trigger IDs) may be defined and associated with such specific display. Further, in the event that multiple displays are being enabled, the same or different triggering profile criteria sets/trigger IDs may be easily replicated (and possibly modified) for each of the different displays. To this end, the system may be configured such that, in connection with each display, a user identifying aspect may be sent to the service network (in connection with the specific display), such that the user profile criteria and advertisement target profile criteria can be used to cause display of the most relevant advertisement/content to the user via the specific display where he/she has been identified. Yet again, while physical displays are exemplified in the current embodiment, it should be noted that the display may be the same display with which the service network is accessed, but possibly in a different context (e.g., during use of a separate application, during downtime, etc.).

Figure 31:
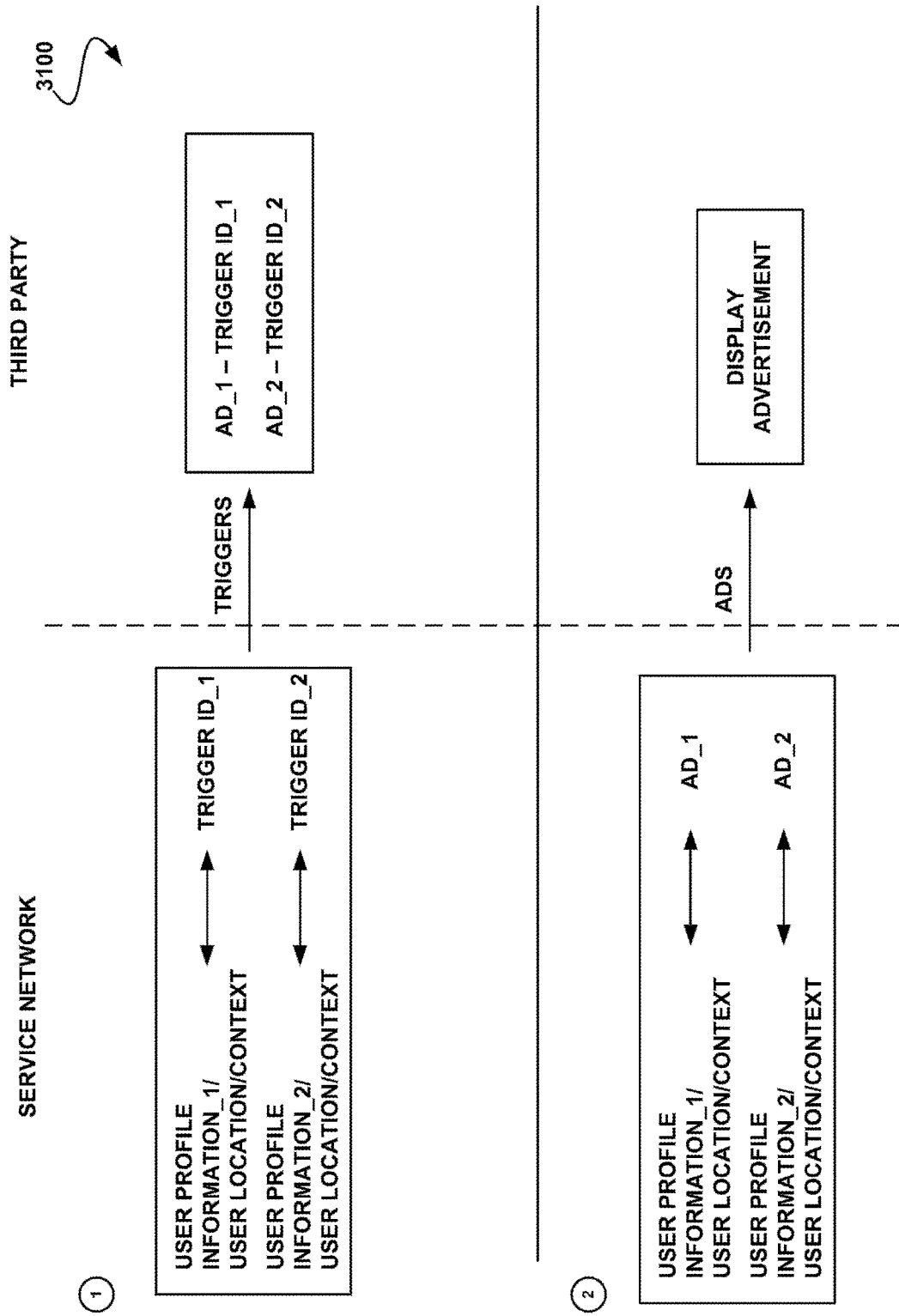
FIG. 31 shows a system flow for presenting advertisements, in accordance with another embodiment.

FIG. 31 shows a system flow 3100 for presenting advertisements, in accordance with another embodiment. As an option, the system flow 3100 may be implemented in the context of the architecture and environment of the previous Figures and/or any subsequent Figure(s). Of course, however, the system flow 3100 may be implemented in the context of any desired environment. It should also be noted that the aforementioned definitions may apply during the present description.

As shown, a service network system may associate user profile information, user location information, and/or contextual information with one or more advertisement/content trigger IDs. For example, in one embodiment, the service network system may utilize relevant information associated with a user to characterize the user such that advertisements/content may be targeted towards that user, based on the characterization. In this way, the service network system may utilize a vast amount of information the system has compiled about the user to more accurately characterize and/or categorize the user, for the purposes of more appropriately targeting advertisements/content. In one embodiment, the relevant profile information may be utilized to associate a trigger ID with the user. In one embodiment, the trigger ID may be associated with one or more advertisements/content that are considered to be relevant to the user.

Further, in one embodiment, user location information may be included and/or linked to the trigger ID. In one embodiment, the user location information may include current user location information. For example, in various embodiments, the current user location may be determined based on a user check-in, a mobile phone signal, a user communication (e.g., a user post, etc.), GPS coordinates, a network signal, a Bluetooth signal, and/or by utilizing various other techniques.

In another embodiment, the location information may include a residence location associated with the user. In another embodiment, the location information may include a business location associated with the user. In another embodiment, the location information may include a shopping location associated with the user. In another embodiment, the location information may include a virtual location associated with the user (e.g., a website, etc.).

Further, in one embodiment, the trigger ID may be associated with a context. In various embodiments, the context may include situations in which the advertisement/content is to be displayed, a time period in which the advertisement/content is to be displayed (or an expiration time, etc.), an event that is to occur before advertisement/content is to be displayed, and/or any other context in which the advertisement is to be displayed.

In one embodiment, the advertiser (and/or the service network, etc.) may have the ability to configure rules associated with the context. In one embodiment, the advertiser (and/or the service network, etc.) may have the ability to configure rules associated with the context utilizing one or more interfaces (e.g., the interfaces of FIG. 30, etc.). In various embodiments, the configurable rules may include configuring a number of times an advertisement/content is displayed to a particular user, a number of times an advertisement/content is displayed to all users, a time of day the advertisement/content is capable of being displayed, a location in which the advertisement/content is permitted to be displayed (e.g., a geographic location, a specific display location, a business location, etc.), a demographic that is capable of viewing the content/advertisement, criteria that must be true for the advertisement/content to be presented, events that must occur before the advertisement/content is presented (e.g., the user must purchase a specific item, the user must check-out at a store, etc.), and/or any other rule that may be utilized to establish a context.

Furthermore, in one embodiment, the triggers IDs, which are associated with the information, may be associated with one or more advertisements. In one embodiment, the service network system may associate the trigger ID with the advertisement(s). In another embodiment, the third party system may associate the trigger ID with the advertisement(s). For example, knowing what demographic, users, groups, and/or types of users in which the trigger IDs are associated, the advertisements/content that should be directed to those users (e.g., based on market research, etc.) may be selected and associated with the trigger IDs.

Accordingly, in one embodiment, when an apparatus associated with the third party determines that a user is present (e.g., at a point-of-sale terminal at check-out, etc.), information associated with the user may be sent from the third party (e.g., a name, an ID, a captured image, a username, etc.) such the service network may identify an associated trigger ID (or associate the user with a trigger ID, etc.). In one embodiment, the identified (or determined) trigger ID associated with the user may be communicated to the third party system (along with any other information, such as context, etc.). In response, in one embodiment, the third party system may utilize the trigger ID (as well as any other information accompanying the trigger ID, such as context, etc.) to select one or more advertisements to display to the user.

In another embodiment, the service network system may identify the location of the user (e.g., based on GPS coordinates, based on a user check-in, based on a check-out, etc.) and send a trigger ID to the third party system such that the advertisement/content may be selected and displayed. In still another embodiment, the service network may send advertisements/content to the third party system. For example, in one embodiment, the user may be identified and one or more advertisements may be selected by the service network system and sent to the third party system. In this case, in one embodiment, the third party system may display the advertisement received from the service network system. In one embodiment, the service network system may access an advertisement database to select an advertisement to send to the third party system.

Figure 32:
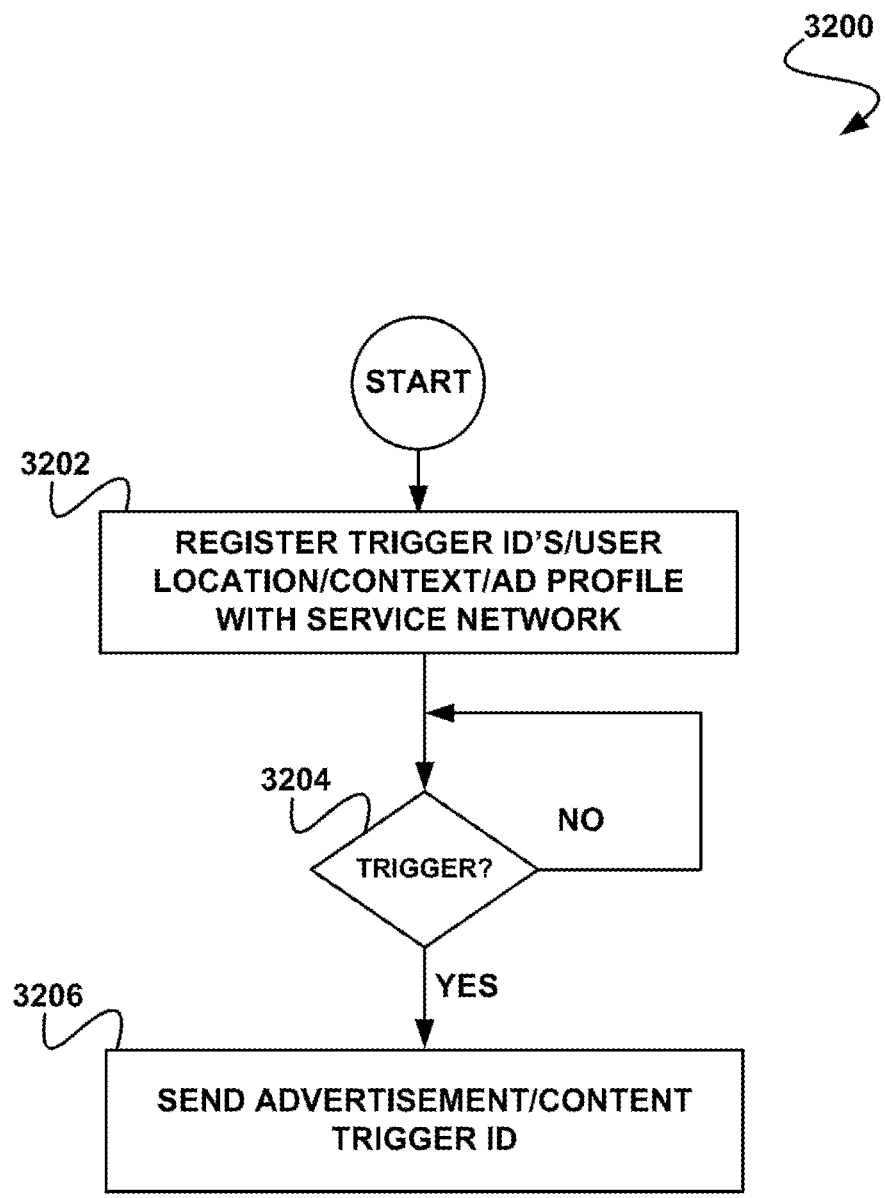
FIG. 32 shows a method for communicating advertisement/content trigger IDs, in accordance with one embodiment.

FIG. 32 shows a method 3200 for communicating advertisement/content trigger IDs, in accordance with one embodiment. As an option, the method 3200 may be implemented in the context of the architecture and environment of the previous Figures and/or any subsequent Figure(s). Of course, however, the method 3200 may be carried out in any desired environment. It should also be noted that the aforementioned definitions may apply during the present description.

As shown, trigger IDs are registered with a service network. See operation 3202. In one embodiment, a context, user location information, and advertisement profiles may also be registered with the service network and may be associated with a trigger ID. Of course, any of the trigger IDs and associated advertisement profile criteria and/or user profile criteria (as disclosed herein) may be registered in operation 3202.

Further, it is determined whether a trigger event has occurred. See decision 3204. In one embodiment, the service network may determine whether the trigger event has occurred. In another embodiment, a third party system may determine whether the trigger event has occurred. In one embodiment, the third party system may determine that the trigger event has occurred and may notify the service network system (e.g., by requesting an advertisement, by requesting a trigger ID, by sending user information, etc.).

The trigger event may include any type of trigger event. For example, in one embodiment, the trigger event may include a device recognizing the face of the user. In another embodiment, the trigger event may include the user scanning a loyalty card. In another embodiment, the trigger event may include the user swiping a credit card. In another embodiment, the trigger event may include the user initiating a mobile wallet payment. In another embodiment, the trigger event may include the user scanning an item.

In another embodiment, the trigger event may include the user checking in to a location. In another embodiment, the trigger event may include the user checking out at a store. In another embodiment, the trigger event may include the user requesting an advertisement/content. In another embodiment, the trigger event may include the user visiting a website (e.g., a particular website, etc.).

In another embodiment, the trigger event may include the user selecting an item on a web page. In another embodiment, the trigger event may include the user purchasing a particular item (or any item, etc.). In another embodiment, the trigger event may include the user performing a designated action on a point-of-sale terminal (e.g., selecting a particular button, etc.). In another embodiment, the trigger event may include the user performing a specific action on a mobile device (e.g., accessing a particular application, utilizing mobile payment functionality, etc.).

In another embodiment, the trigger event may include receiving a signal from a mobile device of the user. In another embodiment, the trigger event may include a determination that the user is in or near a particular location. In another embodiment, the trigger event may include the user accessing a particular network (e.g., a particular wireless network, etc.). In another embodiment, the trigger event may include receiving a text including keywords. In another embodiment, the trigger event may include receiving an e-mail including keywords.

In another embodiment, the trigger event may include receiving a voicemail including keywords. In another embodiment, the trigger event may include a calendar event. In another embodiment, the trigger event may include a media event. In still other embodiments, the trigger event may occur as a function of the identification of any of the user identifying aspect(s) disclosed hereinabove. Of course, in various embodiments, the trigger event may include any type of event.

If it is determined that a trigger event has occurred, the advertisement/content trigger ID is sent to the third party system. See operation 3206. In one embodiment, the advertisement may be sent to the third party system in response to the trigger event.

As noted, in one embodiment, the trigger event may include a user implementing a transaction utilizing a mobile device.

Figure 33:
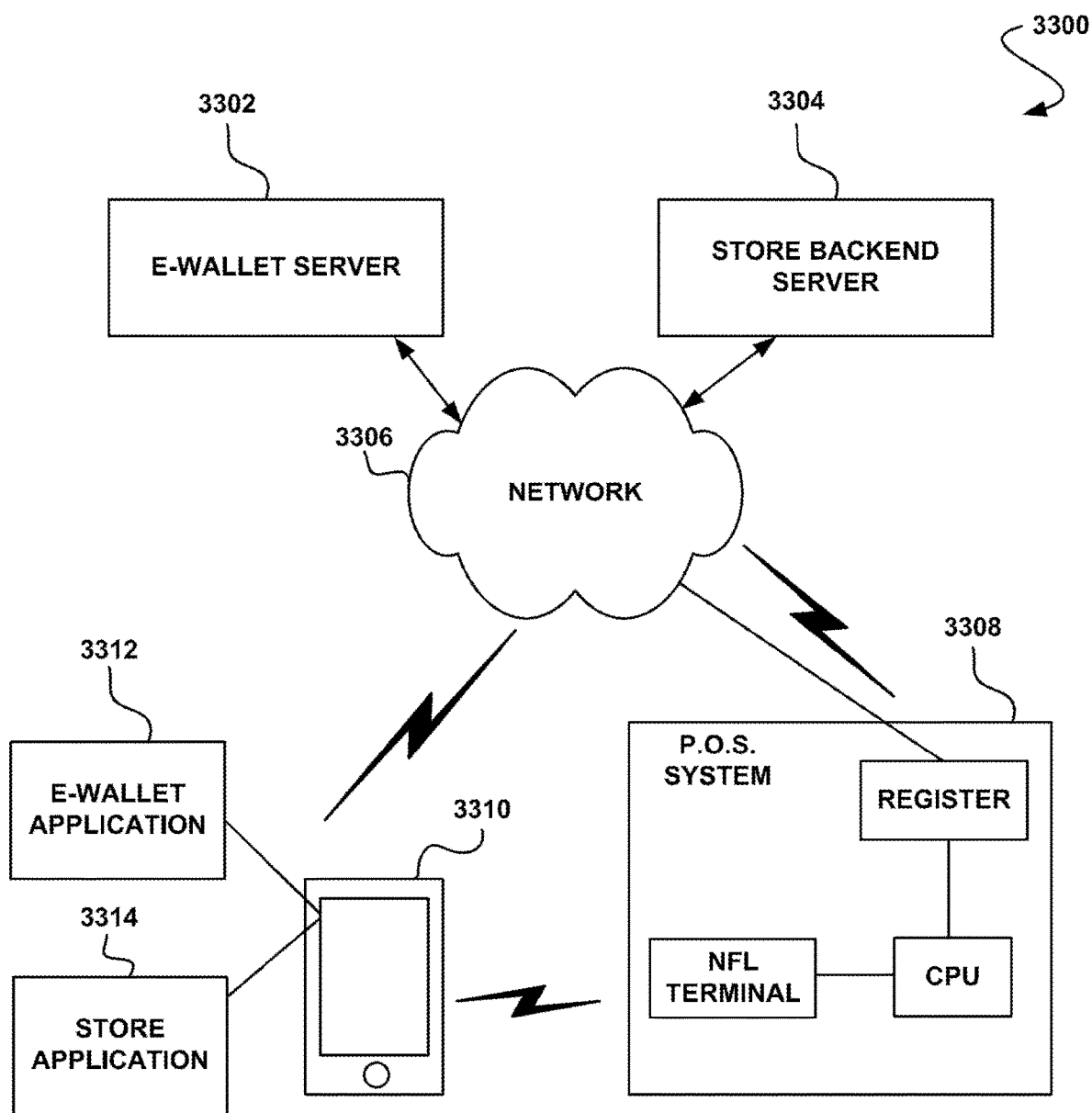
FIG. 33 shows a system for mobile device transactions, in accordance with another embodiment.

FIG. 33 shows a system 3300 for mobile device transactions, in accordance with another embodiment. As an option, the system 3300 may be implemented in the context of the architecture and environment of the previous Figures and/or any subsequent Figure(s). Of course, however, the system 3300 may be implemented in the context of any desired environment. It should also be noted that the aforementioned definitions may apply during the present description.

As shown, an e-wallet server 3302 may be in communication with one or more mobile devices 3310 and one or more point-of-sale systems 3308 over one or more networks 3306. Furthermore, in one embodiment, one or more store backend servers 3304 may be in communications with the e-wallet server 3302, the mobile device 3310, and/or the point-of-sale terminal 3308.

In operation, a user of the mobile device 3310 may initiate a transaction utilizing the mobile device 3310 and the point-of-sale terminal 3308. In one embodiment, an NFC connection between the mobile device 3310 and the point-of-sale terminal 3308 may be utilized to facilitate the transaction. In another embodiment, a Wi-Fi direct connection between the mobile device 3310 and the point-of-sale terminal 3308 may be utilized to facilitate the transaction.

In another embodiment, an IR connection between the mobile device 3310 and the point-of-sale terminal 3308 may be utilized to facilitate the transaction. In another embodiment, a Bluetooth connection between the mobile device 3310 and the point-of-sale terminal 3308 may be utilized to facilitate the transaction. In another embodiment, bump technology implemented between the mobile device 3310 and the point-of-sale terminal 3308 may be utilized to facilitate the transaction.

In another embodiment, the transaction between the mobile device 3310 and the point-of-sale terminal 3308 may be facilitated over the network 3306 (or another network, the Internet, etc.). In another embodiment, information displayed on the mobile device 3310 may be scanned by the point-of-sale terminal 3308 to facilitate the transaction. Of course, in various embodiments, any suitable technology may be utilized to facilitate the transaction.

In operation, in one embodiment, the user may utilize an e-wallet application 3312, which is stored on the mobile device 3310 to facilitate payment of goods and/or services. In one embodiment, the e-wallet application 3312 may enable communication between the mobile device 3310 and the e-wallet server 3302. In one embodiment, the e-wallet server 3302 may include service functionality for enabling a transaction to occur between the user of the mobile device 3310 and a store associated with the point-of-sale terminal and/or the store backend server 3304.

For example, a user may proceed to checkout at a point-of-sale terminal at a grocery store. In one embodiment, the mobile device 3310 may be utilized to communicate store loyalty card information to the point-of-sale terminal 3308. In one embodiment, a store application 3314, which may be stored on the mobile device 3310, may be utilized to facilitate the transfer of the store loyalty card information. In another embodiment, the e-wallet application 3312 may be utilized to facilitate the transfer of the store loyalty card information.

Further, in one embodiment, the user may utilize the e-wallet application 3312 stored on the mobile device 3310 to pay for items. In one embodiment, the e-wallet application 3312 may include credit card information associated with the user, such that the credit card may be utilized automatically to pay for the items. In another embodiment, the e-wallet application 3312 may include pre-paid card information associated with the user, such that the pre-paid card may be utilized automatically to pay for the items. In another embodiment, the e-wallet application 3312 may include bank card information associated with the user, such that the bank card may be utilized automatically to pay for the items. In another embodiment, the e-wallet application 3312 may include bank account information associated with the user, such that the bank account information may be utilized automatically to pay for the items. In one embodiment, a user may have the ability to choose a default payment method from a list of available payment methods.

In one embodiment, transaction details may be displayed on the mobile device 3310 and/or on a display associated with the point-of-sale system 3308. For example, in one embodiment, upon finalization of the transaction, transaction information may be displayed on the mobile device. In one embodiment, the transaction information may be displayed utilizing the e-wallet application 3312.

In another embodiment, the transaction information may be displayed utilizing the store application 3314. In another embodiment, the transaction information may be displayed utilizing another application stored on the mobile device 3310. Further, in one embodiment, the transaction information may be displayed on a lock screen of the mobile device 3310. In one embodiment, such transaction information may be displayed in a non-intrusive manner. In various embodiments, the transaction information may include a cost (e.g., a total cost, a cost per item, a cost of sales tax, an itemized price list, etc.), a list of purchased items/services, a time of purchase, product names, product codes, a method of payment, one or more of the transaction parties, and/or any other transaction related information.

Still yet, in one embodiment, the transaction may serve as trigger event for displaying advertisements on the point-of-sale terminal 3308 and/or the mobile device, as described in the context of the previous figures and subsequent figures, etc. In one embodiment, the advertisements may be displayed on the mobile device 3310 and/or the point-of-sale terminal 3308 in a non-intrusive manner.

More information about non-intrusively displaying advertisements on a mobile device may be found in U.S. Provisional Patent Application No. 61/711,727, filed Oct. 9, 2012, titled "SYSTEM, METHOD, AND COMPUTER PROGRAM PRODUCT FOR DETERMINING WHETHER TO PROMPT AN ACTION BY A PLATFORM IN CONNECTION WITH A MOBILE DEVICE," which is incorporated herein by reference in its entirety.

Figure 34:
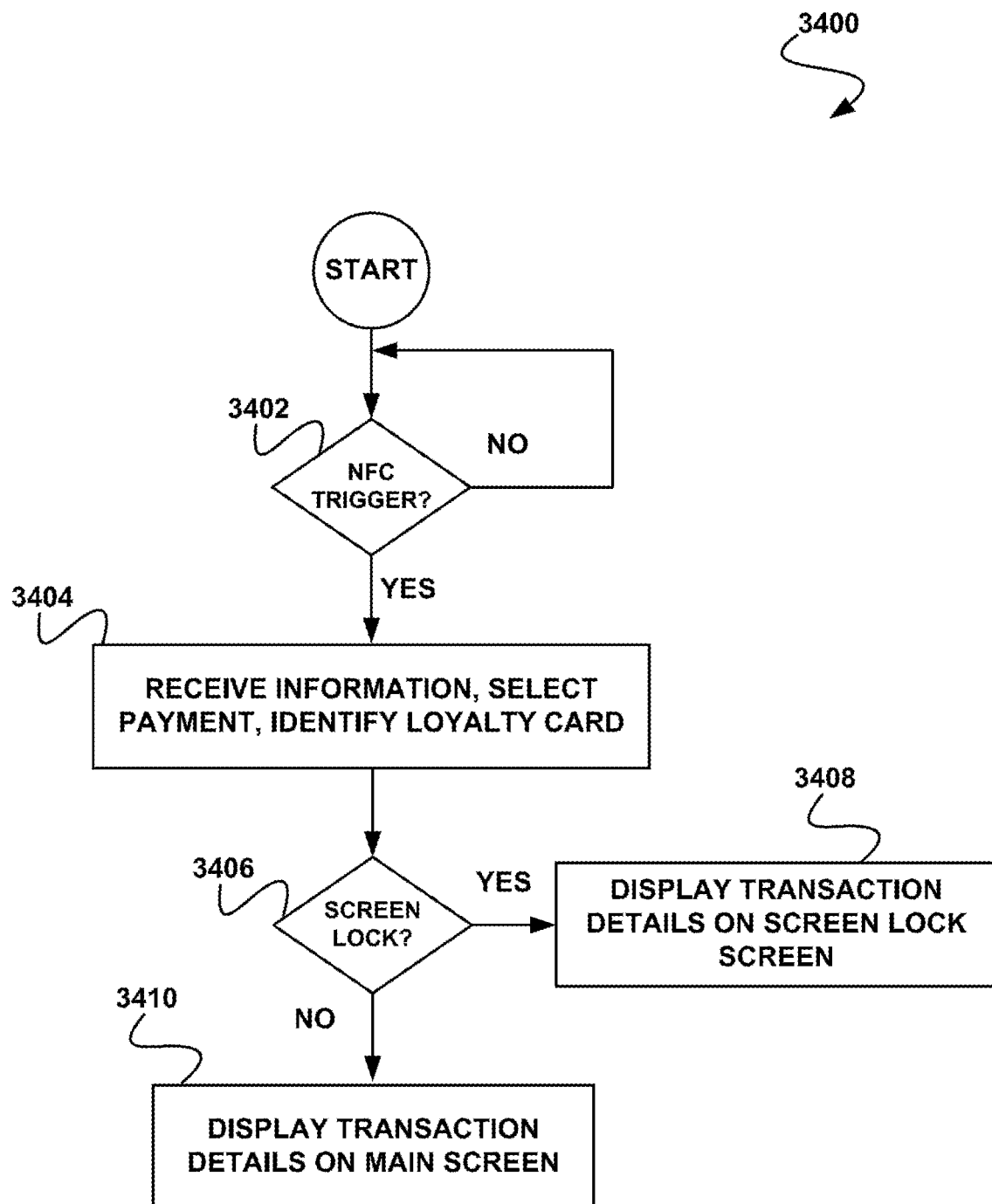
FIG. 34 shows a method for a mobile device transaction, in accordance with another embodiment.

FIG. 34 shows a method 3400 for a mobile device transaction, in accordance with another embodiment. As an option, the method 3400 may be implemented in the context of the architecture and environment of the previous Figures and/or any subsequent Figure(s). Of course, however, the method 3400 may be carried out in any desired environment. It should also be noted that the aforementioned definitions may apply during the present description.

As shown, it is determined whether an NFC trigger is received by a mobile device (or an application associated therewith). See determination 3402. While a NFC trigger is disclosed in the context of operation 3402, it should be noted that any connection mechanism (e.g., see those, for example, disclosed during the description of FIG. 33, etc.) may be used in lieu of NFC.

If a trigger is received in operation 3402, information associated with the transaction is received, a payment method is selected (e.g., a card is selected, etc.), and a loyalty card is identified. See operation 3404.

In one embodiment, the information received may include transaction information. In various embodiments, the transaction information may include a price, credit card information, loyalty information, product information, store information, time information, location information, discount information, method of purchase information, and/or any other type of transaction-related information.

In various embodiments, the payment method may include a credit card (or a credit card number), a debit card, a prepaid card, bank account information, and/or any other payment type. In one embodiment, the payment method may be manually selected by the user at the time of completing the transaction. Further, in another embodiment, the payment method may be automatically selected (or at least suggested) based on any criteria. Such criteria may include or be based, at least in part, on a current location (e.g., based on a GPS location, etc.), a point-of-sale terminal used, on a signal received (e.g., that indicates which payment method types are acceptable), the type of payment method last used (in general, or at the current location), a balance of an account associated with the payment method (that is sufficient to cover the cost of the transaction), etc.

Still yet, in operation 3404, a loyalty card may be identified. For example, such loyalty card may be automatically selected. In various embodiments, the loyalty card may be selected based on a current location (e.g., based on a GPS location, etc.), based on a point-of-sale terminal used, based on a signal received, and/or utilizing various other techniques. In another embodiment, the loyalty card may be manually selected by the user of the mobile device.

Further, it is determined whether a screen of the mobile device is locked. See determination 3406. If it is determined that the screen is locked, the transaction details are displayed on the screen lock screen of the mobile device. See operation 3408. If it is determined that the screen is not locked, the transaction details are displayed on the main screen of the mobile device. See operation 3410.

While not necessarily illustrated, it may or may not be determined whether the mobile device is in a standby mode in determination 3406. If it is determined that the mobile device is in a standby mode, the mobile device may be powered up and/or taken out of the standby mode before the transaction details are displayed on the screen lock screen of the mobile device in operation 3408.

In the event that the transaction details are displayed on the main screen of the mobile device per operation 3410, an application (e.g., e-wallet, etc.) installed on the mobile device (that is capable of facilitating the transaction) may be automatically executed and opened, such that the main screen is populated (possibly entirely or substantially so) by an interface of the aforementioned application.

While not shown, in the event that a transaction is completed via the lock screen in operation 3408, an option may be given thereafter to execute and open a relevant interface (e.g., post-transaction interface) of the foregoing application for engaging in post-transaction functionality (e.g., examples of which will be set forth hereinafter in greater detail). Further, absent electing such option, the mobile device may either stay in lock screen mode for a predetermined period and thereafter return to the power standby mode, or immediately return to the power standby mode.

In one embodiment, one or more advertisements may be displayed on the lock screen of the mobile device (and/or the main screen, as well). Further, in one embodiment, advertisements may be displayed on the mobile device based on a location of the mobile device.

Again, it should be noted that, although the method 3400 refers to an NFC trigger, any communication protocol connection may be utilized as a trigger in another embodiment.

As an option, the aforementioned mobile device may be capable of operating in a location-specific mode, in the context of any of the embodiments disclosed hereinabove. Specifically, in one embodiment, a location associated with the mobile device may be determined. Further determined may be a presence of at least one other person at the location. Still yet, a graphical user interface may be automatically displayed. Such graphical user interface may be specifically associated with the determined location and the determined presence of the at least one other person. In another embodiment, the system, method, or computer program product may be capable of determining a location associated with the mobile device and automatically determining that the location is proximate to a previously identified item of interest. To this end, a graphical user interface associated with the determined location and the previously identified item of interest may be displayed. More information regarding such location-specific features that may or may not be incorporated into any of the embodiments disclosed herein, may be found in U.S. patent application Ser. No. 13/652,458, filed Oct. 15, 2012, titled "MOBILE DEVICE SYSTEM, METHOD, AND COMPUTER PROGRAM PRODUCT," which is incorporated herein by reference in its entirety.

In various other optional embodiments, the features, capabilities, and/or technology, etc. of the television, mobile devices, and/or mobile device applications, etc. disclosed in the following patents/applications may or may not be incorporated into any of the embodiments disclosed herein: U.S. Pat. Nos. 8,078,397, 7,669,123, 7,725,492, 7,788,260, 7,797,256, 7,809,805, 7,827,208, 7,827,265, 7,890,501, 7,933,810, 7,945,653, 7,970,657, 8,010,458, 8,027,943, 8,037,093, 8,081,817, 8,099,433, US20080033739A1, US20080046976A1, US20090144392A1, US2009-0198487A1, US20100049852A1, US20100132049A1, US20100164957A1, US20100169327A1, US2010-0198581A1, US20100229223A1, US20100257023A1, US20110044354A1, U.S. Non-Provisional application Ser. No. 13/652,458, filed Oct. 15, 2012; U.S. Provisional Application No. 61/547,638, filed Oct. 14, 2011; U.S. Provisional Application No. 61/567,118 dated Dec. 5, 2011; U.S. Provisional Application No. 61/577,657 dated Dec. 19, 2011; U.S. Provisional Application No. 61/599,920 dated Feb. 16, 2012; and/or U.S. Provisional Application No. 61/612,960 dated Mar. 19, 2012. Each of the foregoing patents/applications is hereby incorporated by reference in its entirety for all purposes.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals.

It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

In one embodiment, each method described above and combinations thereof may be embodied in computer executable code that, when executing on one or more computing devices, performs the acts and/or provides the capabilities thereof. In another embodiment, the methods may be embodied in systems that perform the acts and/or provides the capabilities thereof, and may be distributed across devices in a number of ways, or all of the functionality may be integrated into a dedicated, standalone device or other hardware. In another embodiment, means for performing the steps associated with the processes described above may include any of the hardware and/or software described above. All such permutations and combinations are intended to fall within the scope of the present disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the claims and their equivalents.

In various embodiments, the modules/platforms described above may include, but are not limited to modules/platforms configured to provide payment provider information (e.g., user billing information, user awards point information, purchase information, etc.—see, for example, U.S. Pat. Nos. 8,127,982, 8,239,276, US 2002/0179704A1 filed Jun. 5, 2001, which are each incorporated herein by reference), search provider information (e.g., search query terms, search results, etc.), application usage information (e.g., information associated with the types of applications used, information provided to applications, information gleaned from applications, information determined by applications, stored information associated with applications, information collected by the application from other platforms, applications, etc.), information associated with a current or past location associated with a device and/or a user (e.g., IP address information, GPS information, cellular network information, social network check-in information, etc.), general information (e.g., general information associated with a device, general information associated with a user, etc.), big data information (e.g., mobile device generated or logged data, user generated or logged data, automobile generated or logged data, etc.), and/or various other information.

In one embodiment, the master application may provide information to company advertisements and/or other relater and/or other related-third party advertisers to trigger advertisements. More information about providing dynamic advertisements may be found in U.S. Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER," which is incorporated herein by reference in its entirety.

More information regarding targeted advertisements and content may be found in U.S. Provisional Patent Application No. 61/563,741, filed Nov. 25, 2011, titled "SYSTEM, METHOD, AND COMPUTER PROGRAM PRODUCT FOR PRESENTING DECISION RELATED INFORMATION;" U.S. Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER" U.S. Provisional Patent Application No. 61/591,819, filed Jan. 27, 2012, titled "SYSTEM, METHOD, AND COMPUTER PROGRAM PRODUCT FOR ALTERING AT LEAST ONE ASPECT OF AN INTEGRATED E-COMMERCE ON-LINE APPLICATION;" and U.S. Provisional Patent Application No. 61/596,174, filed Feb. 7, 2012, titled "SYSTEM, METHOD, AND COMPUTER PROGRAM PRODUCT FOR ALTERING AT LEAST ONE ASPECT OF AN INTEGRATED E-COMMERCE ON-LINE APPLICATION," which are incorporated herein by reference in their entirety.

More information regarding facial recognition may be found in U.S. Provisional Patent Application No. 61/612,960, filed Mar. 19, 2012, titled "SYSTEM, METHOD, AND COMPUTER PROGRAM PRODUCT FOR ALTERING AT LEAST ONE ASPECT OF AN EXPERIENCE OF A VIEWER IN ASSOCIATION WITH A TELEVISION," which is incorporated herein by reference in its entirety.

More information about facial recognition may be found in U.S. Pat. No. 8,261,090, issued Sep. 4, 2012, titled "Login to a computing device based on facial recognition," which is incorporated herein by reference in its entirety.

More information regarding user check-in may be found in U.S. Provisional Patent Application No. 61/590,767, filed Jan. 25, 2012, and titled "SYSTEM, METHOD AND COMPUTER PROGRAM PRODUCT FOR LOCATION-SPECIFIC PRIVACY SETTINGS," which is incorporated herein by reference in its entirety.

More information regarding location definition and determination may be found in U.S. Provisional Patent Application No. 61/511,750, filed Jul. 26, 2011, titled "SYSTEM, METHOD, AND COMPUTER PROGRAM PRODUCT FOR MANAGING A SOCIAL NETWORK BASED ON AT LEAST A TIME OR A LOCATION," and U.S. patent application Ser. No. 13/557,198, filed Jul. 24, 2012, titled "SYSTEM, METHOD, AND COMPUTER PROGRAM PRODUCT FOR MANAGING A SOCIAL NETWORK BASED ON AT LEAST A TIME OR A LOCATION," which are incorporated by reference in their entirety.

More information associated with image/object recognition techniques may be found in U.S. Provisional Patent Application No. 61/612,960, filed Mar. 19, 2012, titled "SYSTEM, METHOD, AND COMPUTER PROGRAM PRODUCT FOR ALTERING AT LEAST ONE ASPECT OF AN EXPERIENCE OF A VIEWER IN ASSOCIATION WITH A TELEVISION," which is incorporated herein by reference in its entirety.

More information regarding determining interests/habits of a user may be found in U.S. Provisional Patent Application No. 61/481,722, filed May 2, 2011, titled "SYSTEM, METHOD, AND COMPUTER PROGRAM PRODUCT FOR ALLOCATING TIME TO ACHIEVE OBJECTIVES;" and U.S. patent application Ser. No. 13/462,804, filed May 2, 2012, titled "SYSTEM, METHOD, AND COMPUTER PROGRAM PRODUCT FOR ALLOCATING TIME TO ACHIEVE OBJECTIVES," which are incorporated herein by reference in their entirety.

The communication between the mobile device and the point-of-sale terminal may include various types of communication. For example, in one embodiment, the communication may be established utilizing near field communication (NFC). In another embodiment, the communication may be established utilizing Wi-Fi functionality (e.g., Wi-Fi direct, etc.). In another embodiment, the communication may be established utilizing Bluetooth functionality. In another embodiment, the communication may be established utilizing bump technology (e.g., direct contact, etc.). For example, in one embodiment, such bump technology may or may not include one or more of the features set forth in U.S. Application Publication No.: US2011/0191823A1 filed Feb. 3, 2010, which is incorporated herein by reference for all purposes. In still yet another embodiment, the communication may be established via the Internet (e.g., via a cellular network, Wi-Fi network, etc.).

More information regarding leveraging service providers to collect information may be found in U.S. Provisional Patent Application No. 61/563,741, filed Nov. 25, 2011, titled "SYSTEM, METHOD, AND COMPUTER PROGRAM PRODUCT FOR PRESENTING DECISION RELATED INFORMATION;" and U.S. Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER," which are incorporated herein by reference in their entirety.

More information regarding determining interests/habits of a user may be found in U.S. Provisional Patent Application No. 61/481,722, filed May 2, 2011, titled "SYSTEM, METHOD, AND COMPUTER PROGRAM PRODUCT FOR ALLOCATING TIME TO ACHIEVE OBJECTIVES;" and U.S. patent application Ser. No. 13/462,804, filed May 2, 2012, titled "SYSTEM, METHOD, AND COMPUTER PROGRAM PRODUCT FOR ALLOCATING TIME TO ACHIEVE OBJECTIVES," which are incorporated herein by reference in their entirety.

As an option, the aforementioned mobile device may be capable of operating in a location-specific mode. Specifically, in one embodiment, a location associated with the mobile device may be determined. Further determined may be a presence of at least one other person at the location. Still yet, a graphical user interface may be automatically displayed. Such graphical user interface may be specifically associated with the determined location and the determined presence of the at least one other person. In another embodiment, the system, method, or computer program product may be capable of determining a location associated with the mobile device and automatically determining that the location is proximate to a previously identified item of interest. To this end, a graphical user interface associated with the determined location and the previously identified item of interest may be displayed. More information regarding such location-specific features that may or may not be incorporated into any of the embodiments disclosed herein, may be found in U.S. patent application Ser. No. 13/652,458, filed Oct. 15, 2012, titled "MOBILE DEVICE SYSTEM, METHOD, AND COMPUTER PROGRAM PRODUCT," which is incorporated herein by reference in its entirety.

The present application claims priority to U.S. Non-Provisional application Ser. No. 13/652,458, filed Oct. 15, 2012, which claims priority from U.S. Provisional Application No. 61/547,638, filed Oct. 14, 2011, U.S. Provisional Application No. 61/567,118 dated Dec. 5, 2011, U.S. Provisional Application No. 61/577,657 dated Dec. 19, 2011, U.S. Provisional Application No. 61/599,920 dated Feb. 16, 2012, and U.S. Provisional Application No. 61/612,960 dated Mar. 19, 2012, all of which are incorporated herein by reference in their entirety for all purposes. As an option, any one or more of the following embodiments (and/or any one or more features thereof) described in connection with any one or more of the subsequent Figure(s) may or may not be implemented in the context of any one or more of the embodiments (and/or any one or more features thereof) described in connection with any one or more Figure(s) of the above incorporated applications. Of course, however, any one or more of the following embodiments (and/or any one or more features thereof) may be implemented in any desired environment.

As an option, the aforementioned mobile device may be capable of operating in a location-specific mode, in the context of any of the embodiments disclosed hereinabove. Specifically, in one embodiment, a location associated with the mobile device may be determined. Further determined may be a presence of at least one other person at the location. Still yet, a graphical user interface may be automatically displayed. Such graphical user interface may be specifically associated with the determined location and the determined presence of the at least one other person. In another embodiment, the system, method, or computer program product may be capable of determining a location associated with the mobile device and automatically determining that the location is proximate to a previously identified item of interest. To this end, a graphical user interface associated with the determined location and the previously identified item of interest may be displayed. More information regarding such location-specific features that may or may not be incorporated into any of the embodiments disclosed herein, may be found in U.S. patent application Ser. No. 13/652,458, filed Oct. 15, 2012, titled "MOBILE DEVICE SYSTEM, METHOD, AND COMPUTER PROGRAM PRODUCT," which is incorporated herein by reference in its entirety.

In another embodiment, the devices described herein may include a vehicular head-unit display associated with a vehicular assembly. One example of such a vehicular assembly may include that which is disclosed in U.S. Pat. No. 8,131,458 issued Mar. 6, 2012 and entitled "SYSTEM, METHOD, AND COMPUTER PROGRAM PRODUCT FOR INSTANT MESSAGING UTILIZING A VEHICULAR ASSEMBLY," which is incorporated herein by reference in its entirety. In the present embodiment, such head-unit display may communicate with the servers 2804 and/or 2806 via a communication channel of a mobile device (as taught in U.S. Pat. No. 8,131,458). Of course, in other embodiments, the vehicle (and thus the head-unit display) may be equipped with its own modem for communicating directly with the servers 2804 and/or 28406.

More information about non-intrusively displaying advertisements on a mobile device may be found in U.S. Provisional Patent Application No. 61/711,727, filed Oct. 9, 2012, titled "SYSTEM, METHOD, AND COMPUTER PROGRAM PRODUCT FOR DETERMINING WHETHER TO PROMPT AN ACTION BY A PLATFORM IN CONNECTION WITH A MOBILE DEVICE," which is incorporated herein by reference in its entirety.

Still yet, in one embodiment, the social networking system may provide information (e.g. user information, trigger IDs, etc.) to company advertisers and/or other related-third party advertisers to trigger advertisements. More information about providing dynamic advertisements may be found in U.S. Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER," which is incorporated herein by reference in its entirety.

In one embodiment, the social networking service may include a time and/or a location based social network. More information regarding location based applications may be found in U.S. Provisional Patent Application No. 61/511,750, filed Jul. 26, 2011, titled "SYSTEM, METHOD, AND COMPUTER PROGRAM PRODUCT FOR MANAGING A SOCIAL NETWORK BASED ON AT LEAST A TIME OR A LOCATION," and U.S. patent application Ser. No. 13/557,198, filed Jul. 24, 2012, titled "SYSTEM, METHOD, AND COMPUTER PROGRAM PRODUCT FOR MANAGING A SOCIAL NETWORK BASED ON AT LEAST A TIME OR A LOCATION," which are incorporated herein by reference in their entirety.

In various embodiments, the aforementioned user identifying aspect may be encrypted for ensuring anonymity of the user. More information regarding various possible features and/or utilization of the aforementioned user identifying aspect may be found in U.S. Provisional Patent Application No. 61/563,741, filed Nov. 25, 2011, titled "SYSTEM, METHOD, AND COMPUTER PROGRAM PRODUCT FOR PRESENTING DECISION RELATED INFORMATION;" and U.S. Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER," which are incorporated herein by reference in their entirety.

More information about non-intrusively displaying advertisements on a mobile device may be found in U.S. Provisional Patent Application No. 61/711,727, filed Oct. 9, 2012, titled "SYSTEM, METHOD, AND COMPUTER PROGRAM PRODUCT FOR DETERMINING WHETHER TO PROMPT AN ACTION BY A PLATFORM IN CONNECTION WITH A MOBILE DEVICE," which is incorporated herein by reference in its entirety.

More information regarding targeted advertisements/content and the information utilized to determine such advertisements/content may be found in U.S. Provisional Patent Application No. 61/563,741, filed Nov. 25, 2011, titled "SYSTEM, METHOD, AND COMPUTER PROGRAM PRODUCT FOR PRESENTING DECISION RELATED INFORMATION;" and U.S. Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER," which are incorporated herein by reference in their entirety.

More information regarding facial recognition and other features that may or may not be incorporated into any of the embodiments disclosed herein, may be found in U.S. patent application Ser. No. 13/652,458, filed Oct. 15, 2012, titled "MOBILE DEVICE SYSTEM, METHOD, AND COMPUTER PROGRAM PRODUCT," which is incorporated herein by reference in its entirety.

More information regarding checking in to a location, etc. may be found in U.S. Provisional Patent Application No. 61/590,767, filed Jan. 25, 2012, titled "SYSTEM, METHOD AND COMPUTER PROGRAM PRODUCT FOR LOCATION-SPECIFIC PRIVACY SETTINGS;" U.S. Provisional Patent Application No. 61/591,819, filed Jan. 27, 2012, titled "SYSTEM, METHOD, AND COMPUTER PROGRAM PRODUCT FOR ALTERING AT LEAST ONE ASPECT OF AN INTEGRATED E-COMMERCE ON-LINE APPLICATION;" and U.S. Provisional Patent Application No. 61/596,174, filed Feb. 7, 2012, titled "SYSTEM, METHOD, AND COMPUTER PROGRAM PRODUCT FOR ALTERING AT LEAST ONE ASPECT OF AN INTEGRATED E-COMMERCE ON-LINE APPLICATION," which are each incorporated herein by reference in their entirety.

In various other optional embodiments, the features, capabilities, and/or technology, etc. of the television, mobile devices, and/or mobile device applications, etc. disclosed in the following patents/applications may or may not be incorporated into any of the embodiments disclosed herein: U.S. Pat. Nos. 8,078,397, 7,669,123, 7,725,492, 7,788,260, 7,797,256, 7,809,805, 7,827,208, 7,827,265, 7,890,501, 7,933,810, 7,945,653, 7,970,657, 8,010,458, 8,027,943, 8,037,093, 8,081,817, 8,099,433, US20080033739A1, US20080046976A1, US20090144392A1, US20090198487A1, US20100049852A1, US20100132049A1, US20100164957A1, US20100169327A1, US20100198581A1, US20100229223A1, US20100257023A1, US20110044354A1, U.S. Non-Provisional application Ser. No. 13/652,458, filed Oct. 15, 2012; U.S. Provisional Application No. 61/547,638, filed Oct. 14, 2011; U.S. Provisional Application No. 61/567,118 dated Dec. 5, 2011; U.S. Provisional Application No. 61/577,657 dated Dec. 19, 2011; U.S. Provisional Application No. 61/599,920 dated Feb. 16, 2012; and/or U.S. Provisional Application No. 61/612,960 dated Mar. 19, 2012. Each of the foregoing patents/applications is hereby incorporated by reference in its entirety for all purposes.

What is claimed is:

1. A computer-program product tangibly embodied in a non-transitory machine-readable storage medium, including instructions configured to cause one or more data processors of a device to perform actions including:
   storing payment information associated with a payment account;
   detecting a point-of-sale (POS) terminal;
   in response to detecting the POS terminal, presenting a stimulus;
   detecting a mechanical input;

in response to detecting the mechanical input, enabling the payment information to be accessed; and
causing a communication to be transmitted to the POS terminal;
wherein:
the detecting the mechanical input includes detecting that a button has been pressed;
the actions further include: receiving a user input corresponding to a selection of the payment account to use for a transaction; and
the actions further include:
after detecting the POS terminal, when a backlight of a touchscreen of the device is powered off:
powering on the backlight of the touchscreen of the device;
after detecting the POS terminal, when the device is operating in a lock screen mode:
identifying at least one card, and
simultaneously displaying, via a lock screen displayed on the touchscreen of the device, the at least one card, at least a portion of a card number of the at least one card, and an indication for a user of the device to provide identity verification input;
after the display, via the lock screen displayed on the touchscreen of the device when the device is operating in the lock screen mode, of the at least one card, the at least portion of the card number of the at least one card, and the indication for the user of the device to provide identity verification input:
detecting, utilizing the device, an identity verification input,
in response to the detection of the identity verification input, generating an identity verification signal utilizing the device,
in response to the generation of the identity verification signal utilizing the device, performing an analysis based on the identity verification signal, and
based on the analysis, sending, to the POS terminal, the communication that includes a first signal, where the identity verification input is required in addition to the mechanical input so that no other user input is required after detecting the POS terminal and before the first signal is sent, and the device operates in the lock screen mode after the detection of the identity verification input and further after the first signal is sent.

2. The computer-program product of claim 1, wherein the communication is transmitted using near-field communication (NFC).

3. The computer-program product of claim 1, wherein the actions further include, in response to detecting the mechanical input, selecting the payment account from amongst a plurality of payment accounts based on application of a learning technique.

4. The computer-program product of claim 1, wherein the enabling of the payment information to be accessed is further in response to detecting that the identity verification input has been received.

5. The computer-program product of claim 1, wherein the enabling of the payment information to be accessed is further in response to detecting that a passcode input has been received.

6. The computer-program product of claim 1, wherein the mechanical input is received via a mechanical button on a side of the device.

7. The computer-program product of claim 1, wherein the mechanical input includes a double press of the button.

8. The computer-program product of claim 1, wherein the actions further include:
after sending, utilizing the device, the first signal:
receiving a second signal, and
in response to the receipt of the second signal:
displaying, a notification.

9. The computer-program product of claim 8, wherein the payment information is enabled to be accessed by verifying the identity verification input, the payment information is enabled to be accessed in response to detecting the identity verification input in addition to the mechanical input, and the notification is displayed via the lock screen on the touchscreen of the device and below a time indicia.

10. The computer-program product of claim 8, wherein the actions further include:
after the receipt of the second signal, when the backlight of the touchscreen of the device is powered off:
powering on the backlight of the touchscreen of the device.

11. The computer-program product of claim 8, wherein the device is configured, when the device is operating in the lock screen mode, to remain in the lock screen mode after the detection of the identity verification input and further after the first signal is sent, until additional input is detected.

12. The computer-program product of claim 8, wherein the device is configured such that:
the at least one card includes a credit card or a debit card;
the card number includes a credit card number or a debit card number;
the first signal includes a financial transaction first signal; and
the second signal includes a financial transaction receipt signal.

13. The computer-program product of claim 12, wherein the device is configured to, after detecting the mechanical input: display an option to, as an alternative to a presentation of a face or a fingerprint of a user, enter a passcode for causing the first signal to be sent.

14. The computer-program product of claim 8, wherein the notification indicates that use of the at least one card was successful, and the first signal is an authorization signal and the second signal is a response signal.

15. The computer-program product of claim 1, wherein the actions further include:
receiving a user selection indicating that the at least one card is a default card among a plurality of cards, wherein the at least one card is displayed via the lock screen displayed on the touchscreen, based on the user selection.

16. The computer-program product of claim 1, wherein the actions further include:
displaying a settings interface, and
receiving a user selection to enable or disable a capability involving the display of the at least one card on the lock screen, and
wherein the at least one card is displayed via the lock screen, based on the user selection.

17. The computer-program product of claim 1, wherein the device is configured to display, via the lock screen displayed on the touchscreen of the device, with the at least one card, with the at least portion of the card number of the at least one card, and with the indication for the user of the device to provide identity verification input: an option for the user of the device to enter a passcode for causing the first signal to be sent.

18. The computer-program product of claim 1, wherein the user input corresponding to the selection of the payment account is received, after detecting the POS terminal, and before causing the communication to be transmitted to the POS terminal.

19. The computer-program product of claim 1, wherein the actions further include detecting the POS terminal when the device is in a standby mode, and, in response to detecting the POS terminal when the device is in the standby mode, activating a backlight of the device for presenting the stimulus.

20. The computer-program product of claim 1, wherein the actions further include detecting the POS terminal when the device is in the lock screen mode, and, in response to detecting the POS terminal when the device is in the lock screen mode, prompting the identity verification input to be received.

21. The computer-program product of claim 1, wherein the actions further include:
    detecting the POS terminal when the device is in the lock screen mode, and, in response to detecting the POS terminal when the device is in the lock screen mode, prompting the identity verification input to be locally received; and
    in response to detecting that the identity verification input is locally received, removing the device from the lock screen mode.

22. The computer-program product of claim 1, wherein the actions further include:
    after detecting the POS terminal, when the device is not operating in the lock screen mode:
        opening a card-related application, and
        displaying, utilizing the touchscreen of the device, a card-related application interface on one or more screens.

23. The computer-program product of claim 22, wherein the device is configured such that the card-related application interface is displayed with the at least one card, the at least portion of the card number of the at least one card, and the indication for the user of the device to provide identity verification input.

24. The computer-program product of claim 23, wherein the one or more screens is not a lock screen.

25. The computer-program product of claim 23, wherein the one or more screens is not a lock screen, such that the card-related application interface populates an entirety of the one or more screens.

26. The computer-program product of claim 23, wherein:
    the card-related application includes an e-wallet application; and
    the card-related application interface includes an e-wallet application interface.

27. The computer-program product of claim 1, wherein the instructions are configured such that, when the POS terminal is detected while the backlight of the touchscreen of the device is powered off and the device is operating in the lock screen mode, the following actions are capable of being performed in the following order without any additional user input being required between any of the following actions:
    (a) detecting the POS terminal;
    (b) powering on the backlight of the touchscreen of the device;
    (c) presenting the stimulus;
    (d) detecting a mechanical input;
    (e) receiving the user input corresponding to a selection of the payment account to use for a transaction;
    (f) simultaneously displaying the at least one card, the at least portion of the card number of the at least one card, and the indication for the user of the device to provide identity verification input;
    (g) detecting the identity verification input;
    (h) sending the first signal;
    (i) receiving the second signal; and
    (j) displaying the notification.

28. The computer-program product of claim 1, wherein the instructions are configured such that, when the POS terminal is detected while the backlight of the touchscreen of the device is powered off and the device is operating in the lock screen mode, the following actions are capable of being performed in the following order without any additional user input being required between any of the following actions:
    (a) detecting the POS terminal;
    (b) powering on the backlight of the touchscreen of the device;
    (c) presenting the stimulus;
    (d) detecting a mechanical input;
    (e) simultaneously displaying the at least one card, the at least portion of the card number of the at least one card, and the indication for the user of the device to provide identity verification input;
    (f) detecting the identity verification input;
    (g) sending the first signal;
    (h) receiving the second signal; and
    (i) displaying the notification.

29. The computer-program product of claim 1, wherein the instructions are configured such that, when the POS terminal is detected while the backlight of the touchscreen of the device is powered off and the device is operating in the lock screen mode, the following actions are capable of being performed in the following order without any additional user input being required between any of the following actions and without any additional touchscreen output between any of the following actions:
    (a) detecting the POS terminal;
    (b) powering on the backlight of the touchscreen of the device;
    (c) presenting the stimulus;
    (d) detecting a mechanical input;
    (e) simultaneously displaying the at least one card and the at least portion of the card number of the at least one card, with the indication for the user of the device to provide identity verification input; and
    (f) detecting the identity verification input.

30. A computer-program product tangibly embodied in a non-transitory machine-readable storage medium, including instructions configured to cause one or more data processors of a device to perform actions including:
    storing payment information associated with a payment account;
    detecting a point-of-sale (POS) terminal;
    in response to detecting the POS terminal, presenting a stimulus;
    detecting a mechanical input;
    in response to detecting the mechanical input, enabling the payment information to be accessed; and
    causing a communication to be transmitted to the POS terminal,
    wherein:
    the mechanical input is a mechanical push of a mechanical button;

the actions further include: receiving a user input corresponding to a selection of the payment account to use for a transaction; and the actions further include:
after detecting the POS terminal, when a backlight of a touchscreen of the device is powered off:
powering on the backlight of the touchscreen of the device;
after detecting the POS terminal, when the device is not operating in a lock screen mode:
opening a card-related application, and
displaying, utilizing the touchscreen of the device, a card-related application interface on one or more screens;
after detecting the POS terminal, when the device is operating in the lock screen mode:
identifying at least one card, and
simultaneously displaying, via the lock screen displayed on the touchscreen of the device, the at least one card, at least a portion of a card number of the at least one card, and an indication for a user of the device to provide identity verification input;
after the display, via the lock screen displayed on the touchscreen of the device when the device is operating in the lock screen mode, of the at least one card, the at least portion of the card number of the at least one card, and the indication for the user of the device to provide identity verification input:
detecting, utilizing the device, the identity verification input,
in response to the detection of the identity verification input, generating an identity verification signal utilizing the device,
in response to the generation of the identity verification signal utilizing the device, performing an analysis based on the identity verification signal, and
based on the analysis, sending, to the POS terminal, the communication that includes a first signal, where the identity verification input is required so that no other user input is required after detecting the POS terminal and the mechanical input, and before the first signal is sent; and
after sending, utilizing the device, the first signal:
receiving a second signal, and
in response to the receipt of the second signal when the device is operating in the lock screen mode:
displaying, on the touchscreen of the device and below a time indicia, a notification indicating that use of the at least one card was successful.

31. The computer-program product of claim 30, wherein the actions further include: receiving a user selection indicating that the at least one card is a default card among a plurality of cards.

32. The computer-program product of claim 31, wherein the at least one card is displayed via the lock screen displayed on the touchscreen, based on the user selection.

33. The computer-program product of claim 32, wherein the actions further include:
displaying a settings interface, and
receiving another user selection to enable or disable a capability involving the display of the at least one card on the lock screen, and
wherein the at least one card is displayed via the lock screen, based on the another user selection.

34. The computer-program product of claim 33, wherein the card-related application interface is displayed on a particular screen that is not the lock screen, such that the card-related application interface populates an entirety of the particular screen.

35. The computer-program product of claim 33, wherein the actions further include:
after the receipt of the second signal, when the backlight of the touchscreen of the device is powered off:
powering on the backlight of the touchscreen of the device.

36. The computer-program product of claim 33, wherein the device is configured to operate in the lock screen mode after the detection of the identity verification input and further after the first signal is sent.

37. The computer-program product of claim 33, wherein the device is configured such that the card-related application interface is displayed with the at least one card, the at least portion of the card number of the at least one card, and the indication for the user of the device to provide identity verification input.

38. The computer-program product of claim 33, wherein the device is configured to display, via the lock screen displayed on the touchscreen of the device, with the at least one card, with the at least portion of the card number of the at least one card, and with the indication for the user of the device to provide identity verification input: an option for the user of the device to enter a passcode for causing the first signal to be sent.

39. The computer-program product of claim 38, wherein the device is configured such that:
the card-related application includes an e-wallet application;
the card-related application interface includes an e-wallet application interface;
the at least one card includes a credit card or a debit card;
the card number includes a credit card number or a debit card number;
the first signal includes a financial transaction first signal; and
the second signal includes a financial transaction receipt signal.

40. The computer-program product of claim 39, wherein the instructions are configured such that, when the POS terminal is detected while the backlight of the touchscreen of the device is powered off and the device is operating in the lock screen mode, the following actions are capable of being performed in the following order without any additional user input being required between any of the following actions:
(a) detecting the POS terminal;
(b) powering on the backlight of the touchscreen of the device;
(c) presenting the stimulus;
(d) detecting a mechanical input;
(e) simultaneously displaying the at least one card and the at least portion of the card number of the at least one card, with the indication for the user of the device to provide identity verification input;
(f) detecting the identity verification input;
(g) sending the first signal;
(h) receiving the second signal; and
(i) displaying the notification.

41. The computer-program product of claim 39, wherein the instructions are configured such that, when the POS terminal is detected while the backlight of the touchscreen of the device is powered off and the device is operating in the lock screen mode, the following actions are performed in the following order without any additional user input being required between any of the following actions and without any additional touchscreen output between any of the following actions:
- (a) detecting the POS terminal;
- (b) powering on the backlight of the touchscreen of the device;
- (c) presenting the stimulus;
- (d) detecting a mechanical input;
- (e) simultaneously displaying the at least one card and the at least portion of the card number of the at least one card, with the indication for the user of the device to provide identity verification input; and
- (f) detecting the identity verification input.

42. The computer-program product of claim 33, wherein the device is configured to, after detecting the mechanical input: display an option to, as an alternative to a presentation of a face or a fingerprint of the user, enter a passcode for causing the first signal to be sent.

43. The computer-program product of claim 33, wherein the first signal is an authorization signal and the second signal is a response signal.

44. The computer-program product of claim 43, wherein the notification is displayed via the lock screen on the touchscreen of the device and between an upper time indicia and a lower bar.

45. The computer-program product of claim 43, wherein the identity verification input includes at least one of a face, a fingerprint, or a passcode.

46. The computer-program product of claim 43, wherein the one or more screens is not a lock screen.

47. The computer-program product of claim 43, wherein the device remains in the lock screen mode after the detection of the identity verification input and further after the first signal is sent.

48. The computer-program product of claim 43, wherein the device includes a mobile phone and at least one of:
- a near field communication interface includes a near field communication interface adapter;
- the non-transitory machine-readable storage medium includes a plurality of memories;
- the non-transitory machine-readable storage medium includes a plurality of memories that each store a different subset of the instructions;
- the non-transitory machine-readable storage medium includes a single memory;
- the one or more processors include a single processor;
- the one or more processors include multiple processors;
- the one or more processors include multiple processors each configured to carry out different capabilities;
- after the receipt of the near field communication signal from the terminal utilizing the near field communication interface of the mobile phone, an additional one or more operations is performed before it is determined whether the mobile phone is operating in the lock screen mode and whether the backlight of the touchscreen of the mobile phone is powered off;
- it is determined whether the mobile phone is operating in the lock screen mode before it is determined the backlight of the touchscreen of the mobile phone is powered off;
- the mobile phone operates in the lock screen mode when the backlight of the touchscreen of the mobile phone is powered off;
- the backlight of the touchscreen of the mobile phone is powered off when the mobile phone operates in the lock screen mode;
- it is determined whether the mobile phone is operating in the lock screen mode after it is determined the backlight of the touchscreen of the mobile phone is powered off;
- the backlight of the touchscreen of the mobile phone is powered on after the mobile phone being determined to be operating in the lock screen mode;
- the backlight of the touchscreen of the mobile phone is powered on only after the mobile phone being determined to be operating in the lock screen mode;
- the near field communication signal includes a trigger signal;
- a fingerprint is scanned using a fingerprint scanner is included as part of the touchscreen;
- a fingerprint is scanned using a fingerprint scanner is separate from the touchscreen;
- the determination that the backlight of the touchscreen of the mobile phone is powered off includes a determination whether the mobile phone is in a standby mode;
- the determination that the backlight of the touchscreen of the mobile phone is powered off includes a determination whether the mobile phone is in a sleep mode;
- the first signal includes a code;
- the first signal is sent via another interface separate from the near field communication interface;
- the second signal includes a confirmation;
- the second signal is received via another interface separate from the near field communication interface;
- the use of the at least one card is non-financial;
- transaction information is displayed simultaneously with the indication;
- the at least portion of the card number of the at least one card includes an entirety of the card number;
- the user input other than a fingerprint scan user input, while not required, is capable of being received;
- the user input other than a fingerprint scan user input, while not necessary in a first operational scenario, is capable of being received in a second operational scenario;
- the user input other than a fingerprint scan user input, while not necessary, is capable of being received; or
- the mobile phone is part of a system that includes the terminal.

49. The computer-program product of claim 43, wherein at least one of:
- the non-transitory machine-readable storage medium includes a plurality of memories;
- the non-transitory machine-readable storage medium includes a plurality of memories that each store a different subset of the instructions;
- the non-transitory machine-readable storage medium includes a single memory;
- the one or more data processors include a single processor;
- the one or more data processors include multiple processors;
- the one or more data processors include multiple processors each configured to carry out different capabilities;
- in response to detecting the POS terminal, an additional one or more operations is performed before presenting the stimulus;
- the device operates in the lock screen mode when the backlight of the touchscreen of the device is powered off;
- the backlight of the touchscreen of the device is powered off when the device operates in the lock screen mode;

the backlight of the touchscreen of the device is powered on only after the device being determined to be operating in the lock screen mode;
the notification is displayed in response to the receipt of the second signal while the device is operating in the lock screen mode, after further receipt of additional user input;
the notification is displayed in response to the receipt of the second signal while the device is operating in the lock screen mode, and further in response to receipt of additional user input;
the lock screen mode includes a mode that prevents others from accessing the device;
the lock screen mode includes a mode that prevents others from accessing one or more features of the device;
the lock screen mode includes a mode that prevents others from accessing one or more features of the device, while access to other features is permitted;
a determination that the backlight of the touchscreen of the device is powered off includes a determination whether the device is in a standby mode;
a determination that the backlight of the touchscreen of the device is powered off includes a determination whether the device is in a sleep mode;
the first signal includes a code;
the first signal is sent via another interface separate from a near field communication interface;
the second signal includes a confirmation;
the second signal is received via another interface separate from a near field communication interface;
the display of the at least one card, the at least portion of the card number of the at least one card, and the indication for the user of the device to provide identity verification input, is displayed via the card-related application interface;
the display of the at least one card, the at least portion of the card number of the at least one card, and the indication for the user of the device to provide identity verification input, is not displayed via the card-related application interface;
the display of the at least one card, the at least portion of the card number of the at least one card, and the indication for the user of the device to provide identity verification input, is displayed via the card-related application interface, when the device is operating in the lock screen mode;
the display of the at least one card, the at least portion of the card number of the at least one card, and the indication for the user of the device to provide identity verification input, is not displayed via the card-related application interface, when the device is operating in the lock screen mode;
the display of the at least one card, the at least portion of the card number of the at least one card, and the indication for the user of the device to provide identity verification input, is displayed via the card-related application interface, when the device is not operating in the lock screen mode;
the display of the at least one card, the at least portion of the card number of the at least one card, and the indication for the user of the device to provide identity verification input, is not displayed via the card-related application interface, when the device is not operating in the lock screen mode;
the indication for the user of the device to provide identity verification input is displayed, when the device is not operating in the lock screen mode;
the indication for the user of the device to provide identity verification input is displayed, when the device is operating in the lock screen mode;
the use of the at least one card is non-financial;
in response includes in direct response;
in response includes in indirect response;
in response includes in direct response with no operation therebetween;
in response includes in indirect response with at least one operation therebetween;
transaction information is displayed simultaneously with the indication;
the at least one card is associated with the payment account;
the at least portion of the card number is associated with the payment account;
the at least portion of the card number is part of the payment information;
the at least portion of the card number is not part of the payment information;
the at least portion of the card number corresponds with the payment information;
the card-related application includes code that works with a mobile phone application;
the card-related application includes code that displays a user interface that works in connection with a mobile phone application;
the card-related application is card-related by the application being able to allow access to the payment information;
the card-related application is card-related by the application being able to cause display of the at least one card;
the at least portion of the card number of the at least one card includes an entirety of the card number;
the number associated with the credit card, debit card, gift account, or value account, includes the at least portion of the card number of the at least one card;
the number associated with the credit card, debit card, gift account, or value account includes an entirety of the card number of the at least one card;
the number associated with the credit card, debit card, gift account, or value account, includes an identifier other than the at least portion of the card number of the at least one card;
the at least one card includes the credit card, the debit card, a card associated with the gift account, or a card associated with the value account;
the payment information includes data that includes or is based, at least in part, on at least one of: a username, a password, a name, an alias, a user identifier, a user email address, a physical address, a user phone number, an application identifier, a user context identifier, a cookie, a session identifier, a purchase receipt, an account number, an account alias, a randomly generated identifier, a comment, content, a facial recognition result, a fingerprint scan result, an Internet search query, a photo, a scan of a code, a location, a status, a signal, a transaction, or a unique identifier;
the payment information includes a user identifying aspect;
the payment information is user identifying;
the mechanical input causes the face to be captured when presented;
the mechanical input causes the face to be captured;
the device is part of a system that includes the terminal; and wherein the device is configured for determining a location associated with the device;
determining a presence of at least one other person at the location; and automatically displaying a graphical user interface associated with the determined location and the determined presence of the at least one other person, wherein the device is further configured for determining that the location is proximate to a previously identified item of interest; and
displaying another graphical user interface associated with the determined location and the previously identified item of interest.

50. The computer-program product of claim 30, wherein the device is configured such that the identity verification input includes a face scan user input that includes presenting a face prior to a capture of the face.

51. The computer-program product of claim 30, wherein the user input corresponding to the selection of the payment account is received, after detecting the POS terminal, and before the causing the communication to be transmitted to the POS terminal.

52. The computer-program product of claim 30, wherein at least one of:
the payment information is securely stored by being encrypted;
the presentation of the stimulus indicates that the mechanical input has not been locally received;
the presentation of the stimulus prompts the mechanical input to be locally received;
a representation is capable of being presented independent of the detection of the POS;
the representation is capable of being presented in response to the mechanical input being detected in response to the stimulus being presented in response to the detection of the POS;
the presented stimulus is presented by being displayed;
the presented stimulus includes presented indicia;
the locally received is local by virtue of being received by the one or more data processors;
the locally received is local by virtue of being received by the device including the one or more data processors; or
the payment information is enabled to be accessed, by the POS terminal; and
wherein the instructions are further for determining a location associated with the device; determining a presence of at least one other person at the location; and automatically displaying a graphical user interface associated with the determined location and the determined presence of the at least one other person, wherein the device is further configured for determining that the location is proximate to a previously identified item of interest; and displaying another graphical user interface associated with the determined location and the previously identified item of interest.

53. The computer-program product of claim 30, wherein the instructions are configured such that, when the POS terminal is detected while the backlight of the touchscreen of the device is powered off and the device is operating in the lock screen mode, the following actions are capable of being performed in the following order without any additional user input being required between any of the following actions:
(a) detecting the POS terminal;
(b) powering on the backlight of the touchscreen of the device;
(c) presenting the stimulus;
(d) detecting a mechanical input;
(e) simultaneously displaying the at least one card and the at least portion of the card number of the at least one card, with the indication for the user of the device to provide identity verification input;
(f) detecting the identity verification input;
(g) sending the first signal;
(h) receiving the second signal; and
(i) displaying the notification.

54. The computer-program product of claim 30, wherein the instructions are configured such that, when the POS terminal is detected while the backlight of the touchscreen of the device is powered off and the device is operating in the lock screen mode, the following actions are capable of being performed in the following order without any additional user input being required between any of the following actions and without any additional touchscreen output between any of the following actions:
(a) detecting the POS terminal;
(b) powering on the backlight of the touchscreen of the device;
(c) presenting the stimulus;
(d) detecting a mechanical input;
(e) simultaneously displaying the at least one card and the at least portion of the card number of the at least one card, with the indication for the user of the device to provide identity verification input; and
(f) detecting the identity verification input.

55. The computer-program product of claim 30, wherein the instructions are configured such that, when the POS terminal is detected while the backlight of the touchscreen of the device is powered off and the device is operating in the lock screen mode, the following actions are performed in the following order without any additional user input being required between any of the following actions:
(a) detecting the POS terminal;
(b) powering on the backlight of the touchscreen of the device;
(c) presenting the stimulus;
(d) detecting a mechanical input;
(e) simultaneously displaying the at least one card and the at least portion of the card number of the at least one card, with the indication for the user of the device to provide identity verification input;
(f) detecting the identity verification input;
(g) sending the first signal;
(h) receiving the second signal; and
(i) displaying the notification.

56. The computer-program product of claim 30, wherein the instructions are configured such that, when the POS terminal is detected while the backlight of the touchscreen of the device is powered off and the device is operating in the lock screen mode, the following actions are capable of being performed in the following order without any additional user input being required between any of the following actions:
(a) detecting the POS terminal;
(b) powering on the backlight of the touchscreen of the device;
(c) presenting the stimulus;
(d) detecting a mechanical input;
(e) receiving the user input corresponding to a selection of the payment account to use for a transaction;
(f) simultaneously displaying the at least one card, the at least portion of the card number of the at least one card, and the indication for the user of the device to provide identity verification input;
(g) detecting the identity verification input;
(h) sending the first signal;
(i) receiving the second signal; and
(j) displaying the notification.

57. The computer-program product of claim 30, wherein the instructions are configured such that, when the POS terminal is detected while the device is operating in the lock screen mode, the following actions are capable of being performed in the following order without any additional user input being required between any of the following actions:
- (a) detecting the POS terminal;
- (b) presenting the stimulus;
- (c) detecting a mechanical input;
- (d) simultaneously displaying the at least one card and the at least portion of the card number of the at least one card, with the indication for the user of the device to provide identity verification input;
- (e) detecting the identity verification input;
- (f) sending the first signal;
- (g) receiving the second signal; and
- (h) displaying the notification.

58. The computer-program product of claim 30, wherein the device is configured to operate in the lock screen mode after the first signal is sent despite the first signal being sent in response to the detection of the identity verification input.

* * * * *